US011238382B1

(12) United States Patent
Graziano et al.

(10) Patent No.: US 11,238,382 B1
(45) Date of Patent: Feb. 1, 2022

(54) THRESHOLD CONFIGURATION AND SYSTEM FOR SPACE

(71) Applicant: STEELCASE INC., Grand Rapids, MI (US)

(72) Inventors: Francis Gerard Graziano, Grand Rapids, MI (US); Mark Baloga, E. Grand Rapids, MI (US); Terry D. West, Caledonia, MI (US); Paul Noll, Grand Rapids, MI (US); Nicolas Henri Louis de Benoist de Gentissart, Paris (FR); Karl Jahn Mead, Grand Rapids, MI (US)

(73) Assignee: STEELCASE INC., Grand Rapids, MI (US)

( * ) Notice: Subject to any disclaimer, the term of this patent is extended or adjusted under 35 U.S.C. 154(b) by 1143 days.

(21) Appl. No.: 15/167,354

(22) Filed: May 27, 2016

Related U.S. Application Data

(60) Provisional application No. 62/171,340, filed on Jun. 5, 2015, provisional application No. 62/304,445, filed on Mar. 7, 2016.

(51) Int. Cl.
*G06Q 10/06* (2012.01)
*G06Q 10/10* (2012.01)

(52) U.S. Cl.
CPC . *G06Q 10/063114* (2013.01); *G06Q 10/1095* (2013.01)

(58) Field of Classification Search
None
See application file for complete search history.

(56) References Cited

U.S. PATENT DOCUMENTS

| 8,407,944 | B2 | 4/2013 | Baloga et al. |
| 9,261,262 | B1 | 2/2016 | Baloga |
| 9,380,682 | B2 | 6/2016 | Mead et al. |
| 9,479,730 | B1 | 10/2016 | Noll |

(Continued)

FOREIGN PATENT DOCUMENTS

| JP | 2005234736 A | * | 9/2005 |
| WO | 2007059060 A2 | | 5/2007 |

OTHER PUBLICATIONS

Saruladha. K, Distributed Meeting Scheduler—A Knowledge Based Approach to Schedule Meetings, 2007, International Conference on Computational Intelligence and Multimedia Applications 2007 (Year: 2007).*

(Continued)

*Primary Examiner* — Jerry O'Connor
*Assistant Examiner* — Matthew H Divelbiss
(74) *Attorney, Agent, or Firm* — Quarles & Brady LLP

(57) ABSTRACT

A system comprising a database storing schedule information associated with different meeting spaces, at least a first threshold display located proximate at least a first meeting space, an employee tracking system, a processor programmed to perform the steps of receiving employee tracking information including locations and identities, determining the relative juxtapositions of employees with respect to the first threshold display, identifying content to be presented on the first threshold display based on identity of a first employee, a distance between the first employee and the display and the schedule information.

14 Claims, 71 Drawing Sheets

(56) References Cited

U.S. PATENT DOCUMENTS

| | | | | |
|---|---|---|---|---|
| 2013/0091440 A1* | 4/2013 | Kotler | .................... | G06Q 10/10 |
| | | | | 715/753 |
| 2014/0028781 A1* | 1/2014 | MacDonald | ........... | H04N 7/147 |
| | | | | 348/14.07 |
| 2015/0085060 A1* | 3/2015 | Fish | ....................... | H04N 7/142 |
| | | | | 348/14.03 |
| 2015/0089394 A1* | 3/2015 | Chen | ...................... | H04N 7/142 |
| | | | | 715/753 |

OTHER PUBLICATIONS

Lai, et al., BlueSpace: Personalizing Workspace Through Awareness and Adaptability, Int. J. Human-Computer Studies, 2002, 57:415-428.

Steelcase, RoomWizard II Scheduling System, Product Brochure, Copyright 2011 Steelcase.

* cited by examiner

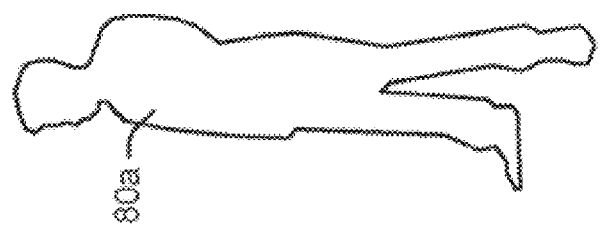
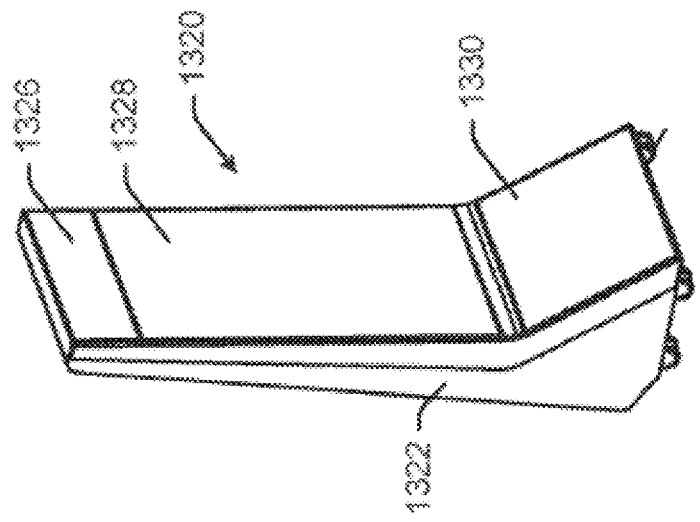
Fig. 62

THRESHOLD CONFIGURATION AND SYSTEM FOR SPACE

CROSS-REFERENCE TO RELATED APPLICATIONS

This application claims priority to U.S. provisional application Ser. No. 62/171,340 which is titled "Threshold Configuration And System For Space" which was filed on Jun. 5, 2015 and also claims priority to U.S. provisional application Ser. No. 62/304,445 which is titled "Threshold Configuration And System For Space" which was filed on Mar. 7, 2016 which is incorporated herein in its entirety by reference.

STATEMENT REGARDING FEDERALLY SPONSORED RESEARCH OR DEVELOPMENT

Not applicable.

BACKGROUND OF THE DISCLOSURE

The field of the invention is transitional technology and architecture for distinguishing physical spaces and helping people make psychological transitions when moving among different spaces that are associated with different activities.

One primary goal of most businesses is to increase profits year over year. One way to increase profits is to increase productivity of existing business resources. Thus, for instance, if a design engineer is able to increase her output by 10% this year by using a new CAD software program which expedites generation of CAD images, an increase in her productivity should result in increased profits. As another instance, if employee sick leave can be reduced by 15% from one year to the next by implementing a health improvement program throughout a company, an increase in productivity should increase profits. Thus, businesses are routinely searching for ways to increase employee and team productivity.

During a typical work day a typical employee will participate in various types of activities. For instance, a typical employee that works at an employer's facility may travel to work between eight thirty and nine AM, may have one hour between 9 and 10 AM for personal focused activities in a personal office, may then have a one and one half hour meeting from 10 AM to 11:30 AM, may have another half hour for personal focused work until a lunch meeting from noon until 1 PM, may have another 1 hour for focused work until 2 PM followed by a half hour of meditation, 15 minutes of travel to another facility and 15 minutes of downtime there after prior to a one hour 3 PM meeting and another one hour 4 PM meeting prior to traveling back home at 5 PM. Thus, this employee's day includes three individual focused work periods, four different group meetings, one period for personal rejuvenation (e.g., the meditation period) and various travel and transition times.

Recognizing that much employee time is spent performing focused individual activities and in group meetings and conferences, the computing industry has developed many different hardware and software tools for increasing productivity in those environments. For instance, in the case of individual focused activities, many companies provide computers for use by most of their employees and routinely update software on those computers in an effort to increase individual productivity. One simple way individual productivity has been increased has been by reducing the amount of time required to boot up a personal computer so that a morning transition from travel to individual focused work is expedited. Another simple way that productivity has been increased for at least some employees has been to swap relatively large computer displays for smaller displays thereby enabling an employee to more easily access two or more applications in different windows during focused work, to more easily compare different work product, etc.

In the case of group work activities, the computing industry has developed and continues to develop conference room affordances that help people easily share and organize digital content within a space in an intuitive and efficient manner. For instance, some conference rooms include several large flat panel displays that can present content from one or more personal computing devices used by employees. One example of conference room technology is the MediaScape system by Steelcase which includes two or more large flat panel displays and a control system that enables any of several different conferees within a space to present digital content to others in the space in an egalitarian fashion (e.g., any conferee can take control or give up control of one or more of the displays at any time without requiring authorization from some other conferee).

In addition to the computing industry, other industries have developed products specifically designed to increase individual and group productivity. To this end, workstation desks, specialized task chairs, monitor support arms, keyboard support arms and specialized lighting devices have been developed for creating ideal individual work spaces for focused work. In the case of group meetings, specialized conference tables, chairs, breakout spaces, etc., have been developed.

While computer and environmental affordances have helped employees achieve substantially optimal productivity during at least parts of focused individual or group activity periods, relatively non-productive periods often times occur during transitions from one activity to a subsequent activity. For example, assume eight people (e.g., conferees) are scheduled to meet in a conference room AA at 10 AM for a one hour meeting and that only five of the eight conferees are in room AA at 10 AM when the meeting is supposed to start. Here, while waiting for the remaining three conferees, the five present conferees often effectively waste their time wondering where the other three conferees are, when the other three conferees will arrive or if any of the three conferees is skipping the conference. In some cases present conferees will start trying to contact the missing conferees via phone, text or e-mail. Where at least one conferee is still absent after a period of waiting (e.g., 10 minutes), present conferees may start the meeting without the missing conferee(s). If a missing conferee arrives late after a conference has commenced, often times the conferees that were present when the conference was initiated will stop and fill in the late conferee with information about what has already transpired.

Clearly the transition from prior activities to the conference and conference space described above is inefficient due to the tardy conferees. There are many other reasons why transitions from one activity to another are inefficient. For example, inefficiency can result from conferees being unclear about which of several conference spaces have been reserved for a conference upon arrival, the purpose(s) of a specific conference, topics to be addressed during a specific conference, a target work product to achieve by the end of a conference, who is attending a specific conference, etc. Inefficiency in transition can also result from small talk that always seems to occur at the beginning of a conference, forgetfulness about a previous state of a project associated with a conference, uncertainty about what has transpired since a last conference associated with a project, access to personal content that is or may be important to a project associated with a conference, etc. One other source of transition inefficiency occurs when a prior conference in a space runs long and into a period associated with a next conference or when one conference has to be unnecessarily moved to a different space because the conference runs into the time associated with a next conference where the next conference will be starting late due to one or more tardy conferees.

While transitions into conference are particularly inefficient, transitions out of a conference activity can also be inefficient. For example, in many cases conferees may lose track of time and not optimally wrap up a conference session with summary of content developed and a path forward. Where the end of a meeting is rushed, often times a sub-set of conferees are required to work thereafter to develop a consensus among the conferees about work product and the path forward instead of handling those activities during the session. As another example, sometimes one or more conferees will leave a conference prior to the scheduled end time. Here, in many cases the act of leaving the conference early may be particularly disruptive as other conferees may stop conference activities to summarize content and the path forward while an entire team is present. Where content and the path forward is summarized prior to the end of a session period, often times activities during the remaining portion of the session devolve into small talk and social activities. As conferees leave a space used for a session, often times other employees are waiting to use the space for another meeting and continuing consideration of meeting materials or wrapping up session activities is difficult at best.

In addition to transitions into and out of conference being inefficient, transitions to and from other activities are also relatively inefficient. For instance, a transition from a group conference to a personal rejuvenation session (e.g., a half hour meditation period) is often fraught with inefficiency. For example, where a first employee meditates in her office, it may take the first employee 10 or more minutes to settle down and start actually gaining benefit from her meditation activity. If a second employee enters the first employee's office during the meditation session, the value of the session would likely be reduced appreciably.

As another instance, a transition from a group session in a conference room to a personal office for individual focused work can also be inefficient. In this regard, when an employee leaves a conference and walks to her office, the employee may remain focused on one or more topics addressed during the conference session. On her way to her office, the employee may run into another employee and have a brief conversation about a social activity coming up on the following Saturday and another conversation with a different employee about a new project getting started in a different business unit. Here, when the employee gets back to her office, she will have been mentally pulled in several different directions and it may be difficult to refocus on individual work. For instance, if the employee set three goals for personal focused work at the beginning of her day, it may be difficult to refocus on any one of her three goals when she arrives at her office. Instead, the employee may button up some aspect of the previous conference (e.g., make a call, finish up work product, etc.), may address some aspect of the new project or may start to plan the Saturday social activity. While some inadvertent redirection during an employee's day is often necessary, in most cases such redirection is optional and reduces productivity substantially.

Thus, what is needed is a system that can help people efficiently transition from one activity to another both physically and psychologically. More specifically, what is needed is a system that exists within the space between locations of sequential activities as well as within the time periods between those sequential activities to help prepare people to participate in a next activity regardless of prior activities.

BRIEF SUMMARY OF THE DISCLOSURE

It has been recognized that physical thresholds between spaces can be designed and used to smooth transitions between different sequential activities that occur throughout an employee's typical work day. Here, for instance, where a first employee arrives at a space to be used for a meeting 20 minutes prior to the scheduled start time of the meeting, a threshold display screen outside the meeting space may operate to confirm the location and scheduled time of the meeting and may present information related to the locations of other employees scheduled to attend the meeting. For instance, where five other employees are scheduled to attend the meeting locally and two are scheduled to link to the meeting remotely via telepresence systems, the threshold may indicate if any employees are already locally present or linked remotely. Based on this simple information, the first employee can quickly develop a plan for how best to use her 20 minutes prior to the scheduled meeting start time. For instance, the employee may decide to head to a coffee station and get a cup of coffee prior to meeting commencement. As another instance, the employee may decide to enter the meeting space and have a brief conversation with a present local employee. In some cases the threshold may allow the first employee to link to an available remote employee via telepresence to have a quick side bar prior to commencement of the meeting.

In addition to indicating space and invited employee statuses, the threshold may also present other useful information such as content (e.g., files, records, documents, images, etc.) that have been added to a meeting queue so that the early arriving employee has the ability to access that content for review, to prepare for the meeting, etc. As another instance, a meeting agenda may be presented to the employee or meeting goals may be presented to the employee. Other information types that may be presented include historical information related to the meeting and perhaps a larger project that is associated with the specific meeting, current project status, more detailed information about employees invited to the meeting (e.g., titles, job descriptions, other projects the employees are working on, etc.). In some cases other content may be presented as hyperlinks where each link can be selected to access additional information.

It has been recognized that there a threshold can server many different purposes at the same time. To this end, when an employee is close to a threshold to view detailed information, the employee's field of view typically only includes a relatively small area (e.g., 3 by 3 feet). Thus, where a threshold surface is larger than the typical field of view, other sections of the threshold can and should be used for other purposes. For instance, while a first employee is examining detailed content in her field of view field on a threshold, edge sections of the threshold or upper or lower sections can be used to signal space and meeting status, to indicate employee status, etc., so that other employees that are spaced further away from the threshold can use that information to assess meeting, space and employee statuses.

In at least some embodiments content presented to employees via a threshold may be changed by a controlling server as a function of the distance between an employee and the threshold. Thus, for instance, where an employee is far away (e.g., more than 15 feet away) from a threshold, the threshold content may simply include terse information such as a space name, a next meeting name and a countdown clock indicating time prior to the scheduled start time for a next meeting in the associated space. If an employee moves to an intermediate distance from the threshold (e.g., 6 to 15 feet), the threshold may be controlled to present more detailed information such as employee status information. If the employee then moves to a close distance from the threshold, the threshold may present even more detailed information to the employee automatically.

Whether or not a threshold presents detailed content to an employee may depend on whether or not the employee is scheduled to attend a next meeting in an associated space. For instance, where a first employee is scheduled to attend a meeting, detailed meeting content may be presented and if a second employee is not scheduled to attend, the detailed content may not be presented when the second employee approaches the threshold.

Thresholds may take several different forms and an exemplary set of thresholds are described in this disclosure. A simple threshold may include a large flat panel display screen located outside an associated meeting space. A more afforded threshold may include an emissive surface or structure that forms a proscenium that surrounds the sides and upper portion of a door that opens into an associated meeting space. A still more elaborate threshold may include emissive surfaces or structure that forms a corridor that employees pass through when entering an associated meeting space. In some cases a threshold interface or surface may be presented within a meeting space (e.g., on a wall, as part of the top surface of a conference table assembly, as a field on a large common display screen within the meeting space where the screen is used for other purposes, etc.). In some cases a threshold may be presented on a display screen of a portable personal computing device that is brought into a meeting space. In some cases a threshold may be presented on the display screen of a remote computing device (e.g., a remote laptop or desktop computer).

In some cases a meeting space may include at least one entry and at least one exit and separate entry and exit thresholds may be presented adjacent the entry and exit openings into the space. Here, in at least some cases activities by an employee using an entry threshold may continue to be supported and effectively moved into the meeting space as the employee moves into the meeting space. Similarly, activities that occur during a meeting in the meeting space may automatically or at least semi-automatically be moved to and represented on the exit threshold so that employees moving from the meeting space to the exit threshold can maintain at least some level of continuity of thought.

In cases where there are not separate entry and exit thresholds, a single threshold screen or device may be used for both entry and exit functions. Thus, prior to a meeting an employee may use a single threshold to perform pre-meeting activities and once a meeting ends, a sub-group of employees from the meeting may use the same single threshold for a 15 minute wrap up session to complete incomplete meeting activities.

In at least some embodiments a system server may control several different types of thresholds within a single system. For instance, some threshold arrangements or configurations may include thresholds outside a meeting space as well as threshold elements inside the meeting space (e.g., table top thresholds, wall mounted or cart mounted thresholds, etc.) and different threshold content may be presented via each of the different threshold elements. In this same system, remote device thresholds may be provided for remote employees.

In at least some embodiments thresholds that are not required at specific times for the primary purpose of presenting information related to a specific spatially associated space may be used to present information to travelling employees as they travel toward other meeting spaces. For instance, as a first employee follows a path to a first meeting space and encounters a threshold screen at a location along the path, the threshold may present meeting and employee status information to the first employee. Based on the presented information, the first employee can develop a sense of whether or not the employee needs to move quickly to the first meeting space or not. For example, if the first meeting is scheduled to start in 2 minutes and all the other invited employees are already present at the first meeting space or linked to the first space remotely, the first employee would know that she is the only invitee that is not ready for the meeting to begin and may go to the first meeting space quickly. In this same case if three of the other invited employees are still not present at the first space or remotely linked two minutes prior to the scheduled start time, the first employee can surmise that the meeting will start late.

Some embodiments include a system for transitioning employees from one enterprise space to another enterprise space, the system comprising a database storing schedule information associated with different meeting spaces within the enterprise space, at least a first threshold display surface for presenting digital content to at least one employee when the emissive surface is in the field of view of the at least one employee, the first threshold display surface located proximate at least a first meeting space, an employee tracking system for tracking the locations and identities of employees within the enterprise space, a processor programmed to present content on the emissive surface, the processor programmed to perform the steps of (i) receiving employee tracking information including locations and identities of employees from the tracking system, (ii) determining the relative juxtapositions of employees in the enterprise space with respect to the first threshold display surface, (iii) identifying content to be presented on the first threshold display surface based on identity of a first employee located near the first threshold display surface, a distance between the first employee and the threshold display surface and the schedule information in the database for the first meeting space and (iv) presenting the identified content via the first threshold display surface.

In some cases the identified content changes automatically as the distance between the employee and the first threshold display surface changes. In some cases the identified content includes information types, a first set of information types presented to the first employee when the first employee is scheduled to attend a meeting in the first meeting space and a second set of information types different than the first set presented to the first employee when the first employee is not scheduled to attend a meeting in the first meeting space. In some cases the information types presented to the first employee depend on whether or not a meeting that the first employee is to attend in the first meeting space has commenced. In some cases the information types presented to the first employee depend on whether or not a meeting that the first employee is to attend in the first meeting space has ended.

In some cases wherein at least some of the content include information related to identities of employees in the first meeting space. In some cases at least some of the content includes information related to locations of other employees that are to attend a meeting in the first meeting space. In some cases at least some of the content includes information related to estimated times of arrival of employees scheduled to attend a meeting in the first meeting space.

In some cases, if a workstation proximate the first meeting space is available prior to commencement of a meeting that the first employee is to attend is available, the identified content includes an offering of the workstation to the first employee for use. In some cases the processor is further programmed to divide the threshold display surface into different areas automatically to provide different areas and personalized content in each of those areas as a second and more employees are detected proximate the display surface. In some cases the presented content includes interface tools that enable employees to access at least some content information associated with a meeting that is to take place. In some cases the processor presents at least first and second different content sets to an employee based on distance between the employee and the display surface.

In some cases the processor determines if an employee is within an intermediate distance range of the display surface, further away than the intermediate distance range or closer than the intermediate distance range, and presents first, second and third content sets when the employee is closer than the intermediate distance range, within the intermediate distance range and farther away than the intermediate distance range, respectively. In some cases the processor offers an employee that is closer than the intermediate distance range an option to view the third content set and only presents the third content set when the employee accepts the option.

In some cases the third content set includes more detailed personal information than the first and second content sets. In some cases the display surface includes at least one section arranged so that the surface thereof is relatively precluded by an employee that is proximate the display surface and wherein the third content set is presented on the at least one section while content in the first and second content sets is presented on other sections of the display surface.

Other embodiments include a method for use with a threshold display surface, the method for facilitating employee transitions into and out of meeting spaces proximate the threshold display surface, the method comprising the steps of storing a space schedule in a database where the space schedule indicates meetings scheduled for meeting spaces in an enterprise space, storing employee schedules in a database where the employee schedules indicate meetings that employees are scheduled to attend within the meeting spaces, identifying locations of employees within the enterprise space in which the threshold display surface resides, determining identities of employees at locations proximate the threshold display surface, when a first employee is proximate the threshold display surface, identifying a meeting that the first employee is scheduled to attend in one of the meeting spaces, presenting meeting status information related to status of the meeting that the first employee is to attend via the threshold display surface, determining statuses of other employees scheduled to attend the meeting that the first employee is to attend and presenting employee status information for at least a subset of the other employees scheduled to attend the meeting via the threshold display surface.

In some embodiments the method further includes the steps of, after the meeting that the first employee is to attend is completed, detecting that the first employee is approaching the threshold display surface and presenting other information associated with the completed meeting to the first employee for consideration. In some cases the other information associated with the completed meeting includes a content queue that renders content considered during the meeting accessible. In some cases, when a second employee is proximate the threshold display surface, identifying a second meeting that the second employee is scheduled to attend in one of the meeting spaces, presenting meeting status information related to status of the second meeting that the second employee is to attend via the threshold display surface, determining statuses of other employees scheduled to attend the second meeting that the second employee is to attend and presenting employee status information for at least a subset of the other employees scheduled to attend the second meeting via the threshold display surface.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL
VIEWS OF THE DRAWINGS

FIG. 62 is a perspective view of a totem assembly that is consistent with at least some aspects of the present disclosure;

DETAILED DESCRIPTION OF THE DISCLOSURE

Figure 1:
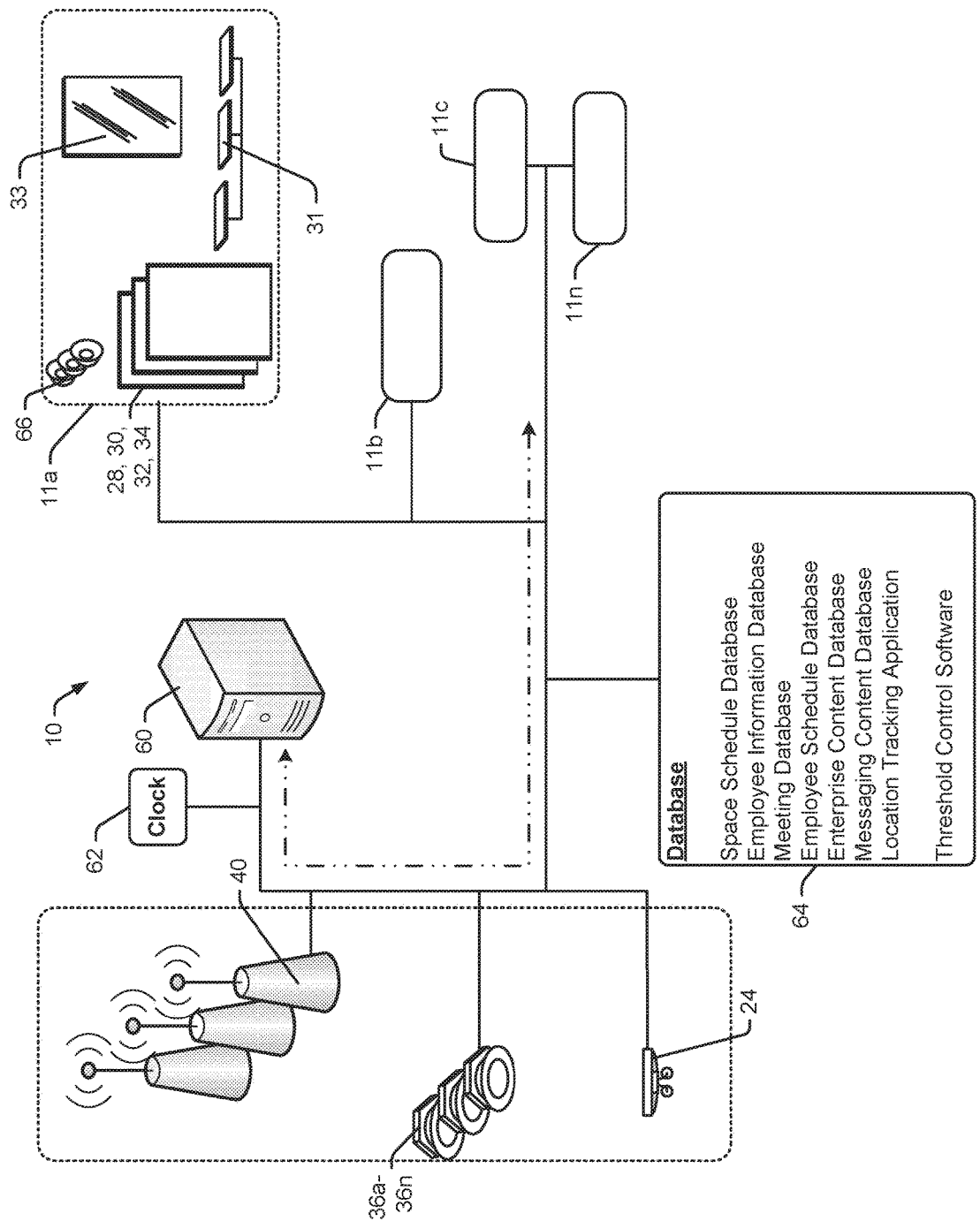
FIG. 1 is a schematic view of an exemplary threshold configuration as consistent with at least some aspects of the present disclosure.

The various aspects of the subject disclosure are now described with reference to the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the word "exemplary" is used herein to mean serving as an example, instance, or illustration. Any aspect or design described herein as "exemplary" is not necessarily to be construed as preferred or advantageous over other aspects or designs. The disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Unless indicated otherwise, a person (e.g., an employee of an enterprise, a contractor, a supplier, a client or customer, etc.) that participates in or that is scheduled to participate in a conference or a meeting will be referred to herein as an enterprise "employee" and labels 80, 80*a*, 80*b*, etc., will be used to refer to employees in the figures and he following specification. In addition, unless indicated otherwise, the phrase "system server" will be used herein to refer to any type of computing device or configuration of devices capable of performing the processes described herein. For instance, a system server may include a dedicated system server, a workstation, a personal computer, a laptop computer, a tablet type computing device or some other type of computing device. In addition, while the system server may include a single computing device, in many cases it is contemplated that the system server may include a number of linked servers or other computing devices, each performing different functions and processes or the set cooperating to perform different functions and processes as described in this specification. For example, a first server may run space scheduling software designed to maintain schedules for all enterprise meeting rooms or spaces, a second server may run employee schedule software designed to maintain schedules for employees associated with an enterprise, a third server may manage enterprise content (e.g., documents, images, videos, files, records, etc.) that is developed by employees and that may be shared among employees associated with the enterprise, a fourth server may run resource locating or tracking programs for tracking the instantaneous locations of resources, including employees, in space, and a fifth server may run software for driving system thresholds based on information retrieved from the first through third servers that are linked via some type of communication network. As another example, server 60 may include a plurality of processors linked to different components where the processors are wirelessly linked to each other or to a central server for communication and cooperation to form an internet of things.

In the disclosure that follows, several exemplary threshold configurations are described that include different threshold device affordance sets. For instance, referring to FIG. 3, a first exemplary threshold affordance set includes a flat panel display screen 32 mounted to an exterior surface of a wall structure outside a meeting space and two speakers 66 adjacent screen 32. As another example, see the exemplary second threshold configuration in FIG. 21 that includes an emissive surface structure that surrounds an entry into a meeting space and the third configuration in FIG. 23 that includes an emissive surface structure that has a depth component to it.

Other threshold configurations are contemplated, some of which will be described hereafter. While most disclosed concepts will be described in the context of one or a subset of threshold configurations, it should be recognized that most of the disclosed concepts may be used in other threshold configurations. In addition, in most cases it is contemplated that a conferencing system may include two or more different types of threshold configurations associated with two or more different meeting spaces. Thus, for instance, a conferencing system may include 100 different meeting spaces and each of the meeting spaces may include a space specific threshold, some of the thresholds being of a first type, some of the thresholds being of a second type, some of the thresholds being of a third type, and so on.

In addition, in the disclosure that follows, several of the embodiments are described as including emissive surfaces that can be used to present digital content to employees. The phrase emissive surface is not intended to be particularly limiting and instead, unless indicated otherwise, should be construed as including any type of content presentation surface such as an electronic display screen or surface, a projected content receiving surface, a glass structure on which content may be presented, etc.

In the disclosure that follows emissive surfaces are often virtually divided into different fields in which different types of information are presented. It at least some cases it is contemplated that a specific convention may be implemented throughout an enterprise whereby all threshold surfaces are divided in a substantially similar fashion and operated in similar fashions so that employees can develop an understanding of how best to use the thresholds over time and the meanings of signaling presented by the thresholds. For instance, simple color coding to indicate status of a meeting space (e.g., meeting starts in five minutes, meeting progressing, meeting ending in five minutes, et.) may be presented in the same location on each threshold structure so that employees learn to rely on the color coding at those threshold locations as signals about space status. As another instance, all thresholds may be driven in the same fashion so that when no employee is close or intermediately close, the thresholds present large format terse content, when an employee is within an intermediate distance of a threshold and is scheduled to attend a next scheduled meeting for an associated space, the threshold presents general meeting and scheduled employee status information in an intermediately sized format and when an employee is close to a threshold and is scheduled to attend a next scheduled meeting for an associated space, the threshold presents information that is specifically targeted toward the specific employee in a detailed content section of the threshold emissive surface while still presenting more terse space and employee status information on other areas of the emissive surface to serve both the proximate employee and other employees that are at long or intermediate distances from the threshold. While some content presentation and virtual field conventions that are particularly advantageous are described hereafter, other conventions are contemplated.

Referring now to the drawings wherein like reference numerals correspond to similar elements throughout the several views and, more specifically, referring to FIG. 1, the present disclosure will be described in the context of an exemplary conferencing system 10 that includes a plurality of conference or meeting space configurations 11a, 11b, 11c . . . 11n within one or a set of enterprise facilities, that are linked to a system server 60 via an intranet, the internet, one or more wide or local area networks, or any type or combination of communication networks. A database 64 is linked to server 60 as are wireless access points 40, high definition digital cameras 36a-36n and one or more microphones 24 or other types of sensing devices. The access points 40, cameras 36a-36n, microphones 24 and other sensing devices are located at specific locations within one or more enterprise facilities and are used as input devices to provide sensed information and received data to server 60. Server 60 uses the received information and data to perform various functions and processes that are consistent with at least some aspects of the present disclosure. In addition, the access points 40 may be used to transmit data, information or commands to various devices located within enterprise space. A clock device 62 is also linked to server 60 to track time. While shown separately to clearly indicate that system 10 includes a clock, the clock 62 would typically be provided as part of the system server 60 itself.

Referring still to FIG. 1, each of the meeting space configurations 11a through 11n includes a set of space affordances including, among others, threshold configurations where each configuration includes devices for providing threshold content to employees at specific locations within enterprise space. Here, in at least some embodiments threshold devices are devices that are generally provided at transition locations within enterprise space that are controlled to provide information designed to aide employees in transitioning from one activity (e.g., a first meeting) to another activity (e.g., a second subsequent meeting) or to allow employees to constructively use time periods between scheduled activities. Exemplary threshold devices include at least one display screen 32 and audio speakers 66 associated with space configuration 11a but may also include other devices such as additional screens, additional speakers, lighting 31, window treatments (e.g., blinds, opacity controllable glass wall and window structures 33), etc. For instance, in some cases a large flat panel display screen may be provided outside a meeting space on a wall near an entryway and information may be presented on that display indicating space status. Unless indicated otherwise, it will be assumed that the threshold configurations associated with space configurations 11a, 11b and 11c include the first, second and third threshold configurations generally shown in FIGS. 3, 21 and 23, respectively.

Hereinafter, while many different types of devices may be controlled to present different threshold experiences, unless indicated otherwise, only screen and speaker devices control will be described in detail. Nevertheless, it should suffice to say that lighting, opacity controllable glass walls and windows, etc., may also be controlled to signal different space and employee statuses and other conditions in addition to or instead of screen and speaker control in some cases.

Referring yet again to FIG. 1, database 64 stores data and information used to drive various other system devices as well as software run by server 60. Among other information, database 64 may store a space schedule database, a meeting database, an employee information database, an employee schedule database, an enterprise content database, a messaging content database, a location tracking software application, and threshold control software. The space schedule database stores schedules for all of the space configurations 11a through 11n. For instance, for a first space configuration 11a, the space schedule database may store meeting titles for each scheduled meeting along with schedule periods or time slots for each of the meeting titles.

The meeting database stores additional meeting information for each of the meeting titles stored in the space schedule database. For instance, exemplary additional meeting information may include the names of employees that have been invited to a specific meeting, indications of which employees have accepted the invites and which have not accepted the invites, information specifying how (e.g., remote or local) employees intend to attend the meeting as well as meeting content such as an agenda, a queue of content that is intended to be presented or at least be made available for quick access during the meeting as well as information related to who (e.g., which employee) posted the content to the queue for presentation or consideration. U.S. patent application Ser. No. 14/640,288 (hereinafter "the '288 application") which was filed on Mar. 6, 2015 and which is titled "Method And System For Facilitating Collaboration Sessions" describes one system that enables conferees to post meeting content to a queue prior to the start of a meeting and that reference is incorporated herein in its entirety by reference.

The employee information database may include identity information for each person associated with an enterprise (e.g., clients, customers, suppliers, etc.) including names, distinct identification numbers or labels, e-mail addresses, phone numbers, titles, job abstracts, etc.

The employee schedule database includes schedules for each or at least a subset of employees (e.g., employees may have to opt into the system tracking their personal schedules). For instance, for a first employee, the employee schedule database may indicate for a specific day, when and where the first employee has meetings or other scheduled activities. The schedule database may also build in travel times from one scheduled location to another which can be used to help the employee transition between scheduled activities on time.

The enterprise content database stores files, records, documents, images, videos, audio recordings and other types of digital content that may be developed or stored by enterprise employees or other people associated with the enterprise. At least a subset of this content may be accessed by any employee at any time while other content in this database may only be accessed by specific employees or sub-sets of employees. In at least some cases this content may be indexed by employee so that each employee may be able to access or may be presented with employee specific content at times.

The messaging content database includes different types of electronically stored messages for enterprise employees. For instance, the stored messages may include e-mails, voice mails, text messages, video messages, blog posts, social network messages, etc. The idea here is to allow an employee to access or receive messages at different locations within an enterprise when that employee has unscheduled time between scheduled activities. Hereinafter, unless indicated otherwise, the phrases "free time" and "free period" will be used to refer to time periods during which an employee is not scheduled to participate in some activity (e.g., a meeting or conference).

The threshold control software includes specifications that indicate threshold device locations and characteristics as well as content that is to be presented via each threshold device and how to present that content on each threshold device.

Figure 2:
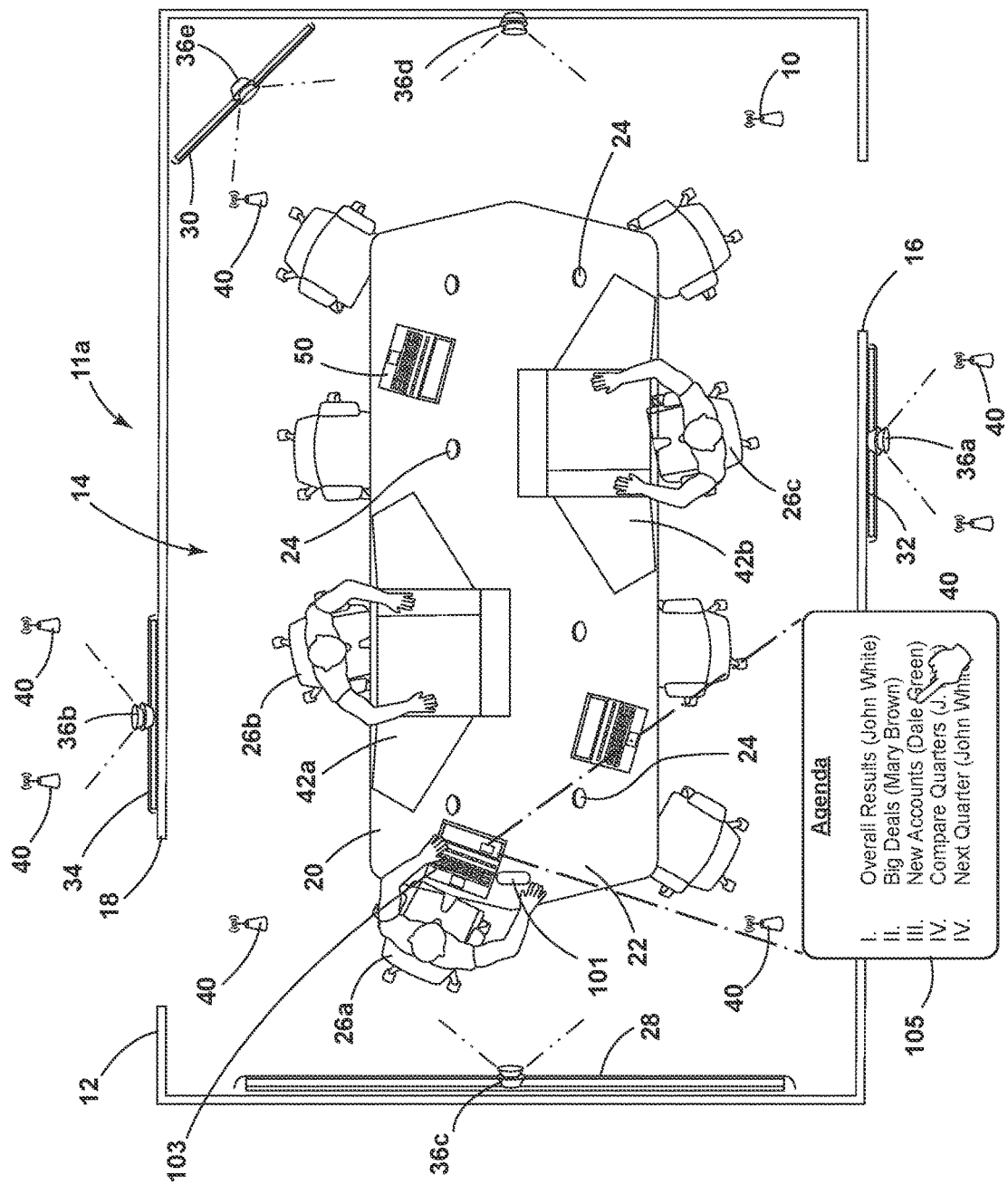
FIG. 2 is a top plan schematic view of an exemplary meeting space and threshold configuration spatially associated therewith.

Referring still to FIG. 1 and now also to FIG. 2, exemplary space configuration 11a includes a wall structure 12 that divides a meeting space 14 from other ambient space there around. The wall structure 12 forms at least a first egress 16 into space 14 and includes a conference table assembly 20 and a plurality of conference chairs, three of which are labeled 26a, 26b and 26c. In addition, one or more large flat panel electronic displays 28 may be mounted to an interior surface of the wall structure 12 to face space 14 for sharing content among employees within space 14 and one or more cameras 36c, 36d, etc., may be located within space 14 for obtaining video of the space 14 to facilitate telepresence activities between employees in space 14 and one or more remote employees located at one or more remote locations.

Figure 3:
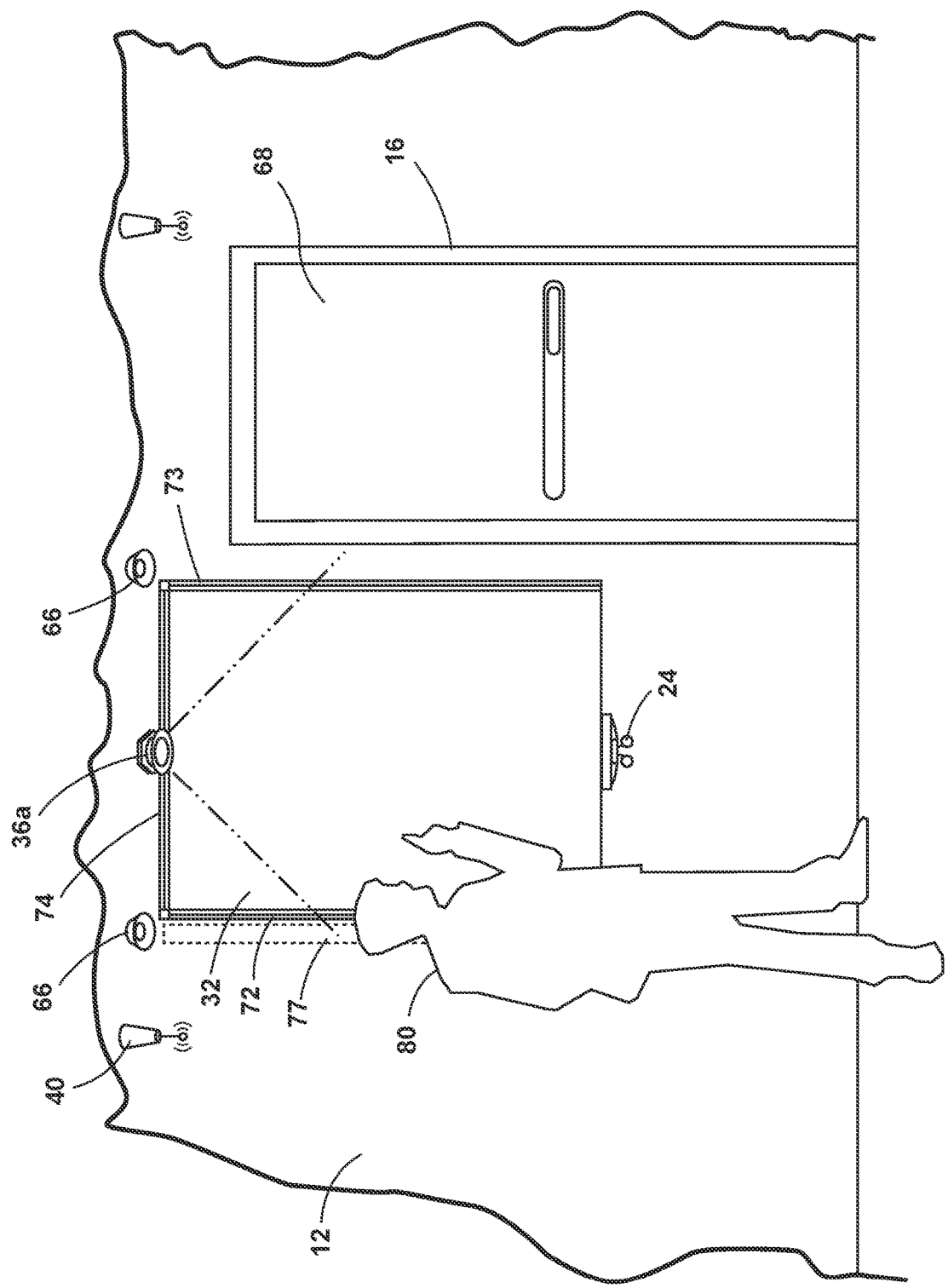
FIG. 3 is a front plan view of the threshold entry configuration shown in FIG. 2.

Referring still to FIG. 2 and now also to FIG. 3, in an exemplary simplified system, the threshold configuration associated with space configuration 11a may simply include a single relatively large (e.g., 2 to 4 feet wide by 3 to 6 feet high) display screen 32 mounted to a wall surface adjacent the space entry opening 16. In FIG. 3 the opening is shown temporarily closed by a hinged door 68. While display screen 32 may include a simple flat panel display screen in some embodiments, in the illustrated embodiment, screen 32 is shown having a central flat rectangular section 70 and curved emissive top and first and second lateral edge sections at 74, 72 and 73, respectively. To this end, U.S. patent application Ser. No. 14/500,091 (hereinafter "the '091 application") which is titled "Curved Display And Curved Display Support" and which was field on Sep. 9, 2014, teaches various curved emissive surface concepts that may be used to configure a screen with curved edges. The '091 application specification is incorporated herein in its entirety by reference. A radius of curvature of each of the curved sections 72, 73 and 74 of the screen 32 may be between one inch and six inches and in a particularly advantageous embodiment may be between two and four inches. In at least some cases the edge of each curved section may be immediately adjacent (e.g., within one half an inch) a supporting wall surface while in other cases the screen assembly 32 may be held off the supporting wall to be suspended in space so that the edges are spaced from the wall surface be a gap (e.g., 2 to 5 inches).

Figure 4:
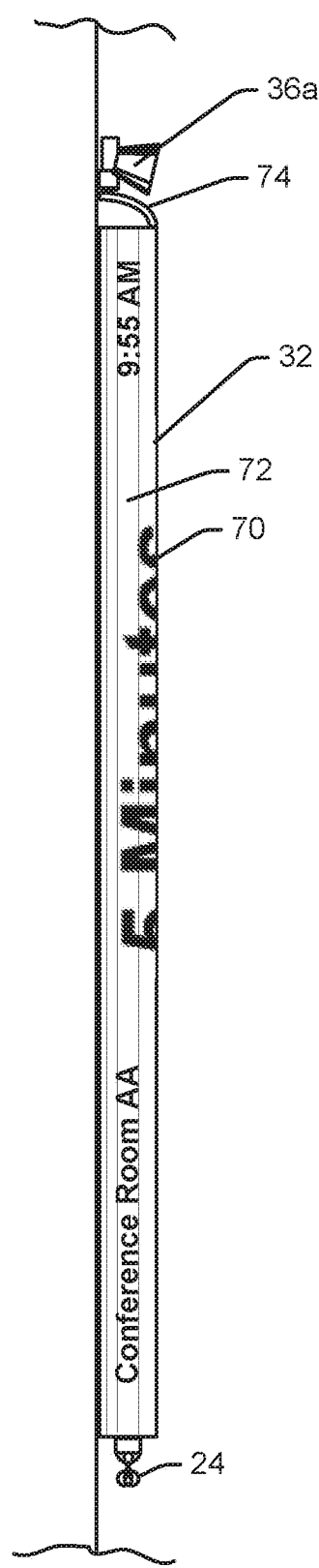
FIG. 4 is a side view of the exemplary threshold configuration shown in FIG. 3.
Figure 5:
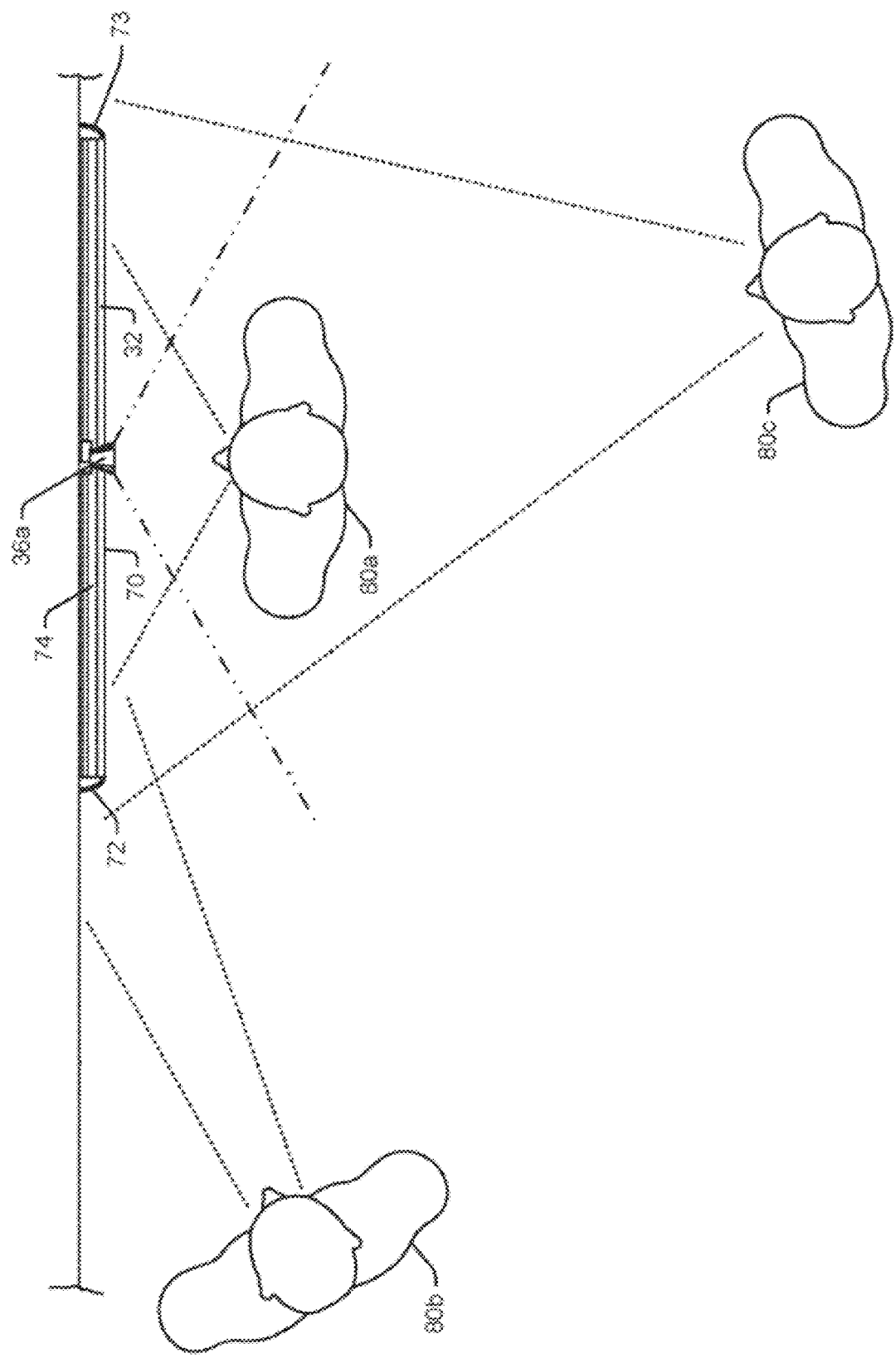
FIG. 5 is a top plan view of the threshold configuration shown in FIG. 3 showing employees at different relative juxtapositions with respect to the threshold configuration.

Referring also to FIGS. 4 and 5, once hung on a supporting wall surface, the emissive surfaces of the curved sections 72, 73 and 74 can be seen when screen 32 is viewed from a side vantage point. In at least some embodiments it is contemplated that when a curved screen section 72, 73 or 74 is illuminated, light therefrom may subtend and be reflected off an adjacent portion of wall structure 12. Thus, for instance, where curved edge section 72 is illuminated green in FIG. 3, the light there from may subtend wall 12 at area 77 so that that portion of the wall glows green to provide a relatively large signaling effect when desired. When section 72 is illuminated red, the red light subtends the adjacent wall area 77 in a similar fashion. While not shown, the area 77 may be colored white or may be covered with some type of reflective surface to enhance the reflecting effect thereof.

While not shown in FIGS. 2 through 5, it should be recognized that other simple threshold configurations are contemplated that includes front and side emissive or other signaling configurations. For instance, instead of including a screen with curved edge sections to signal to the sides, is some cases one or several LEDs or other light devices may be provided to generate side directed light for signaling different conditions or statuses. In other cases LEDs or other light devices may direct light into light pipes that run along edges of a screen 32 to provide lateral or edge lighting for signaling purposes. In still other cases a projector may project light or content into lateral spaces 77 where the projector is either included within an edge portion of device 32 or is ceiling or otherwise mounted in front of the screen 32.

It has been recognized that a threshold may usefully serve at least three general functions. First, a threshold can help manage space utilization and meeting schedules by transitioning employees from prior activities into meetings within enterprise space and then, in at least some cases, back out of the enterprise spaces and on to other scheduled activities in other spaces.

Second, a threshold can be used to provide various types of content related to a meeting or not related to the meeting to employees that have free time between scheduled activities (e.g., to an employee that arrives at a threshold for a meeting 15 minutes prior to the scheduled start time for the meeting) to enable employees to use free time more efficiently. For instance, in some cases a threshold may simply present an internet news feed via a threshold for employees to view during free times. In other cases, a threshold may present enterprise news (e.g., important news for a particular company). In other cases, instead of simply pushing relatively general content to employees viewing a threshold, a threshold may push employee specific content to specific proximate employees (e.g., an employee's documents related to the context of a meeting that is going to start in a few minutes, advertisements related to different employee specific interests, an employee's schedule for the remainder of a day, flight options for a trip the employee needs to schedule in the next 2 weeks, etc.). In yet other cases, a threshold screen may be touch sensitive so that employees can interact with presented content, affirmatively access personal content or general content, or even develop content (e.g., access and edit a document via a word processor application). Optimally, in at least some cases, a threshold serves both space management and data access functions simultaneously.

Third, a threshold can be used to extend meetings when a meeting space is required for a subsequent meeting. For instance, in many cases where a large group (e.g., 5-10) of employees ends a meeting, a smaller subset of those employees are interested in extending the meeting activity for at least some time to complete consideration of a concept, review a prior considered concept, summarize meeting activities or conclusions, schedule a next related meeting, etc. A properly constructed, located and controlled threshold can encourage meeting extension and increase the efficient use of employee time appreciably.

It has also been recognized that there are relatively optimal threshold screen areas for presenting different content types to facilitate the different space management and content providing functions. To this end, in the case of an employee using a threshold or any display type interface for that matter to access, view, manipulate, etc., information or content, in most cases, an employee will value an arrangement where content is presented in an at least semiprivate manner as opposed to a way in which others can view the content that the employee is viewing. Viewing content in a semiprivate manner typically means that the content is viewed on a relatively small scale directly in front of an employee where the employee's body acts as a temporary shield for the presented content from at least some vantage points.

In addition, it has been recognized that where an employee is located immediately in front of a display screen to view content on the screen, typically the employee's optimal field of view only includes a relatively small portion of the display screen. In this regard, an employee's field of view can typically be divided into different sections both vertically and horizontally. With respect to vertical division of a field of view, for most people a view can be divided into a foveal central view, an upper or "cloud" view above the foveal view and a lower or "ground" view below the foveal view. Here, foveal means the vertical portion of a field of view directly aligned with the trajectory of an employee's vision that can be comfortably viewed by an employee with head up (as opposed to where an employee tilts her head up or down). Cloud and ground refer to portions of a field of view that can be directly viewed if an employee tilts her head up and down, respectively.

With respect to horizontal division of a field of view, for most people a view can be divided into a central portion and left and right lateral portions where the central portion includes the horizontal portion of a view directly aligned with the trajectory of an employee's vision that can be comfortably viewed by an employee. Thus, a field of view can typically be divided into nine different zones or portions including a left cloud portion, a central cloud portion, a right cloud portion, a left foveal portion, a central fovial portion, a right foveal portion, a left ground portion, a central ground portion and a right ground portion. While an employee can most easily view content in a central foveal portion of her field of view, typically at least some content from the other view portions can be seen peripherally.

If an employee is fifteen feet from a display screen, the employee's central foveal view may include a relatively large area. This should be contrasted with a case where an employee is two feet from a screen and her central foveal view is substantially smaller. In this case, the employee typically can only comfortably see a relatively small area of the screen without straining her neck. To this end, see again FIG. 5 where first, second and third employees 80a, 80b and 80c are shown at different locations relative to a threshold screen 32. First employee 80a is located immediately in front of screen 32. A typical central foveal view for first employee 80a that is close (e.g., 2 to 3 feet away) to screen 32 may be 3 to 4 feet high and 3 to 4 feet wide. Thus, in at least some cases, it is contemplated that the optimal location on a screen for viewing or otherwise personally manipulating content may be a section immediately in front of an employee having width and height dimensions within ranges of two feet to four feet and two feet to four feet, respectively. Hereinafter, unless indicated otherwise, a screen section used by an employee to personally view detailed content in a close juxtaposition (both vertically and horizontally limited) will be referred to as a "detailed content section" unless indicated otherwise.

It has further been recognized that, in many cases, the best location for space management and meeting schedule content to be presented is within screen sections outside the detailed content section of a threshold screen. Where a detailed content section is vertically and horizontally limited to comport to a typical central foveal view for an employee that is close to a screen surface, when an employee is immediately adjacent the detailed content section, the upper section of screen 32 and one or both lateral edge sections will typically remain viewable by other employees located relatively far away from screen 32. In this regard, see again FIG. 5 where second employee 80b is off to a side of screen 32 but can still view the curved edge section 72 and where third employee 80c is generally to the rear of first employee 80a but can still see side edge sections 72 and 74. See also in FIG. 3 that an employee separated from screen 32 by another employee 80 should still be able to see the upper section of screen 32. Thus, where a threshold screen is generally four feet wide by six feet high, an upper one and one half foot section as well as left and right six inch lateral edge sections may be used to present meeting schedule content while the central three by four foot section provides a detailed content section. In this case, even when a first employee is located in front of a threshold screen, typically most of the meeting schedule content will still be viewable from a relatively long distance (e.g., over the head of a first employee located in front of the detailed content section) and useable for its intended purpose.

It has still further been recognized that meeting schedule content can be divided into at least two additional types based on relative importance and that content can be presented in ways which enable the content to optimally facilitate their associated functions. In this regard, in many applications, the most important meeting schedule content will include warnings that indicate instantaneous meeting status such as a warning that a meeting is about to commence, an indication that a meeting is currently in progress, an indication that a meeting is about to end, etc. Less important but still relevant meeting schedule content may include employee status content that indicates immediate locations or ready states of employees invited to a meeting.

In at least some embodiments, relatively important space management content will be presented in a manner such that the content is viewable from relatively long distances (e.g., greater than 15 feet) while less important meeting schedule information is presented for closer viewing. Different ways to increase ability to view content from a distance may include presenting the content in a relatively large format (e.g., text that is 2-5 inches high), color coding the content, locating the content relatively high on or along the edges of a display screen where the content can generally be seen from afar and where the content is relatively less likely than content presented on other sections of the screen to be obscured by an employee standing in front of the screen, etc. Thus, for instance, where instantaneous meeting status warnings are particularly important, the status warnings may be presented within an upper section of a threshold screen and, perhaps also, along lateral edges of the screen to increase the likelihood that the content is visible.

Less important space management content, in some cases, will be presented in screen sections that are not optimized for presenting either personal content or the most important space management content in at least some embodiments.

In many embodiments, it will be particularly advantageous if warning content is glanceable so that the meaning of each particular warning is discernible based on a quick glance or even a peripheral and indirect view of the warning content. Thus, for instance in addition to or instead of including a descriptive text phrase (e.g., "The Quarterly Mid-West Sales Meeting is scheduled to commence in 5 minutes" to indicate that a meeting starts in 5 minutes) which has to be read to understand its meaning, warning content may include a color coding easy to see from a long distance and that can indicate one of a small subset of warning states (e.g., change from green to yellow to indicate that a meeting is going to start in five minutes). Other easily discernible changes to warning content may include changing a lighting effect (e.g., pulsing a color on and off to indicate that a meeting will start in less than one minute), scrolling content along an edge field of a display, etc.

In at least some embodiments warning content in the long range fields 90, 92, 94 and 100 will include both a color component and a textual representation. To this end, after an employee has some experience with the system, the employee should become familiar with the meanings of different colors presented in the long range fields so that the meaning of a warning can be quickly discerned from the color presented in the fields. However, for a different employee that is unfamiliar with the meanings ascribed to different colors, short textual representations should server to indicate the meaning of a warning and also to help train the employee on the meanings of associated colors. The other advantage associated with presenting different colors in the long range fields to indicate different warnings is that even if an employee is initially unfamiliar with the meanings of the different colors presented, a change in color should serve as a clearly identifiable signal that status has changed and should call the employee's attention to the textual representation which more definitively indicates meeting status. Thus, a color change should be contrasted with a simple text change in the long range fields where the color change would be clearly identifiable even within an employee's peripheral field of view while a test change could go unnoticed unless the employee was looking directly at one of the long range fields when the change occurred.

Referring yet again to FIG. 6, exemplary threshold screen 32 is shown divided up into fields of three different types including a close content field 98, four long range content fields 90, 92, 94 and 100, and an intermediate content field 96. In the illustrated example, flat screen section 70 is divided into three fields where a bottom field 100 serves as one of the long range content fields, close content field 98 is above field 100 and intermediate content field 96 is above close content field 98. Here, lower field 100 will typically be in the ground portion of an employee's field of view below the foveal portion and therefore is not optimal for presenting detailed content to an employee. Thus, field 100 can be used to provide one more screen portion that can present long range warning type space management content.

Each of curved sections 72, 73 and 74 forms a different one of the other three long range content fields 92, 94 and 90, respectively. As shown, close content field 98 may, in some embodiments, include more than half the total area of flat section 70 and, as described above, field 98 may have dimensions that are similar to the dimensions of a typical employee's central foveal view (e.g., a width within a range of between two feet and four feet and a height within a range of between two feet and four feet) when the employee is located proximate (e.g., within 2 to 3 feet) screen 32. While shown as extending across the total width of flat section 70, in other embodiments the close content field may have a smaller relative width so that the long range fields 92 and 94 extend at least somewhat into the lateral portions of flat section 70.

Figure 6:
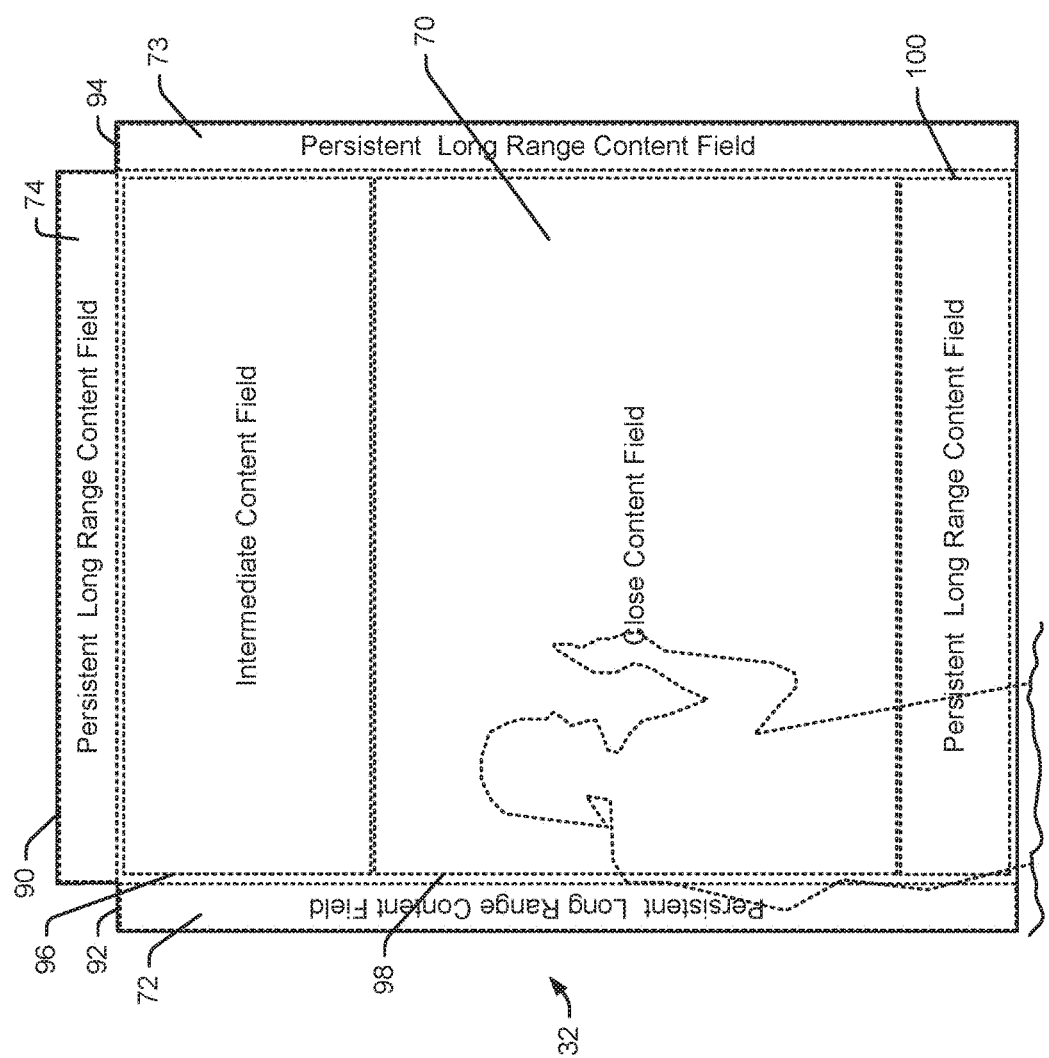
FIG. 6 is a schematic view showing the threshold configuration of FIG. 3, albeit where the threshold screen sections are laid flat.

Referring still to FIG. 6, intermediate content field 96, as shown, includes approximately the top one fourth of section 70 while each of the long range fields 90 and 100 and long range fields 92 and 94 have relatively smaller height and width dimensions (e.g., within a range of 3 to 12 inches), respectively. Thus, in at least some embodiments, while the content to be presented in the long range content fields is deemed relatively more important than the content that is presented in intermediate content field 96, the dimensions of field 96 will nevertheless be larger than any one of the long range content fields. It has been recognized that the nature of the space management content that is presented in the intermediate field often times means that that content is necessarily more voluminous than the relatively more important content presented in the long range content fields. For instance, while simple space management status warnings can be clearly presented via minimal content (e.g., an illumination color change), in may cases content presented in the intermediate content field includes much more detail. For example, in at least some cases employee status information may be presented in intermediate content field 96. For instance, assume six employees have been invited to a meeting that is to start in 15 minutes and that two are currently present in the space reserved for the meeting, two are on their way to the reserved space, a fifth employee is on his way to a remote location to participate in the meeting and the sixth employee has indicated that something unexpected has come up and he will not be able to attend the meeting. Here, the amount or volume of information required to indicate current employee status would be substantially greater than the amount required to provide the simple warning indications.

Figure 9:
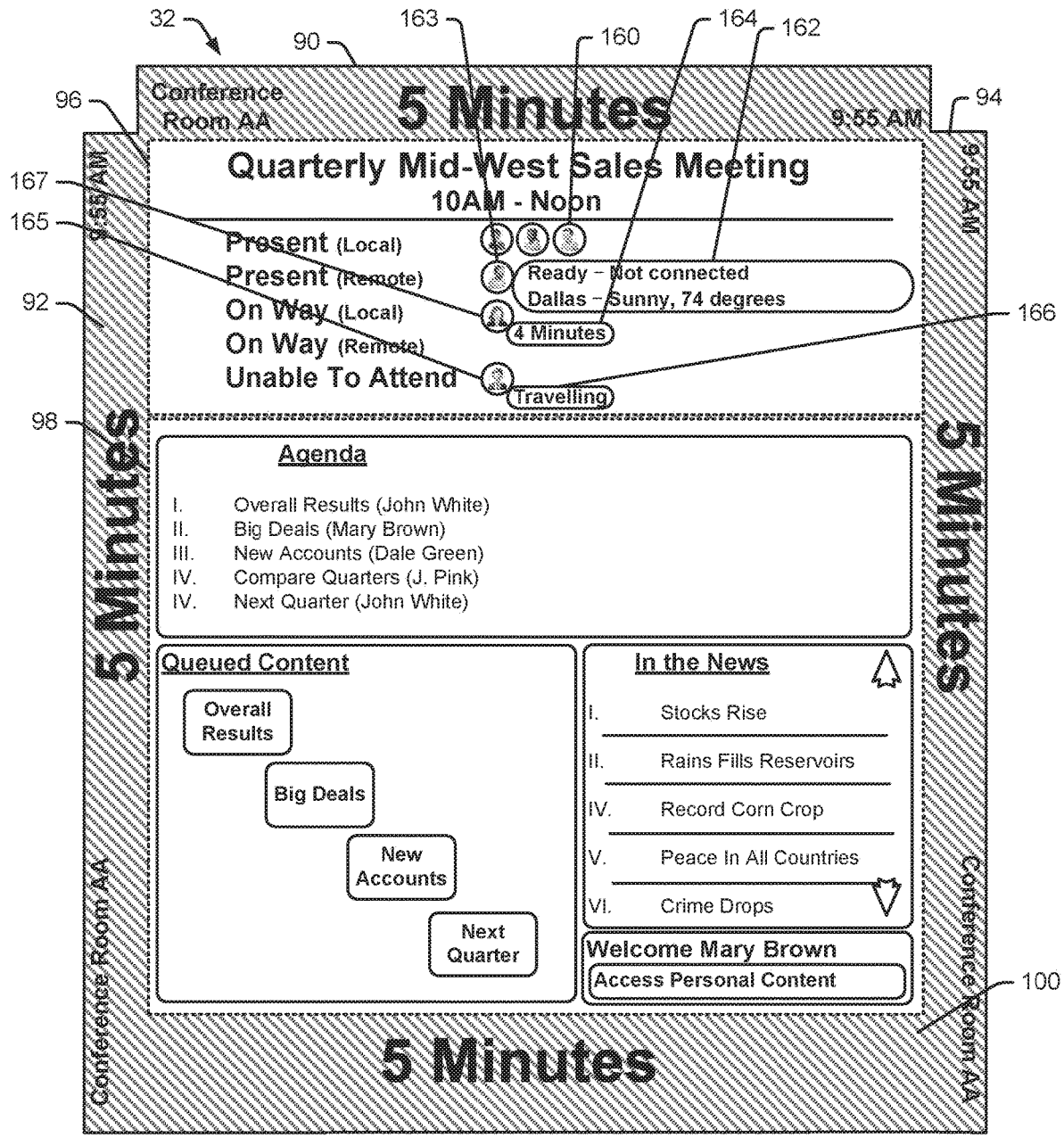
FIG. 9 is similar to FIG. 7, albeit showing the exemplary threshold at a different relative time with respect to a scheduled meeting.

Content presented via a threshold configuration may be automatically changed as a function of time relative to a scheduled meeting. To this end, threshold content may include an initial content set well prior to the start time of a session, a second content set as a meeting start time nears, a third content set once a start time occurs, updated content sets while a meeting is occurring and yet a different content set once a meeting end time has occurred. To this end, see FIG. 7 that shows content presented via screen 32 fifteen minutes (e.g., well prior to) prior to a scheduled start time for a meeting, FIG. 9 that shows content presented via screen 32 five minutes (e.g., just prior to) prior to a scheduled meeting start time, FIG. 10 that shows content presented via screen 32 while a meeting is progressing, FIG. 11 that shows content presented via screen 32 five minutes prior to a scheduled end time to a meeting and FIG. 12 that shows content presented via screen 32 after a meeting has been completed and prior to the start of a next meeting. The FIGS. 7, 9, 10, 11 and 12 images are described in more detail hereafter.

Screen fields may, in some cases, be further divided into sub-fields where specific types of information are presented. To this end, see FIG. 7 where exemplary content or information is presented in fields 90, 92, 94, 96, 98 and 100. The upper long range content field 90 includes three types of information including a meeting room name at 110, a meeting status indicator in the form of a countdown clock at 112 and a current time at 114. The meeting room name 110 and current time 114 are self explanatory. The status indicator 112 in the illustrated example includes text that indicates a period in minutes prior to the scheduled commencement time for the next meeting. Thus, in FIG. 7, the next meeting is scheduled to commence 15 minutes from the current time. Each of fields 92 and 94 on the left and right curved sections of screen 32 includes the same content as field 90 so that if an employee is located to the side of screen 32, the employee should have a clear view of the presented content. The content in fields 90, 92 and 94 is presented with a relatively large font so that the content is easy to read by employees that are generally distant from screen 32. Thus, for instance, the "15 Minutes" indication 112 may be two to ten inches high so that it can be read from a long distance.

In addition, the background in each of the long range content fields 92, 94, 90 and 100 may be color coded to indicate current status or a warning about status. Thus, for instance, in FIG. 7 where a meeting is to commence in 15 minutes, the background in each of fields 90, 92, 94 and 100 may be white as indicated by no cross hatching. The background in fields 90, 92, 94 and 100 may be changed to other colors as shown by the left down to right cross hatch (yellow), double cross hatch (red), left up to right cross hatch (green) and horizontal hatching (blue) in FIGS. 9, 10, 11 and 12 to indicate different status or warning states. For instance, as in FIG. 9, the background in the long range content fields may be changed from white (as in FIG. 7) to yellow as indicated by the left down to right cross hatch in FIG. 9 when a meeting is to commence in 5 minutes, to red as indicated by the double cross hatch in FIG. 10 during the scheduled time for a meeting, to green when within 5 minutes of the scheduled end time of a meeting as indicated by the left up to right cross hatch in FIG. 11 and to blue at the end of a meeting as indicated by the horizontal cross hatch in FIG. 12. Again, the color warning content is glanceable and therefore particularly useful for determining space status quickly and from long distances.

Figure 7:
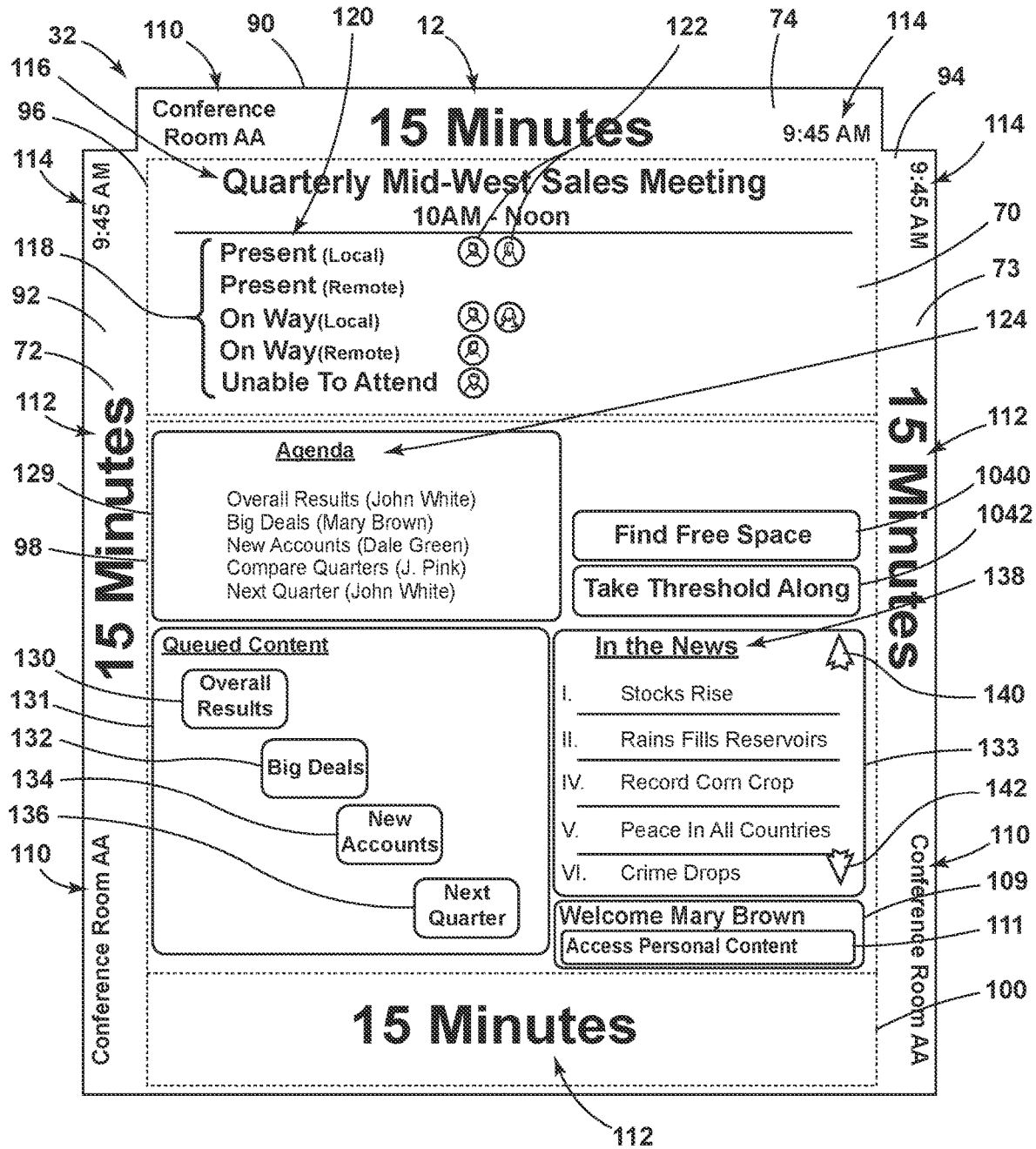
FIG. 7 is similar to FIG. 6, albeit showing different types of content that maybe presented view the threshold configuration.

Referring still to FIG. 7, intermediate field 96 includes meeting identifying information including a title and a scheduled period for a meeting at 116. In addition, the intermediate field presents employee status information at 118. The employee status information includes a list of employee status categories at 120 including "Present (Local)", "Present (Remote)", "On Way (Local)", "On Way (Remote)" and "Unable To Attend". Each employee that is scheduled to attend the meeting is associated in field 118 with one of the statuses in list 120. Thus, for instance, in FIG. 7, where six employees have been invited to a meeting and first and second are locally present, third and fourth are on their way to a scheduled meeting space, a fifth is on his way to a remote location to patch into the meeting via telepresence and a sixth is not going to attend, images of the first and second employees 122 are presented adjacent the Present (Local) status type, images of the third and fourth employees are presented next to the On Way (Local) status type, an image of the fifth employee is presented adjacent the On Way (Remote) status type and an image of the sixth employee is presented adjacent the Unable To Attend status type. Thus, a conferee outside the meeting space can quickly discern the statuses of employees that are to attend the meeting and get a sense of whether or not the meeting is likely to start on time. While images of employees are shown at 122, other employee identifying information may be presented such as names, titles, etc. in addition to or instead of the images.

To identify locations of employees within enterprise space or more generally in space, in at least some embodiments it is contemplated that the system server may be able to determine employee identities and locations using output from one or more different types of sensors within the enterprise environment or using data provided by some other system (e.g., GPS from a satellite or a radio tower outside enterprise space). To this end, referring again to FIGS. 1 and 2, in at least some cases where employees carry personal portable computing devices (e.g., laptops, tablets, smart phones, wearable devices like a wrist watch or glasses, etc.) or wear electronic badges that include transmitters of wirelessly readable tags, wireless signals from those devices may be received by access points 40 or other sensors in space and signal strength data may be provided to server 60 that is programmed (see location tracking application in FIG. 1) to triangulate or otherwise use the received data to determine locations of those devices and hence the locations of employees associated with those devices.

In other cases it is contemplated that sensors associated with space entry points (e.g., 16 in FIG. 2) may sense when personal portable devices enter or exit a local space and that information may be used to identify which employees are locally present. Here, where an employee is not locally present and has not patched into a session remotely or indicated that the employee will not attend, the server may be programmed to assume that the employee is on her way to the scheduled meeting location. In other cases, at some point prior to the start time of a meeting, server 60 may be programmed to generate and transmit an automatic query to each employee not currently located in or at least proximate the scheduled meeting space requesting that the employee indicate her current status (e.g., on way local, on way remote, not able to attend, etc.) which can then be used to drive the employee status content in field 96.

In still other cases images from cameras (e.g., 36a-36n) located within the enterprise space may be used to track employee locations via face recognition when possible or other employee identification at specific locations (e.g., RFID reading of an employee identification tag or badge upon entry into an enterprise facility) followed by a system for tracking image aberrations that are associated with human forms as they move through the enterprise space. For instance, where an employee's identity can be determined at any location within an enterprise space and an image aberration at that location and at the identifying time can be associated with a human, it can be assumed that a similar aberration in subsequent images corresponds to the same employee and therefore the employee identification can be associated with the aberration at different locations in the subsequent images. As a tracked employee moves from the field of view of one camera to a field of view of a second camera, the server may be programmed to continue tracking aberrations in images from the different cameras so that the employee identity can continue to be associated with the aberrations and hence so that location of employees can be continually tracked.

Referring still to FIG. 7, detailed content in field 98 which includes a central fovial view portion of screen 32 for a close employee includes an agenda field 129, a queued content field 131 and a news feed field 133. Agenda field 129 includes an "Agenda" title 124 to clearly indicate that the nature of content in the field and a list of topics that are scheduled to be discussed or otherwise considered during the meeting. The topic list also includes names of employees (see brackets) that will be leading consideration of each list topic. Here, an employee that arrives early for a meeting can review the agenda and develop at least a high level understanding of what is supposed to be accomplished during the meeting.

Queued content field 131 also includes a title at the top to clearly indicate the nature of the content presented in the field and also includes a list of content (see 130, 132, 134 and 136) that has been previously added to a meeting queue to be considered during the meeting. The news feed field 139 includes a field title at 138 and a list of news headlines in the illustrated example that can be observed to get a sense of what is happening. Scrolling icons may be presented in any of the detailed content field 129, 131 or 133 for scrolling through other options in any of those fields. For instance, see scrolling arrow icons 140 and 142 in the news feed field 133.

In at least some embodiments any of the detailed content field 96 content may be presented as a hyperlink so that selection of the content leads to more detailed content of the selected type. Fort instance, referring again to FIG. 7, the content queue field 131 includes separate content icons 130, 132, 134 and 136 corresponding to different content records that are to be considered during the meeting. Here, each icon 130, 132, 134 and 136 may be hyperlinked to a different content record that is to be considered so that, if the icon is selected, the content record can be accessed for a preview prior to commencement of the session. To this end, see FIG. 8 where, after icon 134 is selected in FIG. 7, a single new accounts field 150 is opened in field 96 and the document associated with icon 134 is presented at 154. Where the presented document includes multiple pages or sections, scrolling arrows 140 and 142 may be provided to flip through the new account content. A "Back" icon 156 is presented that can be selected to move back to the more general view shown in FIG. 7.

Referring again to FIG. 7, just as icons 130, 132, etc., may be selectable to drill down into more detailed content, any one of the agenda topics or the presenter names shown in brackets may also be hyperlinked to more detailed related content. Similarly, any one of the news stories listed in field 133 may be hyperlinked to a complete article or related document.

As the status of employees invited to a meeting changes and is detected by server 60, the information in intermediate content field 96 is automatically updated to reflect the changes. For instance, in FIG. 9, the employee image labeled 160 is moves into the Present (Local) row from the On Way (Local) row to indicate that the associated employee has moved into the space scheduled for the meeting. Similarly, the image labeled 163 has been moved to the Present (Remote) row from the On Way (Remote) row to indicate that the associated employee is remotely located and waiting for the meeting to start.

In addition, in at least some embodiments, the content presented in any of the fields may be altered as a function of time relative to a scheduled period for a meeting. As discussed above, in FIG. 9 the background color in the long range content fields 90, 92, 94 and 100 is shown left down to right cross hatched to indicate a change to yellow at the 5 minute mark to indicate that the scheduled meeting time will commence shortly.

Similarly, in the illustrated example, additional information has been added to the intermediate content field 96 for at least some of the employee images. For instance, a tag 166 is spatially associated with image 165 to indicate the reason that the employee associated with image 165 cannot attend the meeting (e.g., to indicate that the associated employee is traveling). As other instances, a tag 164 is spatially associated with image 167 to indicate that the employee associated with image 167 is 4 minutes away from the meeting space and a tag 162 is associated with image 163 to indicate that the imaged employee is located in Dallas and that the current weather conditions in Dallas are Sunny and 74 degrees. Tag 162 also indicates that the associated employee is ready for the session to begin but is not current sharing video of the remote conferee. Additional content for tags 162, 164 and 166 may be obtained from any of several different sources. For instance, a weather service may be used to obtain the Dallas weather conditions, the employee schedule database (see FIG. 1) may be used to determine that the employee associated with tag 166 is on a plane to Paris during the scheduled meeting time and the location information derived using the system access point strength of signal data may be used along with a map of enterprise space to determine that a walking time for the employee associated with tag 164 to the scheduled meeting space is 4 minutes. In the alternative, at some point prior to the scheduled start time (e.g., 5 minutes prior) of a meeting, for employees that are not locally or remotely present for the meeting, the system server 60 may send an e-mail, text message, etc., to missing employees requesting an estimated time prior to arriving for the meeting and the response may be used to populate tag 164. Here, it has been recognized that employees themselves are usually more accurate about arrival times than any location tracking system as employees travel at different rates, know if they intend to stop at some location along their way (e.g., at a restroom, at a coffee station, etc.) to a meeting space, etc.

The employee status content in field 96 may be updated routinely to reflect real time status during the entire period prior to the scheduled start time of a meeting, as the meeting progresses, and even for some time after a meeting has ended. To this end, see that the tag 164 is updated in between FIGS. 9 and 10 to indicate that an associated employee has been further delayed and likely will not arrive at the meeting space for another 10 minutes. See also FIG. 11 where the employee associated with the FIG. 10 tag 164 is locally present as indicated at 180 near the end of the meeting.

When a scheduled meeting start time occurs, in at least some embodiments threshold content is controlled to provide yet another mix of content that reflects meeting progression and current activities. Here, by representing meeting progression outside the meeting space, employees that arrive late for the meeting can use the threshold content to assess how far along the meeting has progressed. In addition, in at least some embodiments, a late arriving employee may be able to use the threshold screen to quickly review content already considered during the initial part of a meeting to get up to speed quickly on what has transpired. For instance, referring to FIG. 10, when a meeting start time occurs, the long range content fields 90, 92, 94 and 100 may be illuminated green as indicated by the left up to right cross hatching to indicate that a meeting is in progress in the associated space. In addition, the text warnings presented in the long range fields may be changed to indicate "In Progress" or something to that effect. Employee status may continually be presented in intermediate content field 96.

Figure 10:
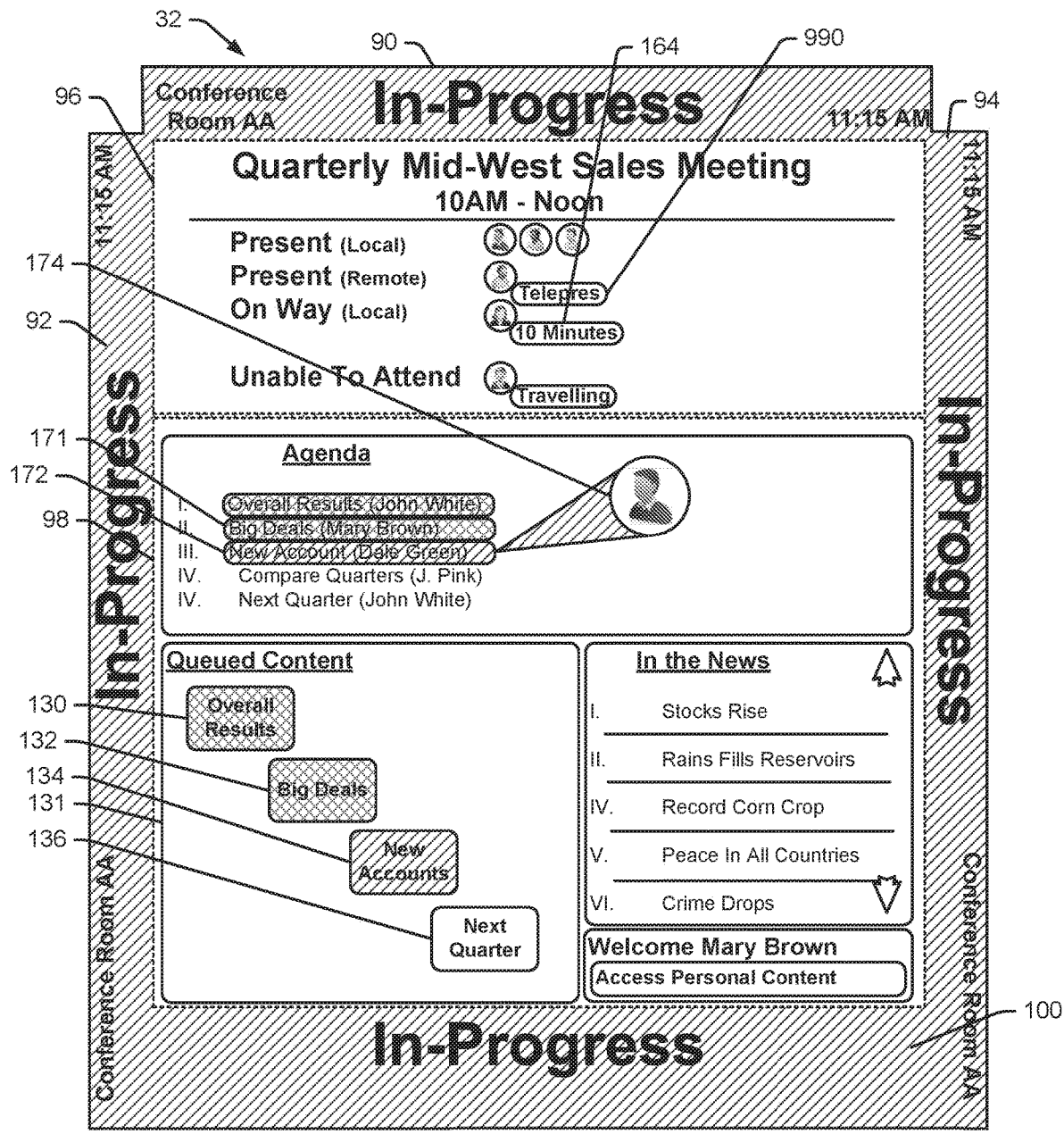
FIG. 10 is similar to FIG. 7, albeit showing threshold content while a meeting is progressing.
Figure 11:
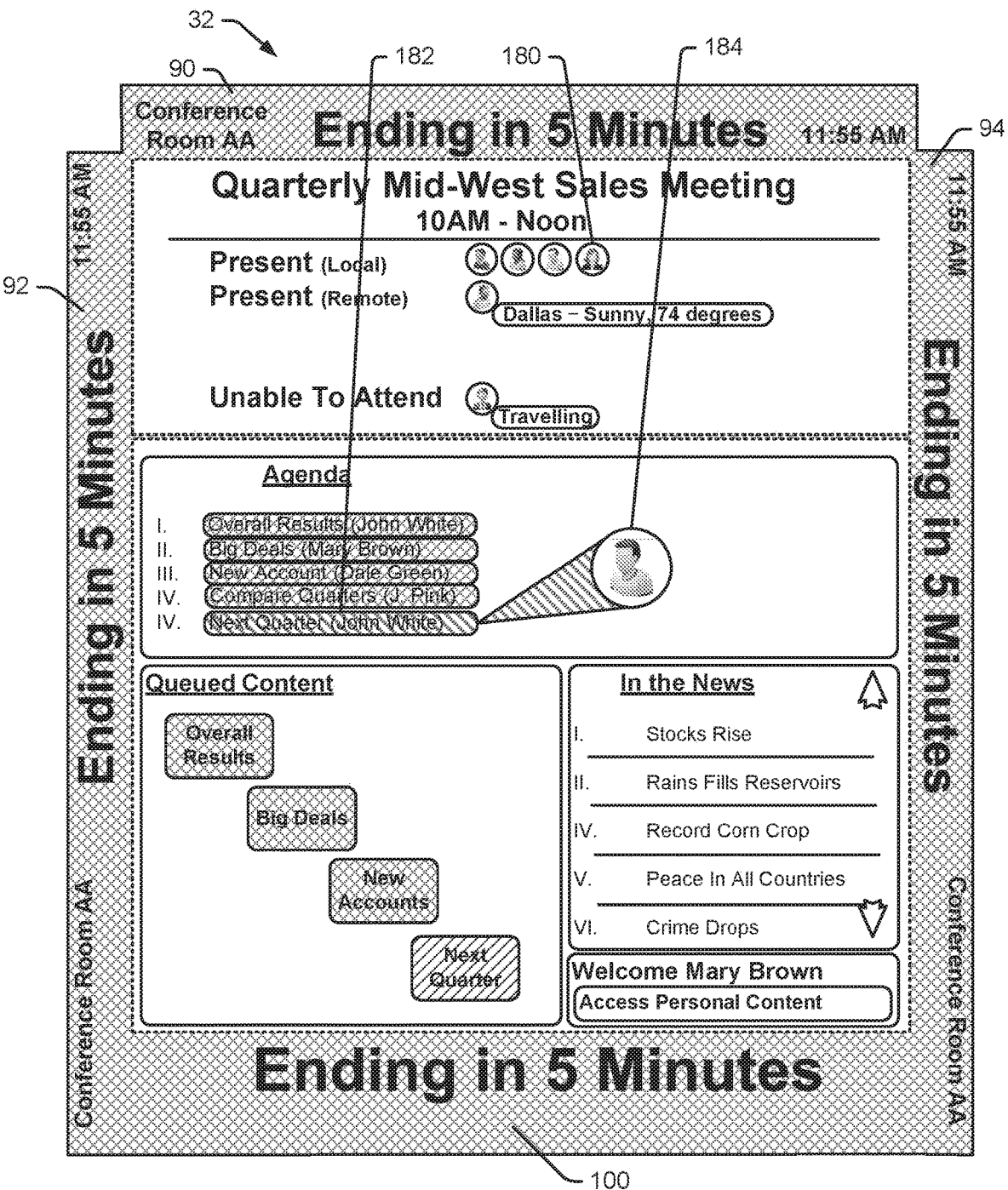
FIG. 11 is similar to FIG. 7, albeit showing threshold content just prior to the end of an associated meeting.

Referring still to FIG. 10, meeting progress is indicated in close range content field 98 where the subject on the agenda that is currently being considered in the space is highlighted green (e.g., left up to right hatching) as shown at 172. In addition, an image 174 of the employee that is primarily responsible for the subject currently under consideration is shown at 174 in a way which associates the image with the highlighted subject in the agenda at 172. Agenda topics that have already been considered are highlighted red as indicated by the double cross hatching at 171. In at least some embodiments, it is contemplated that image 174 and/or each of the topics in the agenda list may be selected to access additional information associated therewith. For instance, selection of image 174 may open a window that includes detailed information about the employee associated with image 174 such as name, title, one or more additional images, an abstract or a resume, a list of projects that the employee has participated in generally or in the recent past or that the employee is currently active in, etc. In at least some cases, it is contemplated that agenda topics that have already been considered in the meeting may be visually distinguished from the currently considered topic and other agenda topics that have yet to be considered.

In any case where the appearance of agenda topics is changed to reflect current meeting status, the system will have to be able to determine current status in some way. In at least some embodiments it is contemplated that some type of interface may be provided within the meeting space that can be used by at least one of the employees locally present in the space to manually indicate progress of the session. In this regard, see again FIG. 2 where a simple mechanical button 101 is shown on the top of table assembly 20 that may be used to indicate meeting progression. In a simple case, each time an agenda topic has been completed, an employee adjacent button 101 may select the button to indicate progression. In other cases the in-space employee interface may be more complex and provide additional functionality. For instance, an agenda window 105 may be provided on one of the personal computing device display screens 107 as shown in FIG. 2 where a mouse controlled cursor can be used to select different agenda list topics to toggle between different states including, for instance, already considered, currently being considered and not yet considered where the states are then mirrored on the threshold screen 32 outside the space. In this case, the statuses of topics that are considered out of order can nevertheless be accurately conveyed. In addition, in this case, even if a topic has been previously considered and is so indicated, if the topic were revisited, the employee could modify the status to indicate current consideration in a simple fashion.

In still other embodiments system server 60 may be programmed to use sensed information in a meeting space to automatically identify which agenda topics have already been considered, which is currently being considered and which has yet to be considered. To this end, for instance, where specific content is associated with specific agenda topics, if that content has already been presented, server 60 may automatically determine that the associated topic has been considered. Similarly, if content is currently being presented in the meeting space 14, server 60 may identify that the topic associated with the currently presented content is currently being considered.

In yet other embodiments other information sensed in a space may be used to determine meeting progression. For instance, microphones 24 may be provided in space 14 (see again FIG. 2) and audio picked up by the microphones may be used to identify topics being discussed and to automatically determine currently considered agenda topics. Here, in addition to using audio content to determine meeting status, additional information such as which employee is speaking or which employee is speaking the most may be considered. Thus, in the example illustrated in FIG. 10, if Dale Green is the only one speaking for some threshold period (e.g., five minutes and the first two topics in the agenda have already been considered, server 60 may determine that the third topic is currently being considered.

Referring still to FIG. 10, server 60 may also present content icons in field 131 where the icons are visually distinguished based on whether or not associated content has been considered or is currently being considered. Thus, for instance, icons 130 and 134 are shown double cross hatched to indicate a red color that means that the content associated therewith has already been considered, icon 134 is highlighted green (e.g., left up to right cross hatched) to indicate that the content associated therewith is currently being considered and icon 136 is shown white (no cross hatching) to indicate that the associated content has not and is not currently being considered. Here, as in the case of agenda topics described above, content statuses can be determined in any of several ways including manual indications from one or more employees in a meeting space or sensed data obtained from the meeting space.

Figure 8:
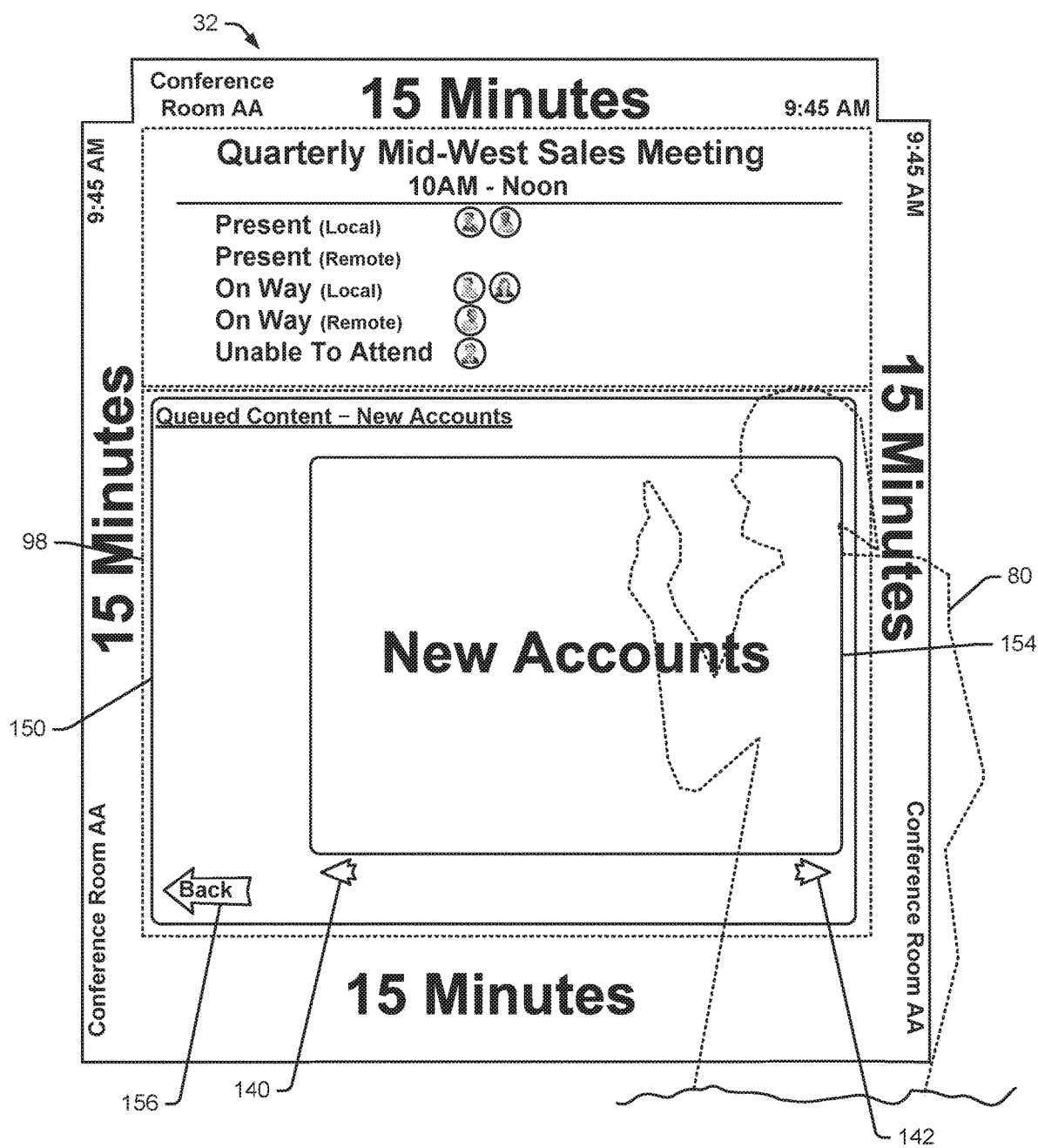
FIG. 8 is similar to FIG. 7, albeit showing a different set of presented information.

In at least some cases, as in the case of FIG. 8 described above, a late arriving employee can select any one of the content icons 130, 132, 134 or 136 on a threshold to access the content. In the FIG. 10 example, for instance, a late arriving employee may want to quickly access and review the content associated with icons 130 and 132 prior to entering the meeting space to get up to speed on the meeting status. In cases where an employee can access meeting content or is provided with meeting progress information, server 60 may only present that type of information and capability to specific employees. For example, in at least some embodiments server 60 may only present that type of information and capability to employees that are scheduled to be attending an associated meeting. In some cases, server 60 will identify a proximate employee automatically and then automatically present that type of information upon arrival of an employee that is authorized to view that type of information and access that type of capability. In other cases an arriving employee may have to perform some password or other function in order to be recognized by server 60.

Near (e.g., with five minutes to go) the scheduled end time of a meeting, server 60 may again update meeting status or progress on a threshold screen in several different ways. For instance, see FIG. 11 where warning text in the long range content fields 90, 92, 94 and 100 indicates that the meeting is scheduled to end in 5 minutes and where the double diagonal cross hatching in those fields indicates a light red color to signal that the meeting is nearing its scheduled end time. The final agenda topic is colored green at 182 and an image of the final agenda presenter is provided a 184 while the content icon 136 associated with the final topic is colored green to indicate current consideration in the meeting space.

Figure 12:
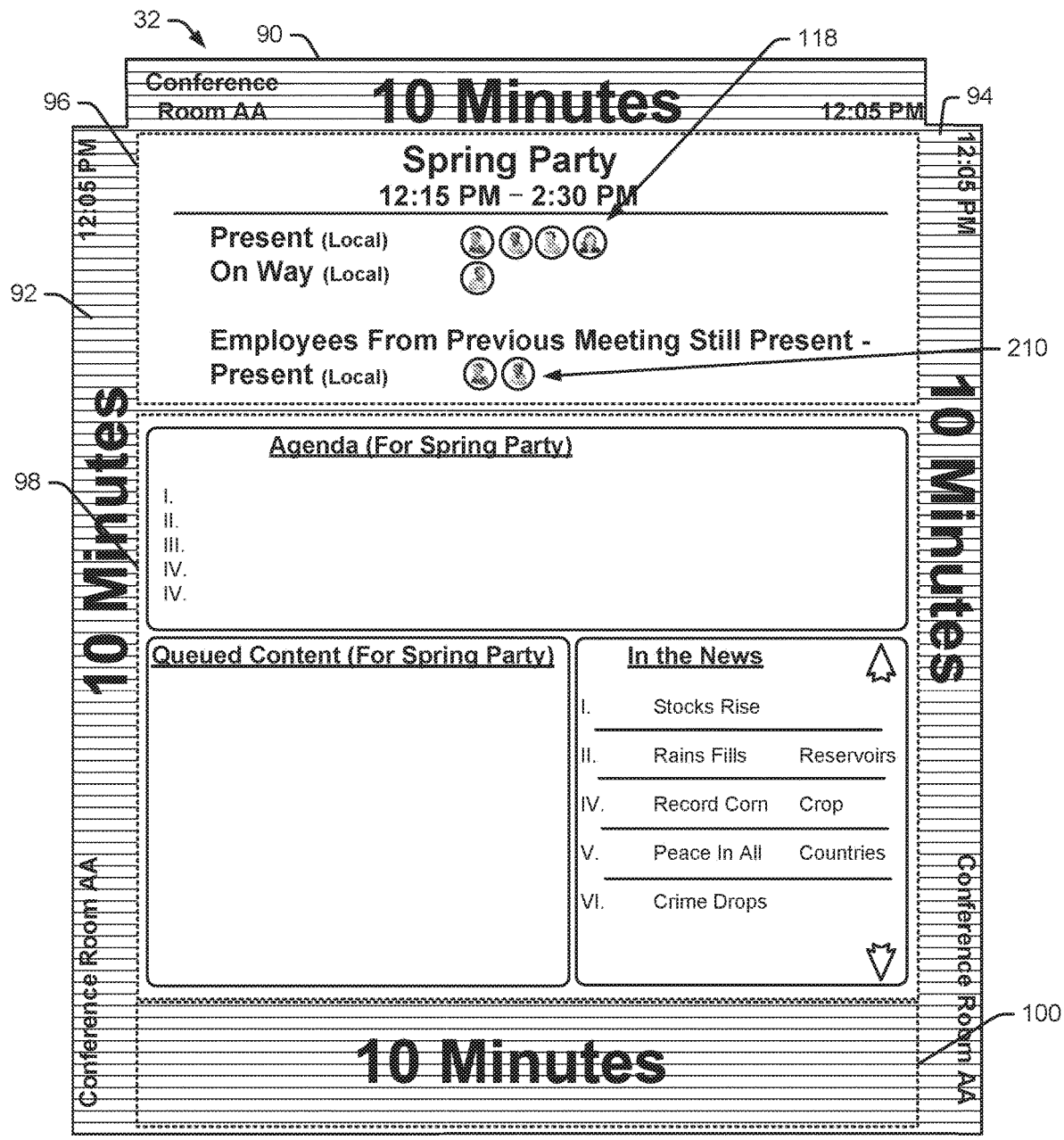
FIG. 12 is similar to FIG. 7, albeit showing threshold content after an associated meeting has ended while at least some employees associated with the completed meeting are still within an associated meeting space.

Exemplary threshold content that may be presented after a session has ended is shown in FIG. 12. The FIG. 12 content includes a text warning in each of long range fields 90, 92, 94 and 100 indicating "10 Minutes" to indicate when the next meeting scheduled for the space is scheduled to start. Each of the long range fields is colored blue as indicated by the horizontal hatching to indicate that the next meeting will commence in a few minutes but that employees from the most recent meeting to end in the space are still located within the space. In addition, consistent with FIG. 7 above, the title of the next meeting and scheduled meeting period are presented in the intermediate field 96 as well as employee status content at 118.

Here, in addition to including employee status content for employees that have been invited to the next meeting, the status content also include employee status information related to at least a subset of the employees associated with the prior meeting in at least some cases. For instance, images of two employees that are still in the general vicinity of the meeting space associated with threshold 32 are provided at 210. Indicating other employees in the general area at 210 is advantageous as other employees arriving for the next meeting may want to have an impromptu conference with one or more of the employees still in the area and notice of their presence as at 210 would be useful. For instance, if a first employee arrives early to attend the next meeting and second and third employees that attended the prior meeting are still in the meeting space where the first employee wants to conference with the second employee, the first employee can use the threshold content to locate the first employee in the general area so that the impromptu conference can occur.

In at least some embodiments it is contemplated that content presented via the threshold screen 32 may be modified as a function of employee proximity to screen 32. For instance, where the closest employee to a specific threshold screen 32 is a relatively long distance (e.g., 15 or more feet), in many cases it will make no sense to present detailed content in a close field as most employees could not perceive the content presented in the relatively small format. Instead, in a case where the closest employee is a long distance away from a threshold screen, more terse content may be presented so that the content serves a useful purpose. Then, when at least one employee moves closer to the screen, the closer employee location may operate as a trigger causing the system server to present a different content set. Additional content set changes may occur as at least one employee moves closer to the screen until detailed content is automatically presented in the close content field as described above.

Figure 13:
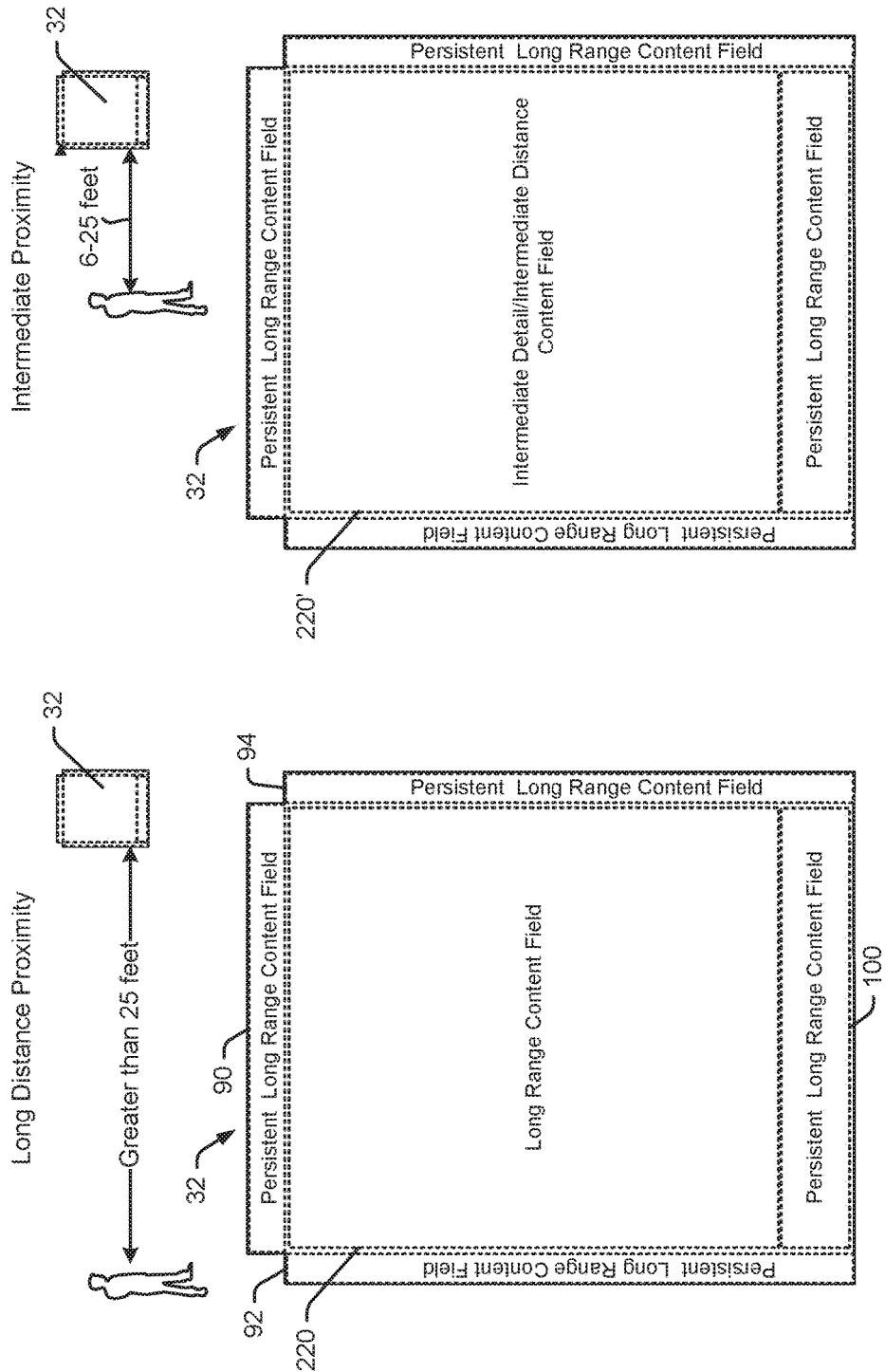
FIG. 13 is a schematic illustrating the FIG. 6 threshold twice, one showing content fields that maybe presented when an employee is a long distance from the threshold and one showing the fields when an employee is an intermediate distance from the threshold.
Figure 15:
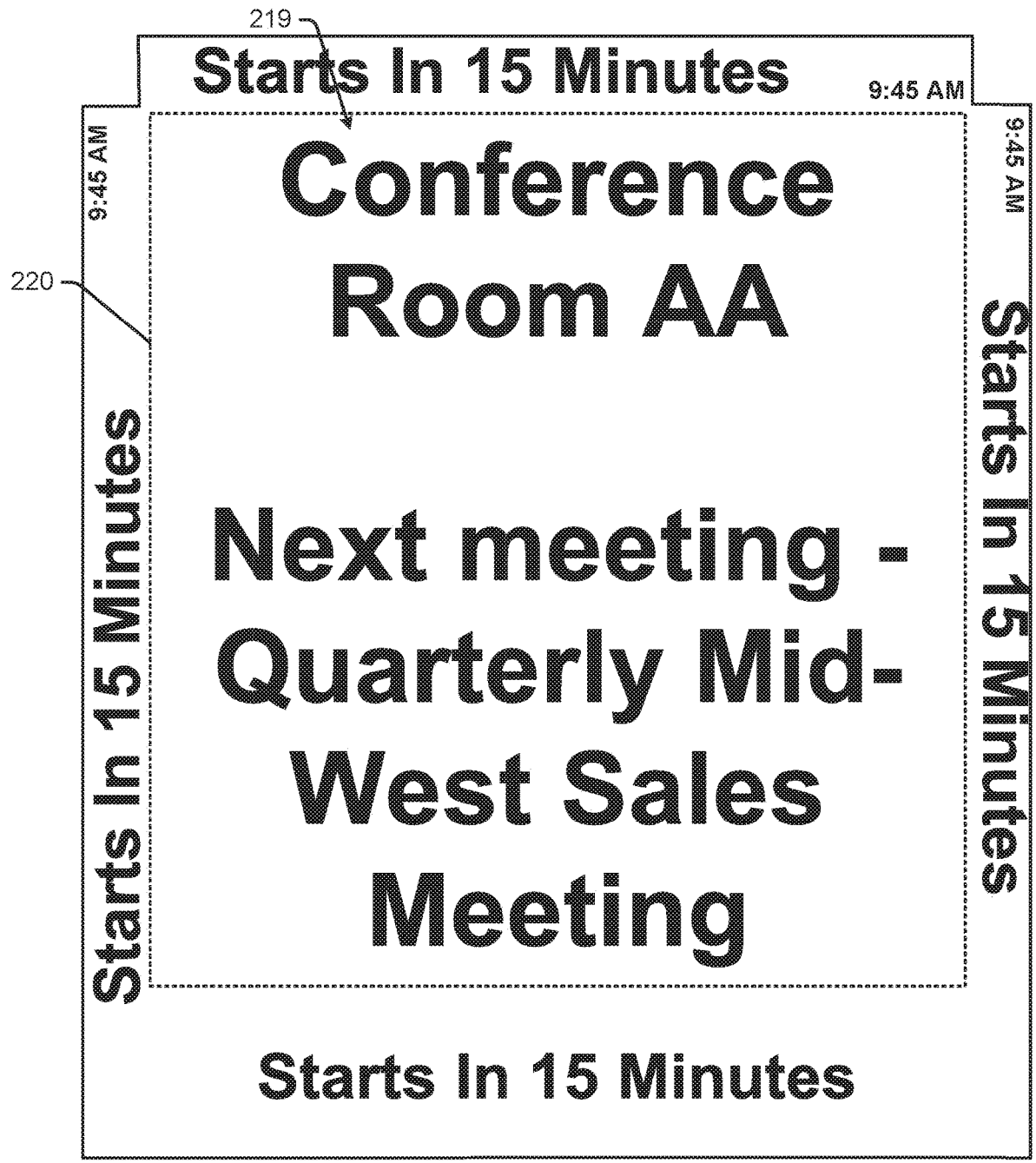
FIG. 15 shows the FIG. 7 threshold presenting content for long range viewing.

Consistent with the prior paragraph see FIG. 13 where a threshold screen 32 is shown in a left half of the figure to initially have five content fields when a conferee is more than fifteen feet away from a screen including the four long range fields 90, 92 94 and 100 described above as well as a large central long rang field 220 that covers all of the flat section 70 of the screen. See also FIG. 15 that shows exemplary long range content in each of the five fields, where the content in field 220 includes a large representation of an associated meeting space name and the title of the next meeting to occur in the associated space at 219. Here, a simple countdown clock is provided in the long range content fields to indicate when the next meeting is scheduled to start. The countdown clock and the space/meeting status color coding in the long range content fields may be controlled in the same fashion described above to indicate different meeting and space statuses.

Figure 16:
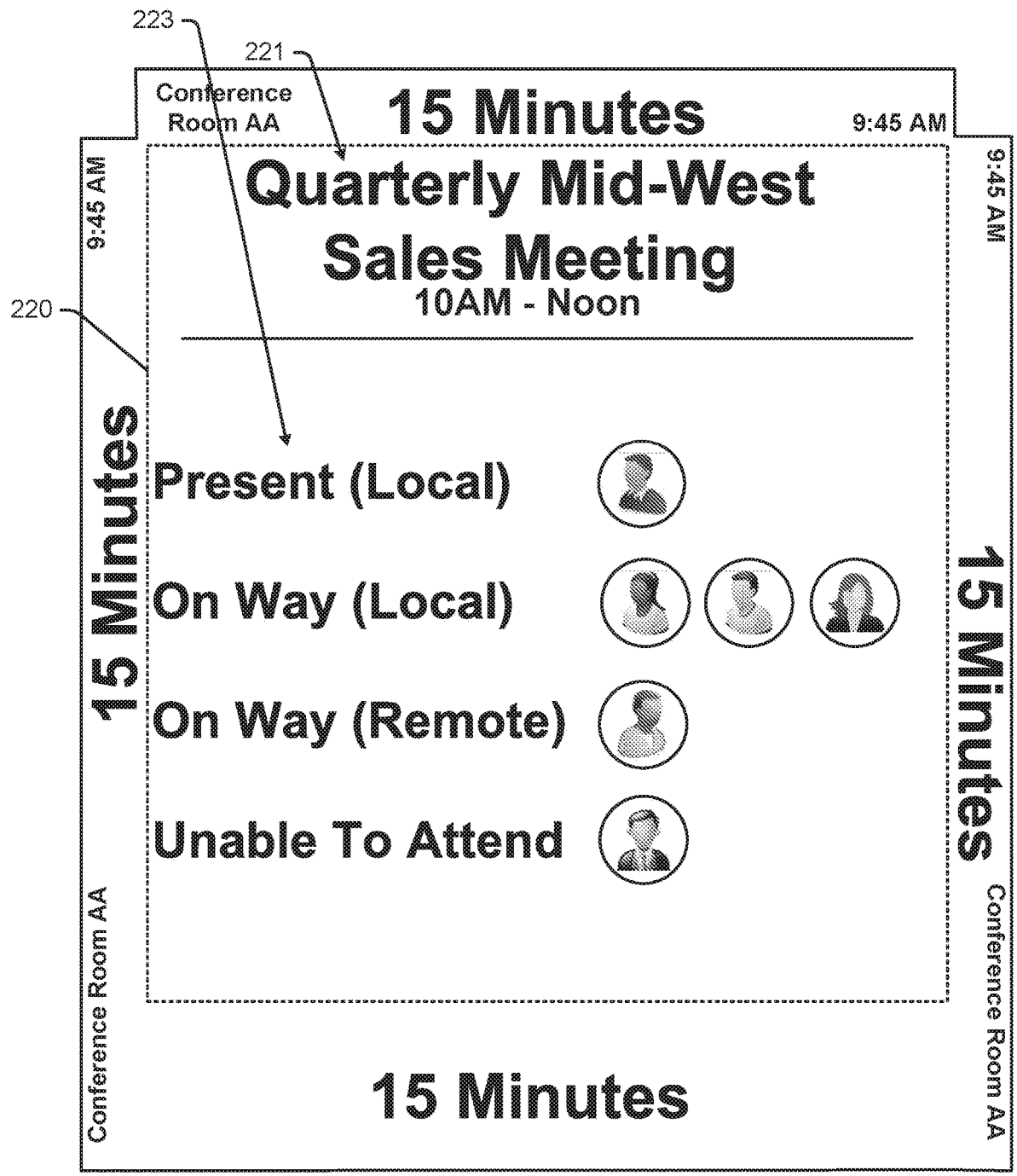
FIG. 16 is similar to FIG. 15, albeit showing the threshold presenting content when an employee is an intermediate distance away from the threshold.

Referring again to FIG. 13, and specifically to the right hand portion of the figure, once at least one employee is located within an intermediate range (e.g., 6 to 15 feet) of threshold screen 32, the central long range field would be changed to a central intermediate content field 220' including a different set of content suitably sized for easy reading within the intermediate range. Here, the edge fields would remain long range fields and would persistently present the long range content for employees more than 15 feet away from the screen. Referring also to FIG. 16, a large font title and time associated with a next meeting at 221 as well as a relatively large representation of employee status information at 223 is shown as intermediate distance content. Here, the conferee status information at 223 is again updated routinely as statuses change. In addition, the countdown clock and the background color in the long range content edge fields may be updated as described above.

Figure 14:
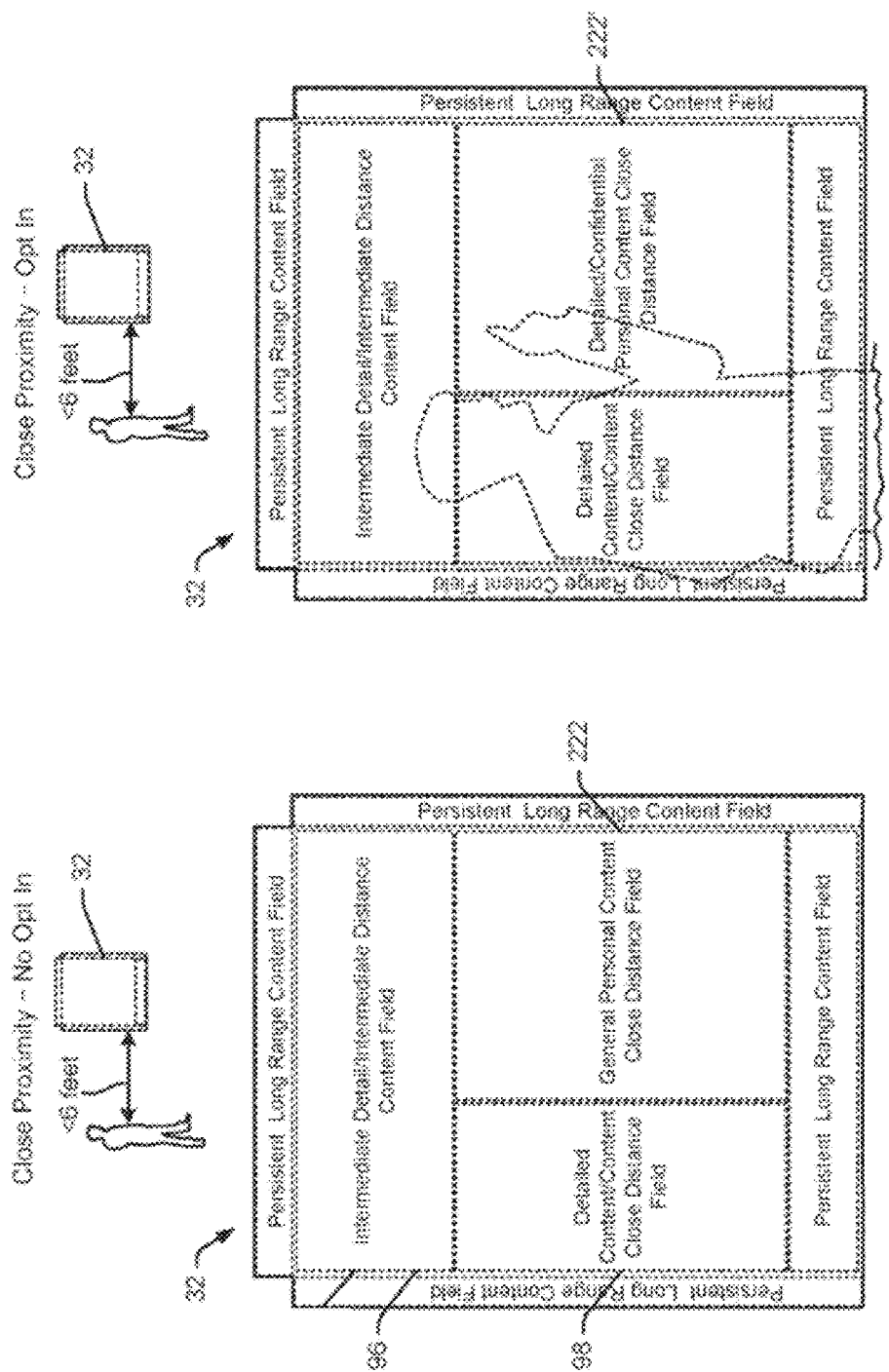
FIG. 14 is similar to FIG. 13, albeit showing threshold fields when, a first instance prior to an employee opting into viewing detailed personal information and a second instance corresponding to a case where the employee has opted into accessing personal detailed content.

Once at least one employee moves to a close location (e.g., within 6 feet) relative to screen 32, a close content field may be provided as well as other fields. More specifically, in at least some embodiments, referring again to FIG. 7 and also to FIG. 14, the flat section 70 of the screen 32 may be divided into the upper intermediate field 96 and the lower close content field 98 and content of different types and having different characteristics (e.g., size, colors or highlighting, etc.) may be provided in the different fields as described above.

Figure 17:
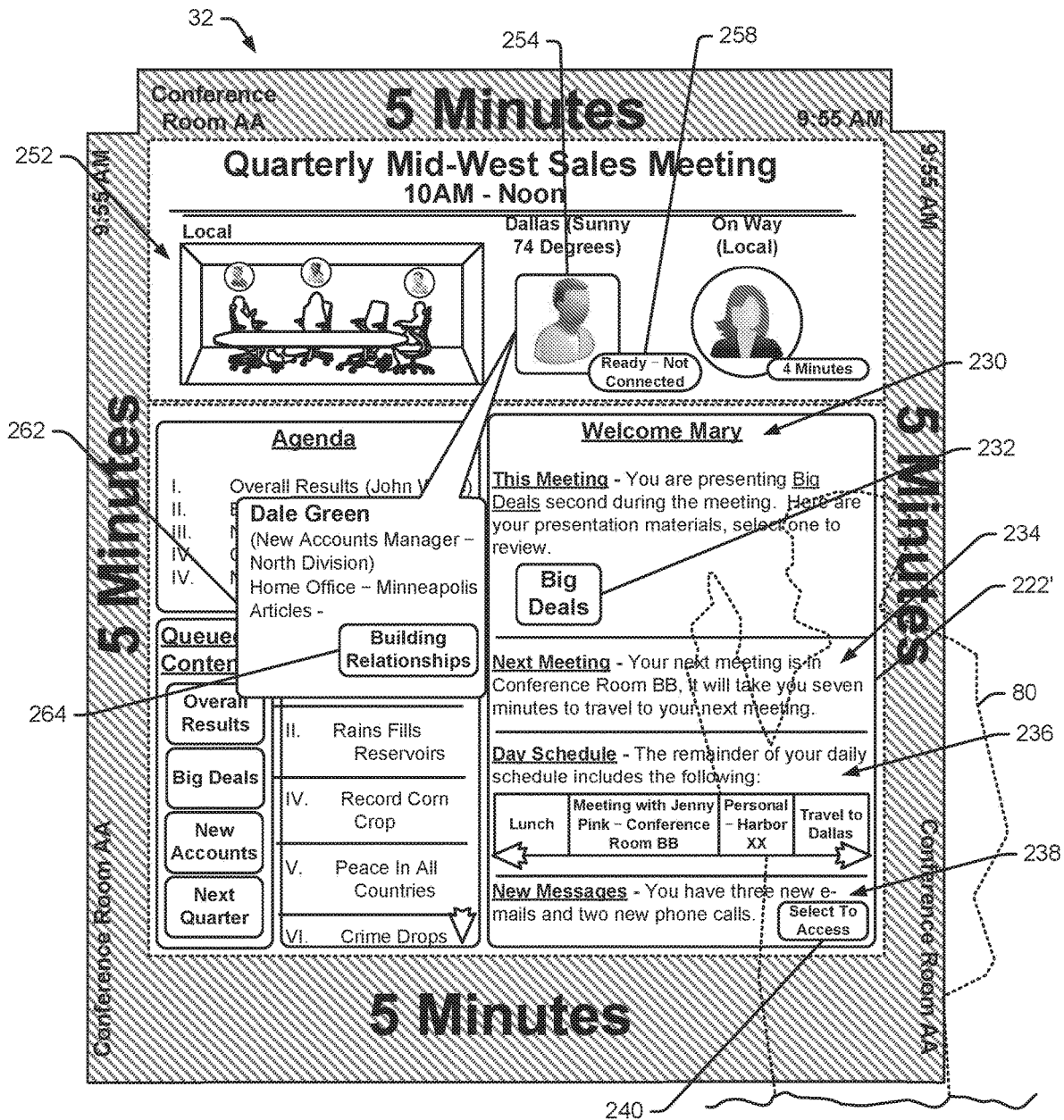
FIG. 17 is similar to FIG. 15, albeit showing the threshold content when an employee is close to the threshold and after having opted into the function that presents detailed personal information.

In at least some cases it is contemplated that a first type of content may be presented to an employee via a threshold upon initial arrival and that a second type that is more private in nature may be presented to the employee upon the employee taking some action. For instance, general news may initial be presented along with a selectable "opt in" icon that can be used to access more personal information. For example, see again in FIG. 7 that a salutation is presented at 109 welcoming a proximate employee and an opt in icon 111 for accessing a "personal dashboard" is presented that can be selected to access more detailed personal information. See also FIG. 14 that shows screen 32 division and content types in each screen field when an employee moves to within a short distance of screen 32 without opting in and after opting in where field 222 presents general personal content (e.g., preferred news feeds for a particular employee) and field 222' presents a detailed confidential personal dashboard. See also FIG. 17 where a personal dashboard is presented in field 222' where information about the up coming meeting is shown in sub-field 230 which includes a selectable content icon 232 corresponding to content that the specific employee is to present at the meeting, a field 234 that indicates a next meeting for the employee including location and an estimated travel time to the location of the next meeting, a day schedule at 236 and current waiting message information at 238 that can be accessed via icon 240 to view or access e-mails, texts, voice mains, etc.

Other threshold views are contemplated. For instance, in at least some cases a real or virtual view into a conference space may be provided via a threshold so that an arriving employee can develop a sense of the conference space, locations of other employees already in the space, etc., prior to entering the space. For example, see FIG. 17 where a conference space view 252 is presented that shows locations of present local conferees in the space at 252. A virtual view of the present local conferees is particularly advantageous in some cases as that view provides useful information to an employee outside the space while still allowing employees within the space to maintain some level of privacy. The view in FIG. 17 also shows that a remote conferee icon may be selected via a threshold to access additional information in a sub-window 262 associated with that employee such as, for instance, title, information about a home office, a content icon 264 associated with content that the remote employee may be presented at the meetings, etc. Similar information may be accessible via any of the employee image icons in representation 252 or icon 256 associated with an employee on her way to the local meeting space.

In at least some cases where a remote employee is going to join a meeting via telepresence or a voice connection, the threshold screen 32 may present a tag indicating a current connection status for the remote employee. For instance in FIG. 17 a connection status tag 258 indicates "Ready—Not Connected" meaning that the remote employee is at the location of a telepresence system to be used for the meeting but that the telepresence communication link has not been established. Once the link is established, icon 254 may be replaced with a live feed of the remote employee or, in the alternative, the tag 258 may be updated to indicate a connected and ready status.

In at least some cases, in addition to or instead of the threshold screen 32 located outside space 14, one or more threshold screens may be presented at other locations. For instance, referring again to FIG. 2, in at least some embodiments a screen 30 akin to screen 32 may be presented within space 14. In some cases screen 30 may perform in substantially the same way that screen 32 performs as described above to greet employees as they arrive for a meeting, to present relevant information about a meeting, etc. In other cases some of the functions described above may not be supported via the in space screen 30 as they make less sense. For instance, presenting information about which employees are located in space 14 makes little sense in space 14 as any employee in that space can assess who is there, where other employees are seated, etc.

Figure 18:
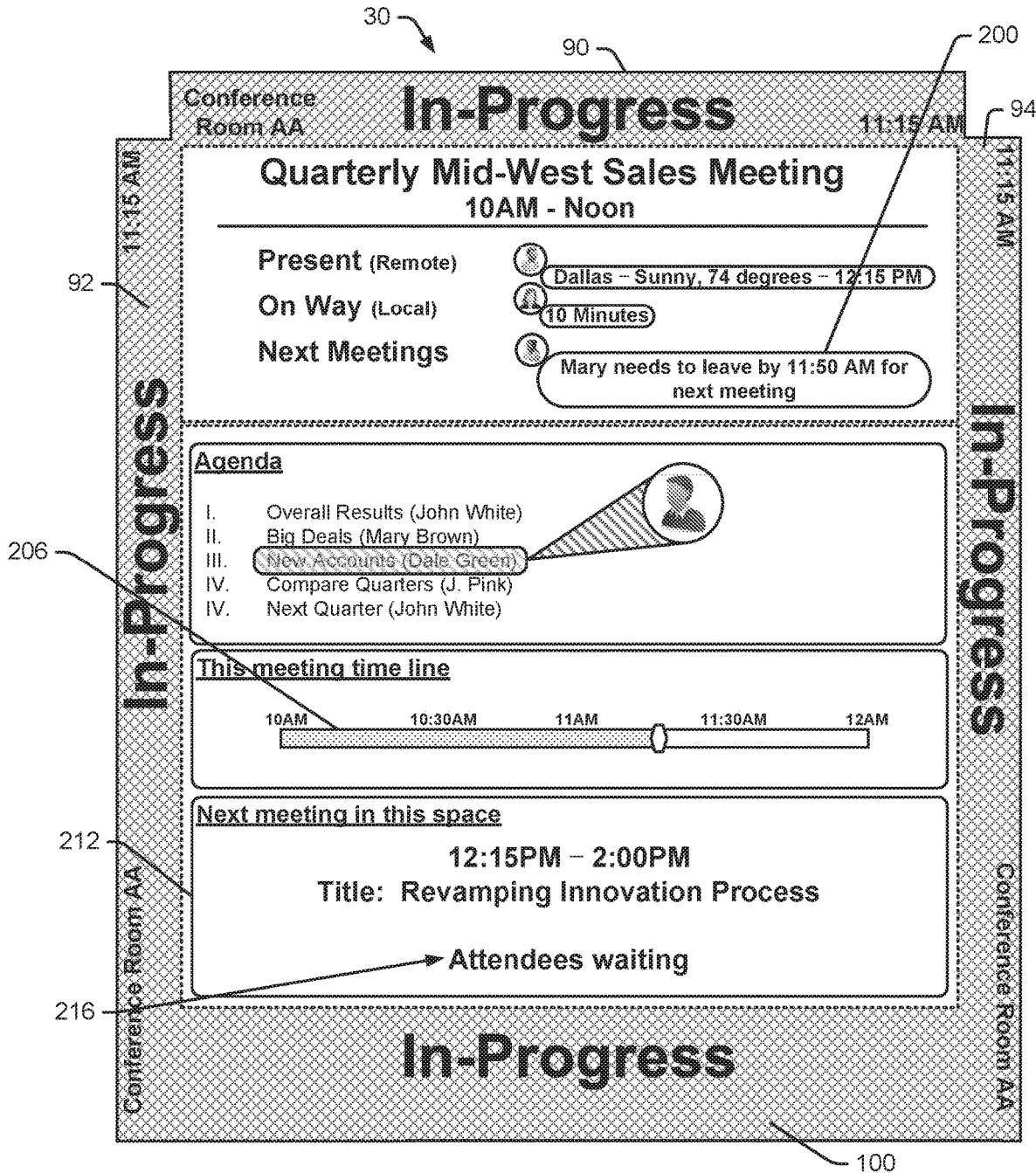
FIG. 18 is similar to FIG. 7, albeit showing another view of the threshold content during a progressing meeting.

Referring to FIG. 18, an exemplary in space screen 30 is shown that includes at least some information and fields that are akin to the information and field described above. Additional interesting information that is presented includes a next meeting indication for at least one employee at 200 that indicates that the employee needs to leave the current meeting by 11:50 AM to make it to her next meeting. This indication is a gentle reminder for other employees at the current meeting that the specific employee has another commitment and should encourage the employees at the current meeting to wrap up their activities on time. The suggested departure time may be automatically determined by server 60 based on where the current meeting space is located relative to the next meeting space for the associated employee and a typical or average travel speed for the specific employee or employees in general moving through a facility.

In addition, screen 30 includes a time line 206 for the current meeting which is intended to present a glanceable representation of the current meeting. It is believed that a time line representation of a period often is more informative than simple text and can encourage employees to move along as they can quickly see the relative amount of time left in a period to the total period length.

A next meeting indication is presented at 212 to let employees in the current meeting know the status of the meeting space 14 after their meeting. Knowing space status allows employees to determine if they need to wrap up a current meeting on time or if they have the option to extend the meeting longer for some reason. An "Attendees waiting" indication may be presented as at 216 when one or more employees scheduled to attend a next meeting in space 14 are located outside the space 14.

Figure 19:
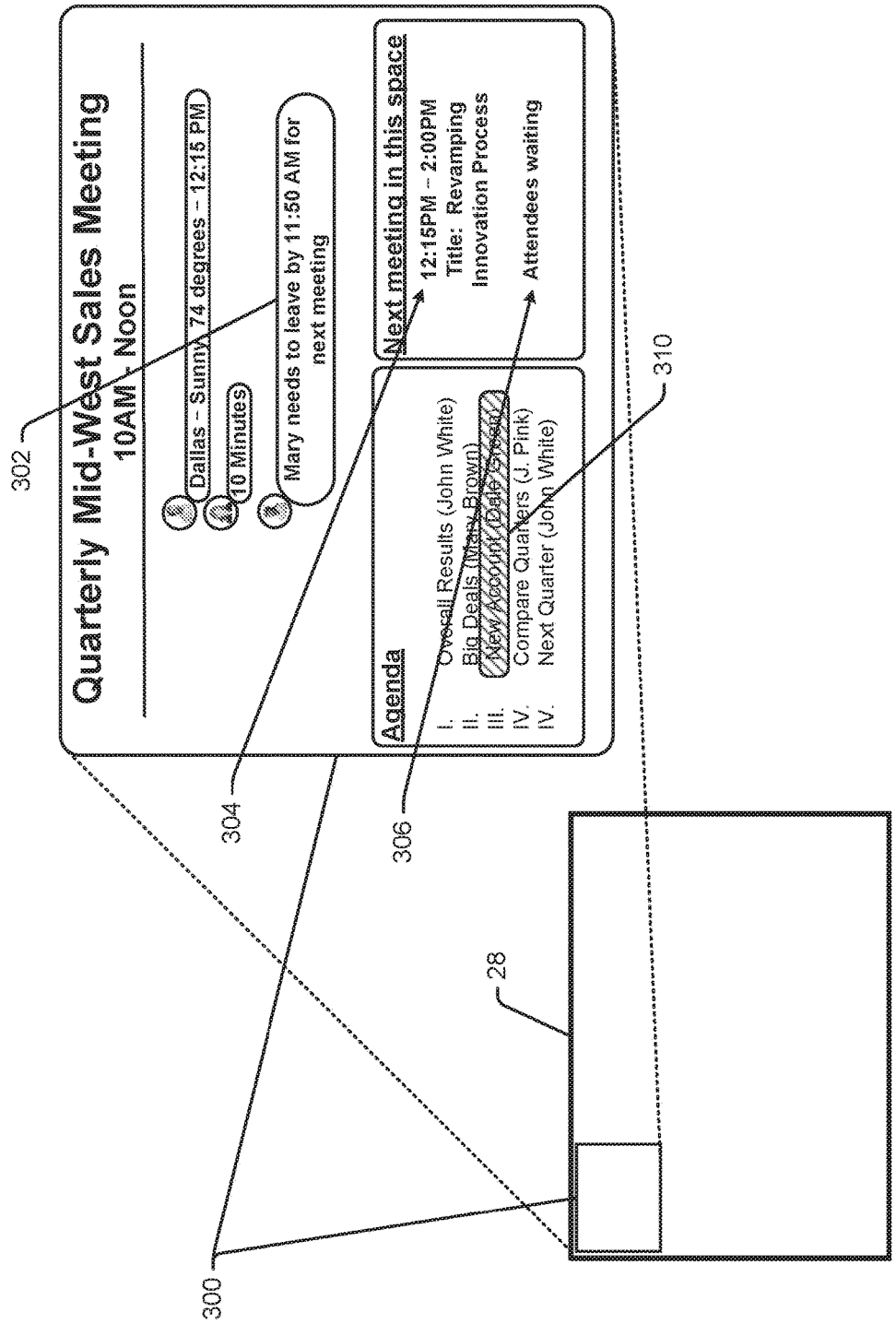
FIG. 19 is a schematic view showing the large common display screen in the meeting space in FIG. 2 and a single threshold field that maybe presented via that common display screen.

In still other cases, in space threshold content may be presented via a general purpose display screen that is used for other purposes in the space. For instance, referring again to FIG. 2 and also to FIG. 19, a portion of a large flat panel display screen 28 may be used to present a threshold field 300 that includes information related to a next meeting for an employee (see 302), a next meeting time for the space (see 304) and whether or not employees have arrived for a subsequent meeting (see 306). Other threshold information may also be presented in field 300 and the presented information may be changed as a function of time, meeting progression, etc. For instance, see at 310 that a current agenda item is highlighted to indicate current consideration. As another instance, the color or border highlighting of field 300 may be changed to indicate when a meeting is about to start, when a meeting is progressing, when a meeting is about to end, when employees are arriving for a next scheduled meeting, etc.

In at least some case when a scheduled end time for a meeting is near, if a space 14 is not scheduled for use by some other employee for some time thereafter, once the meeting gets within some threshold period of the scheduled end time, server 60 may automatically extend the meeting time and indicate the extension via one of the in space screens or threshold fields. For instance, if there is no scheduled meeting for an hour after a current meeting and the current meeting gets within 5 minutes of its scheduled end time, server 60 may automatically add 15 minutes to the end of the current meeting and indicate the change via screen 30. Whether or not a meeting is extended may also be a function of schedules of employees attending the meeting, preferences of employees attending the meeting, or other factors. For instance, where three of five employees in a meeting need to leave immediately at the end of the meeting to travel to other scheduled meetings, serer 60 may not extend the meeting time automatically so that the three employees feel no pressure to stay. As another instance, where three of five employees have expressed a general preference to not extend meetings and that information is captured in database 64, server 60 may forego extension of a current meeting to accommodate those preferences.

Referring again to FIG. 2, in at least some embodiments space opening 16 may be an entry and there may be a separate exit 18 so that employees can exit space 14 without disturbing other employees outside the entry 16 that are waiting for a next meet. Here, while it is recognized that the informal interactions between employees leaving one meeting and other employees arriving for a next meeting are often useful, in many cases the mix of employees from consecutive meetings can be disruptive to useful transition activities. For instance, employees leaving space 14 through entry 16 would disrupt employees waiting outside entry 16 that are using threshold screen 32 to perform some useful task. As another instance, employees leaving space 14 after a meeting often continue to discuss meeting topics in small subgroups on their way out of space 14 and those discussions are often cut short when other employees are located in an exit area either because of privacy concerns or other discussions that commence between arriving and leaving employees. By having one group of employees leave through exit 18 the value of extended sub-meetings after a scheduled meeting ends is appreciably increased.

In at least some embodiments separate exit thresholds 34 (see still FIG. 2) are provided outside exits 18 to help employees leave an ending meeting. To this end, see exemplary FIG. 20 that includes a threshold 34 with exemplary exit information including edge areas that are blue to indicate a completed status and edge legends that textually indicate "Complete". Screen 34 also presents next location information for each of the employees that locally attending the meeting at 330 that includes images of each local employee and tags 332 that indicate next locations for meetings for each of those employees, an estimated time to travel to the next meeting and a current status of the next meeting (e.g., in progress, starts in XX minutes, etc.). Tags may be color coded to make next activity status glanceable (see green left up to right hatching at 331). Here, by indicating meeting statuses and estimated travel times, employee empathy is greatly increased (i.e., the need to explain why an employee needs to rush off is eliminated). While not shown in any particular order, the employee images and associated tags may be arranged in an order of importance so that employees that have urgent next activities are listed first and others that have less urgent activities are listed thereafter. The next location information may also include a map 334 of facility space which may include paths for each of the local employees to show where next meetings or other activities occur for each of the employees. Paths may be color coded for each employee to show the different paths clearly on the map. As employees leave the area proximate screen 14, information related to each departing employee may be automatically removed from screen 34 so that only content useful by proximate employees is presented.

It has been recognized that in many cases when a meeting ends, a subset of attendees at the meeting may want to continue meeting discussion for at least some period after the end of the meeting. For instance, a final topic considered during a scheduled meeting may not have been completely considered. As another instance, two employees may want to review a document considered during the meeting, review a new document generated during the meeting, etc. To accommodate employees that want to continue to meet after a scheduled meeting has ended where the meeting space is scheduled for some other use, an exit threshold may facilitate a small group meeting. In at least some cases it is contemplated that meeting content may be automatically presented on an exit threshold to enable quick access thereto. To this end, see, for instance, the content queue at 336 in FIG. 20 which includes all of the documents or other content that was considered or generated during an associated meeting or that was placed in the meeting queue. Here, it is contemplated that if one or more employees that exit space 14 would like to continue a conversation related to the meeting, the employee(s) can simply move out exit 18 and use the meeting content icons at 336 to access one or more of the meeting documents or other content via screen 34.

In at least some cases the queue 336 will be presented automatically as employees leave a space 14. In other cases it is contemplated that the queue 336 may only be presented if at least one of the employees from the recently ended meeting moves to a location proximate (e.g., within 6 feet) screen 34. Here, server 60 tracks employee locations and only presents the queue if one of the meeting employees is proximate screen 34. In still other cases the queue 336 may be presented in a visually distinguished manner where the queue content icons are not selectable until one of the meeting employees makes a selection. In this case, the queue itself operates as an invitation to select and revisit content and should be immediately recognizable as such. In other cases, server 60 may present a textual invitation (e.g., a selectable "Revisit Meeting Content" icon) via screen 34 when one of the meeting employees approaches screen 34 querying if the employee would like to access the meeting queue and queue 336 would only be presented if the invitation is accepted (e.g., the selectable icon is activated).

Figure 20:
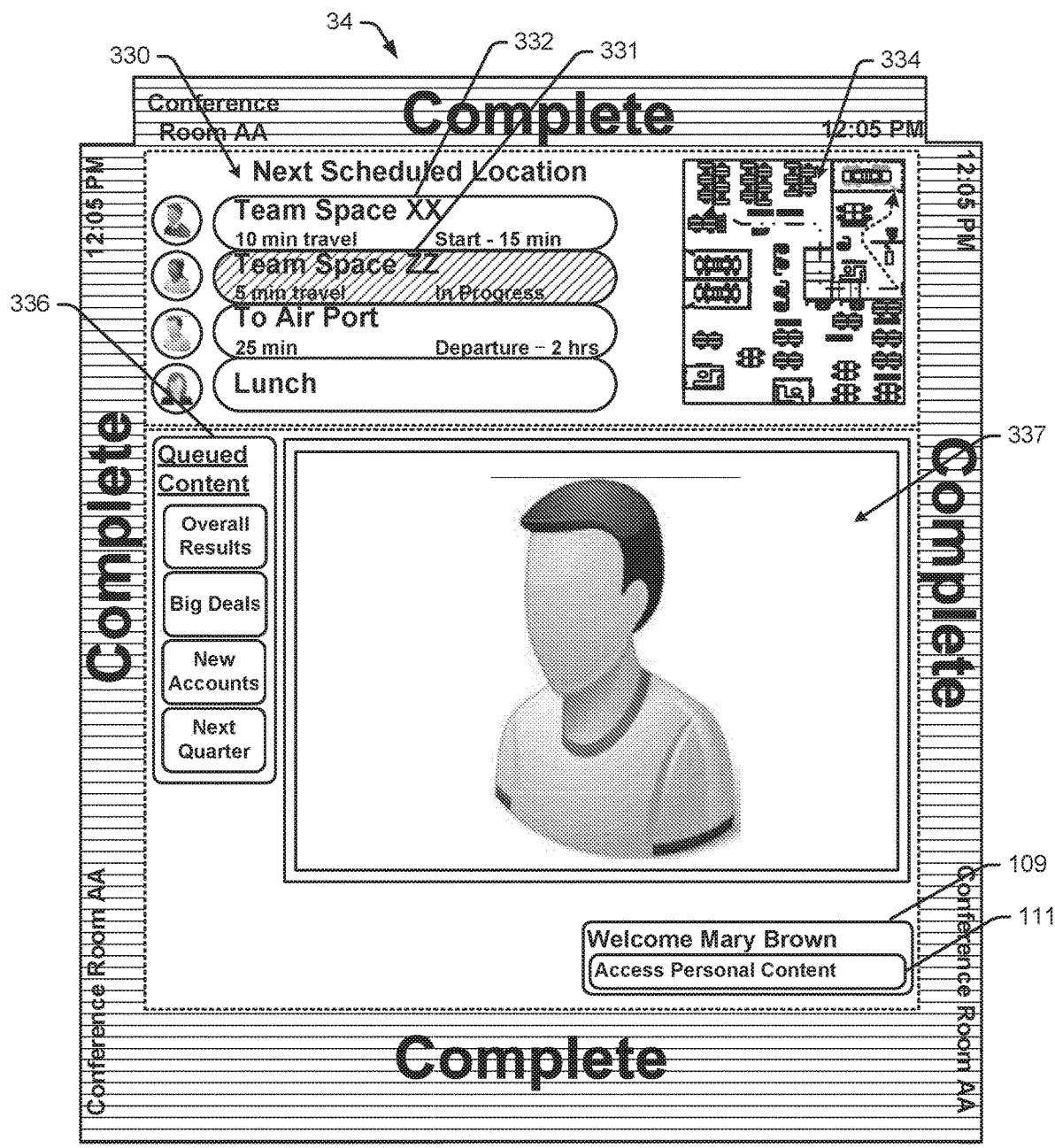
FIG. 20 is similar to FIG. 7, albeit showing threshold content after a meeting has been completed.

When a specific employee approaches screen 34, in some cases server 60 may present a salutation 109 and dashboard icon 111 as in FIG. 20 so that the employee has the ability to access her personal information via screen 34. Here, for instance, Mary Brown may want to check new messages left for her during the meeting and may want to use screen 34 to do so in a content amplification fashion.

In at least some cases, when a meeting ends, one or more remote conferees may want to continue the meeting with one or more local conferees outside the space 14. In at least some embodiments it is contemplated that a telepresence link may be redirected from a screen in space 14 to an exit threshold 34. For instance, just prior to the end of a meeting, a first remote employee and a second local employee may agree to continue a side bar after the meeting ends. Here, in at least some cases, the remote end of the communication link may be continued until the remote employee takes some step to discontinue the link or until all local employees that attended the meeting have left the general area about space 14. Server 60 tracks local employee locations and when one of the local employees approaches the exit threshold, server 60 may automatically redirect the telecommunication link to the exit threshold so that the first remote employee image appears on the threshold screen as shown at 337 in FIG. 20. In this case the after meeting sidebar may be able to commence immediately. Again, in this case, the server 60 may only enable the telecommunication link with the remote employee when one of the local meeting employees approaches an exit threshold. If no local meeting employee approaches an exit threshold within some threshold time period (e.g., 10 minutes), server 60 may be programmed to automatically discontinue the telepresence communication link.

In other cases when a local meeting employee walks up to an exit threshold to continue a redirected telepresence activity with a remote employee, the image of the remote employee may be fuzzy or otherwise distorted and server 60 may require some type of opt in action by the local employee to enable full telepresence functionality. For instance, as the local employee approaches the exit threshold, server 60 may present a selectable "Opt in to telepresence" icon to the approaching employee which, when selected, causes the post meeting telepresence session to commence.

Figure 21:
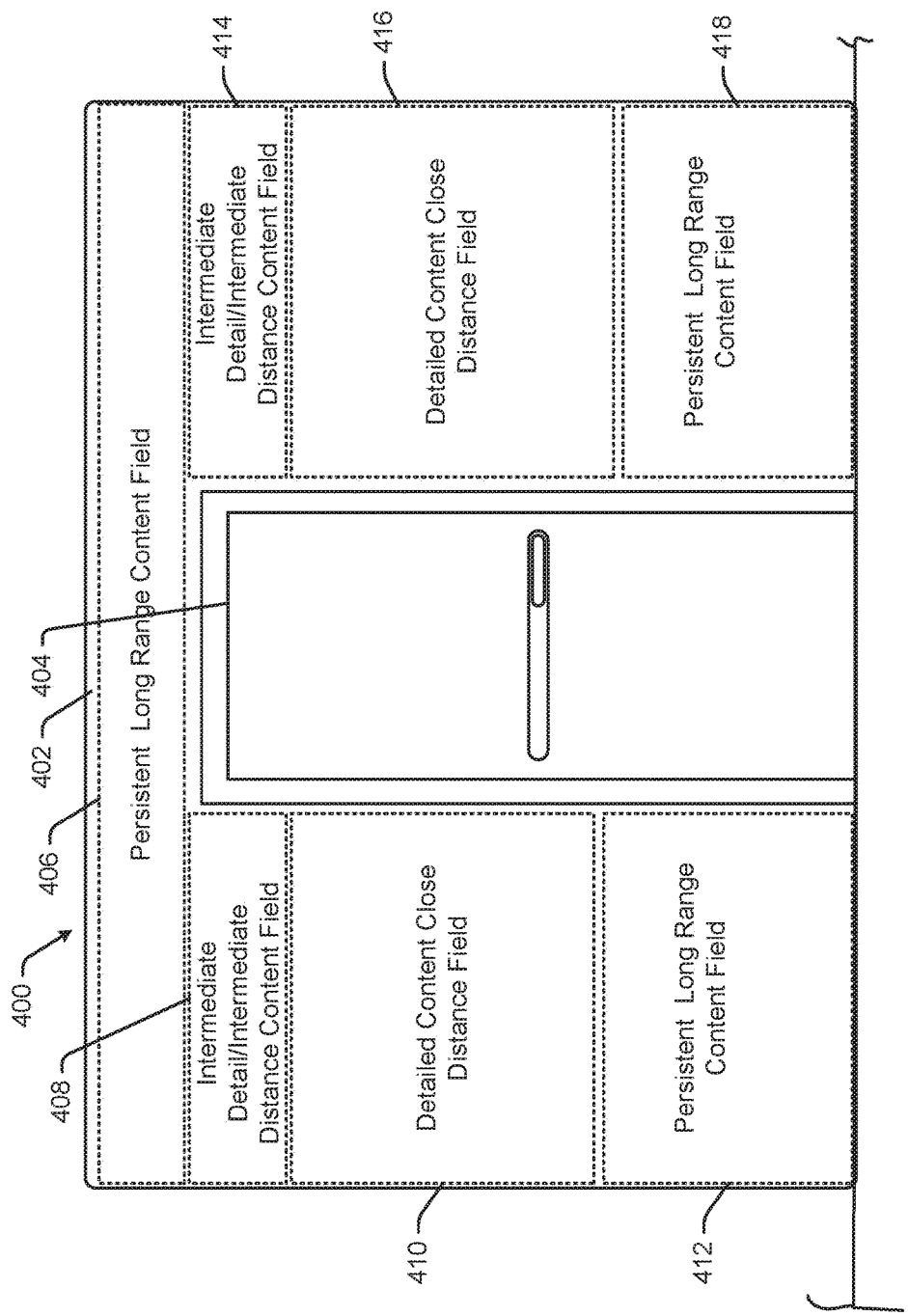
FIG. 21 is similar to FIG. 6, albeit showing a second threshold configuration type.
Figure 22:
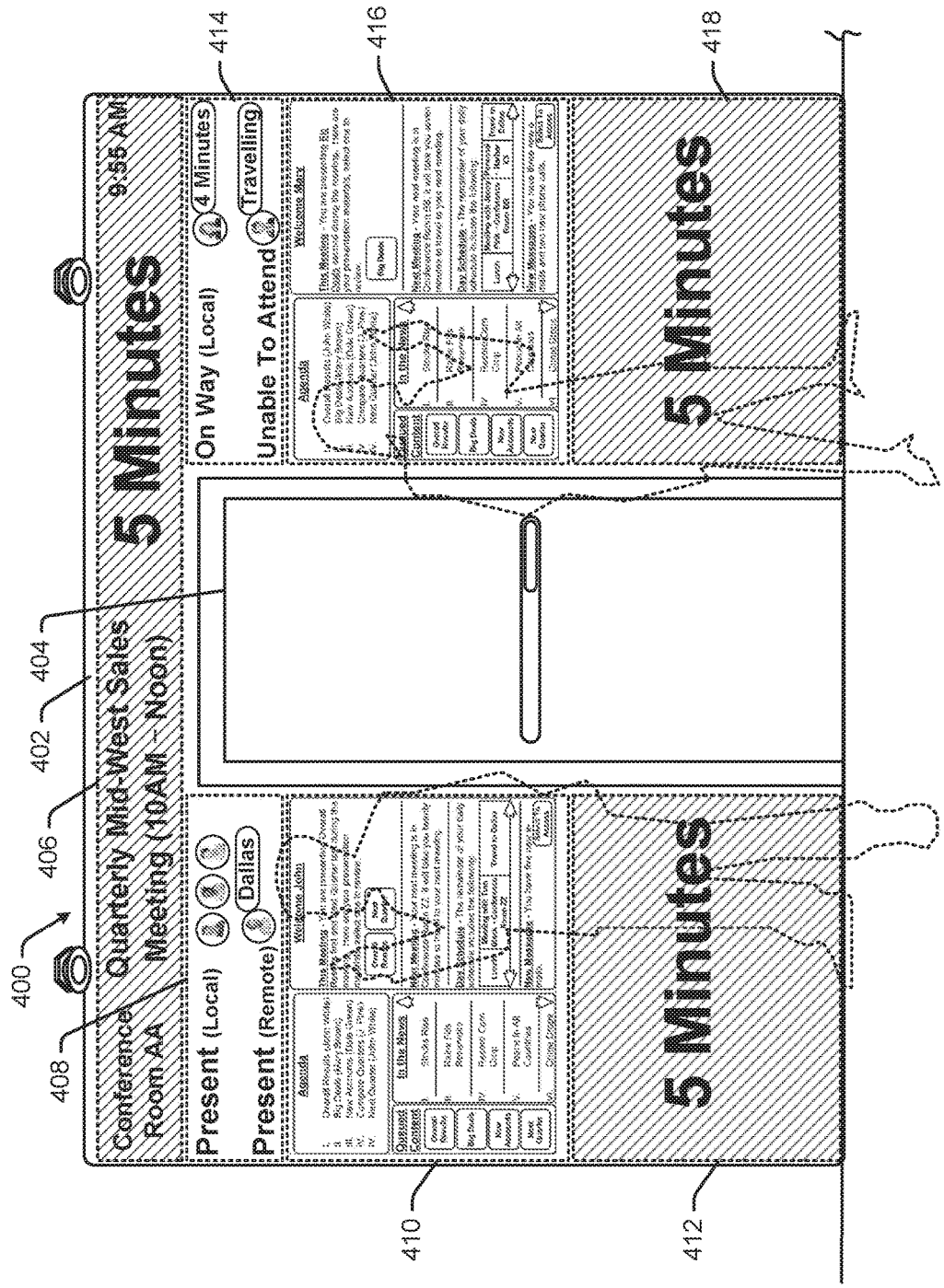
FIG. 22 is similar to FIG. 21, albeit showing an exemplary set of content that maybe presented via the second threshold type.

Referring now to FIGS. 21 and 22, a second threshold configuration 400 is illustrated that includes a large emissive surface or structure 402 that forms a proscenium about an entry/exit door 404 including emissive surfaces to the top and to left and right sides of the door 404. In at least some embodiments structure 400 will includes several flat panel display screens with thin or substantially no bezels so that the emissive surface is substantially continuous about the door 404. In other cases a single emissive structure may provide a continuous emissive surface about door 404. In other cases at least some of the area provided by structure 400 may include a projection screen and content may be projected onto that surface. For instance, fields labeled 406, 408 and 410 are relatively high on structure 400 and therefore a projector projecting into those spaces generally will not be blocked by an employee standing close to structure 400, especially where a short throw projector is used to project content into those fields.

Referring still to FIGS. 21 and 22, the surface of structure 400 is divided into seven different fields including a persistent long range field 406 along the top, persistent long range content fields along the bottom at 412 and 418, left and right intermediate detail/intermediate distance content fields 408 and 414 and left and right detailed status/content close distance fields 410 and 416, respectively. Unless indicated otherwise, hereinafter, fields 408, 410 and 412 will be referred to collectively as left fields and fields 414, 416 and 418 will be referred to collectively as right fields. As in the case of the first threshold configuration shown in FIG. 3, server 60 is programmed to present different types of information in the different fields based on locations of employees relative to threshold 400, time related to a schedule for an associated meeting space, etc.

In general, threshold 400 includes more emissive surface than the first threshold described above. For instance, in at least some embodiments each of the left and right fields of threshold 400 have a height dimension that is similar to the height dimension of a standard entry door 404 and a width that is between two and four feet and a top portion of the threshold above the left and right fields and the door has a width dimension between seven and twelve feet and a height dimension between one foot and three feet.

Because threshold 400 has a relatively large amount of emissive surface, the surface can be used to present content to different employees at different times in at least some embodiments. To this end, again, for a typical employee, when the employee is close to the emissive threshold surface, there is only a maximum useful field of that surface that can be easily viewed and any are outside that field is difficult to view at best. Thus, in general, once an employee is close to threshold 400, portions of the emissive surface outside the maximum useful field can be used to present content other than content for use by the proximate employee.

Referring to FIG. 22, threshold 400 is shown at a time just prior to commencement of a meeting when a first employee is proximate the left portion of the threshold 400. As shown, the long range content fields 406, 412 and 418 are yellow to indicate that a meeting is going to commence in the next 5 minutes and text to that effect is also presented in each of those fields. A space name and time as well as a meeting title and meeting time are presented in the upper long range field 406.

Referring still to FIG. 22, present (local), present (remote), on way (local) and unable to attend employee lists and various types of tags are presented in fields 408 and 414 to indicate the status of employees that are scheduled to attend the meeting. Although not shown, if no employee is close to any part of threshold 400 (e.g., no employee is within 6 feet of threshold 400), the employee status information in fields 408 and 414 or other content may be presented in a larger format in fields 408, 410, 414 and 416 so that the content can be seem from a distance of greater than 6 feet. If a first employee walks up to the left side of the threshold 400, the content on that side of the threshold 400 may be shrunk down to the size shown in FIG. 22 and close field content may be presented to the first employee as illustrated in FIG. 22. Here, if no second employee is proximate the right side of threshold 400, the larger format employee status content may persist in fields 414 and 416 so that it can be seen from a greater distance than 6 feet. If a second employee walks up to the right side of threshold 400, the content on the right side of the threshold may be shrunk down to the size shown in FIG. 22 and close field content may also be presented in field 416. While close field content is presented on either the left or right side of threshold 400, if a proximate employee moves away from threshold 400, the content in one of the intermediate distance content fields 408 or 414 may again be increased in size to take up the field there below or other content suitable for viewing past 6 feet may be provided to fill the field 410 or 416. Thus, the added area of threshold 400 enables more than one employee to interact with the threshold content.

While not shown, in at least some embodiments a threshold like threshold 400 may be provided around an exit opening to a meeting space as well as about an entry opening. Where a large threshold 400 is provided at an exit location, two separate breakout sub-meetings may be supported at the exit location after a meeting ceases or duplicative exit content may be presented at different location of the large emissive exit surface.

Figure 23:
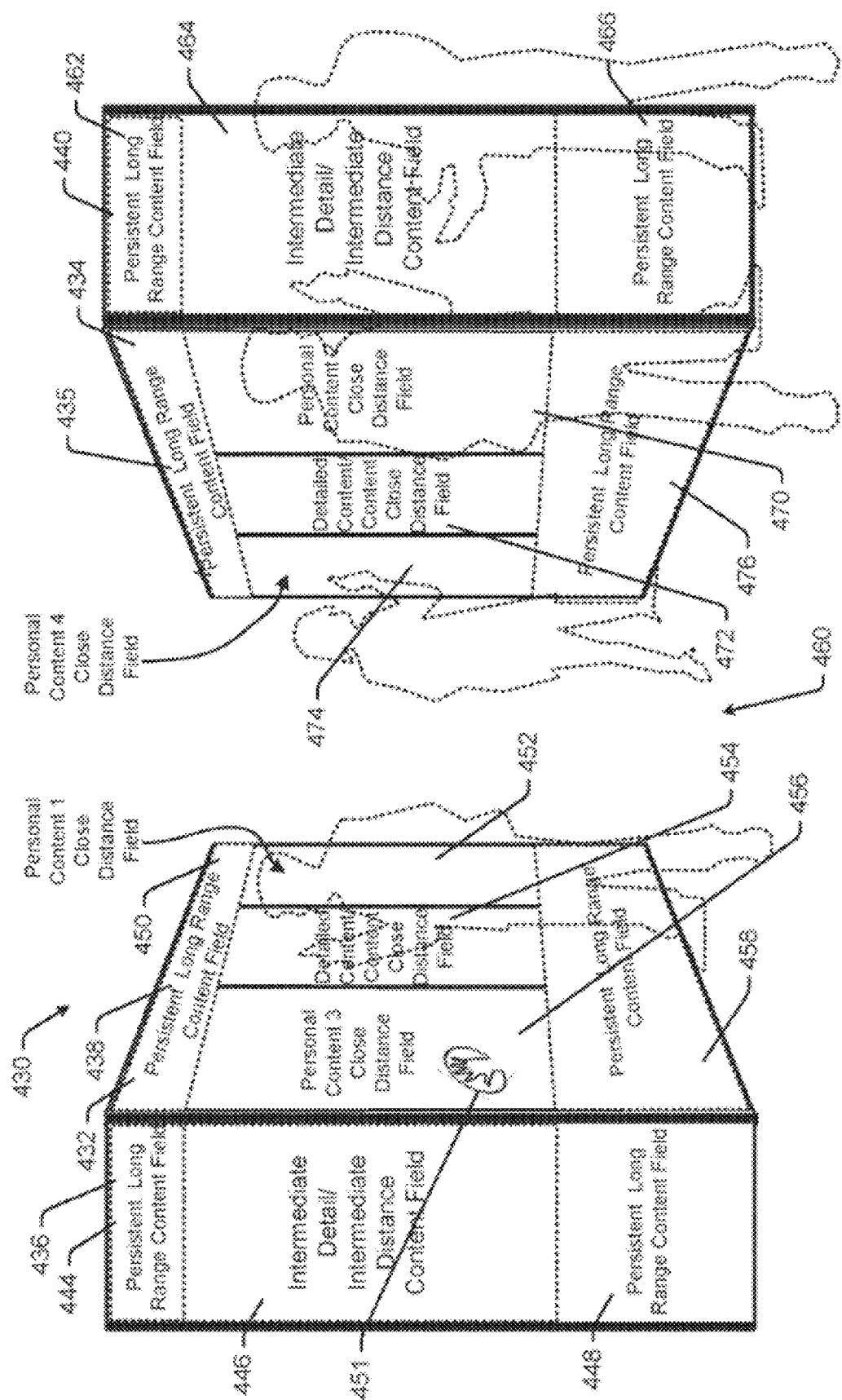
FIG. 23 is similar to FIG. 6, albeit showing a third threshold configuration type that is consistent with at least some aspects of the present disclosure.

Referring now to FIG. 23, an exemplary third threshold type 430 is illustrated that includes structure that generally forms a corridor or passageway 460 from outside a meeting space into the meeting space that has to be transgressed to enter the space. The exemplary threshold 430 includes first and second emissive wall structures 432 and 434. Structures 432 and 434 are shown as stand alone structures but, in at least some embodiments, the structure 432 and 434 may be integrally formed into or mounted to supporting wall structures that form part of an associated meeting space. Each of the structures is similarly constructed and operates in a similar fashion and therefore, unless indicated otherwise, only structure 432 will be described here in some detail.

Referring still to FIG. 23, structure 432 includes an outer section 436 and a corridor section 438 and structure 434 includes an outer section 440 and a corridor section 435. The outer wall sections 436 and 440 form substantially coplanar and rectangular emissive surfaces that face outward from an associated meeting space. In at least some cases, sections 436 and 440 have floor to ceiling height dimensions between six feet and nine feet while in other cases there may be some space between a floor and the lower edge of each of sections 436 and 440 as well as some space between a ceiling structure and the top edges of sections 436 and 440. Each section 436 and 440 has a width dimension that is large enough to accommodate at least one employee that wants to access personal content in at least some embodiments. For instance, in some cases, sections 436 and 440 will each have a width dimension between two feet and four feet and in particularly advantageous embodiments will have a width dimension between two and one half feet and three and one half feet.

Near edges of sections 436 and 440 form an opening into the passageway or corridor 460. In at least some embodiments the opening into corridor 460 defines a horizontal distance between three feet and seven feet. In some embodiments the width of the corridor 460 is substantially uniform along its length while in other embodiments the corridor 460 may narrow or widen from its opening end to its exit end spaced from wall sections 435 and 440.

Corridor sections 438 and 435, in the illustrated embodiment, form substantially flat emissive surfaces that face the corridor 460. Each section 438 and 435 is similarly constructed and operates in a similar fashion. Section 435 has a height dimension that may be identical to the height dimension of section 436 and has a length dimension along the length of corridor 460 that is between four feet and fifteen feet and, in particularly advantageous embodiments, will be within a range between seven feet and ten feet.

In some embodiments, sections 436 and 438 are formed using a single emissive screen structure and sections 440 and 435 are also formed using a single emissive screen structure. In other cases, as in the case of the second threshold configuration described above, separate minimal bezel display screens may be mounted edge to edge to form the emissive threshold surfaces. Hereinafter, sections 436, 338, 440 and 435 will be referred to as first, second, third and fourth emissive surfaces, respectively.

Referring still to FIG. 23, as in the case of the other threshold configurations described above, the emissive threshold surfaces may be divided up to provide several different fields. First emissive surface 436 is shown divided into a cloud field, a first outer fovial field and a ground field 444, 446 and 448, respectively, while second emissive surface 438 is shown divided into a single cloud field 450, a single ground field 458 and first, second and third fovial fields 452, 454 and 456, respectively. The third and fourth emissive surfaces 440 and 435 are similarly divided into eight fields labeled 462, 464, 466, 470, 472, 474, 448 and 476. Consistent with the naming convention for fovial fields formed by surfaces 436 and 438, fovial fields 464, 470, 472 and 474 will be referred to hereinafter as a second outer fovial field, a fourth fovial field, a fifth fovial field and a sixth fovial field, respectively.

Referring still to FIG. 23, in at least some embodiments the cloud and ground fields are persistently used to present long range content and therefore are labeled "persistent long range content fields". For instance, space status color coding, a space name, a current time, a text indication of instantaneous space status, etc., may all be presented in the long range cloud and ground fields. The fovial fields 446, 464, 452, 454, 456, 470, 472 and 474 are, in at least some embodiments, controlled dynamically to present different content based on employee locations relative to threshold 430.

It has been recognized that when a threshold forms a corridor 460 or other semi-enclosed structure, the space within the corridor of structure may offer more privacy than space outside the corridor. In fact, it may be difficult for anyone to see content presented via the second and third emissive surfaces 438 and 435 unless they are within the corridor 460. For this reason, in at least some embodiments, no content may be presented on the surfaces that form the corridor 460 unless an employee is located therein or is at least close to threshold 430 (e.g., is approaching the threshold). In addition, in at least some embodiments, personal content may only be presented via fields that form corridor 460 so that employees viewing the personal content are afforded more privacy. Thus, for instance, in FIG. 23, when no employee is within a close distance (e.g., within 6 feet) of threshold 430, sever 60 may only presents intermediate distance content in the first and second outer fovial fields 446 and 464 and long range content in fields 444, 448, 462 and 466 without presenting any content on the fields within corridor 460. In some cases an abstract image, a color, etc., may be presented on the corridor facing fields to indicate that those fields are active without providing specific content.

When a first employee moves into a location proximate threshold 430, server 60 may start to present content within corridor 460. For instance, in at least some cases, server 60 may effectively draw the employee into the corridor 460 by presenting content in the far end first fovial field 452. Here, by presenting content in fovial field 452 as opposed to in some other fovial area, the first employee is encouraged to move into deep into the corridor and assume a substantially private position at the far end thereof. In some cases, the content may first be presented at the near end of the corridor and then may move to the far end. In other cases, an arrow or the like may be presented at the near end directing the employee to the far end. Here, the arrow may include a salutation naming the arriving first employee so that the employee knows that the message is for that specific employee. By moving the first arriving employee to the far end of corridor 460, the near end of corridor 460 remains generally open and can be used to present content to a second arriving employee.

Next, assume that a first employee is still adjacent first fovial field 452 interacting with personal content when a second employee arrives proximate threshold 430. In at least some embodiments it is contemplated that server 60 will "invite" the second employee into corridor 460 in some fashion and specifically to a corridor location that is not immediately adjacent the first fovial field 452 used by the first employee. For instance, in FIG. 23, server 60 may present some detailed content on the fourth fovial field 470 that is directed at the second employee to draw the second employee into the corridor 460. Here, the second employee is afforded at least some privacy by the corridor structure and, because of the spacing from the first employee at field 452, should not disturb the first employee at the far end of corridor 460. In at least some cases the initial content presented to the first and second employees in the current example may simply include detailed content about a meeting to occur in a space associated with threshold 430 and truly personal information may require some type of opt in action (see again tools 109 and 111 in FIG. 7) by an employee.

While content is presented to the first and second employees in fields 452 and 460, other detailed content may be presented in other fovial fields that form corridor 460 and that can be viewed by other employees generally in the area. If a third employee moves into corridor 460, server 60 may present a personal salutation in the third fovial field 456 that is separated from the first fovial field 452 by the second fovial field 454. In the alternative, a third employee may be encouraged to use the first outer fovial field 446 to view detailed and/or personal content so that the third employee is generally spaced away from the first and second employees using fields 452 and 470, respectively.

Now assume that in a different case a first employee uses field 452 to access personal information for a few minutes and then moves into a meeting space associated with threshold 430 prior to arrival of a second employee. Here, when the second employee arrives at threshold 430, server 60 may encourage the second employee to move into corridor 460 and assume a position, again, at the first fovial field 452, thus affording the most privacy to the second arriving employee whenever possible.

It is contemplated that in most cases only a small number of employees will be located proximate a threshold at any given time and therefore even two or three separate semi-private fields should accommodate most employees. For instance, where six employees are scheduled to locally attend a meeting, the likelihood of more than two or three arriving at the local space more than a few minutes prior to a scheduled start time is unlikely. In cases where several meeting spaces and associated thresholds are located in the same general area and meetings are staggered to start at different times, in at least some cases where an employee arrives early for a meeting and a threshold associated with the space to be used for the meeting is being used by one or more other employees, the arriving employee may be directed to a different proximate threshold to be used prior to the meeting. Here, server 60 may identify the arriving employee and the employee's location and may present a personal salutation at the other threshold and invite the arriving employee to use the other threshold temporarily.

In at least some cases it is contemplated that server 60 may automatically resize fields presented to employees as a function of how many employees are located proximate threshold surfaces. For instance, again assume that only a first employee is located within corridor 460 in FIG. 23. Here, server 60 may present a single fovial field that covers both the first and second field s 452 and 454 so that the first employee has a larger area in which to interact with personal or other detailed content. If second and third employees arrive in corridor 460, the second employee may be offered a second large field that covers field 470 and 472 and the third employee may be offered the third fovial field 456. When field 456 is offered to the third employee, the field presented to the first employee may be reduced in size to only cover first fovial field 452 so that there is some space between the fields used by the first and third employees to maintain a sense of privacy.

In still other cases it is contemplated that an arriving employee may have a choice regarding where to access a personal fovial field on the threshold emissive surfaces. For instance, upon arriving at threshold 430, server 460 may present a hand icon 451 or other imagery as shown in FIG. 23 at the near end of corridor 460. The hand icon may follow the first employee as that employee travels into corridor 460 to the far end. At any location on surface 438, the employee may touch the hand icon 452 to open up a fovial field for accessing personal or detailed content.

Referring again to FIG. 2, in at least some embodiments it is contemplated that the template concept may be extended into meeting spaces and more specifically onto conference table assemblies like assembly 22. Extending the threshold into a meeting space is useful in cases where a space is available for some time prior to a meeting and an employee arrives early for a meeting and would like to access useful information within the meeting space 14. In at least some embodiments the entire top surface or at least portions of the top surface of table assembly 22 may include emissive surfaces so that digital content can be presented to employees via the table assembly.

Figure 24:
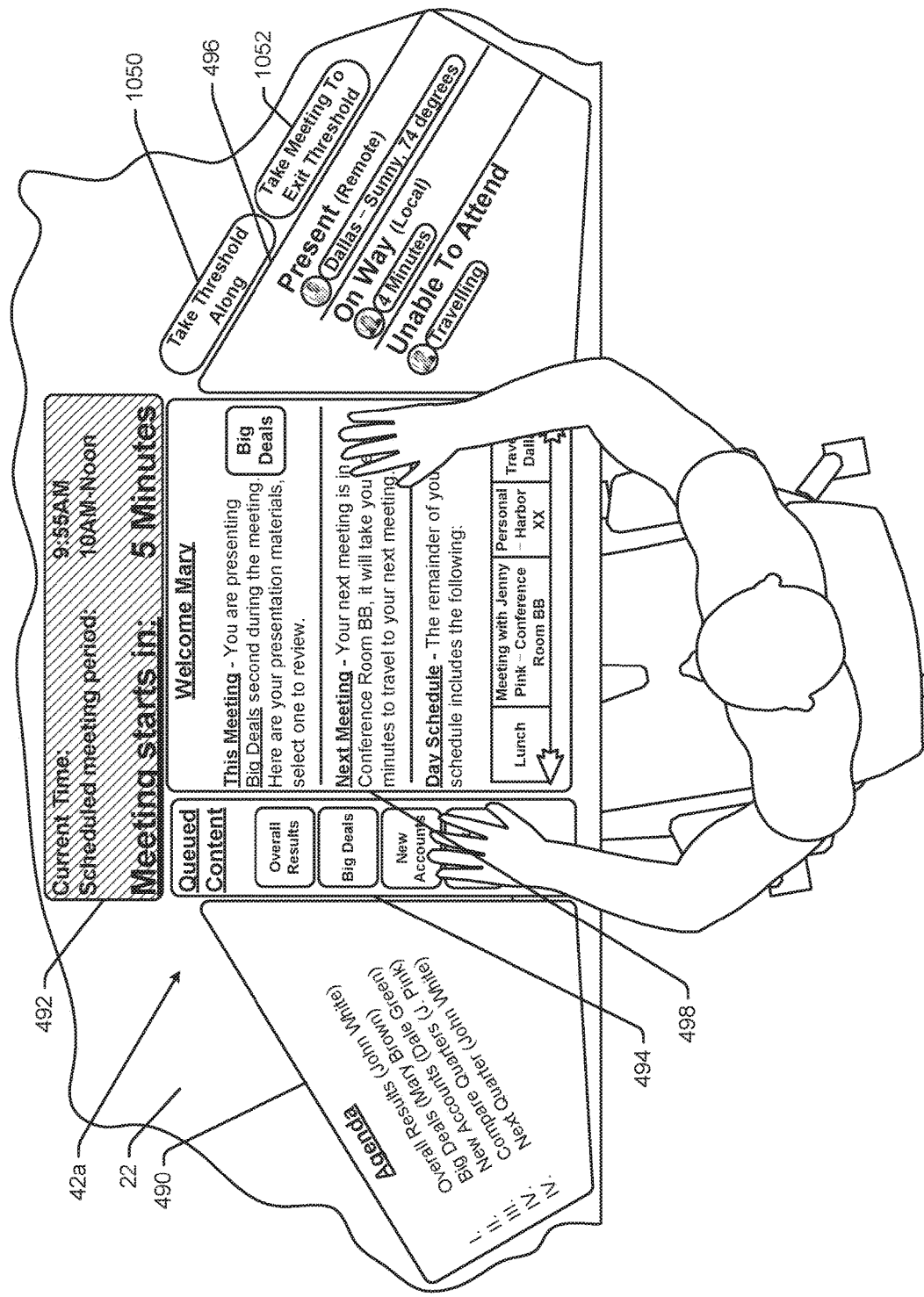
FIG. 24 is a top plan view showing an exemplary threshold interface that maybe presented via the emissive table top surface shown in FIG. 2.

In FIG. 2, two exemplary virtual threshold interfaces are shown and labeled 42a and 42b. Referring also to FIG. 24, an exemplary interface 42a is shown in greater detail and includes an agenda field 490, a space and meeting status field 492, an employee status field 496, a queued content field 494 and a personal content field 498. Space and meeting status field 492 indicates that status of a meeting and, consistent with the above disclosure, is colored yellow to indicate that a next meeting is scheduled to commence within five minutes. A current time and a count down clock to the next meeting start time are presented in field 492.

Agenda field 490 presents a meeting agenda for the upcoming meeting and the employee status field 496 presents employee status information indicating current locations of employees that are scheduled to attend the upcoming meeting. The employee status information does not include a listing of present local employees as interface 42a is located in the local meeting space and therefore the employee associated with interface 42a can determine who is present by simply looking about in space 14.

Referring still to FIG. 24, queue field 494 presents a set of selectable virtual icons, one for each file or record that is associated with a meeting. In at least some cases each of the file icons may be selectable to access an instance of the associated file via personal content field 498. Personal content field 498 may default to presenting meeting information specific to an associated employee (e.g., a selectable icon with the content that the employee is presenting) as well as next meeting and day schedule information. In addition, the personal content field may also be used to show other personal information like a message log, content of specific messages, a list of documents the employee has recently accessed or worked on, a list of the employee's documents that, based on title, an abstract or other information is possibly related to the meeting that is about to commence, etc.

Figure 25:
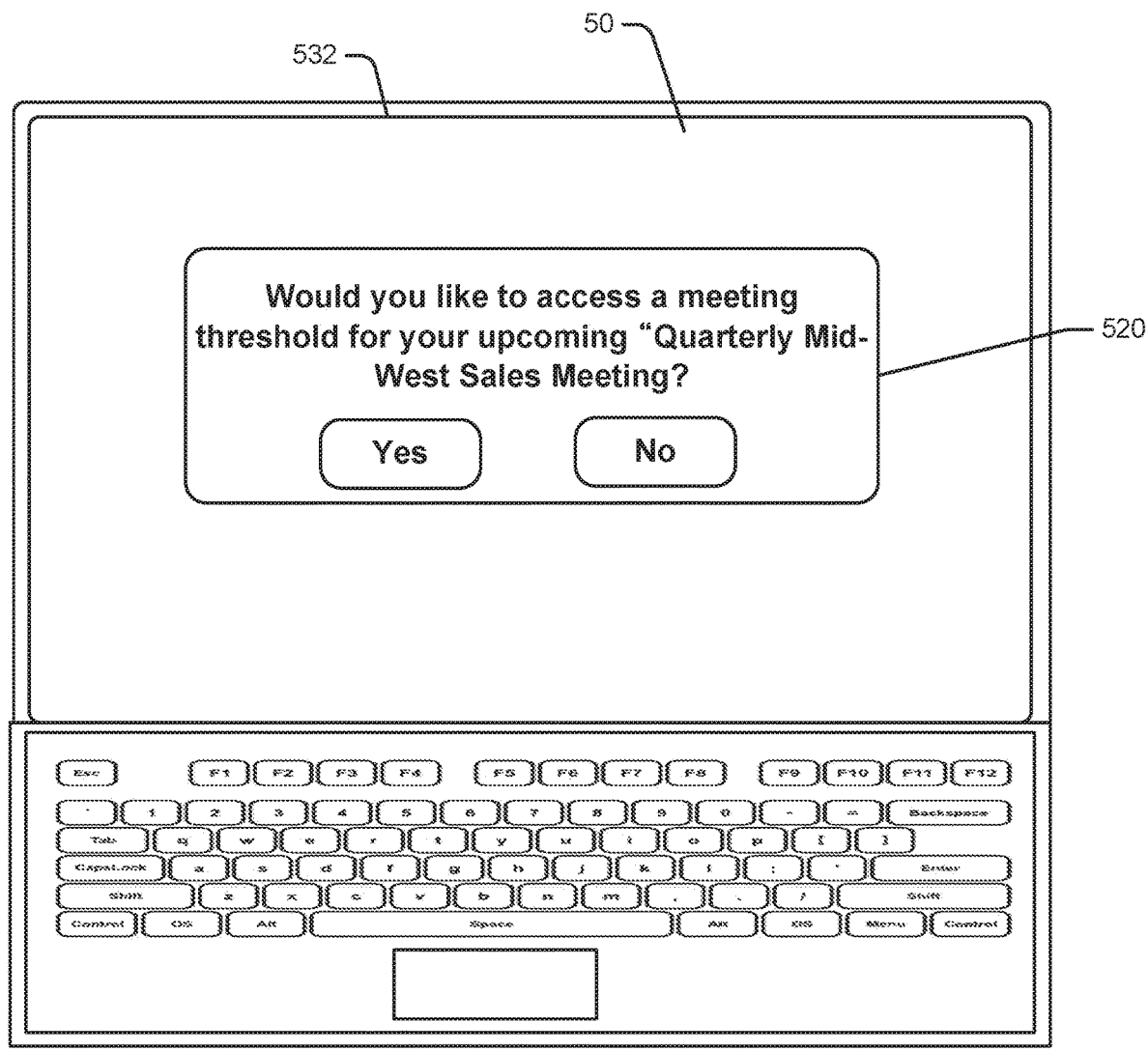
FIG. 25 is a schematic illustrating an exemplary lap top computer that allows an employee access a threshold interface for use in a meeting space associated with the threshold.

In at least some embodiments it is contemplated that a threshold may also be provided on the display screen associated with a personal portable computing device either inside a meeting space or outside that space (e.g., to a remote employee or to an employee that is in transit to the local meeting space. For instance, referring again to FIG. 2, in at least some embodiments server 60 may automatically recognize when a laptop or other portable device 50 is located in space 14 and may query if an associated employee would like to view a threshold for space 14 and the meeting in space 14. In this regard see, for instance, FIG. 25 where a threshold query is presented at 520 on a screen 532 of a local laptop 50. In FIG. 25 the employee either selects the yes or no icons to access a threshold or forego accessing a threshold. Where an employee access a threshold via her portable device, see exemplary threshold content presented on screen 532 in FIG. 26.

The exemplary portable device threshold includes a plurality of fields and related content including a general meeting/space filed at 534 that includes a count down clock to count down time prior to the meeting, a meeting space identifier and current time identifier, an indication of the meeting title and a period over which the meeting is scheduled to occur. The device threshold also includes an employee status field 538, an agenda field 540, a meeting content queue field 542 and a news content field 544 that are similar to the similarly labeled fields as described above in relation to other threshold configurations. The employee status field 538 includes status information on current locations or activities related to each non-local employee that is scheduled to attend the meeting at 536. Here, because device 50 is locally located in space 14, the employee status information does not include information related to present local employees. Informational tags are provided for at least a subset of the employees listed in field 538 indicating instantaneous locations or other information (e.g., times to travel to a destination, current cities, current weather, travelling or other activities, etc.) related to the employees. Scrolling icons may be presented enabling the employee to scroll through threshold content.

Figure 26:
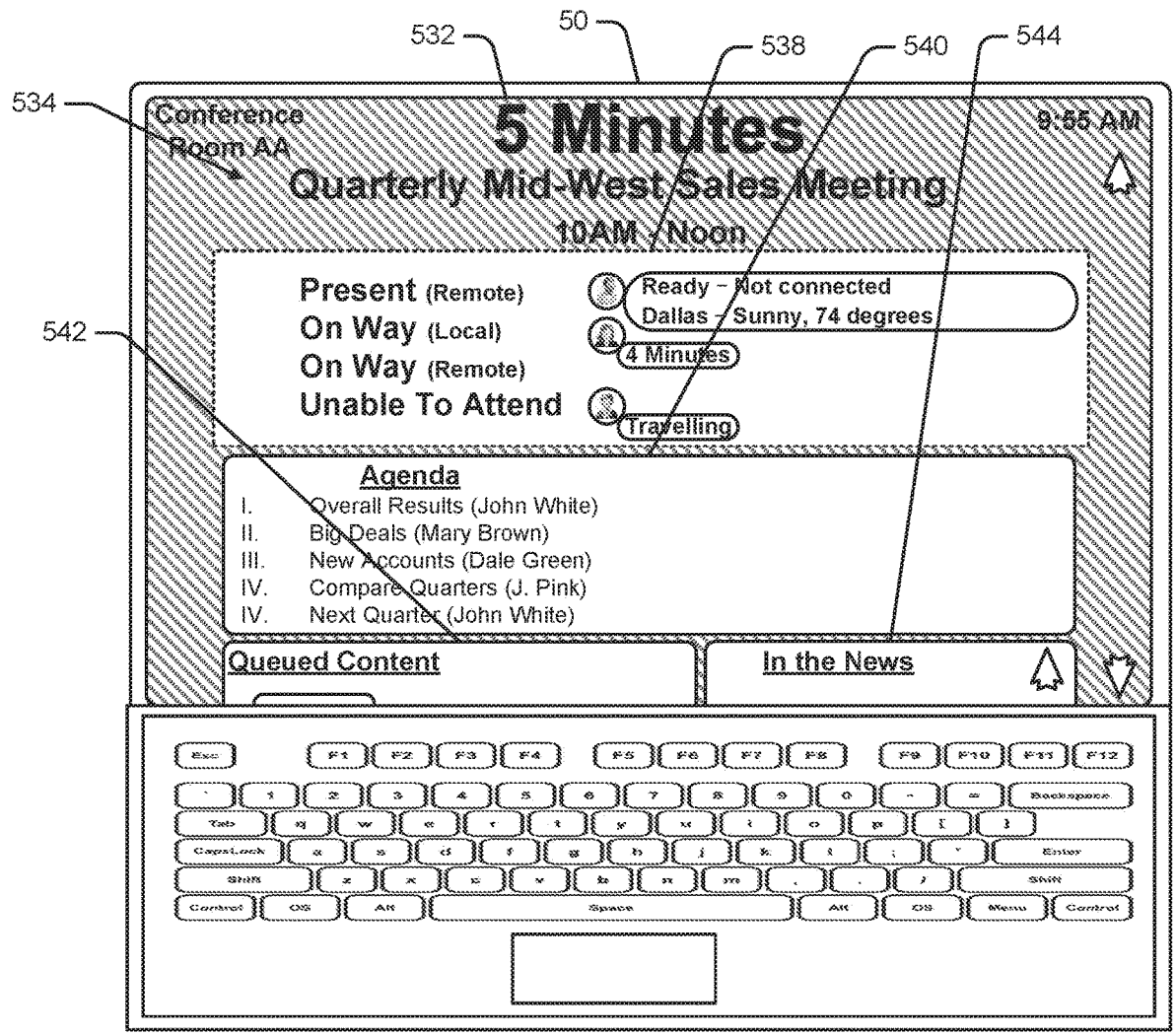
FIG. 26 is similar to FIG. 25, albeit showing an exemplary threshold interface.

Referring still to FIG. 26, at least initially in some cases, the portable device interface will present selectable icons that can be used to drill down into associated content. For instance, any of the tags in the queued content field 542 or headlines in the news field 544 may be selected to access more detailed related information. At least initially the content presented via screen 532 is of a nature that most employees would not consider the information private.

While the threshold presented in FIG. 26 is described as being accessed via an opt in action using on screen tools as shown in FIG. 25, in other cases the threshold may be automatically presented on portable device screens of devices that are associated with employees scheduled to attend a meeting. Thus, for instance, if an employee were to bring device 50 into a meeting space, server 60 may automatically open a threshold map on screen 532 and present the FIG. 26 threshold interface or something akin thereto.

The present disclosure also contemplates remote thresholds that may be presented to remote conferees that link to a meeting being held at a local location. For instance, a first remote employee may use a personal laptop computer including a camera to link to a meeting in space 14 (see again FIG. 2) to participate via a telepresence link. Here, if the remote employee links to the meeting prior to a scheduled start time, the remote employee should have the same type of threshold information and capabilities that local employees enjoy. In addition, during a progressing meeting, a remote employee should have access to meeting content, local and other remote employee status information, currently considered content and agenda items, etc.

Figure 27:
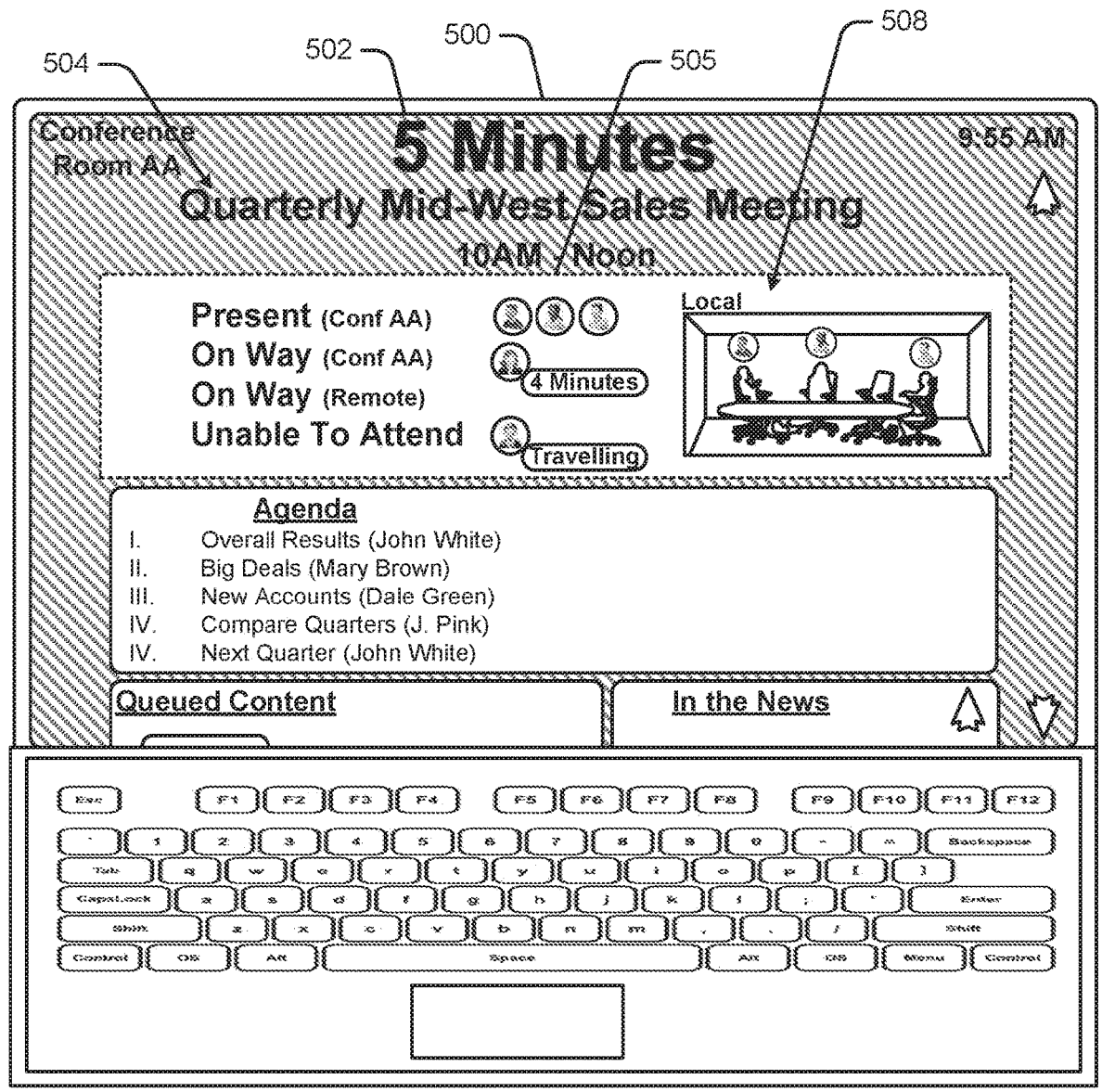
FIG. 27 is similar to FIG. 26, albeit showing an exemplary remote threshold interface that maybe provided via a lap top computer in at least some embodiments of the present disclosure.

Referring to FIG. 27, an exemplary remote laptop is shown at 500 where a threshold interface is provided on screen 502. The threshold interface shown in FIG. 27 is similar to the interface shown in FIG. 26, albeit where the presented information is tailored for a remote employee. To this end, the general meeting and space information at 504 is similar to the information described above except that now the meeting is only 5 minutes away as opposed to being 15 minutes away. A background color is shown as yellow to indicate that the scheduled start time for an associated meeting is within five minutes. The employee status information at 505 indicates who is in the local meeting space, who is on their way to the local space and to remote locations to attend the meeting and who is unable to attend for some reason. A real time or virtual image of the conference space is also presented at 508 to indicate relative locations of local employees to the employee using the remote laptop 500. The agenda, queued content and news fields are similar to those fields described above.

In still other cases where an employee is scheduled to attend a meeting either locally or from a specific remote location and has not yet arrived, at some point server 60 may be controlled to send a reminder to the absent employee via a remote portable device. For instance, see FIG. 28 where a smart phone 600 is shown and where a threshold interface is presented on screen 602. The exemplary reminder threshold interface includes a general meeting information field 614 with meeting title, scheduled time period and local location, a count down clock field 606 presenting time prior to the scheduled start time of the meeting, an employee status field 616 and a day schedule section 618 for the absent employee. In addition, precanned responses to the reminder are presented at 608, 610 and 612 that can be selected to transmit a response to server 60 and then used to report out status to other employees attending the meeting via local and other remote thresholds. Again, the remote interface in FIG. 28 includes selectable icons that can be used to access meeting content or other information.

Figure 28:
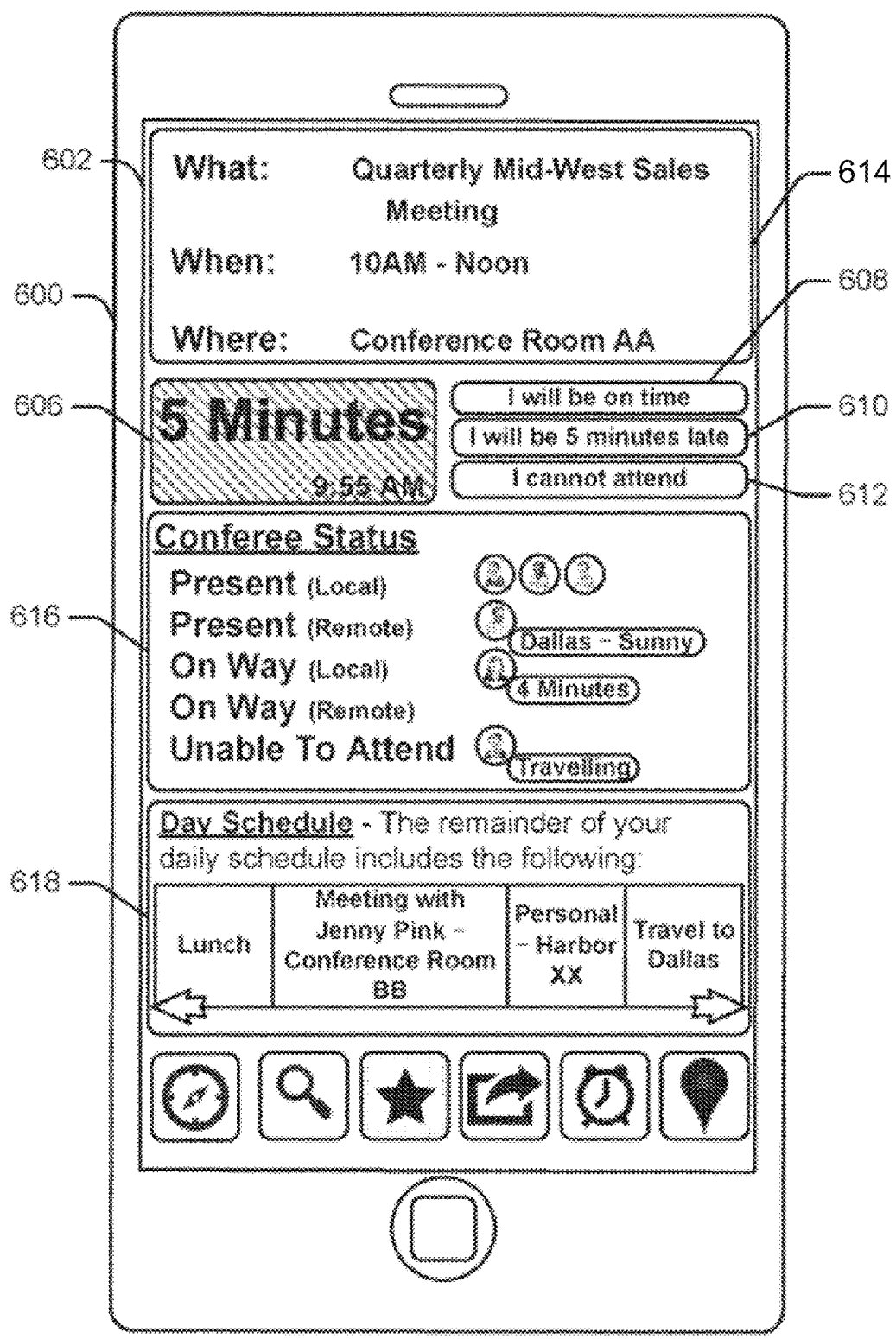
FIG. 28 is a schematic illustrating an exemplary smart phone including a remote threshold interface.

In at least some cases where a remote employee patches into a meeting, the remote conferee may use two devices, one for viewing content shared locally via a common display screen (see 28 in FIG. 2) and a second device for viewing and interacting with a threshold as shown in FIGS. 27 and 28.

Figure 29:
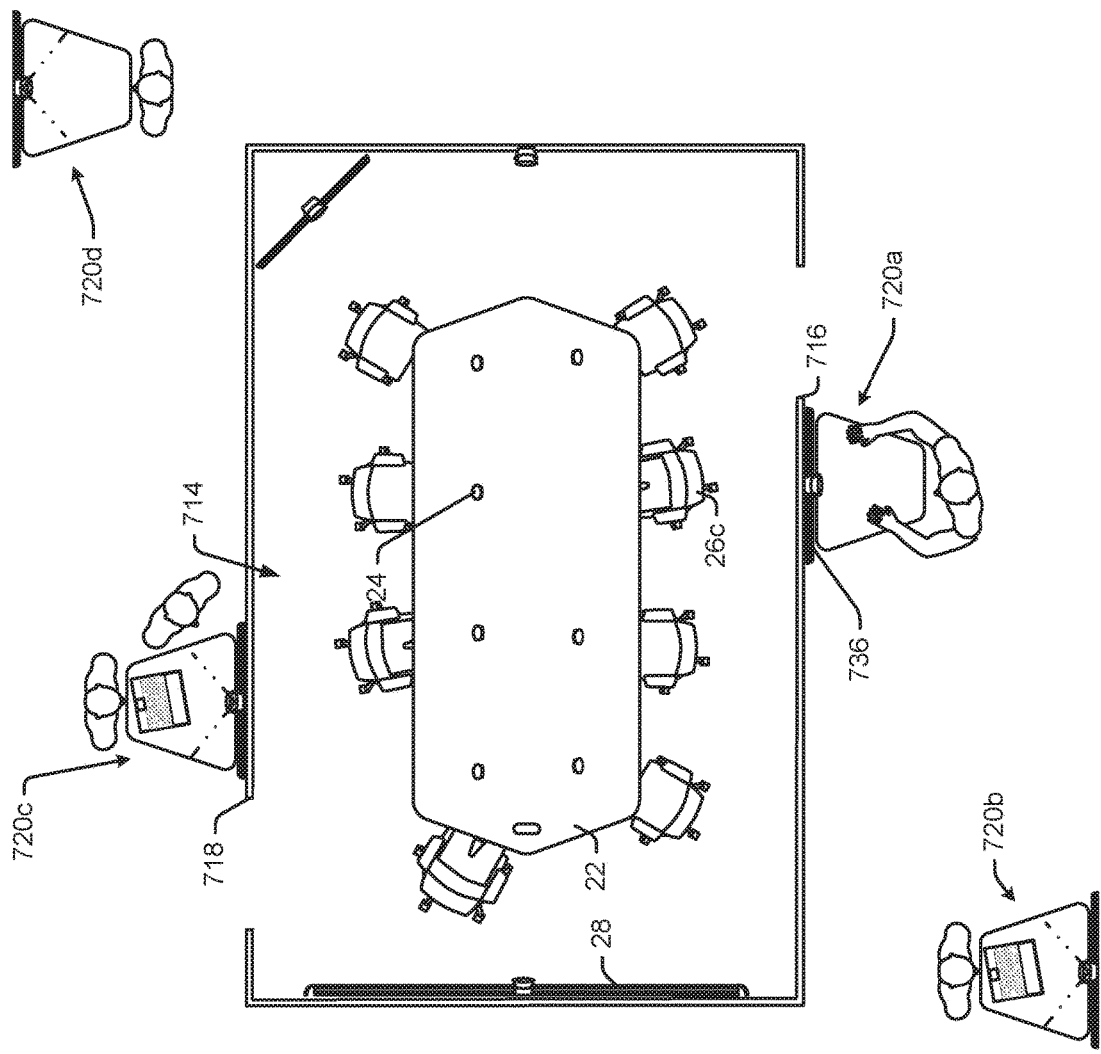
FIG. 29 is similar to FIG. 2, albeit showing a different threshold configuration.
Figure 30:
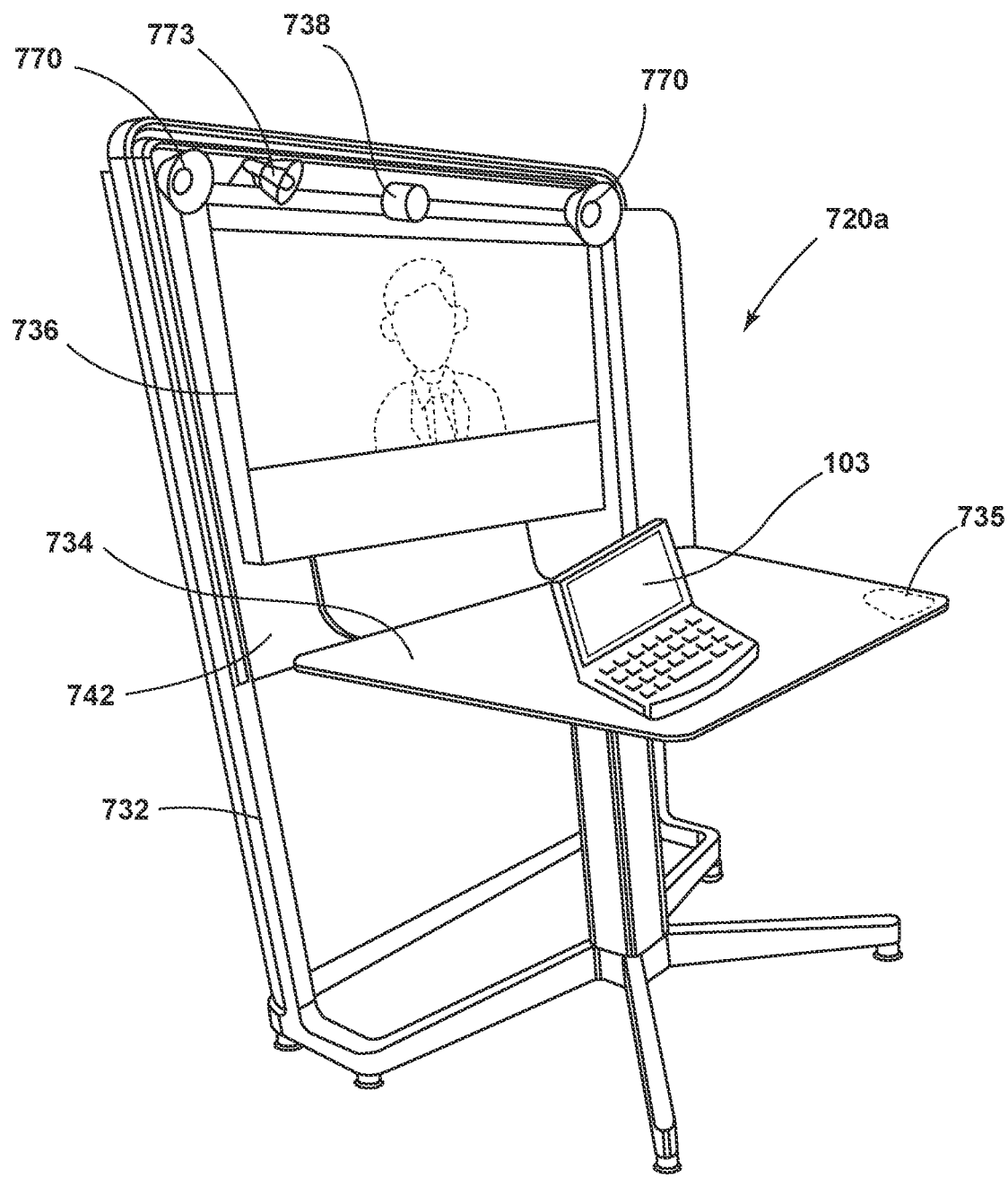
FIG. 30 shows one of the affordance configurations that maybe used to present threshold information from FIG. 29.

Other threshold configurations are contemplated. For instance, in some cases where a work station or other affordance configuration is provided outside a meeting space, that configuration may be utilized as a threshold and may provide additional resources to support employees prior to or after a scheduled meeting. To this end, see, for instance, FIG. 29 that shows a conference space 714 similar to space 14 described above with reference to FIG. 2, albeit where two content amplification stations 720a and 720b are located near a space entry 716 and two other content amplification stations 720c and 720d are located near a space exit 718. Referring also to FIG. 30, an exemplary amplification station 720a is shown that includes a frame structure 732 that supports a table top assembly 734 and a display screen 736 and a privacy shroud 742. Screen 736 is supported adjacent a rear edge of top member 734 and a high definition camera 738 is mounted adjacent the top edge of screen 736 to facilitate telepresence sessions. A touch interface pad or device 735 is mounted in table top 734 and forms a top surface that, in some embodiments, is substantially flush with the top surface of member 734. The touch pad 735 can be used to move a cursor or other pointing icon about on screen 736 to interact with content presented thereon (e.g., to select virtual icons, control various aspects of station 720a (e.g., volume, lighting, etc.). A directional microphone 773 is also mounted to the frame as are speakers 770. The general structure of station 720a is described in detail in U.S. patent application Ser. No. 14/320,984 which is titled "Work And Videoconference Assembly" and which was filed on Jul. 1, 2014 and which is incorporated herein by reference in its entirety.

In operation, station 720a may be used for many different activities in addition to providing threshold functionality. For instance, in some cases station 720a may be used to facilitate a telepresence session in general or to simply amplify content from a laptop 103 or other portable computing device wirelessly or physically linked via a cable to the station. An exemplary system for wirelessly linking a personal portable computing device to a station like station 720a in several ways is described in pending U.S. patent application Ser. No. 13/912,442 (herein after "the '442 application") which was filed on Jun. 7, 2013 and which is titled "Personal Control Apparatus And Method For Sharing Information In A Collaborative Workspace" and which is incorporated herein by reference in its entirety. Any of the device to station associating processes or method described in the '442 application may be used in at least some of the embodiments contemplated by this disclosure.

Referring again to FIG. 29, station 720a is positioned so that the included screen 736 is at the location of threshold screen 32 described above with respect to FIG. 2. In the case of station 720a, because station 720a is located immediately outside entry 716 to space 714, in at least some embodiments, station 720a will only be able to facilitate threshold functionality as described above so that threshold processes for space 714 can be fully supported. However, station 720b which is located near but not immediately adjacent entry 716, may be able to support other activities in addition to the threshold activity. To this end, when an employee that is scheduled to attend a next meeting in space 714 or a meeting in some other generally proximate meeting space walks up to station 720b, server 60 may present a full threshold interface for the space in which the meeting is scheduled to take place and for the upcoming meeting along with other selectable options for other station functions. For instance, the other functions may include content amplification and a telepresence session activity. Here, in at least some cases, if an employee that is not scheduled to attend a next meeting in space 714 or a meeting in some other generally proximate meeting space walks up to station 720b, server 60 may not present a threshold interface and instead may simply present the other options (e.g., content amplification and telepresence session activity) to the employee.

Thus, server 60 can be programmed to take advantage of the fact that there are other resources and specifically workstations or other types of stations that include display screens in the general area of a meeting space entry that can be used to present threshold content when not used for some other purpose. As shown in FIG. 29, while a first employee is using a threshold interface at station 720a, a second arriving employee can use a second threshold interface provided at station 720b to perform other pre-meeting activities. Where a third station is proximate entry 716, a third employee could use that station as a threshold interface.

Figure 31:
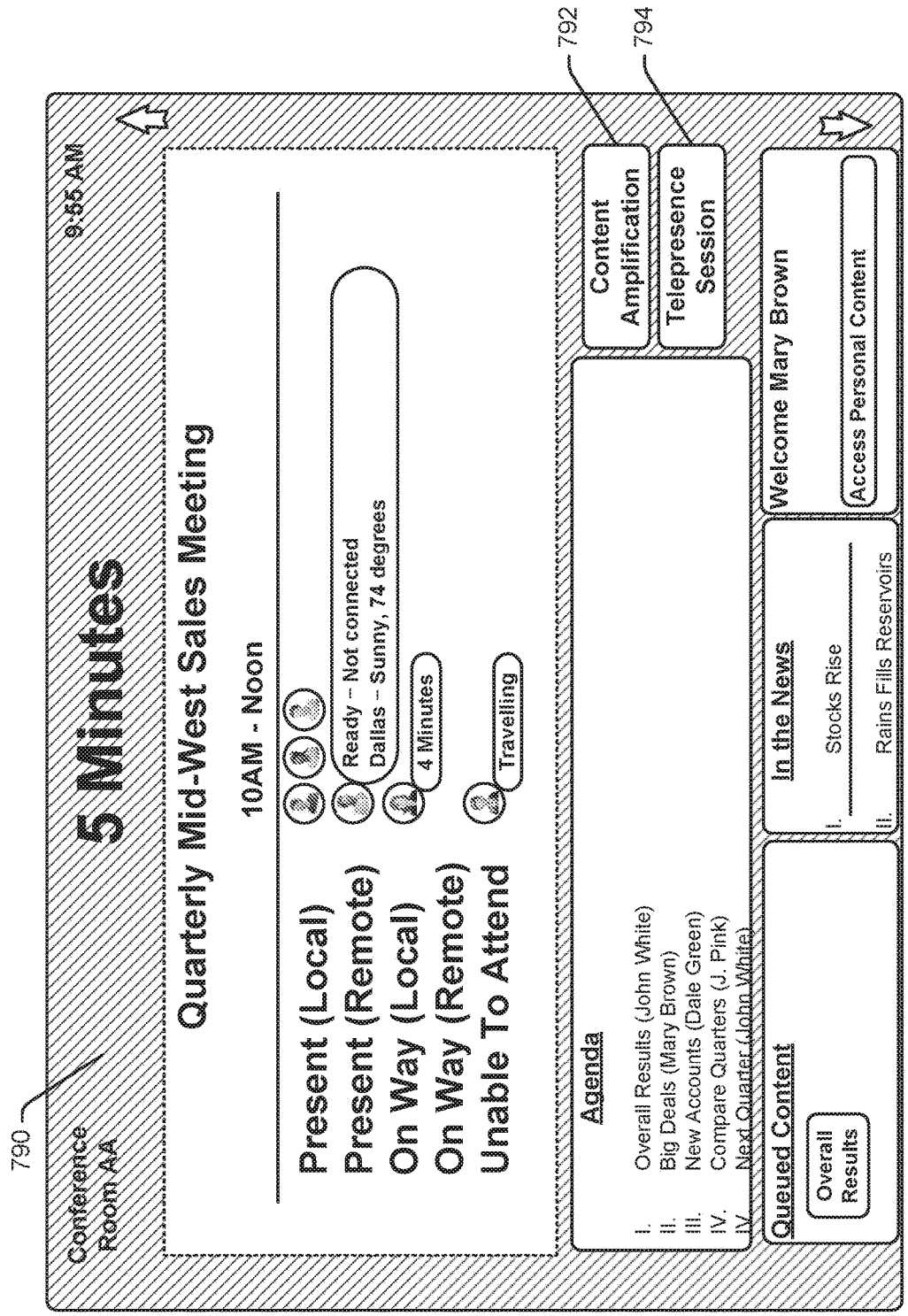
FIG. 31 shows an exemplary threshold interface that maybe presented via the screen that forms part of the configuration shown in FIG. 30.

Referring to FIG. 31, an exemplary threshold interface 790 that may be presented via a stations 720b screen is illustrated that includes threshold elements akin to the elements described above as well as selectable content amplification and telepresence activity icons 792 and 794. An employee can either use the threshold elements as described above or may select one of icons 792 or 794 to access other activity options. Again, in at least some cases where an employee is not scheduled to attend a next meeting in a proximate meeting space, station 720b may only present the amplification and telepresence options without any threshold information.

As mentioned above, where a station like station 720b is generally proximate two or more meeting spaces, that single station may be used as a threshold for any of the proximate meeting spaces. For instance, where three meetings are scheduled to commence at about the same time in first, second and third different and proximate meeting spaces in the general area of stations 720b, if a first employee scheduled to attend the meeting in the first meeting space approaches station 720b, server 60 may automatically determine the first employee's identity and that the first employee is scheduled to attend the meeting in the first meeting space and may therefore present a threshold associated with the first space and the first meeting. In the same situation, if a second employee scheduled to attend the meeting in the second meeting space approaches station 720b, server 60 may automatically present threshold information for the second meeting space and the next meeting to occur in that space. Similarly, a third employee scheduled to attend the meeting in the third space would be presented a threshold interface for the third space meeting.

It is contemplated that, in some cases, an employee may arrive at a meeting space much earlier than the scheduled start time and in some cases even prior to commencement of a prior scheduled meeting in that space. In this case, server 60 may recognize that the arriving employee is scheduled to attend a later (e.g., after a next meeting) meeting in the associated space and may present threshold content associated with the later meeting. This is particularly true in cases where multiple threshold providing configurations are available as in FIG. 29 so that full threshold functionality can be provided for a next meeting in the associated space while supporting early arriving employees at other stations or configurations (e.g., 720b in FIG. 29).

Referring again to FIG. 29, where there are two or more stations or other affordance configurations including display screens that can be driven by server 60, two or more employee subgroups may be able to move continue activities associated with a meeting that just ended in a meeting space in a general area. Here, for instance, when first and second employees leave space 714 after a meeting and approach stations 720c and 720d, those stations may each present threshold content akin to the content shown in FIG. 20 or some subset thereof automatically. Thus, in this case, the first employee may opt to continue a telepresence session with a remote employee via stations 720c and the second employee may opt to review meeting content in the content queue 336. In this case where different employees leaving space 714 approach different stations 720c, 720d, etc., each station may personalize content at least somewhat for the approaching employee. For instance, instead of present next scheduled location information for each local employee associated with the ending meeting, the next scheduled location content may only be presented for one or a smaller subset of employees that approach a specific one of the stations.

In at least some cases it is contemplated that server 60 may be programmed to only present certain threshold content types to specific employees exiting a space 714 when it makes sense given the employee's schedules. For instance, if a first employee leaving space 714 has another meeting in a different location and is likely going to be late given the location of the other meeting in relation to space 714, server 60 may forego presenting the content queue, a telepresence link to a remote conferee or any other information that may cause the employee to slow down.

Figure 32:
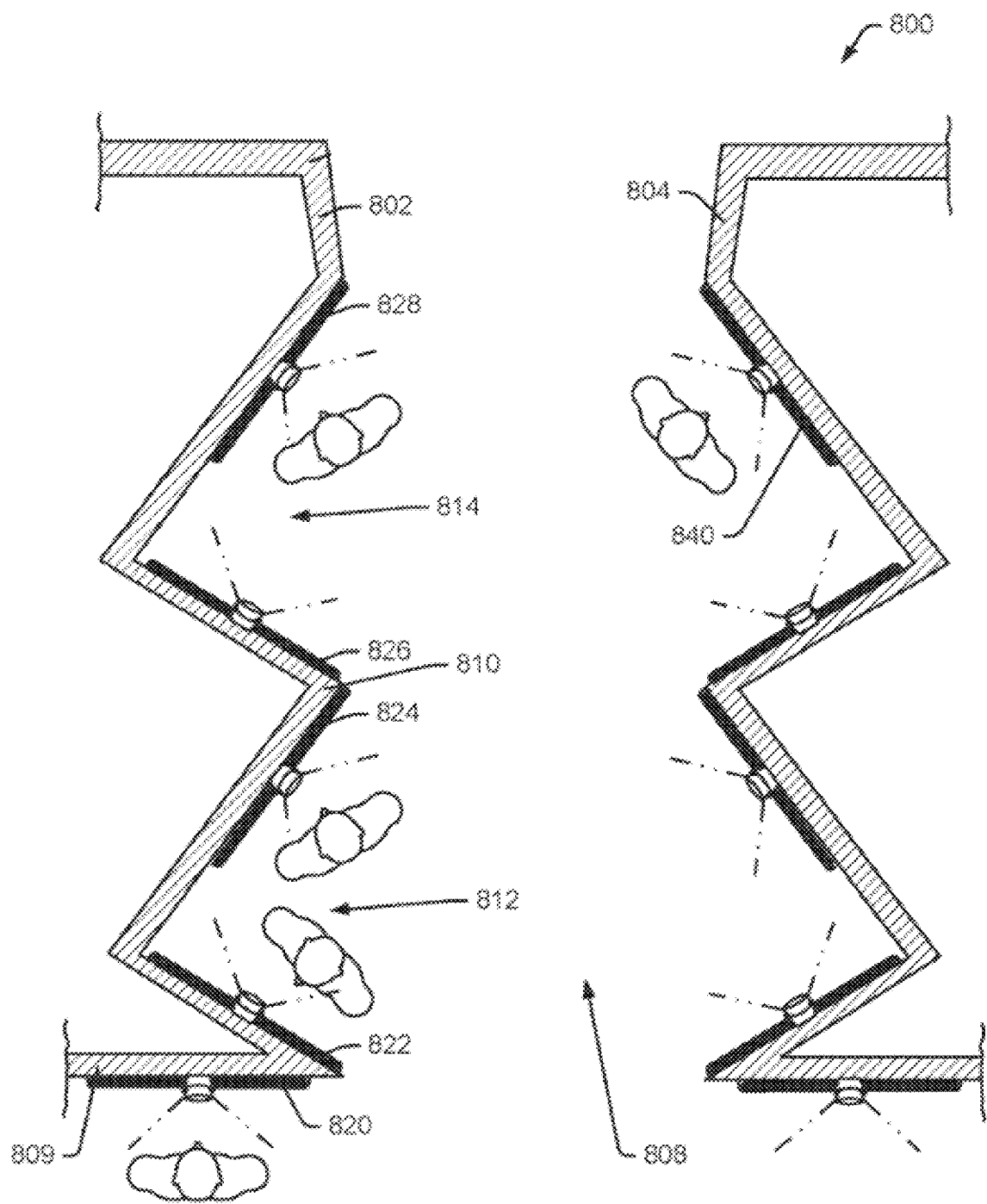
FIG. 32 is a top plan view showing yet another exemplary threshold configuration that is consistent with at least some aspects of the present disclosure.

Another threshold configuration 800 is shown in FIG. 32. Configuration 800 includes a dual wall structure including wall subassemblies 802 and 804 that form a passageway or corridor 808 from an ambient space into a meeting space. In FIG. 32 the meeting space is at the top end of the corridor 808 as illustrated. Each of the wall subassemblies 802 and 804 is similarly constructed and operates in a similar fashion and therefore only wall subassembly 802 is described here in some detail. Wall subassembly 802 include an external wall member 809 and a corridor or passageway forming wall structure 810 where external wall 809 faces the ambient space and wall structure 810 generally includes surfaces that face the corridor 808. Wall structure 810 includes several wall members that are angled with respect to each other to form first and second corner alcoves 812 and 814, respectively. Each alcove 812 and 814 includes two structural wall members that generally form a 90 degree angle where the alcove formed opens into corridor 808. As shown, first and second threshold display screens and associated cameras are mounted in each alcove, one screen and camera per alcove wall member. More specifically, screen and camera combinations 822 and 824 are mounted within alcove 812 while screen and camera combinations 826 and 828 are mounted in within alcove 814. In addition, a single threshold screen 820 is mounted to the ambient facing surface of external wall member 809.

Referring still to FIG. 32, as each of the screens 820, 822, 824, 826 and 828 may be used to present similar information types like those described above with respect to the FIG. 3 embodiment. In other cases, the screens on the external walls (e.g., screen 820) may present only long and/or intermediate distance content (e.g., space name, a countdown clock, space status text, employee status information, etc.) while other more detailed content and personal content is only presented via the alcove screens. As in the case of the FIG. 23 threshold, server 60 may drive screens of threshold 800 to space arriving employees apart. For instance, a first arriving employee may be encouraged to move to screen 828 while a second, assuming the first employee is still proximate screen 828, is encouraged to use screen 822, and so on.

Where there is only one entry into a meeting space, server 60 may automatically perform both entry threshold and exit threshold functions. For instance, in FIG. 32, server 60 may automatically determine the identity of an employee proximate screen 822 and then determine if that employee is leaving an ending meeting or arriving for a next meeting. On one hand, if the employee is arriving for a meeting, server 60 may automatically present content associated with the meeting that is next scheduled to take place in an associated meeting space. On the other hand, if the employee is leaving a meeting that just wrapped up or is about to wrap up, server 60 may automatically present content associated with the meeting that is ending. Thus, in FIG. 32, one employee arriving for a next meeting may use an entry threshold interface automatically provided by server 60 on screen 822 and a second employee leaving a meeting that just ended may use an exit threshold interface that server 60 automatically provides on screen 840 at the same time.

Referring still to FIG. 32, by providing threshold alcoves as shown, employees in those alcoves should have a better sense of privacy. In addition, where an employee is using an alcove screen as a threshold, the employee should be tucked at least somewhat in out of the way of other employees that want to enter or exit the associated meeting space via corridor 808.

In at least some cases it is contemplated that a first employee may have to leave a meeting promptly after the meeting ends to attend to other activities and therefore may not be able to perform one or more tasks that the employee would like to perform to wrap up the meeting. Nevertheless, it is believed that in these cases where an employee cannot complete meeting wrap up activities at the end of a meeting or right after the end of a meeting, many employees intend to perform those activities later once they have some free time. Despite intending to revisit meeting content and conclusions to wrap up their thoughts, in many cases employees never do so. It is believed that this failure to wrap up is, in great part, due to an inability to reaccess meeting content and other employees that attended a meeting.

To address the problems associated with wrapping up a meeting after leaving the space in which the meeting took place, at least some embodiments of the present disclosure contemplate rendering accessible a threshold interface akin to an exit threshold interface for meeting employees at times subsequent to the meeting. To this end, for instance, a meeting exit threshold interface may be offered to an employee subsequent to the end of a meeting at convenient times where the threshold interface includes a content queue including both posted content and content developed during the meeting activities. The threshold offer may, for instance, be made when an employee has an unscheduled period in her schedule that exceeds some minimal duration (e.g., at least 15 minutes) or may be offered within the last 15 minutes of a scheduled activity when the employee may have some available time to consider the meeting content.

Figure 33:
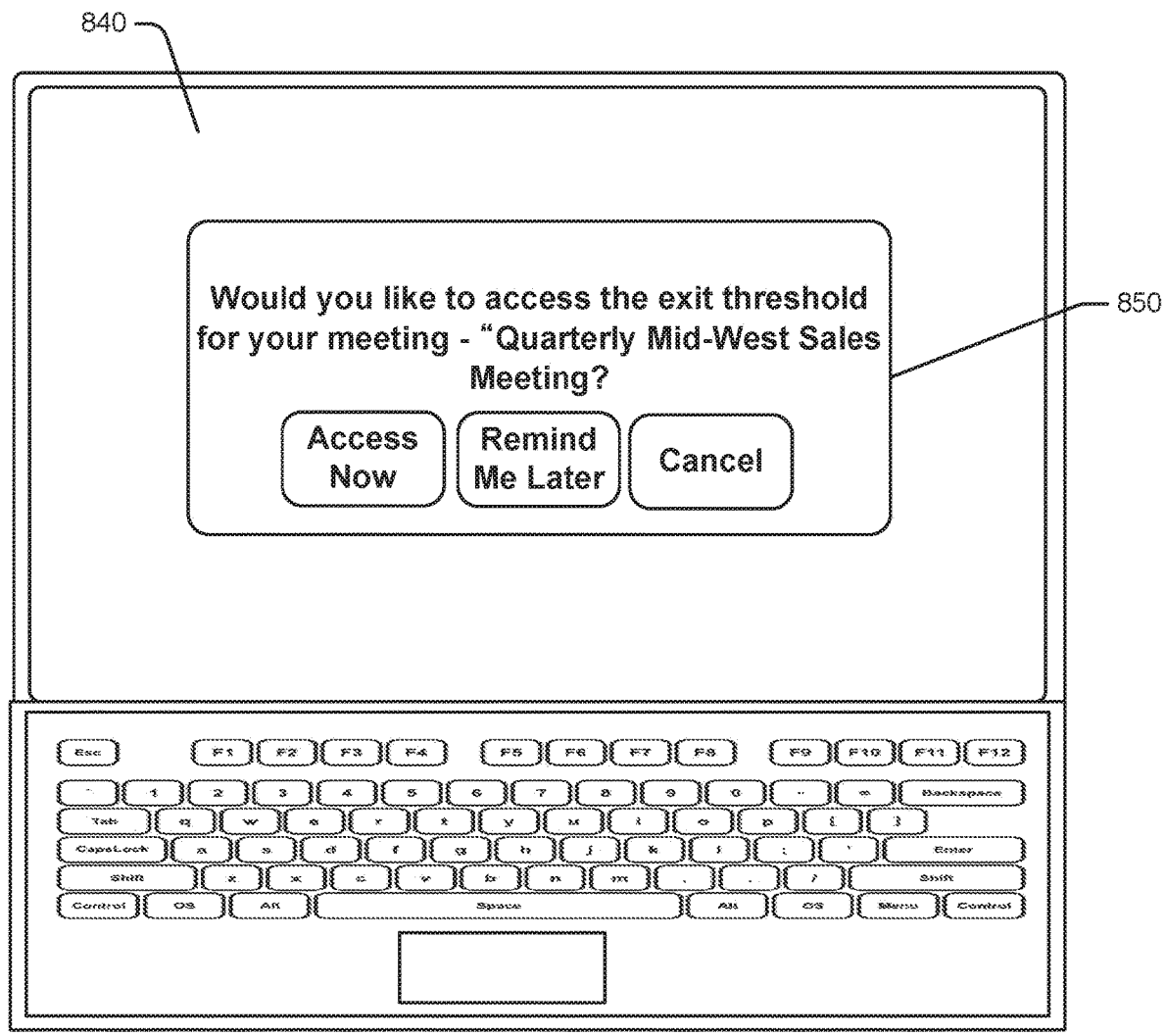
FIG. 33 shows an exemplary lap top computer offering a threshold interface for a prior meeting to an employee.

Here, the employee may be given three options including a first to access the threshold and complete wrap up activities, a second to receive a reminder at a subsequent time and a third to cancel the threshold reminder so that the threshold is not presented again in the future. For example, see laptop 840 in FIG. 33 where three threshold access options are presented at 850. When an exit threshold is accessed after a meeting has ben completed and employees that attended the meeting have dispersed, the interface presented may automatically present contact information for each of the departed employees in addition to a content queue and other useful information. In this way, the employee using the exit threshold has the ability to quickly access meeting content and other meeting attendees in a fashion similar to the way the employees would have done so if they met briefly after the meeting associated with the exit threshold. In this regard, see FIG. 34 that shows a remote laptop 850 presenting a threshold interface 870 that accessed subsequent to departure of employees from a meeting. The interface 870 includes a meeting identifier 872 that includes the a text representation of the meeting location (e.g. Conference Room AA0, a date of the meeting, the title of the meeting and the time period that was scheduled for the meeting. Interface 870 also includes an employee status field at 871 that lists the employees that attended the meeting at 874 and includes selectable tags 876 that indicate current status of the employees that attended the meeting (e.g., available, busy, travelling, sleeping, etc.). Here, to link to one of the employees that attended and that is available, the employee using interface 870 may select an associated one of the tags 876 to link to the associated employee in some fashion (e.g., telepresence, VOIP, instant messaging, etc.). In at least some cases server 60 may be able to determine that one of the employees in the list is located proximate an available (e.g., not currently used or scheduled) telepresence system (e.g., either a camera on the employee's laptop or a dedicated telepresence system in some enterprise facility) and may indicate ability to initiate a telepresence session with that employee as indicated at 873. If initiated, server 60 may send a text or other message to the remote employee requesting a telepresence link and instructing the remote employee on how to participate (e.g., indicate a system near the remote employee that may be used for the session).

Figure 34:
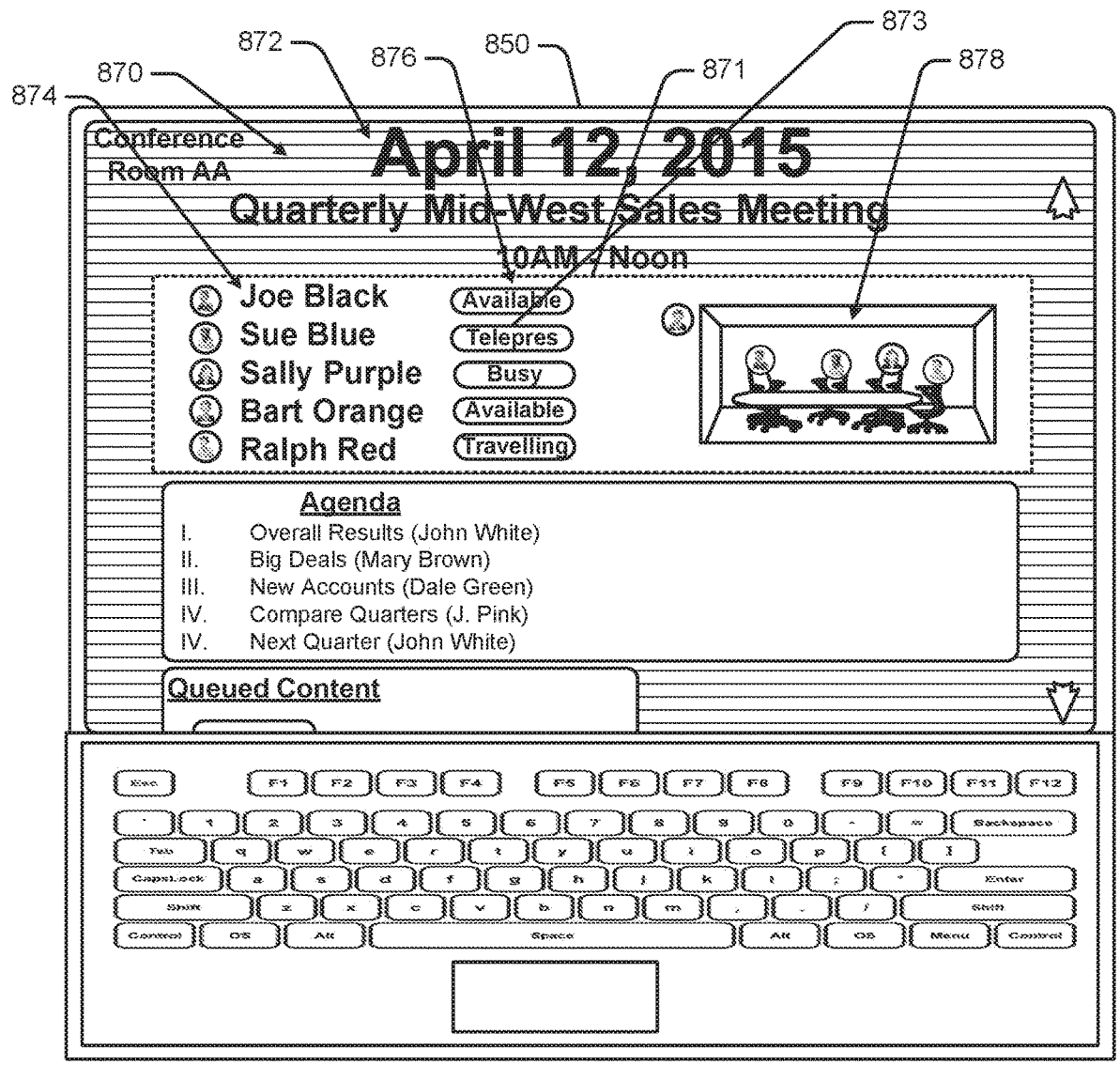
FIG. 34 is similar to FIG. 33, albeit showing an exemplary threshold for a prior meeting.

In addition, the employee status field 871 may also include an image of the meeting space during the meeting or some virtual representation thereof as shown at 878 to help the employee using the interface to remember the meeting. Referring still to FIG. 34, agenda and queue content fields are also presented that are similar to the agenda and queue content fields described above with respect to the other threshold interfaces.

In at least some cases it is contemplated that meeting exit threshold interfaces and associated linked content may be linked to schedule representations in an employee's calendar application so that the employee can access the interface at any time subsequent to occurrence of a meeting. For instance, after a meeting ends, a calendar entry for an attending employee may be updated to include a meeting threshold icon that is selectable to access the associated threshold exit interface (see again FIG. 34).

Referring generally to the thresholds described above, it should be appreciated that, while thresholds may be provided that have many different physical manifestations, in at least some systems where multiple threshold interfaces are contemplated including interfaces on portable devices prior to, during and after a meeting, interfaces on stationary devices outside a meeting space entry prior to, during and after a meeting, interfaces on stationary devices outside meeting space exits prior to, during and after a meeting, interfaces presented on portable devices in a meeting space prior to, during and after a meeting, interfaces presented on wall mounted screens prior to, during and after a meeting and interfaces presented on table top or other furniture structures prior to, during and after a meeting, the different supported interface types should include at least some common elements so that an employee that becomes familiar with any one of the interface types, will automatically have some familiarity with any of the other interface types in the system. Thus, the same general information type layout, same color coding, same imagery, same textual messaging, etc., should be used in all threshold interfaces that comprise a single system.

Figure 35:
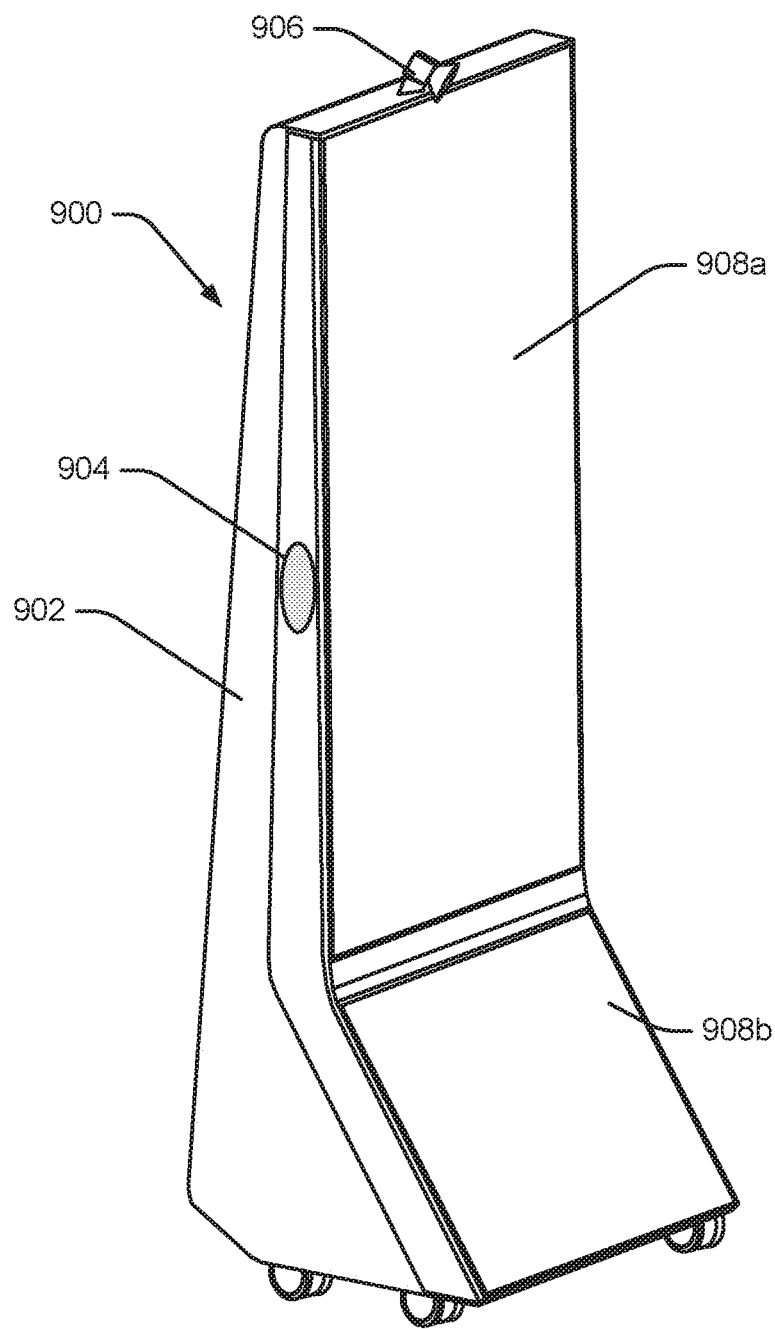
FIG. 35 is a side perspective view of an exemplary cart based threshold structure that is consistent with at least some aspects of the present disclosure.

In some cases automatically moving robots may be used to present thresholds. For instance, see FIG. 35 that shows an exemplary cart based robot threshold assembly 900 that includes a castered frame structure 902 in which is mounted a flat panel display screen including upper and lower sections 908a and 908b and speakers 904 (only one shown). A high definition camera 906 is mounted to the top end of the frame structure 902 and directed at a location that would be occupied by an employee proximate the screen section 908a when viewing content. Here, assembly 900 may be used in many different locations relative to a meeting space at different times. For instance, referring also and again to FIG. 2, prior to commencement of a meeting, assembly 900 may be parked outside space 14 at the location of screen 32 and may provide the entry threshold functions and content described above. Once a scheduled start time for a meeting occurs, threshold assembly 900 may automatically move into space 14 and be parked at the location of screen 30 where the threshold is driven to facilitate the in space threshold functions and provide the associated content as described above. Near or at the end of a meeting, assembly 900 may automatically move out of space 14 and to the exit threshold location associated with screen 34 in FIG. 2 to facilitate the exit threshold functions described above and provide related information.

It has been contemplated that, at times, thresholds that are located throughout enterprise space will not be needed to present detailed content to employees for specific meeting spaces and meetings that the thresholds are spatially associated with. For instance, if a next meeting in a specific conference room does not occur for four hours, indicating that meeting time and employee status information for that meeting may not make much sense. As another example, if a two hour meeting is progressing in a meeting space that is associated with a first threshold and all employees invited to that meeting are present either locally or remotely at the meeting, there may be no reason to present employee status, an agenda or queue content on the first threshold for that meeting. Where thresholds do not need to present information for specific spatially associated meetings at times, those thresholds can be used for other purposes. Hereinafter, unless indicated otherwise, a threshold that does not need to present information for a specific spatially associated meeting space at least temporarily will be referred to as an "available threshold" during that time.

In some cases it is contemplated that available thresholds may be controlled by server 60 to present messaging to employees as they walk by on their way to other meetings in other distant spaces. For example, where a first employee has a next meeting in a conference room AA that is located on a different side of a large enterprise facility that is scheduled to start in 20 minutes, available thresholds along the way may present conference room AA and meeting employee status updates to the travelling first employee so that employee can quickly grasp an understanding of the status of her next meeting. To this end, see FIG. 36 where an exemplary facility map representation is shown at 921 and an exemplary threshold similar to the FIG. 3 threshold described above is shown at 32a. Map 921 includes a 2D top plan representation of facility space and, specifically, shows a path 925 through the space that starts near a conference room XX, passes by a conference room ZZ and ends at conference room AA. Along the path 925, an exemplary travelling first employee Mary Brown passes threshold 32a that is spatially associated with conference room XX and subsequently passes threshold 32b that is spatially associated with conference room ZZ. While not shown, path 925 may also pass by several other available thresholds.

Figure 36:
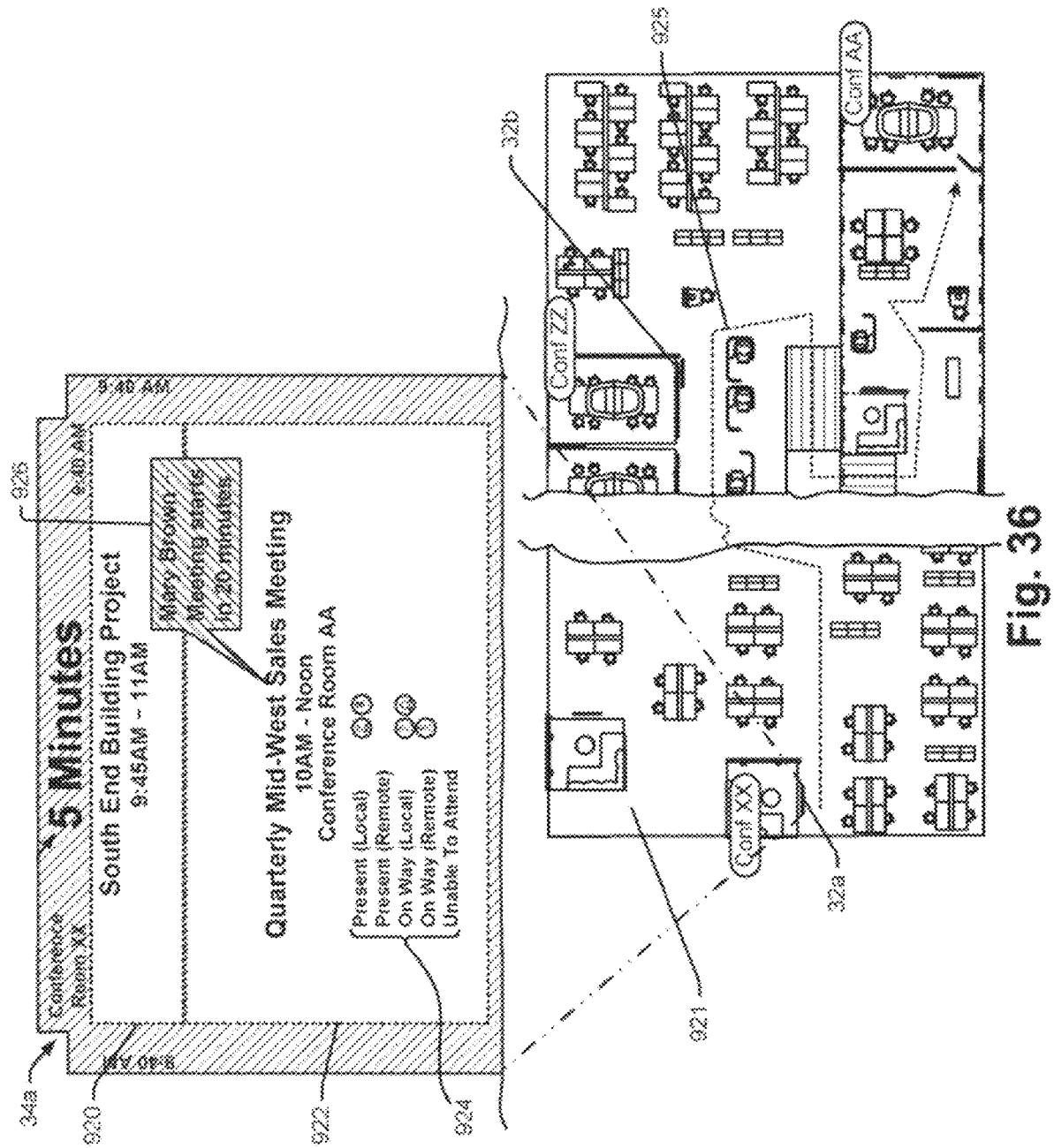
FIG. 36 is a schematic illustrating an exemplary threshold like the threshold shown in FIG. 7 that presents temporary messaging to an employee traveling through an enterprise space to a scheduled meeting at a different location.

Referring still to FIG. 36, as Mary Brown passes by threshold 32a, server 60 may determine her identity, determine her next meeting time and location and automatically present a message via threshold 32a indicating meeting and invited employee status for the meeting to take place in conference room AA. See, for instance, exemplary threshold 32a in FIG. 36 where edge fields and an upper field 920 present information related to spatially associated conference room XX while lower field 922 presents information intended for Mary Brown. In the illustrated example a next meeting is to start in conference room XX in 5 minutes and therefore the edge fields are colored yellow and a 5 minute countdown clock is presented for long and intermediate distance employees to see. Field 922 which is intended for Mary Brown indicates the meeting space, title and time for Mary's next meeting along with invited employee status for Mary's meeting at 924. Here, Mary can quickly get a sense of whether or not all of the employees invited to her next meeting are waiting or are still travelling to conference room AA or to remote locations to link in. In addition, a call out 926 is colored green to get Mary's attention and let her know how much time she has prior to the scheduled start time of her next meeting. The call out should present a relatively quiet social nudge to keep Mary moving toward her next meeting and to let other employees know that Mary is committed to being at some other location.

Figure 37:
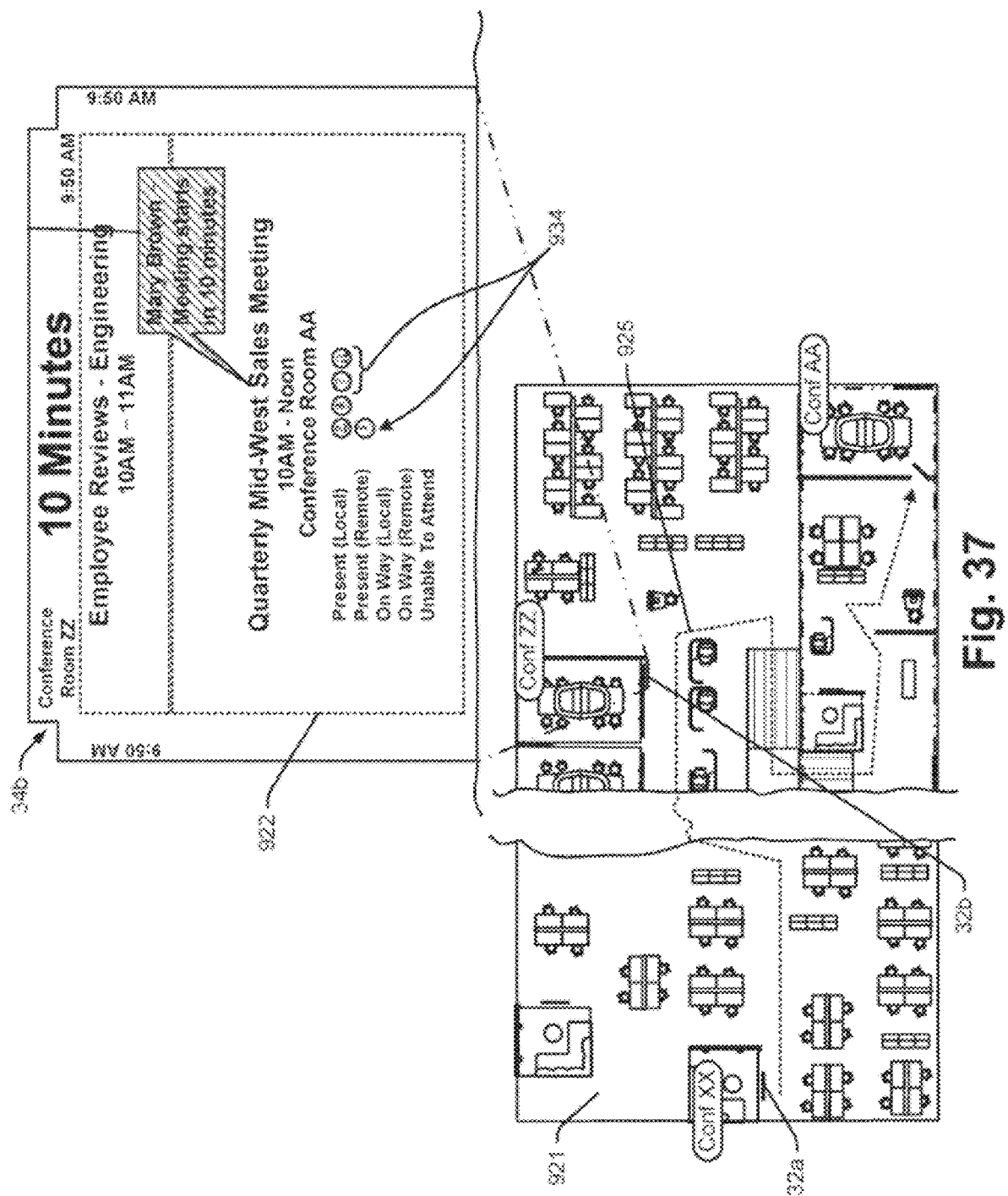
FIG. 37 is similar to FIG. 36, albeit showing a different threshold interface presenting messaging at a different location along the employee's path to the meeting at a different location.

Referring to FIG. 37, an image similar to the FIG. 36 image is presented, albeit where the second threshold 32b is illustrated. Here, screen 32b is located outside conference room ZZ and therefore the edge fields present content related to that space and a next meeting in that space. Field 922 that includes information intended for Mary Brown as she travels by now includes a callout that indicates her next meeting is scheduled to start in 10 minutes and also has been updated to reflect that all local and remote invited employees are now ready for the meeting to begin and therefore that the only invited employee that is not ready is Mary. In this regard, invited employee images have been moved into present rows as indicated at 934.

Referring again to FIG. 36, while threshold 32a may present information to travelling employees as they pass by at times, if threshold 32a is required for its primary purpose of presenting content to employees arriving at conference room XX for a meeting, in at least some cases, the secondary task of presenting content to travelling employees may be foregone. In other cases it may be that a certain field of each threshold in enterprise space may be reserved for messages to travelling employees and employees may become familiar with looking for that field to get updates about their next meetings. After an employee passes by a threshold, server 60 reverts back to driving the threshold with content presented for other purposes.

While the invention may be susceptible to various modifications and alternative forms, specific embodiments have been shown by way of example in the drawings and have been described in detail herein. However, it should be understood that the invention is not intended to be limited to the particular forms disclosed. For example, where an employee is accessing a remote threshold interface while travelling to a meeting space for a meeting, when the employee arrives at the meeting space, the state of the remote threshold interface may be automatically used to present a similar state entry threshold interface via one of the larger stationary threshold screens like 32 in FIG. 2.

Similarly, if an employee is currently using an exit threshold to perform some meeting wrap up or other task, if that employee has to leave prior to completing the task being processed, a subsequently accessed remote exit threshold may initially be presented in the same state that the employee left the exit threshold earlier. By maintaining threshold state, when the employee revisits the exit threshold remotely, the employee should be able to more quickly dial back into the content and finish the wrap up or other task.

Similarly, if an employee is currently using an entry threshold and then moves into space 14 and accesses a table top threshold as shown in FIG. 2, the state of threshold content from the entry threshold may be maintained or at least reflected in the on table threshold interface for use by the employee. The on table threshold interface may likewise automatically be mirrored or reflected on an exit threshold and then on a remote portable device or other remote threshold with changes to content or content state rippling forward through the successive thresholds.

As another example, while an exit threshold may be automatically presented to an employee approaching a station 720*d* as described above with respect to FIGS. 29 through 31, in other cases it is contemplated that the last state of content presented on common display screens (e.g., see 28 in FIG. 29) with an associated meeting space may be automatically presented via a station screen when an employee approaches the stations 720*d*. In this way, if the meeting ended while content was being considered, that specific content may be automatically presented via the exit threshold in its most recent state without requiring an employee to search for that content and additional consideration can be expedited.

As another example, server 60 may be programmed to offer prior meeting content to employees as they arrive at a threshold early for another meeting. For instance, where an employee left one meeting prior to wrapping up thinking about that meeting and arrives early at a threshold spatially associated with a next meeting, one option that may be presented is an exit threshold for the prior meeting as described above. Here, the employee may wrap up thinking on the prior meeting and then turn her attention to a next meeting and access an entry threshold for the next meeting. In this case, the close content fields may present the prior meeting exit threshold content and the far and intermediate distance fields may present entry content for the next meeting for other employees arriving for the next meeting to view.

As one other example, in at least some embodiments it is contemplated that threshold interfaces may be customized by server 60 based on user preferences. For instance, a first user may prefer to automatically have personal content presented via a close content field while a second employee wants to have a password opt in process implemented to control presentation of personal content. As another instance, a first employee may want sports news feeds in the news feed field while another employee may want news feeds related to technological innovations presented in that same field. At least some threshold formatting and content preferences may be supported by system server 60.

In cases where a threshold has a length dimension or forms a corridor, different types of content may be presented within the threshold as an employee moves there through toward a meeting space. For instance, at the front end of the threshold a space name and a next meeting name and time may be presented. In a middle section of the threshold employee status information may be presented. Near the end of the threshold, more detailed meeting content (e.g., an agenda, a queue of content that can be accessed, information about different invited employees, relevant news feeds on subjects associated with the meeting or meeting content, etc.) as well as personal employee content may be accessible and/or presented. In still other cases some content like space name, next meeting name and employee status may be presented at a threshold outside a meeting space and more detailed meeting content and personal content may be presented within the space via a personal portable device, wall mounted display screens or table top emissive or projected surfaces. Thus, the threshold may extend from outside a meeting space to different areas within the space itself.

In still other cases a threshold with length (e.g., a corridor) may include abstract graphics or imagery that is intended to affect an employees mood. For instance, a simple undulating color pattern or scenic nature view may be presented with a threshold corridor that is designed to calm employees passing there through and to signify more emotionally a transition from the ambient space outside a meeting room and the meeting room space itself. As another instance, imagery presented within a corridor may be generated by server 60 as a reflection of activities sensed within the meeting space. For example, where there is a lot of audible activity within a space, the imagery may be energetic (e.g., a fast rotating abstract design) and if there is less audible activity, the imagery may be less energetic (e.g., a slower moving abstract design).

In other cases the threshold may have varying sound characteristics. For instance, in the case of a corridor type threshold, sound volume may increase as an employee moves through the corridor toward a meeting space. Sound may be controlled along with threshold content to indicate different meeting and employee statuses. For instance, a set of recognizably different tones or sounds may be used to indicate space status changes (e.g., a first pitch ping to indicate 5 minutes prior to the scheduled start time of a meeting, a second pitch ping to indicate that a scheduled start time has occurred, a third pitch ping to indicate that there are only 5 minutes left in an on going meeting, a fourth pitch ping to indicate that at least one employee is waiting outside a meeting space to use the space for a next meeting activity, etc.).

While the thresholds described above are described as presenting certain types of information to employees at certain times, other types of threshold information may be presented at other times. In this regard, in general, content presentation can be divided into four temporal periods including substantially prior to a meeting, prior to a meeting (e.g., within one hour for example), during progression of a meeting and after a meeting has ended. In some cases as described above different content sets may be presented via a threshold at each of these four different times.

Exemplary content types that may be presented include but should not be limited to project information (e.g., a project name, project team members, titles, how to pronounce team member names, project status (e.g., initial meeting, quarterly update, etc.), project history—initiation date, first session, last session, etc.), space information (e.g., technology types in space including projectors, screen layout, telepresence, etc., mechanical affordances—tables, chairs, podium(s), etc.), space scheduling information, employee status information, employee schedule information), specific meeting information (e.g., meeting start time, meeting status (e.g., 5 minutes to start, started, 5 minutes to end, running long, completed, etc.), meeting scheduled duration, agenda, meeting goals, scheduled attendees, attendees scheduled to present), session content information (e.g., personal content for specific employees, personal project content for specific employees, historical project status related to each employee, current project status for each employee, a content type queue, recent changes to content since last meeting including author, when made, progression steps in content, etc., session content, tools to contact specific employees, etc.), scheduling tools including tools for inviting additional employees to a meeting, to schedule a next meeting, to increase or decrease the period scheduled for a meeting, etc., and information about employees outside a meeting space (e.g., hovering waiting for next meeting in the space).

As described in the examples above there is a spatial aspect to at least some threshold types. For instance, an employee may be outside a threshold looking in, located in line with the threshold (e.g., in a threshold corridor) or past the threshold (e.g., in a meeting space associated with a threshold). Different content may be presented to employees based on their locations outside, in line and past the threshold.

As yet one other example, in some cases when an employee arrives early at a meeting space, if a remote employee is already waiting for the meeting to begin and is using equipment that can support a telepresence session, the arriving employee may be given the opportunity to initiate a quick telepresence session with the remote employee via a threshold prior to commencement of the scheduled meeting. In this regard, see, for instance, the telepresence tag shown at 990 in FIG. 10 that indicates that the associated remote employee is already linked via a telepresence system to the associated meeting space. Here, selection of tag 990 may automatically link the threshold 34 used by the local employee to the remote employee's telepresence system so that an impromptu telepresence session can commence.

Figure 38:
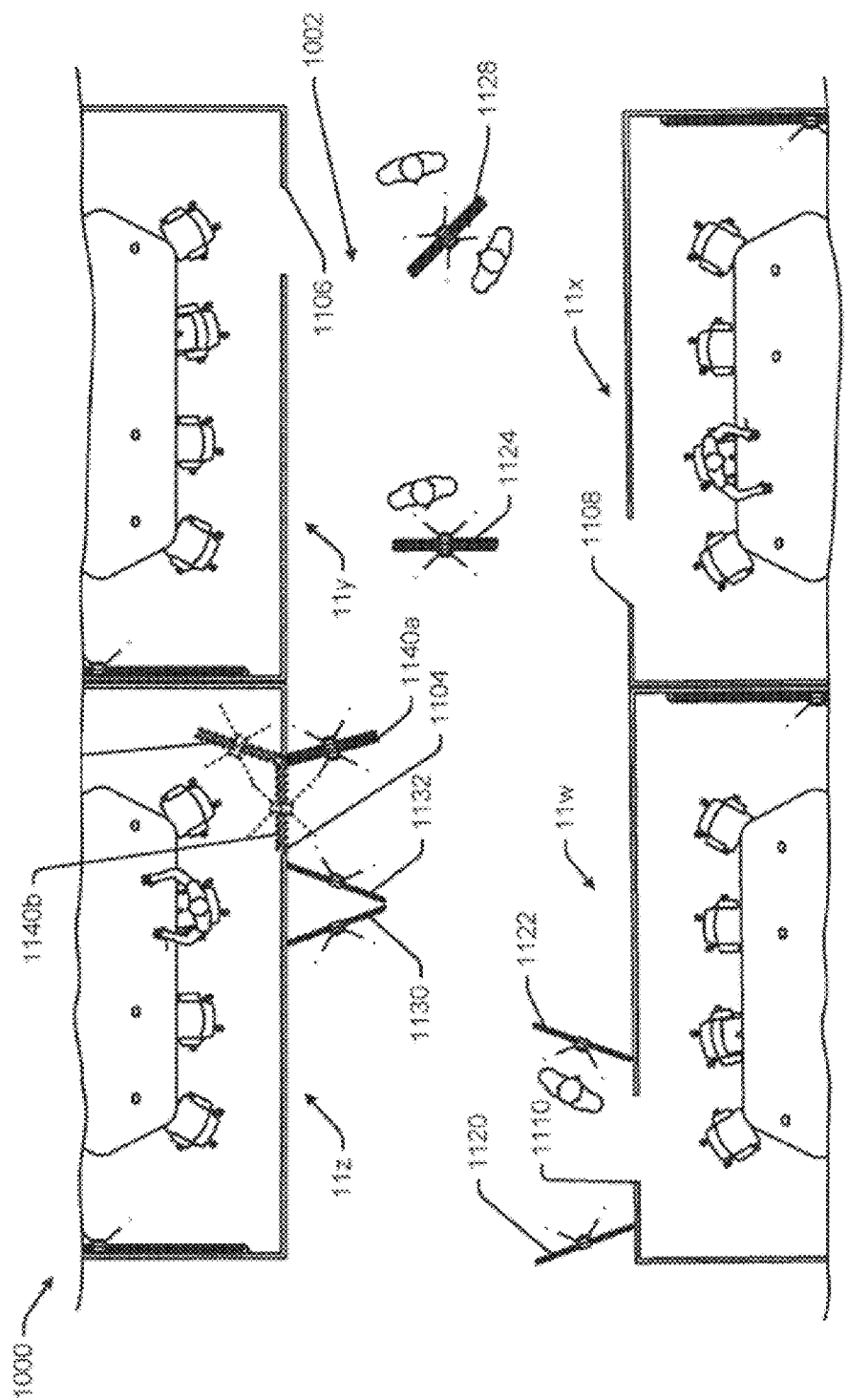
FIG. 38 is a top plan view of a conference area including four meeting spaces arranged about a corridor with several different threshold configurations located within the corridor.

Referring now to FIG. 38, several other threshold concepts are illustrated in the context of a space 1000 that includes four conference or meeting room configurations 11w, 11x, 11y and 11z where first and second meeting rooms 11w and 11x are located on one side of a corridor or hallway 1002 and third and fourth meeting spaces 11y and 11z are located on the opposite side of the corridor 1002. Each of the spaces 11w through 11z has a single egress shown at 1110, 1108, 1106 and 1104. A first other threshold configuration is shown outside egress 1110 of space 11w and includes first and second threshold display screens 1120 and 1122 and associated cameras, speakers, and other components. As shown the screen 1120 is angled with respect to a wall that forms the exterior of space 11w to one side of the egress 1110. Here, when an employee is walking along the hallway 1002. The screen 1120 is angled toward the employee so that the employee can see the front screen surface and is confronted by the threshold content in a more meaningful way. The second screen 1122 is located on a side of egress 1110 opposite screen 1120 and is angled to face generally the other direction in the corridor 1002 so that an employee walking the opposite direction (e.g., left to right as illustrated) sees and is confronted by that threshold screen 1122. Here, first and second different employees can use the first and second screens 1120 and 1122 simultaneously. The threshold angles with respect to the hallway walls may be within a range between 15 and 90 degrees (e.g., the front surface of each screen may form an angle with an adjacent hall wall surface between 15 and 90 degrees) and in particularly interesting embodiments may form an angle between 40 and 65 degrees.

Referring still to FIG. 38, another threshold configuration may provide threshold screens in the central portion of a hallway outside space egresses. For instance, a dual direction threshold screen assembly 1124 is shown outside egress 1108 and a second dual direction threshold screen assembly 1128 is shown outside egress 1106. Here, first and second employees may independently use different sides of each of the assemblies 1124 and 1128. Here, the threshold screens, again, directly face employees walking through corridor 1002 and therefore are more prevalent. As shown, dual assembly 1124 includes screens that form a 90 degree angle with the hall walls while screens 1128 form different angles with the walls.

Referring yet again to FIG. 38, another threshold configuration is shown at 1130 and 1132 and includes two other flat panel screens that are angled from an adjacent wall outside egress 1104 toward each other to form an apex that extends into the corridor space 1002. Again, two employees can use the different screens 1130 and 1132 to access content.

Referring again to FIG. 38, in still other embodiments it is contemplated that a dual or single screen threshold may be attached to or otherwise form an egress door assembly as shown at 1140a. The dual door assembly at 1140a is in an open position and both sides could present entry threshold content to different first and second employees. When the door assembly is closed as at 1140b so that one screen faces into the space 11z and the opposite second screen faces into the hall 1002, in room threshold content may be presented on the in room screen while entry threshold content is presented on the hall facing screen. If the door assembly is opened inward as shown at 1140b, entry, in room or exit threshold content, depending on the time, may be presented on the screen that faces the room. Other threshold configurations are contemplated.

In some cases, when an employee arrives early for a scheduled meeting in a first meeting space, a system server may automatically determine that the employee is proximate a threshold and may also determine that some other space affordance configuration proximate the first meeting space is available for use and may offer the available affordance configuration to the employee for use prior to the meeting. For example, referring again to FIG. 38, if a first employee arrives for a scheduled meeting 20 minutes prior to the start of the meeting in meeting room 11z, in addition to presenting content as described above to the first employee via the threshold 1032, a system server may recognize that meeting space 11w is available (e.g., unscheduled for use for the next 30 minutes) and may automatically or when prompted offer that space 11w for use by the first employee. Here, the first employee may then move into space 11w and use that space to access personal content, meeting queue content or other information to perform some other tasks.

In at least some cases, in the above example, the system server may automatically suggest or offer space 11w to the early arriving first employee when that employee arrives more than a threshold period of time (e.g., 15 minutes) prior to the scheduled start time of the meeting in space 11z. Here, if the first employee arrives within the threshold period of time the server may not offer space 11w for use. In some cases, instead of automatically offering a space 11w, a threshold may simply present a "Find Free Space" icon (see 1040 in FIG. 7) or the like that is selectable by an employee to cause the server to identify at least one proximate available space for use by the employee. In some cases a server may identify more than one free space that can be used by the employee and present options.

While the offered free space in the example above includes a meeting space, other affordance configurations like the amplification kiosk 720*a* shown in FIG. 30, a personal bench or workstation assembly, etc., may be offered to the employee.

In at least some cases spaces offered to employees may be based at least in part on employee identity. For instance, where a first arriving employee is not scheduled to present content at a meeting, the first employee may only be offered a simple configuration like the kiosk shown in FIG. 30. However, if a second employee that is scheduled to present content and lead a meeting arrives early, that employee may be offered a meeting space that is similar to the space that is to be used for the upcoming meeting. Here, the second employee may be able to access meeting content in the offered space in a fashion similar to the way that content will be used in the reserved meeting space to, in effect, get set up for the meeting prior to entering the scheduled meeting space. For instance, the first second employee may open up meeting content and practice in the offered space. Then, just prior to the start time for the meeting, the second employee may move into the reserved space and the opened content in the practice space may move along with the second employee and be opened in the reserved space in a state similar to when the second employee leaves the practice space.

In cases where an employee is using a threshold for any purpose in one location and moves into a different location where the threshold or at least a version thereof follows the employee into the different location and is presented there for the employee to continue to access, in at least some cases, the threshold movement and re-presentation may be automatic. Thus, for instance, in FIG. 2, if an employee is accessing an entry threshold screen on 32 and then moves into space 11*a*, the entry threshold content may automatically be moved to and re-presented on the emissive table top surface 22 as a threshold 42*a*. Similarly, if the employee using threshold 42*a* during a meeting gets up and walks out of the meeting space near the end of the scheduled meeting time, threshold 42*a* may be automatically closed and re-presented on an exit threshold 34 for use by the departed employee.

In other cases, the system server may require an employee to take some clear step to have a threshold follow the employee from one location to another. For instance, see icon 1042 (e.g., "Take Threshold Along"). Here, an employee using the FIG. 7 threshold may select icon 1042 to cause the system server to follow the employee's location as the employee moves into an associated meeting space and may then re-present the threshold content via the emissive table top surface or the like. In at least some cases once icon 1042 is selected, the threshold may move along with the employee to any affordance configuration that can support a threshold. For instance, if an employee selects icon 1042 from screen 32 in FIG. 2 and then moves to a free or available meeting space that is 200 yards away to use for a few minutes, the server may present a version of the threshold to the user in the distant meeting space. Here, when the user arrives in the distant space, the server may present a "Re-present Threshold" icon to the specific user allowing the user to control if the threshold is presented or not.

In at least some cases it is contemplated that any time first and second employees are using workstations or other affordance configurations that are telepresence capable and their locations are trackable, a system server may automatically present a notice to one or both indicating that a telepresence session may be commenced. For instance, if a first employee is located at her usual workstation that includes telepresence equipment and a second employee is travelling but is currently located at and using an amplification station as shown in FIG. 30 that includes telepresence equipment, a system server may present a notice to one or each of the first and second employees indicating that a telepresence session can be set up if desired. Here, if one employee requests a session, the other employee may have to agree to the session or, at the very least, may have to opt into the session to start full telepresence activities after a telepresence communication link is established. In some cases the telepresence offer may only be made to employees that are both on a project team or the employees that are to participate in a meeting that is scheduled to occur within some threshold period (e.g., the next 2 hours).

In the context of a threshold, if a remote employee arrives early at a remote station of some type to participate in a scheduled meeting via telepresence and a local employee also arrives early at a threshold outside the space scheduled for the meeting, the threshold may indicate telepresence capability to the local employee for the remote employee as indicated above. Here, instead of facilitating telepresence at the threshold, in some cases a system server may identify a different available affordance configuration in the area that includes telepresence equipment and may suggest that configuration for use by the local employee.

In at least some embodiments an in meeting space threshold may enable an employee may be presented with options to move content to an exit threshold to continue a meeting or to perform some other process. To this end, see exemplary icons 1050 and 1052 in FIG. 24 that enable an employee to instruct a server to re-present an in room threshold and meeting content at an exit threshold, respectively. Thus, for instance, an employee may select icon 1050 to re-present a version of threshold 42*a* at an exist threshold when the employee arrives at and is identified by the server as the employee that requested the re-presentation of the threshold, at the exit screen.

In all embodiments described above, a sever may be programmed to tie any content representation to user identity so that content may not be presented to a person that is not associated with a specific meeting or project. In all embodiments when content of any type (e.g., meeting, threshold, etc.) is re-presented at a different emissive surface, content representation may again be tied to the server recognizing presence of specific employees so that the content is not presented to employees that have nothing to do with the content.

FIG. 34 shows a post meeting threshold that can be used to access content information after a meeting has ended (e.g., a week after a meeting has ended). While not separately illustrated, it is contemplated that a pre-meeting threshold akin to the FIG. 34 threshold may also be supported by a server. For instance, here, for instance, after a meeting is scheduled and as content (e.g., queued, an agenda, etc.) is added to a threshold, employees scheduled to attend the meeting may be able to access a pre-meeting threshold to see content, contact invited employees, etc. In at least some cases when employees are represented as at 847 in FIG. 34, a use may be able to select one of the representations to access linking information (e.g., a phone number, e-mail address, telepresence linking information where telepresence is supported, etc.).

U.S. patent application Ser. No. 14/159,589 which was filed on Jan. 21, 2014 and which is titled "Emissive Shapes And Control Systems" describes at least some automated interface devices that are presented as a function of user presence and is incorporated herein in its entirety by reference.

Additional and Complimentary Concepts

While upright and table top emissive surfaces can be used advantageously in any of the ways described above, in other embodiments emissive surfaces may be provided in other locations and orientations within an ambient space for use by employees in the space. One particularly useful and underutilized location within an ambient space includes the area located below what is typically considered a person's foveal view when in a standing position. Hereinafter, unless indicated otherwise, the area below a person's foveal standing view will be referred to as the "sub-foveal area" which may include, for instance, any area below a typical seated table top height (e.g., below 24-26 inches). In this regard, known emissive surfaces have typically been located at a table top height or higher within space for several reasons. First, as surface size is increased, surface cost increases appreciably. For this reason, surfaces have been limited in size and surface area has been provided where most needed or useful which has typically at the foveal view level (e.g., electronic whiteboards, dynamic advertising surfaces, etc.). In short, technological and cost constraints made it difficult in the past to provide enough emissive surface in the foveal view to optimally support employees and therefore non-foveal areas were typically not considered.

Second, the sub-foveal area is often obstructed by objects, persons, etc., in space and therefore information presented thereon often times can only be viewed poorly at best.

Third, in many cases usefulness of emissive surfaces increases appreciably where the surfaces are interactive (e.g., touch sensitive to be used as an input device as well as an information output device). Sub-foveal area surfaces are often times simply too low to allow typical employee interaction.

Fourth, sub-foveal emissive surfaces are often exposed and therefore relatively easy to view from many different locations about the surfaces. For this reason sub-foveal surfaces have been thought of as less than optimal for viewing private or personal content as they often times present minimal barriers to viewing.

While the sub-foveal area has several shortcomings when it comes to presenting information on emissive surfaces, it has been recognized that many of those shortcomings can be overcome by structural features, application of various new and evolving technologies, or combinations of structural and technology advances. In addition, systems including artificial intelligence continue to evolve such that some systems can anticipate content employees will want to access and can automatically either suggest that content or even present that content so that employee interaction to access the content is minimized and the importance of a touch interface can be reduced appreciably. Where touch interfacing is replaced by or supplemented by automated content presentation, sub-foveal surfaces that are more difficult to physically interact with become a viable option.

Moreover, by providing at least some information in the sub-foveal area, pressure on foveal area information volume can be ameliorated substantially.

Furthermore, because subfoveal emissive surfaces and supporting structures are relatively low lying, they do not occlude employee field of view in the foveal area and therefore information presented in the foveal area can often times be viewed from greater distances and hence is more useful for its communication purposes. For instance, see the foveal wall mounted emissive surface 1155 in FIG. 39 and the exemplary sub-foveal emissive surface affordance 1150 where affordance 1150 resides at a low level and will not occlude any employee's view of content presented on surface 1155. This should be contrasted with the FIG. 30 and FIG. 35 configurations where emissive surfaces or supporting structure in the foveal area would clearly occlude views of other wall mounted heads up surfaces in a proximate vicinity.

Figure 39:
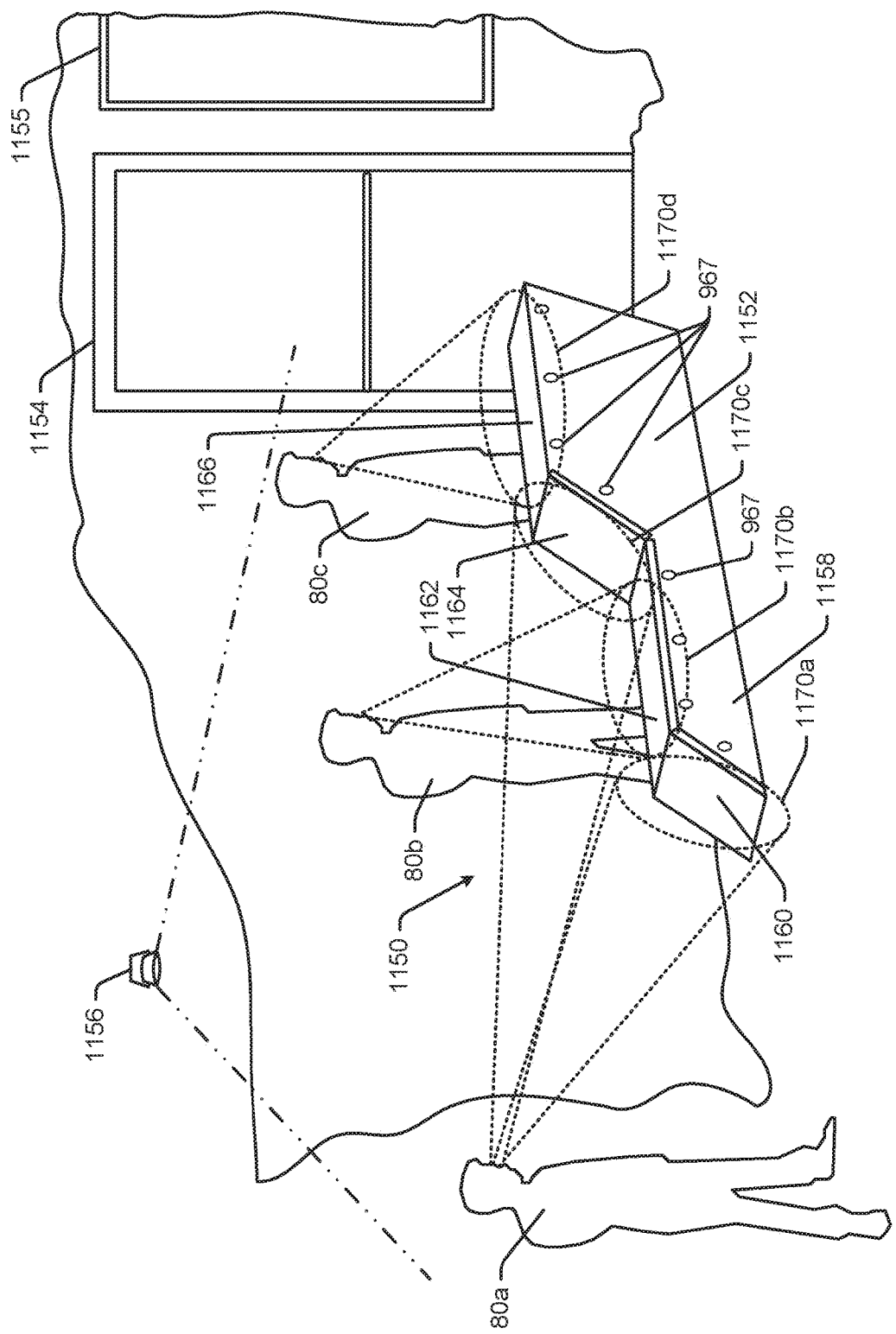
FIG. 39 is a perspective view of a sub-foveal emissive surface affordance that is consistent with at least some aspects of the present disclosure.

Referring now to FIG. 39, an exemplary sub-foveal area emissive surface affordance 1150 is shown within an ambient space outside a door 1154 that operates as an egress to a conference space (not illustrated in FIG. 39). A foveal view emissive surface 1155 is mounted to a vertical wall structure adjacent door 1154. Affordance 1150 includes an architectural understructure 1152 that forms the general shape of affordance 1150. In the illustrated embodiment understructure 1152 includes solid wall members including at least first and second side wall members (one shown and labeled 1158). In other embodiments the understructure may include structural members (e.g., beams) instead of solid wall members to present a different visual effect and/or to provide storage space below the structure.

Figure 40:
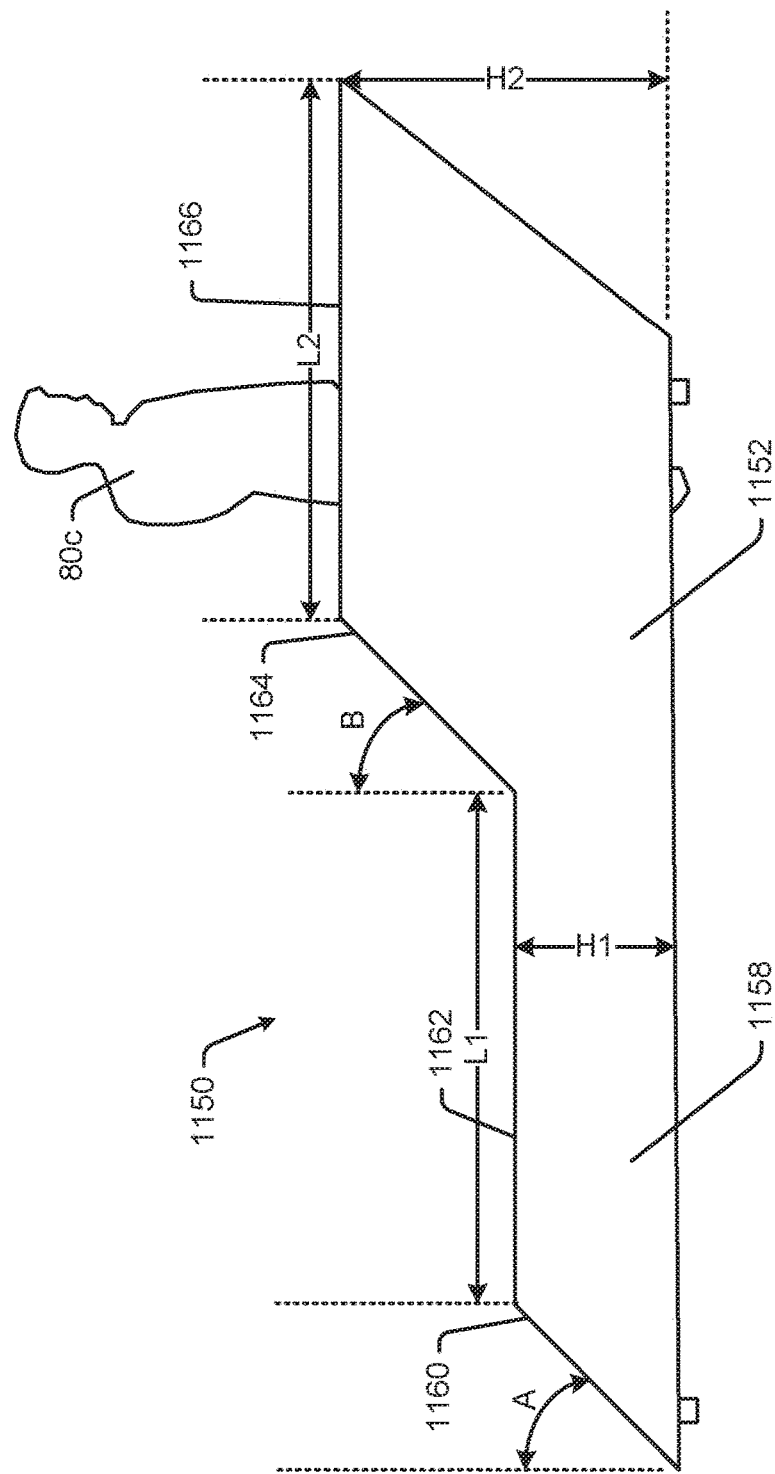
FIG. 40 is a side schematic view of the exemplary affordance of FIG. 39.
Figure 41:
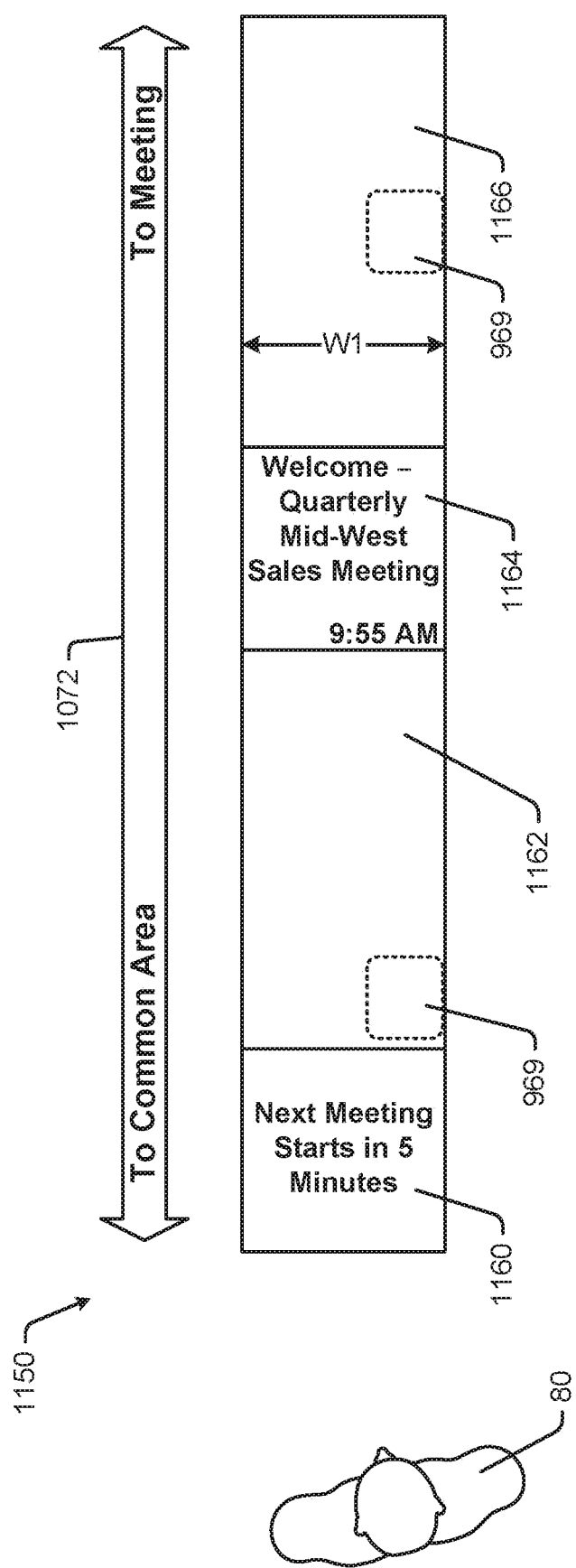
FIG. 41 is a top plan view of the affordance of FIG. 39.

In addition to the understructure 1152, exemplary affordance 1150 includes four flat panel emissive surfaces including a lower slanted surface 1160, a lower horizontal surface 1162, an upper slanted surface 1164 and an upper horizontal surface 1166. Referring also to FIG. 40, lower slanted surface 1160 extends substantially from an ambient floor surface up to a height H1 to form an angle A with respect to vertical. Lower horizontal surface 1162 includes a flat and horizontal top surface and extends from an upper edge of slanted surface 1160 to a lower edge of the upper slanted surface 1164 to form a length dimension L1. Upper slanted surface 1164 extends substantially from lower horizontal surface 1162 at height H1 up to a height H2 to form an angle B with respect to vertical. Upper horizontal surface 1166 includes a flat and horizontal top surface and extends from an upper edge of slanted surface 1164 to a distal edge opposite surface 1164 to form a length dimension L2 and resides in a plane at the H2 height. Referring also to FIG. 41, in the illustrated embodiment, each of surfaces 1160, 1162, 1164 and 1166 has a width dimension W1.

Referring still to FIGS. 39 through 41, in at least some embodiments the surface dimensions and angles A and B are selected so that the surfaces 1160, 1162, 1164 and 1166 are positioned and oriented to perform different functions. For instance, in at least some cases, height H2 may be a standard table top height or a standard countertop or bar height so that an employee standing adjacent surface 1166 can easily touch and interact with surface 1166. Thus, height H2 may be between 22 and 46 inches in many cases and, in particularly advantageous embodiments, may be within a range between 26 and 42 inches. To support various types of employee activities, surface width W1 and length L2 may be within ranges of 12 and 30 inches and 24 and 60 inches, respectively, and, in particularly advantageous embodiments may be within ranges between 18 and 24 inches and 26 and 42 inches, respectively.

Referring still to FIGS. 39 through 41, in at least some cases lower horizontal surface 1162 may have width and length L1 dimensions that are substantially similar to dimensions W1 and L2 described above. Height H1 of surface 1162 is lower than surface 1166 as shown and, in at least some embodiments, will be located a low position that is out of reach of typical standing user so that an employee cannot contact surface 1162 without bending over or squatting adjacent affordance 1150. For instance, surface 1162 height H1 may be between 12 inches and 24 inches in at least some embodiments and, in particularly advantageous cases, H1 may be between 15 and 18 inches high.

Figure 45:
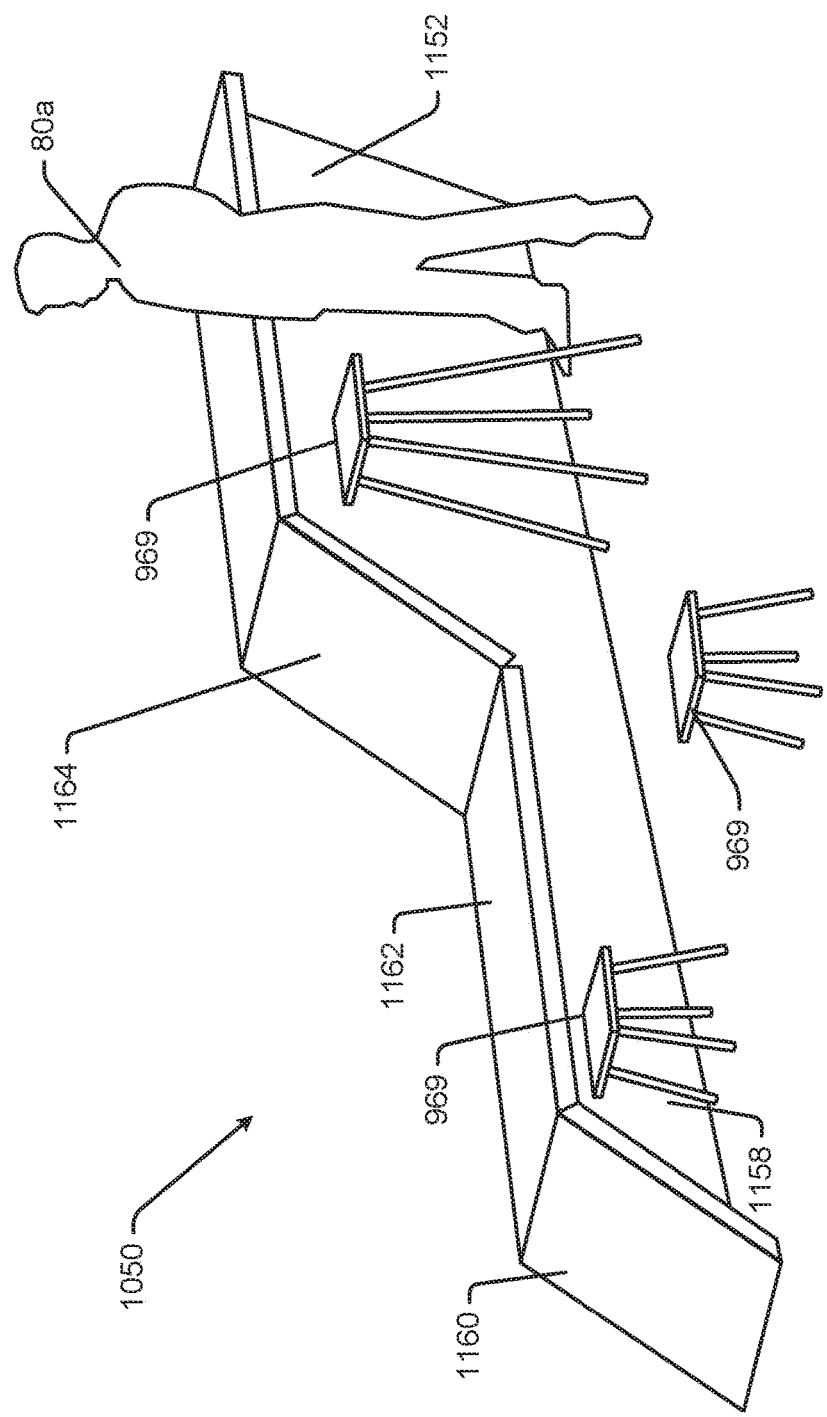
FIG. 45 is a view similar to the view of FIG. 39, albeit showing a different sub-foveal emissive surface configuration along with seating affordances.

Referring to FIG. 45, in still other cases heights H1 and H2 may be selected such that surface 1162 is at a sitting table top height and surface 1166 is at a standing countertop or bar height. Thus, for instance, surface 1162 may be between 22 and 27 inches high while surface 1166 is between 39 and 47 inches high. As shown in FIG. 45, in at least some cases stools 969 of different heights may be provided to support employees in different positions at affordance surfaces 1162 and 1166. Here, in some cases the stools 969 may be dimensioned to fit under (see stools 969 shown in phantom in FIG. 41) overhanging edge portions of the surfaces 1162 and 1166 when in a stored position so that they are out of the way when not being used. Affordances 1150 with these configurations encourage longer term access to information via surfaces 1162 and 1166.

Angle A is selected so that surface 1160 faces upward and in a forward direction. In at least some embodiments angle A will be between 25 and 70 degrees, in other cases angle A will be between 40 and 50 degrees and in particularly advantageous embodiments angle A is approximately or substantially 45 degrees.

In some cases angle B will be substantially identical to angle A. In other cases angle A may be larger than angle B as the perspective of a standing employee within the space including affordance 1150 with respect to each of surfaces 116*o* and 1164 is different. Thus, see for instance employee 80*a* in FIG. 39 that has first and second views 1170*a* and 1170*c* of surfaces 1160 and 1164 that are different because of the different relative juxtapositions of surfaces 1160 and 1164 with respect to employee 80*a*. Where angle A is larger than angle B, the surfaces 1160 and 1164 may both be generally perpendicular to the trajectory of employee 80*a*'s line of sight at the same time. Thus, for instance, in some cases angle A may be between 40 and 60 degrees while angle B is between 30 and 45 degrees.

Referring to FIG. 39, depending on where an employee is located with respect to affordance 1150, the employee will have different abilities to see and perceive information presented on surfaces 1160, 1162, 1164 and 1166. Thus, for instance, employee 80*a* shown spaced away from surface 1160 has views 1170*a* and 1170*c* of surfaces 1160 and 1164 as shown but would have relatively poor views of surfaces 1162 and 1166. Thus, the angles of surfaces 1160 and 1164 cause an employee's line of sight to be relatively more perpendicular to those surfaces than to other surfaces when at a relatively long distance from affordance 1150 and therefore content on the slanted surfaces is easier to view. The viewing effect associated with the slanted surfaces 1160 and 164 should be contrasted with a case where surface 1160 would be vertical in which case the line of sight thereto would always be substantially skewed and the information presented thereon would be more difficult to perceive.

Referring still to FIG. 39, employee 80*c* standing above surface 1166 has a clear view of surface 1166 by looking directly downward as at 1170*d* but would have poor views of the other surfaces 1160, 1162 and 1164 because of her relative position thereto. Similarly, employee 80*b* standing above surface 1162 has a clear view of surface 1162 by looking directly downward as at 1170*b* and a good view of surface 1164 adjacent thereto but would have poor views of the other surfaces 1160 and 1164 because of her relative position thereto.

In cases where surface 1166 is at a height that enables touch interaction, surface 1166 will be touch sensitive in at least some embodiments so that an employee can touch icons and other virtual interface tools thereon to input information and to interact with presented content. In cases where the other surfaces 1160, 1162 and 1164 are to low for an employee to easily contact, in at least some embodiments those surfaces will not be touch sensitive and instead will simply present content or information of various types in an automated fashion in some embodiments. Thus, for instance, surface 1160 may simply present an outdoor temperature reading and a brief weather forecast to be perceived by employees in the general vicinity of affordance 1150 while surface 1162 presents a news feed showing videos of current news stories.

Figure 44:
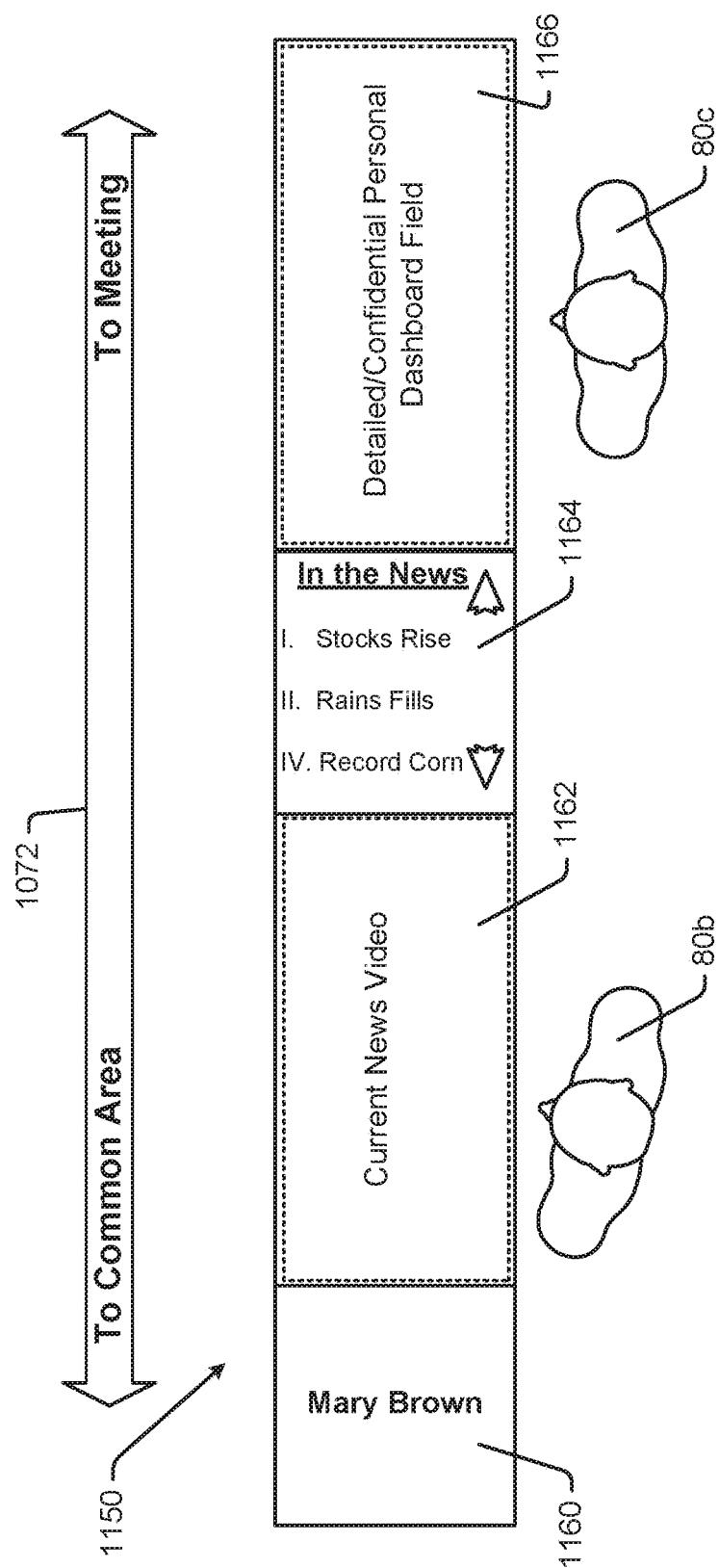
FIG. 44 is similar to FIG. 41, albeit showing a different combination of information being presented on emissive surfaces that comprise the affordance.

In at least some cases, because an employee 80*b* adjacent surface 1162 also has a good view of surface 1164, content or information presented on surface 1164 may be at least somewhat tied to the content presented on surface 1162 so that an employee's experiences an integrated content representation via surfaces 1162 and 1164. For instance, referring to FIG. 44 where current news video clips are presented on surface 1162, next video clips or next news stories up in a queue may be presented on surface 1164. Where surface 1164 is also touch sensitive, an employee may be able to select an icon or text associated with a queued up story at 1164 to skip to an associated video.

In at least some cases where affordance 1150 is spatially associated with other affordances in the ambient, the content presented via surfaces 1160, 1162, 1164 and 1166 may have a spatial aspect to it where surfaces closer to an associated other affordance present content relatively more relevant to the associated other affordance than surfaces that are further away. For instance, in FIGS. 39 and 41 affordance 1150 is arranged along a path (see arrow 1072) leading toward meeting room door 1154 so that surface 1166 is closer to the door 1154 than is surface 1160. See also FIG. 41 where surface 1160 that is spaced away from door 1154 presents general weather information while surface 1164 that is closer to the door 1154 presents information related to a meeting taking place in the meeting space on the opposite side of the door 1154. Here, an employee may be restricted to accessing content to be presented in a spatially associated meeting room via surface 1166 that is proximate that room as opposed to on the other surfaces of affordance 1150. Restricting meeting content to the higher horizontal surface 1166 also makes sense as that type of information can often times be sensitive and because surface 1166, being higher than the other surfaces and being horizontal, renders that surface 1166 relatively more private than the other affordance surfaces that are more easily viewed from about the affordance because of their vertical juxtapositions and/or angles.

In at least some embodiments some type of sensor or several types of sensors may be associated with affordance 1150 for sensing employees in the ambient space and the relative juxtapositions of employees to affordance 1150 and more specifically to surfaces 1160, 1162, 1164 and 1166, and a system server may serve up content on the surfaces 1160, 1162, 1164 and 1166 only when one or more employees are at locations where they should have the ability to perceive content on an associated surface. To this end, see the exemplary camera 1156 and the exemplary under surface mount proximity sensors 967 in FIG. 39 that represent any type of sensor device or system capable of detecting locations of one or more employees within the ambient space relative to affordance 1150. While device 1156 may be a ceiling or wall mounted camera and sensors 967 are mounted below affordance surfaces or within the understructure 1152, other sensor devices or systems are contemplated such as a wireless system that triangulates a user's location based on wireless signals received from a user's portable computing device or an RF or other identification badge via access points, proximity sensors, etc. In at least some cases the sensing system will be able to identify substantially exact employee locations with respect to affordance 1150 including which side of the affordance an employee is on.

Figure 42:
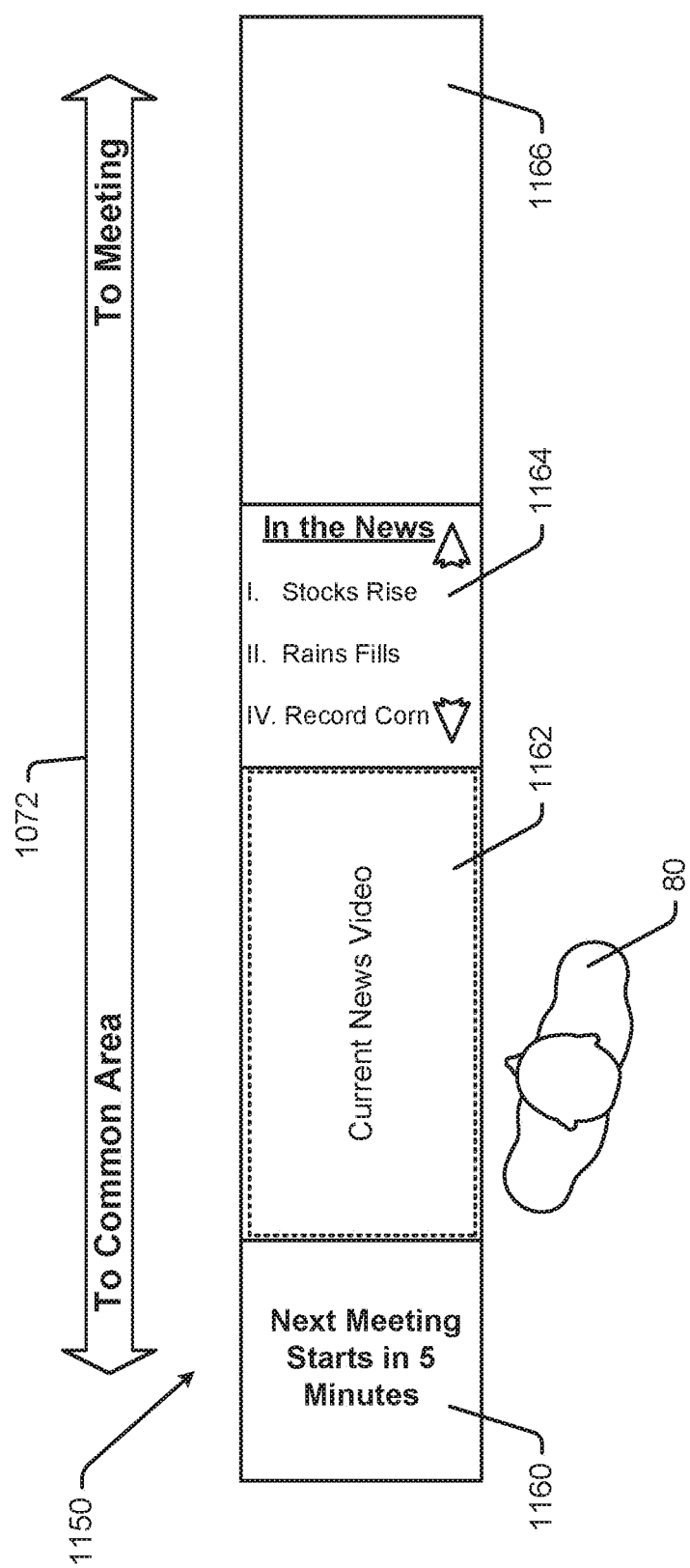
FIG. 42 is similar to FIG. 41, albeit showing a different combination of information being presented on emissive surfaces that comprise the affordance.

Referring again to FIG. 39 and also to FIG. 41, when an employee 80*a* is spaced away from affordance 1150 as shown with no other employees proximate affordance 1150, the server may only present meeting information related to an adjacent meeting space via angled surfaces 1160 and 1164 with no information on surfaces 1162 and 1166 or with simple signaling information on the horizontal surfaces (e.g., a glowing color to indicate status of a meeting in an adjacent meeting room). When an employee moves into a position adjacent surface 1162 as indicated by employee 80*b* shown in FIGS. 39 and 42, the server may commence presenting some type of general content via surface 1162 and via adjacent angled surface 1164 while still presenting meeting related information for other employees in the general area to see on surface 1160.

Figure 43:
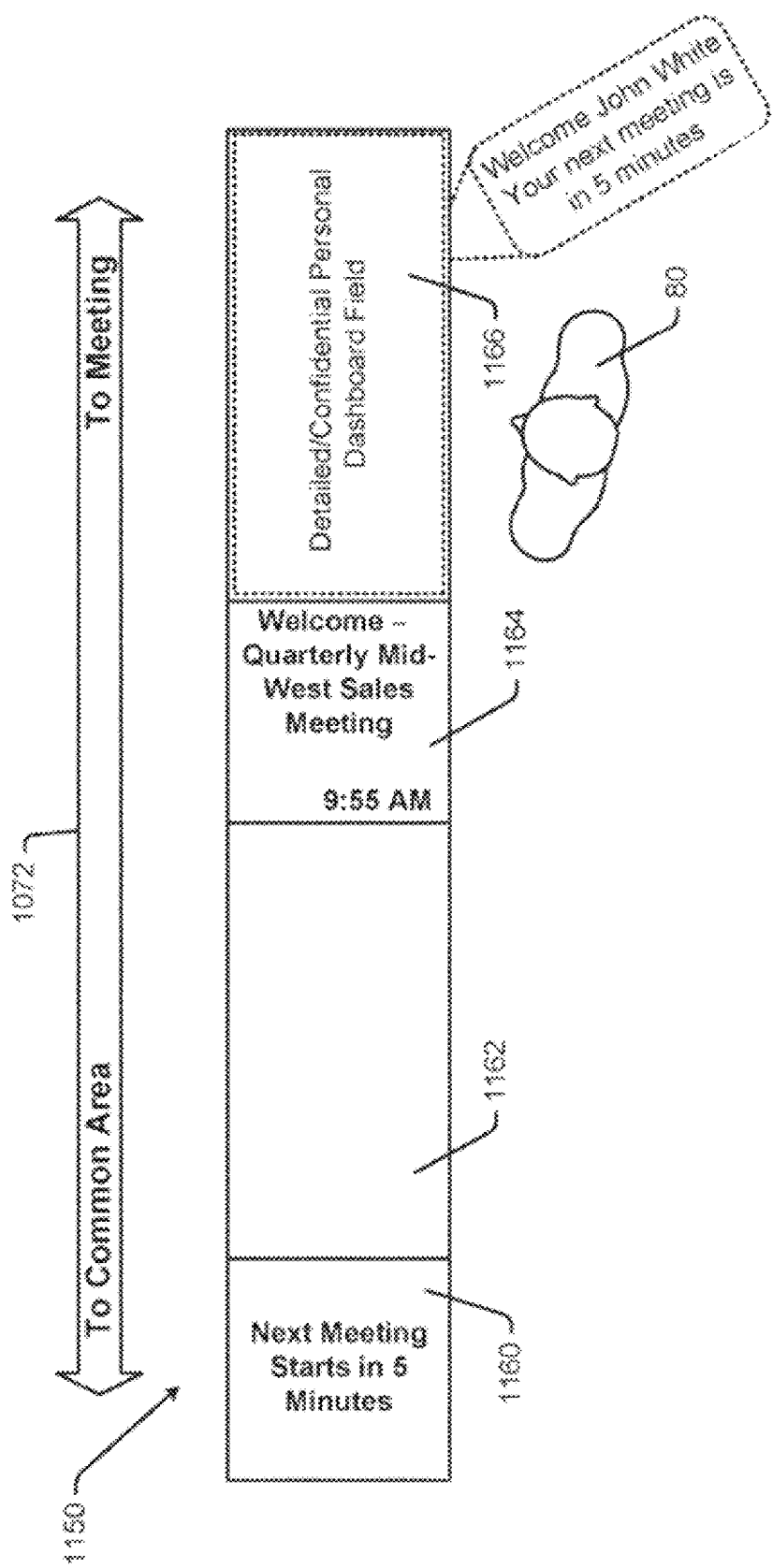
FIG. 43 is similar to FIG. 41, albeit showing a different combination of information being presented on emissive surfaces that comprise the affordance.

When the employee moves to a location adjacent surface 1166 as shown at 80*c* in FIGS. 39 and 43, content on surface 1162 may be blanked or eliminated and instead content may be presented via surface 1166. Here, in at least some cases if an employee was viewing content on surface 1162 when she moves to the location adjacent surface 1166, the content from surface 1162 may be automatically removed from surface 11162 and placed on surface 1166 so that the employee can continue reviewing the same content in a persistent fashion. In addition, the general meeting information may again be presented on surfaces 1162 and 1164 for other employees to see that are spaced from affordance 1150.

If a second employee (see 80*b* in FIG. 44) moves to a location adjacent surface 1162 while a first employee is proximate surface 1166, the current news videos content may again to presented via surface 1162 and options to view may be presented on surface 1164 for the second employee to view while the first employee uses surface 1166 to view other content (e.g., a different video in the queued set).

In at least some cases the orientation of content on at least surfaces 1162 and 1166 may be automatically changed as a function of where an employee is located with respect to the surface. For instance, in FIG. 43 where employee 80*c* is located below surface 1166 as illustrated, content on surface 1166 may automatically be arranged to face employee 80*c* and, if the employee were to move to the other side of surface 1166 (e.g., above surface 1166 as illustrated), the content may be flipped so that it faces the employee in the location above the surface 1166. If the employee moves to a location adjacent the distal edge of surface 1166 opposite surface 1164, the server may reformat the content and present an elongated portrait view via surface 1166.

In addition to generally tracking employee locations within a space adjacent affordance 1150, in at least some embodiments, as described above with respect to other embodiments, a system server may use information received from the area sensors (e.g., 1056, 967) to determine identities of specific employees in the vicinity of the affordance 1150. For instance, each employee may wear an ID badge or the like that includes an RF or other type of tag or may use a personal portable computing device (e.g., a smart phone) that can be sensed via wireless access points or the like to determine employee identity. As another instance, cameras in the vicinity of affordance 1150 may capture images of employee faces that can be used to identify specific employees. Other biometric sensors may also be used to determine identity. Here, the server may use employee identity to automatically or semi-automatically (e.g., after receiving some type of a user opt in indication from an employee) present employee specific content of certain types to employees on at least some of the affordance surfaces 1160, 1162, 1164, 1166. For instance, where content is of a type that an employee may consider personal (e.g., documents, schedule information, e-mails or other communications, etc.), the server may only present personal information on surface 1166 which is relatively difficult for other employees in the area to view given its height and horizontal orientation.

Referring again to FIG. 39, it is believed that there are several advantages associated with specific attributes of the illustrated affordance 1150. First, while employees are drawn to the horizontal surfaces 1162 and 1166 to access information provided thereon, the slanted nature of surface 1160 discourages employees from approaching surface 1162 from the front end of affordance 1150. Thus, if an employee wants to view surface 1162, the shape of affordance 1150 including the slanted front surface 1160 quietly guides the employee to move to one of the lateral sides thereof as opposed to trying to view surface 1162 from a location proximate an end of the affordance 1150. For this reason employees rarely occlude views of even the lowest sub-foveal surfaces like surface 1160 by standing directly in front thereof.

Second, the elongated design of affordance 1150 operates as a physical space divider causing employees that approach affordance 1150 to split to one side or the other. While affordance 1150 physically causes a split at its location, employees tend to separate on approach well before reaching affordance 1150 in many cases. This is particularly true in cases where information is presented on an upwardly slanted surface as at 1160 as employees intuitively comprehend that surface 1160 is intended to convey information and that occluding views thereof is socially awkward. In short, most people do not like standing in front of a sign that other employee's have reason to view and therefore most employees steer clear of slanted sub-foveal emissive surfaces like surface 1160.

Third, the width W1 dimension (see FIG. 41) of affordance 1150, in at least some cases, is purposefully limited to a size that is suitable for presenting content to only one lateral side of the affordance at a time to discourage a case where two employees will be located directly across from each other (e.g., on opposite sides of surface 1166) while viewing content. By limiting the width W1 to single employee support, a greater sense of privacy is subtly created as second employees are not persistently located across from a first employee in most cases. Here, the end result is a greater sense of personal privacy (e.g., no one is directly across from another employee) as well as privacy related to displayed content on surface 1166 (e.g., in most cases a nearest employee using affordance 1150 will be located at a different location along the length thereof. In these cases the width W1 will typically be within a range between 18 and 24 inches.

In still other cases width W1 may be purposefully selected to support first and second employees on opposite lateral sides of affordance 1150 simultaneously so that the each can view personally selected or personal content at the same time. Here, the dimension W1 may be within a range between 30 and 54 inches and, in particularly advantageous embodiments may be within a range between 36 and 48 inches.

In still other embodiments, to accommodate more than one employee at a time on a surface (e.g., 1166), length dimension L2 (see again FIG. 40) may be long enough to provide separate content areas for each of first and second employees side by side along the length L2. For instance, surface 1166 may have a length dimension between 48 and 100 inches long so that two interfaces, each between 24 and 50 inches wide may be presented to first and second adjacent employees. Here, for instance, a first employee may be located on one lateral side of surface 1166 proximate surface 1164 and a second employee may be located on the opposite lateral side of surface 1166 proximate the distal edge opposite surface 1164.

Various width and length dimensions of other affordance surfaces 1160, 1162 and 1164 may similarly be provided to encourage single employee or simultaneous multiple employee use in at least some embodiments.

One other advantage associated with affordance 1150 is that the entire structure 1050 is sub-foveal so that, while affordance 1150 provides useful emissive surfaces within a space, the affordance structure itself does not obstruct views within the foveal and above areas in space. Thus, for instance, it should be appreciated that the vertical wall mounted emissive surface 1155 in FIG. 39 is unobstructed by affordance 1150 and would be unobstructed by other affordances akin to affordance 1150 in the ambient as would be any other emissive surfaces located in the foveal view. This should be contrasted with the exemplary thresholds illustrated in FIGS. 30, 35 and 38 that occlude employee lines of sight in the foveal area and above in many cases.

Figure 46:
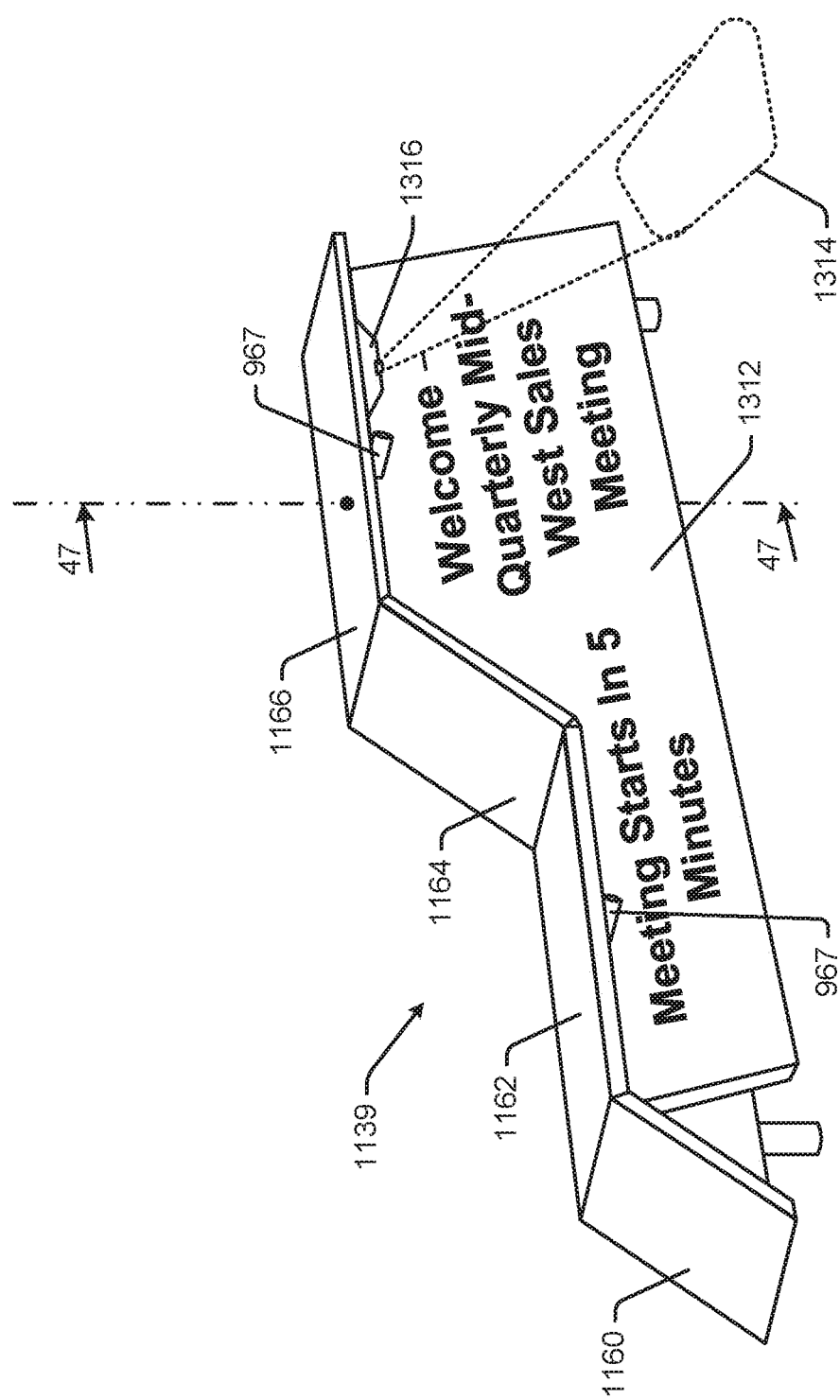
FIG. 46 is a view similar to the view of FIG. 39, albeit showing a different sub-foveal emissive surface configuration.
Figure 47:
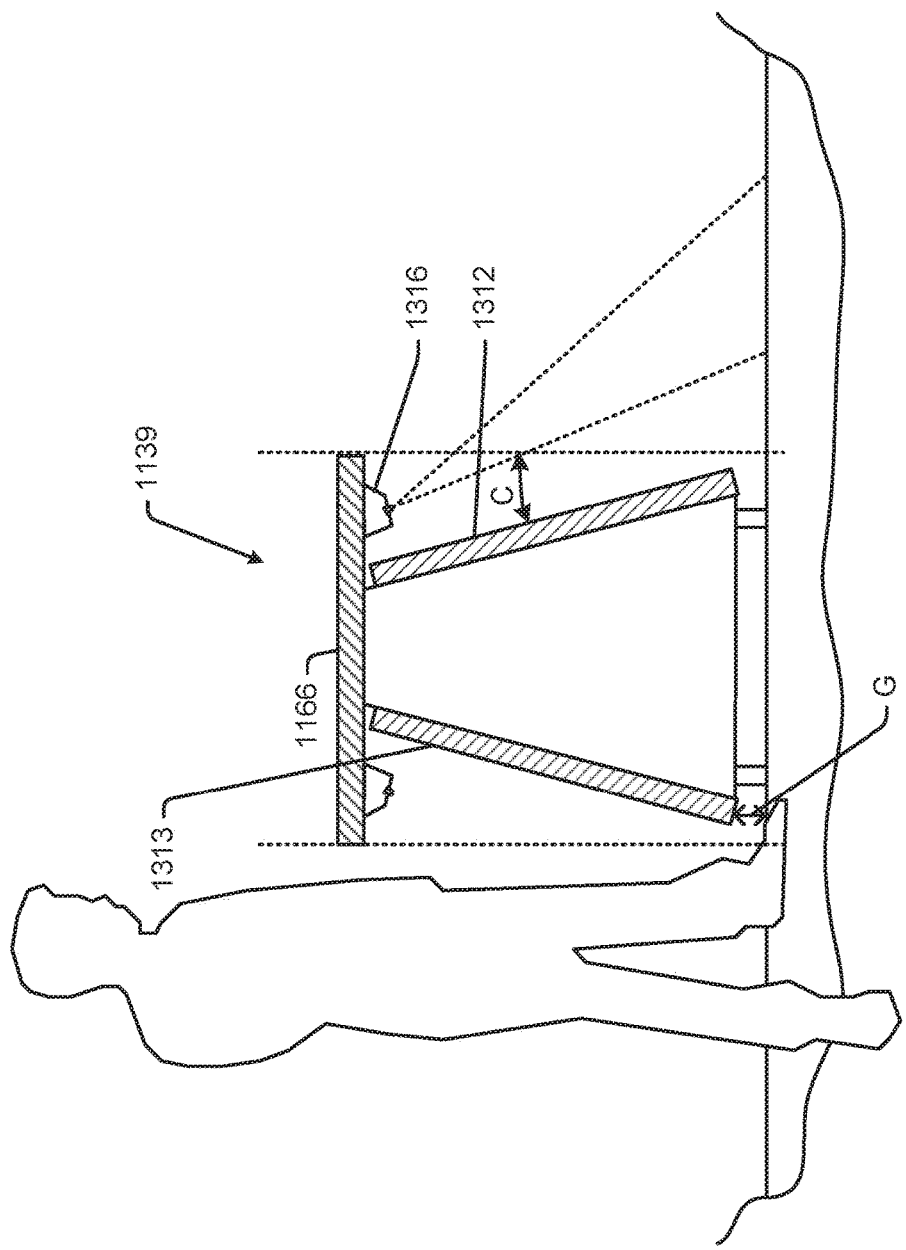
FIG. 47 is a partial cross sectional view taken along the line 47-47 in FIG. 46.

Referring now to FIGS. 46 and 47, another sub-foveal affordance 1139 is illustrated that is similar to affordance 1150 described above, albeit including some additional features. Affordance 1139, like affordance 1150, includes four emissive surfaces 1160, 1162, 1164 and 1166 arranged in a fashion similar to that described above as well as two additional emissive side surfaces 1312 and 1313. The side surfaces 1312 and 1313 are each slanted rearward from bottom to top and are arranged so that bottom edges thereof are located under lateral edges of the surfaces 1160, 1162, 1164 and 1166 (see again FIG. 47). The angle C of each surface 1312 and 1313 with a vertical plane may be within a range between 10 degrees and 45 degrees and in particularly useful embodiments may be in the range between 15 and 30 degrees. The angled front surfaces 1312 and 1313 face at least somewhat upward so that those surfaces are somewhat more squared off with lines of sight of employees laterally positioned with respect to affordance 1139. Because the lower edges of surfaces 1312 and 1313 are located within the space (e.g., a column of space) below the other emissive surfaces (e.g., see again 1166 in FIG. 47), surfaces 1312 and 1313 do not interfere with an employee at one of the lateral edges of surface 1166 or surface 1162. In addition, surfaces 1312 and 1313 are each spaced (see gap G) above the ambient floor surface to provide a toe space or toe gap to allow employees to locate the front portions of their feet below the surfaces enabling the employees to move right up to the lateral edges of surface 1166.

In still other embodiments one or both of surfaces 1312 and 1313 may purposefully be designed so that toe gap G is not provided and/or so that the slanted side surface extends outward from the space below surface 1166 to discourage employees from moving right up to associated sides of the affordance 1139. To this end see FIG. 48 that shows another affordance version 1139a where surface 1313 is similar to the surface 1313 (e.g., defines a toe gap G and is located entirely below surface 1166) in FIG. 47 but where the second lateral side surface 1312 extends all the way to the ambient floor surface (e.g., there is no toe gap G below surface 1312) and where surface 1312 extends outside of the space below surface 1166 to operate as an obstruction to employees to the associated side of surface 1166. Here, while the left side of affordance 1139a as illustrated may subtly welcome an employee to use surface 1166 from that side, the right side as illustrated would subtly discourage employees from locating thereat.

In still other embodiments the side surfaces 1312 and 1313 or at least one of the side surfaces may be mounted for movement between different positions so that the affordance configuration changes depending on how it is instantaneously being used. For example, see in FIG. 48 that a first motive configuration 1307 is provided within affordance 1139a that is linked to surface 1313 that can drive the surface 1313 back and forth between the illustrated solid line position in which surface 1313 is pulled back and completely under surface 1166 and the phantom line position in which the surface 1313 is pushed out and extends down and outward from a lateral edge of surface 1166. Here, surface 1313 may be pushed outward as in phantom when no employee is currently located adjacent thereto and may be pulled back as in solid line when an employee halts proximate surface 1166 for some threshold period of time (e.g., 1-3 seconds).

Similarly, see again FIG. 48 where affordance 1139a is shown with a second motive configuration 1321 is provided within affordance 1139a that is linked to surface 1312 that can drive the surface 1312 back and forth between the illustrated solid line position in which surface 1313 extends outside the column of space under surface 1166 and the phantom line position in which the surface 1312 is pivoted back about its upper edge and into a position that is completely below surface 1166 (e.g., within the column of space below surface 1166). Here, surface 1312 may be pushed outward as in solid view when no employee is currently located adjacent thereto and may be pulled back as in phantom line when an employee halts proximate surface 1166 for some threshold period of time (e.g., 1-3 seconds).

Figure 48:
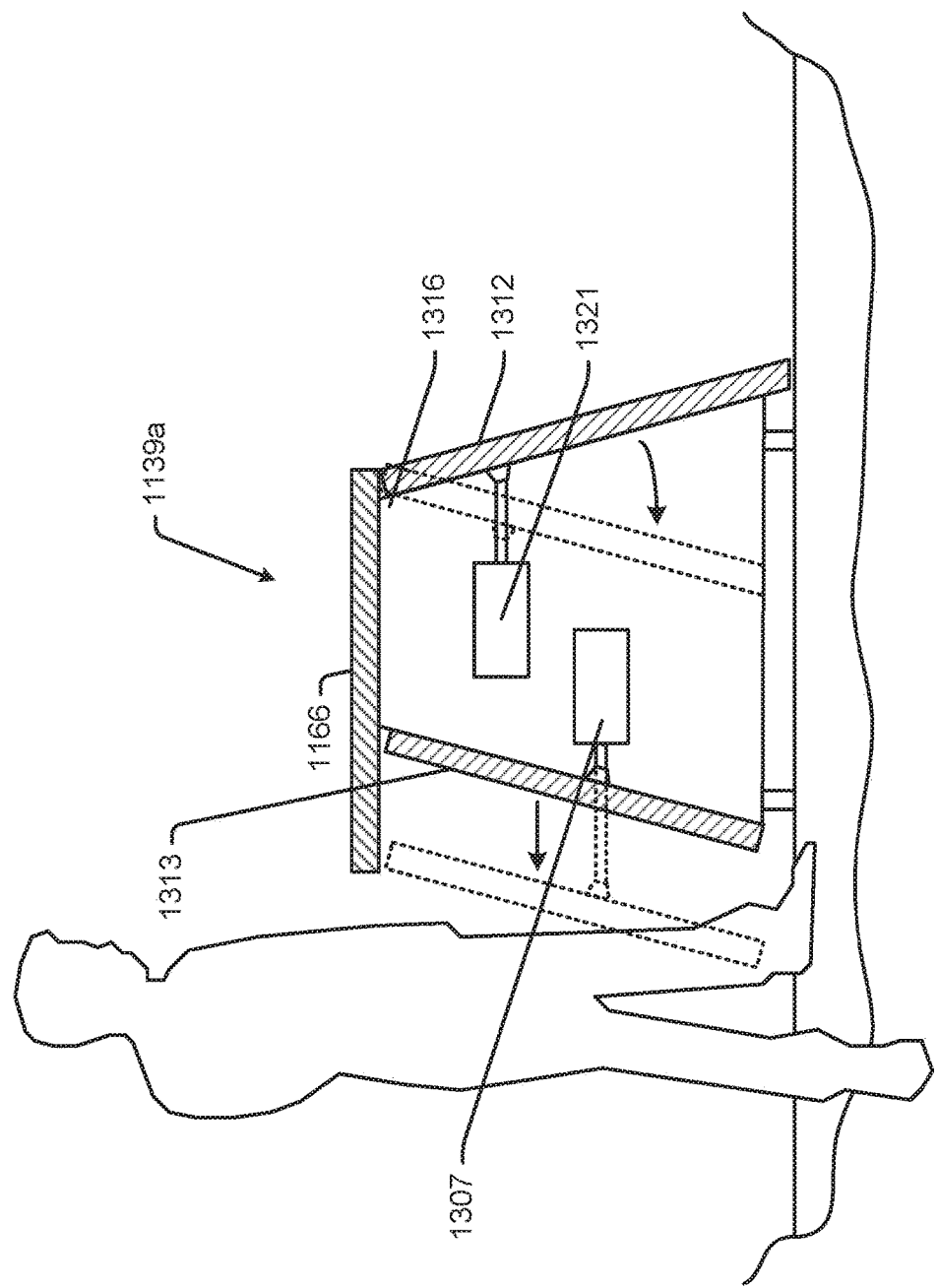
FIG. 48 is a cross sectional view similar to the view in FIG. 47, albeit of a different affordance configuration.

In the FIG. 48 description above and hereafter, the phrase motive configuration is used in a broad sense to refer to any type of assembly or system that is capable of changing juxtaposition of an emissive surface with respect to a supporting structure. Thus, for instance, in some cases each motive configuration 1307 and 1321 may include a motor driven telescoping assembly where one elongated member extends and retracts to drive a surface between positions. Here, a distal end of the extending/retracting member may be pivotally and slidably mounted to a rear or undersurface of an associated moveable surface. In addition, the motive configuration may also include some type of guiding mechanism or assembly to guide a surface between various positions and to provide additional support to the surface in different positions. In other cases a telescoping assembly may be hydraulic, magnetic, etc.

Affordance embodiments are contemplated that include side surfaces that are all similarly mounted and others that include any combination of the side mounting configurations described above. Thus, for instance, referring again to FIG. 48, in some cases side surfaces 1312 and 1313 may both be mounted as is surface 1313 and first and second motive configurations may be provided that are akin to configuration 1307 for moving the screens in and out as shown in FIG. 48 while in other cases surface 1312 may be stationary as shown in FIG. 48 while surface 1313 moves between positions as illustrated in FIG. 48. Other side surface combinations are contemplated.

Referring again to FIGS. 46 and 47, exemplary affordance 1139 also includes projectors 1316 mounted to an underside of surface 1166 or the understructure that supports surface 1166. Projector 1316 may include any type of projector device that can be driven by a system server to present content on an ambient floor surface adjacent affordance 1139. Thus, for instance, projector 1316 may be a laser projector, a video projector, etc. As shown, projector 1316 may be controlled to present any type of information that may be useful to an employee on the floor surface at 1314 such as, for instance, an indication that a meeting in an adjacent conference space is about to start, that a meeting is ending, that the employee has a new e-mail to address, etc.

In at least some cases it is contemplated that affordance 1139 may further include sensors 967 to sense locations of employees proximate the affordance 1139 and the system server may be programmed to modify where at least specific types of information is presented on affordance surfaces or projected surfaces so that employee locations do not or in the alternative minimally impede views of presented content. To this end, see again FIG. 46 where side slanted surface 1312 includes a salutation associated with a meeting along with a warning indicating when the meeting is to commence. Here, if an employee moved to a location adjacent surface 1166, the salutation on surface 1312 and below surface 1166 may be moved to the location below surface 1162 automatically so that employees spaced from surface 1312 can still perceive the salutation (e.g., the employee adjacent surface 1166 does not obstruct other employee's views of the salutation). Here, the 5 minute warning originally presented below surface 1162 may either be reformatted to a smaller font so that a reformatted salutation can be presented therewith below surface 1162 or the 5 minute warning and salutation may cycle alternately to present both sets of information.

In a similar fashion, employee location information developed from proximity sensors 967 (see specifically FIG. 46) may be used by the server to control where projectors 967 project content onto the ambient floor surface area around affordance 1139. For instance, while at least one employee is in the general vicinity of affordance 1139 but is not immediately adjacent thereto, projectors 1316 may project general information on large sections of the ambient floor surface for employees to experience. Here, if an employee moves up to an edge of the affordance 1139, the ambient floor are projected onto may be modified so that the projection is to the side of the proximate employee (e.g., so that the projection does not subtend the employee). In addition, once an employee moves to a location proximate affordance 1139, the projected content may be automatically altered in some fashion. For instance, instead of indicating when a next meeting starts in an adjacent conference space, the projected floor content may indicate current important news stories. As another instance, instead of indicating meeting commencement, the projected floor content may include a reminder to book a flight to New York for a meeting in 2 weeks that is personalized for a specific employee.

In at least some cases floor projected content and content of emissive affordance surfaces may remain general while employees continue to walk close to but past affordance 1139 and may only be automatically altered if system sensors detect that the employee stopped in an area proximate the affordance 1139 or proximate a specific location with respect to the affordance. For instance, in some cases the projected and presented information may be automatically altered any time an employee halts within a three foot area about any edge of affordance 1139. As another instance, projected and presented information may only be automatically altered when an employee moves to within 18 inches of one of the lateral edges of one of surfaces 1162 and 1166.

Figure 49:
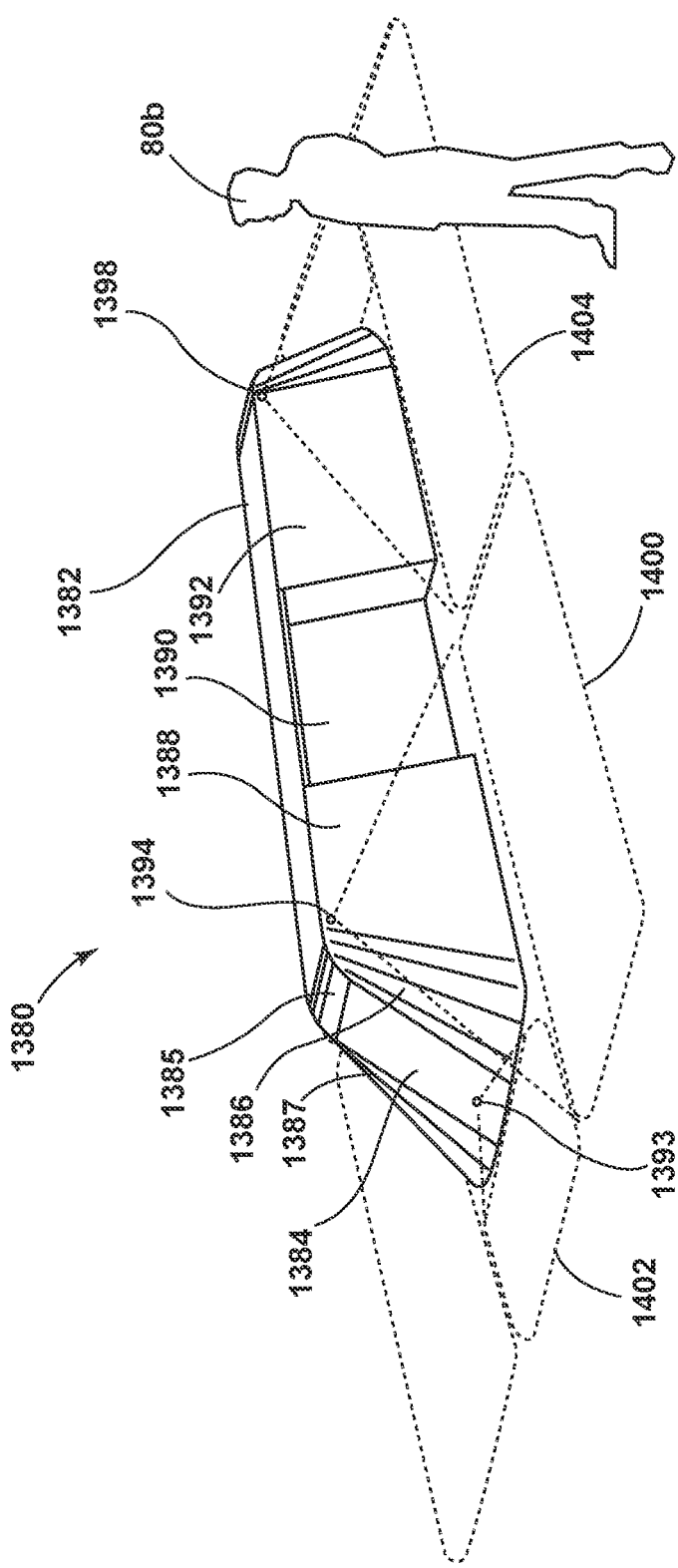
FIG. 49 is a perspective view similar to the FIG. 39 view, albeit of another sub-foveal emissive surface affordance configuration.

Referring now to FIG. 49, another exemplary affordance 1380 is illustrated that includes a support structure (not labelled) that supports various emissive surfaces generally within the sub-foveal area of a space including a flat elongated top surface 1382 and a first slanted end surface 1384 with a curved surface portion 1385 there between and a second slanted end surface (not labelled) at the other end of affordance 1380. In this case, all surface sections 1382, 1384 and 1385 may be formed by a single emissive surface structure so that content may be presented at any location on the combined curved surface structure. Here, a height dimension of surface 1382 may be any of the heights described above with respect to surface 1166.

Referring still to FIG. 49, affordance 1380 also includes slanted lateral side surfaces 1388, 1390 and 1392 on the illustrated side and would include a similar set of three slanted side surfaces on the opposite side of the structure. The slant angle of the surfaces 1388, 1390 and 1392 may be similar to the angle C described above with respect to surface 1312 (see again FIG. 47). Each of surfaces 1388 and 1392 extends downward and outward from a side edge of surface 1382 so that lower edges thereof are outside the space directly below surface 1382. While surface 1390 is slanted backward from its lower edge to its upper edge, surface 1390 is recessed from surfaces 1388 and 1392 so that its lower edge is within the space (e.g., the vertical columnar volume) below surface 1382. Here, as in some of the examples above, the extending slanted surfaces 1388 and 1392 discourage employees from moving right up to surface 382 in those areas while the recessed surface 1390 subtly invites an employee into a space adjacent surface 1382.

Referring yet again to FIG. 49, lateral side surface 1388 curves at 1386 to smoothly transition into the front slanted surface 1384. Here, different small bezel surfaces may form surface 1384 and surface 1388 or, in some cases, a single curved surface structure may provide a unified and contiguous curved surface as illustrated. A similar curved surface section 1387 is provided on the side of slanted front surface 1382 opposite curved surface section 1386. At the other end of affordance 1380, the side surfaces (e.g., 192) also curve into the second slanted end surface. Content may be presented on any of the emissive surface illustrated in FIG. 49.

Referring to FIG. 49, while the central one of slanted side surfaces 1388, 1390 and 1392 is recessed on the illustrated side of affordance 1380, on the opposite side of affordance 1380 it may be that the central one of three slanted side surfaces extends outward from the top edge of surface 1382 and outside the space below surface 1382 while the slanted side end surfaces on opposite sides of the central surface are recessed. In this way, while the affordance structure subtly welcomes an employee to the space adjacent surface 1390 on one side of affordance 1380, the structure would subtly welcome other employees to the end positions on the opposite side of affordance 1380 (see the location of employee 80*a* in FIG. 47) and discourage employees from assuming a position centrally aligned with surface 1390.

Thus, the slanted side surfaces encourage employees to stagger or alternate in positions on the opposite sides of surface 1382.

Referring still to FIG. 49, affordance 1380 also includes combined projector/proximity sensor devices 1394 and 1398 (hereinafter "projector devices") on the illustrated side of the affordance for projecting content onto the ambient floor surface adjacent affordance 1380 as shown at 1400 and 1404 and end projector devices like 1393 in the end surfaces like surface 1393 to project content into floor areas like 1402. Similar projection devices would be provided on the other, non-illustrated side and end of affordance 1380 for projecting content into similar floor areas. Here, projector device 1394 is located in the upper left hand corner of surface 1388 so that it is spaced away from a location that is likely to be assumed by an employee at times near central surface 1390 so that the likelihood of an employee obstructing the projected content is reduced. Similarly, projector device 1398 is located in the upper right hand corner of surface 1392 to reduce employee occlusion of projected content. End projector device 1393 is located low on surface 1394. As shown, projector devices 1394 and 1398 may be designed and positioned to project into floor areas 1400 and 1404 that abut each other or that even overlap at least somewhat so that the system server can present a single uniform image or information representation in a combined area including areas 1400 and 1404 a times. Similarly, end projector devices 1393 may project into areas that are keyed to and aligned with the areas projected by side projector devices so that an entire single projected image or persistent content may be presented on an ambient floor surface about affordance 1380.

Figure 50:
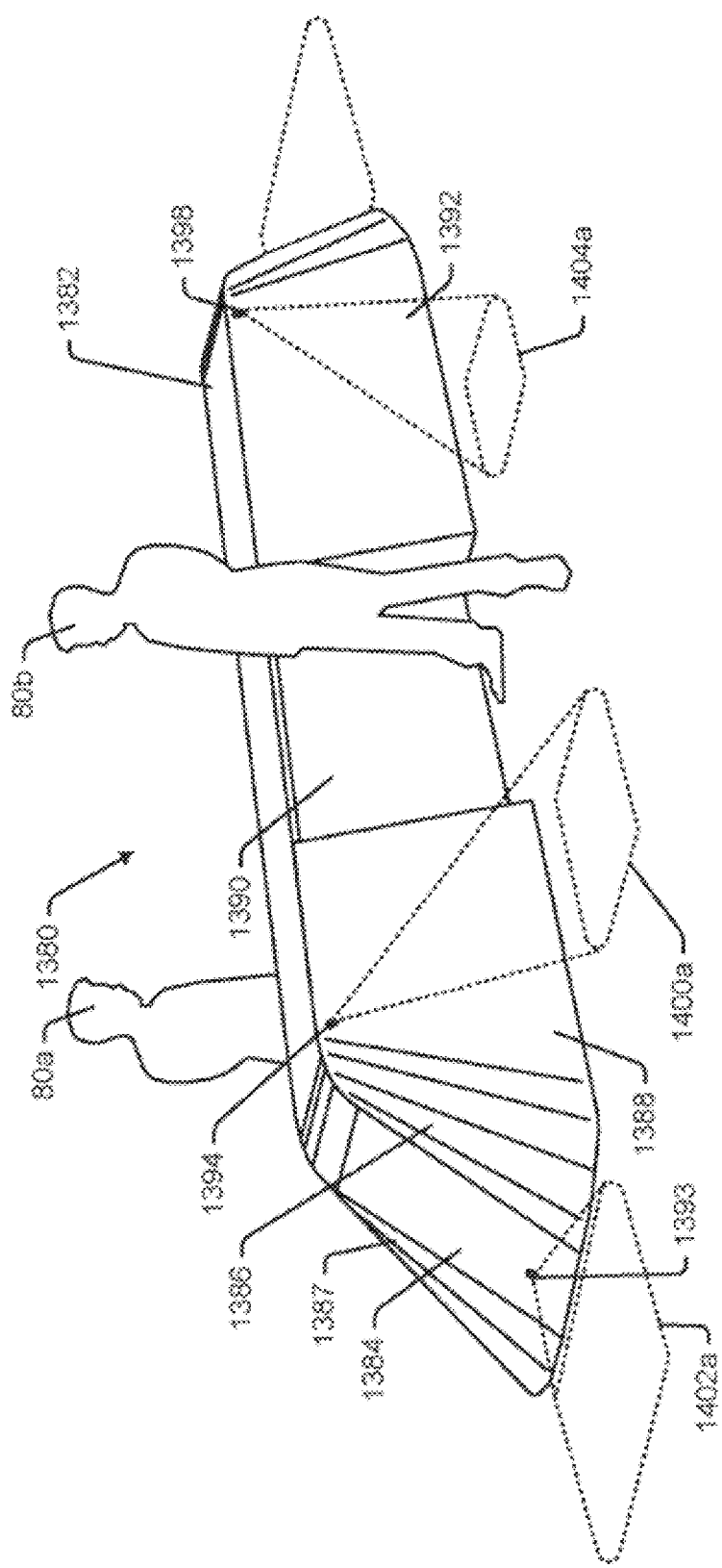
FIG. 50 is another view of the FIG. 49 affordance, albeit in a different operational state.

Referring yet again to FIG. 49, when no employee is near the illustrated side of affordance 1380 or no employee has halted next to a trigger area proximate that side (e.g., an area immediately adjacent the central side surface 1390), projectors 1394 and 1398 may persistently project general information into areas 1400 and 1404 as shown. Referring also to FIG. 50, once an employee 80*b* moves into a trigger space or halts at a trigger location (e.g., generally performs some trigger activity), the system server may alter projected content as shown at 1400*a* and 1404*a* to automatically present other information useful to the employee at surface 1382. Similarly, content projected by end devices 1393, etc. may be automatically altered and on the affordance surfaces may be automatically altered based on employee trigger events or activities. Thus, floor as well as affordance surfaces may be used to present different content to employees at different times depending on employee juxtaposition and interaction with the affordance 1380.

Figure 51:
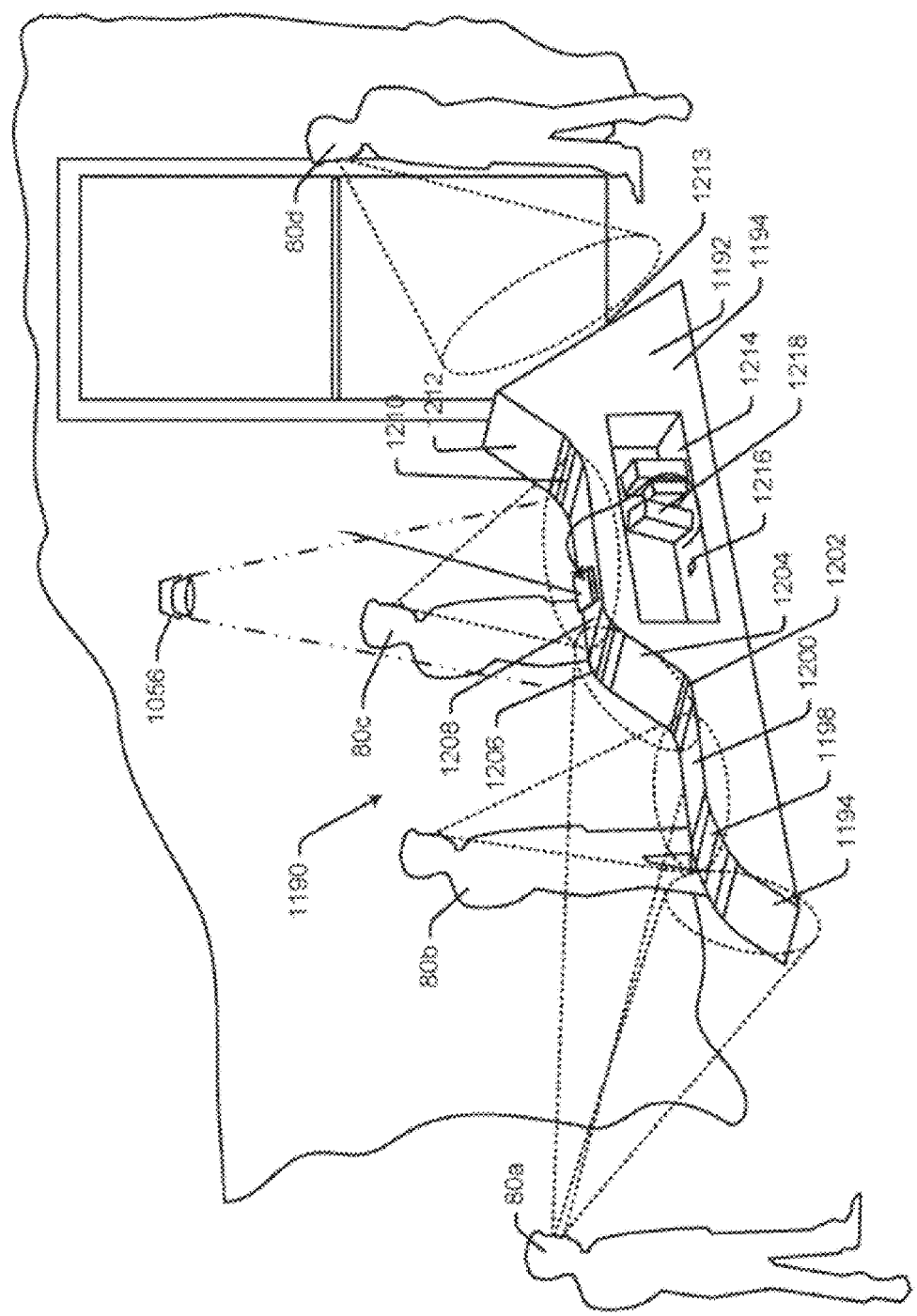
FIG. 51 is a view similar to the view of FIG. 39, albeit showing yet another sub-foveal emissive surface configuration.
Figure 52:
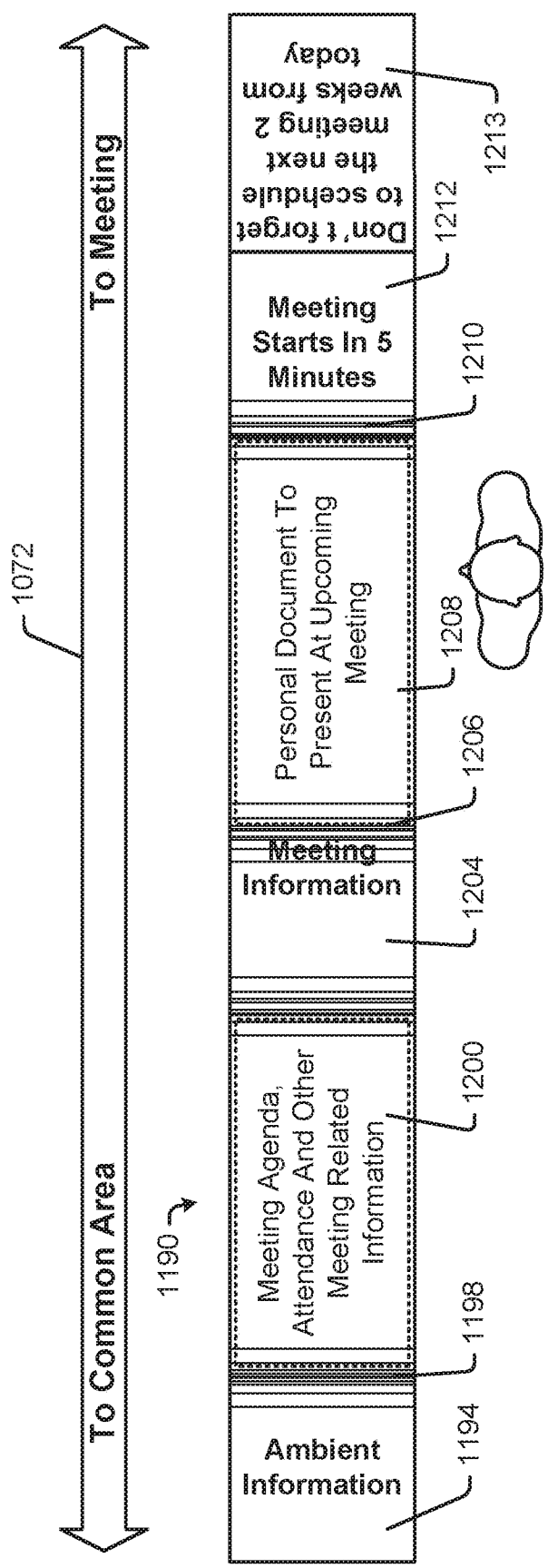
FIG. 52 is a top plan view of the affordance shown in FIG. 51.

Referring now to FIGS. 51 and 52, another exemplary affordance 1190 is illustrated that include a contiguous upward facing emissive surface supported by an understructure 1192. As shown, the undulated surface includes five substantially flat sections 1194, 1200, 1204, 1208 and 1212 that are separated by four curved sections 1198, 1202, 1206 and 1210 for a total of nine emissive surface sections, each being uniquely juxtaposed or oriented by the understructure 1152. Here, any of the aspects of the affordances described above may be used to enhance employee experiences with affordance 1190. Affordance 1190 also includes a sixth flat emissive surface 1213 that is slanted rearward which is best seen in FIG. 52. Surface 1213 generally faces in a direction opposite slanted surface 1194 at the other end of affordance 1190. Slanted surfaces 1194, 1202 and 1212 may have angles with vertical planes that are within the ranges described above with respect to affordance 1150.

With any of the affordances illustrated where the affordance has an elongated shape, it is contemplated that information presented on at least a subset of the affordance emissive surfaces may be presented in a purposeful fashion to reflect proximity to some other affordance or activity within the ambient space. For instance, where affordance 1190 is located outside a conference space represented by the door in FIG. 51, content presented on the affordance surfaces may be arranged so that surfaces relatively closer to the door present content associated with an ongoing or upcoming meeting while affordance surfaces further away from the door present more general information. To this end, see the exemplary content indicated in FIG. 52 where legend 1072 indicates that a conference space associated with affordance 1190 is to the right as illustrated and a common area is to the left as illustrated. General ambient information is presented on surface 1194 and meeting related information is presented on the other flat surfaces where the information gets more on the surfaces as an employee moves from left to right as illustrated. Thus, general meeting agenda information is presented on surface 1200 and surface 1204, detailed confidential information like personal documents to be presented at a meeting are presented via surface 1208 and meeting start time information is presented on surface 1212. Specific information related to an ongoing meeting that is nearing its end is presented on surface 1213 for employees that are leaving that meeting. Thus, the presented information naturally progresses from general to more meeting specific as employees move toward the meeting space in at least some embodiments.

Referring again to FIG. 51, in at least some cases it is contemplated that an affordance may be able to at least semi-automatically access content related to one or more mechanical props useable with the affordance. To this end, for instance, see in FIG. 51 that standard books 1218 are stored on a bookshelf 1214 that is built into the understructure 1152 of affordance 1190. In at least some embodiments it is contemplated that a system server may either maintain a database including additional information associated with each book stored on shelf 1214 or may have access (e.g., via the Internet or some other network) to additional information so that when one of the books is removed from the shelf and placed on an affordance surface 1208, the server may automatically present at least a subset of the additional information and perhaps some interface tools (e.g., virtual touch selectable icons) for accessing or interacting with the presented information. For instance, if the author of a book produced a video interview describing the book plot or storyline, the additional information may include a video of the interview. As another instance, if the book was made into a movie or a play, a video of the performance of the story may be accessible. As one other instance, some critical review of the book or a book abstract may be presented as additional information.

Figure 56:
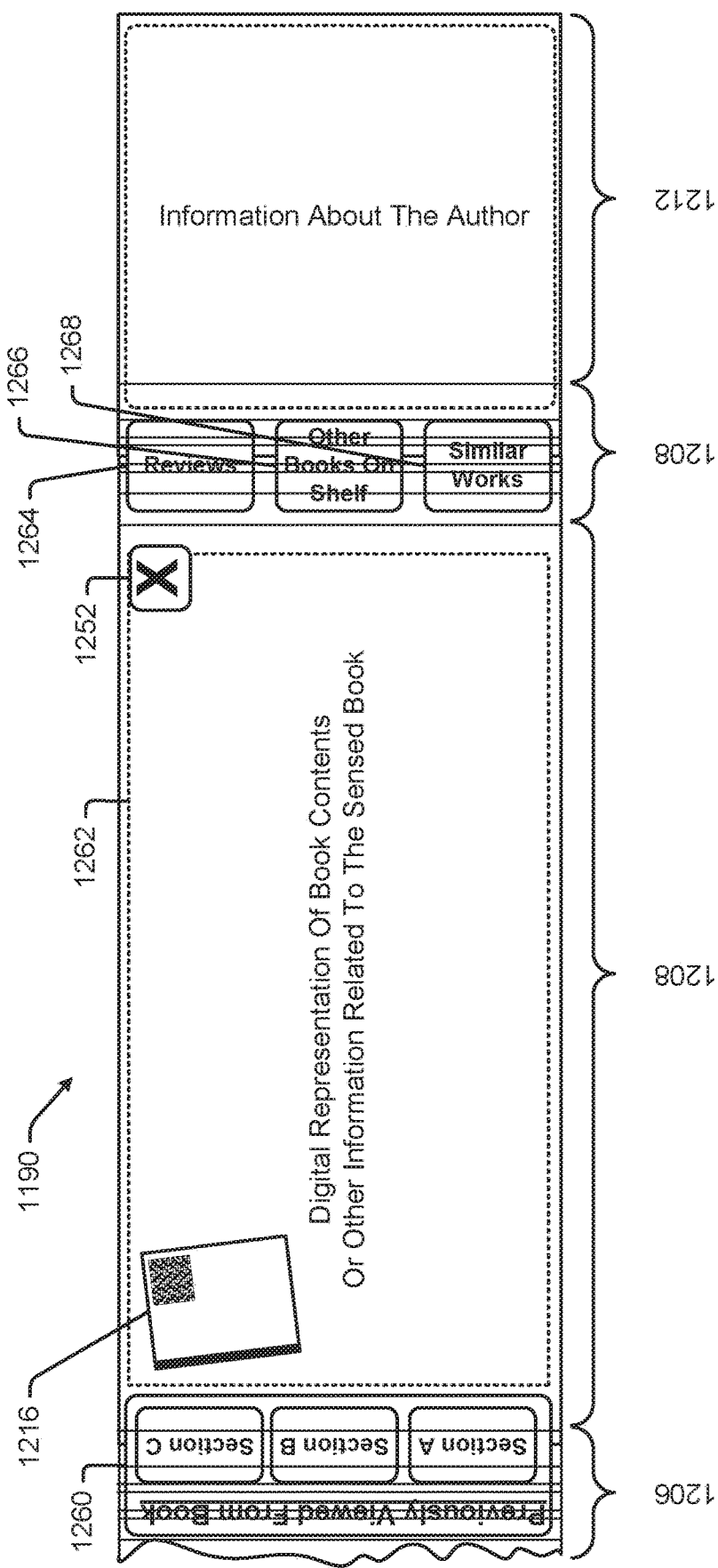
FIG. 56 is similar to FIG. 54, albeit showing the affordance presenting a different content set.

Referring to FIG. 51, camera 1056 is shown above surface 1208 having a field of view that includes the surface 1208 so that the camera can operate as a book sensor device. Here, the camera may read a bar or matrix type code from a cover on the book to identify the book and then access additional information. In this regard, see FIG. 56 that shows a book 1216 with a matrix code on the cover that may be read by camera 1056. In other cases other sensor types are contemplated. For instance, each book may include an RF ID or some other readable tag and a suitable reader may be built into surface 1208. In FIG. 56, exemplary digital book contents are shown at 1262 along with an exit icon 1252 selectable to close out the book related content if an employee wants to use surface 1208 for some other purpose. Other useful information presented to the employee includes previously accessed sections of the book 1216 presented at 1260, book reviews accessible at 1264, other books on the shelf as 1266 and a tool for accessing literary works that are similar to book 1216 at 1268.

Other mechanical props are contemplated that may be associated with a stored database of information that is accessible when the prop is presented on surface 1208 or one of the other affordance surfaces. For instance, an employee may be able to place her cell phone device on surface 1208 to access personal information via surface 1208. As another instance, an employee may be able to place a statue or other prop that represents a next meeting to occur in an adjacent conference space on surface 1208 to access detailed meeting (e.g., meeting content, agenda, attendee list, etc.) information via surface 1208.

Affordance 1190 is shown with a bookshelf sensor device 1216 in the bookcase area 1214 which may sense all books or other mechanical props stored therein. Here, where a separate memory device is associated with affordance 1190, content related to props placed in bookshelf area 1214 may be automatically accessed and cached in the affordance specific database to facilitate quick access thereto when required. In some cases a menu of props stored in bookshelf area 1214 may be presented to an employee via surface 1208 to make the employee aware of available props on the shelf. Here, instead of requiring an employee to place a book or other prop on surface 1208 to access additional related information, a user interface may enable an employee to select one of the menu options to hyperlink to additional content related thereto.

It has been recognized that in cases where an affordance provides emissive surfaces at different heights, in at least some embodiments it is useful to arrange surface content in a manner that reflects temporal consideration thereof. Thus, for instance, content that has previously been viewed may be presented on a first surface area, content currently being considered may be presented on a second surface area and content that may be accessed or that is being suggested to an employee for consideration may be presented on a third surface area. In particularly advantageous embodiments, the first, second and third areas may comprise a relatively low area, a mid-height area and a relatively high emissive surface area, respectively, where the mid-height area is generally in front of an employee. This arrangement of different content types creates a sense of ideas and content descending from on high, being considered and then continuing to descend into the past.

Figure 53:
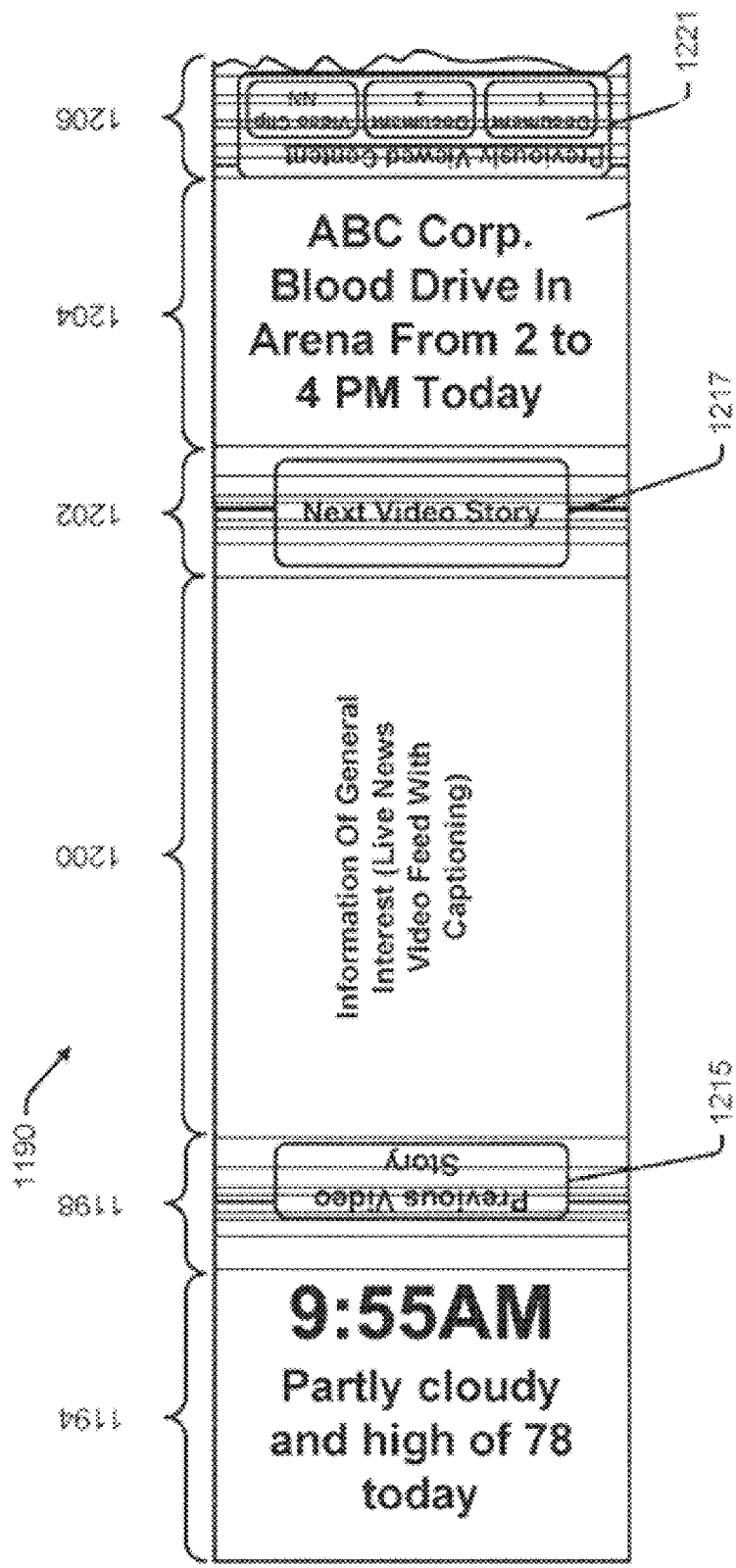
FIG. 53 is a top plan view of a portion of the affordance shown in FIG. 52 with a specific set of content presented.
Figure 54:
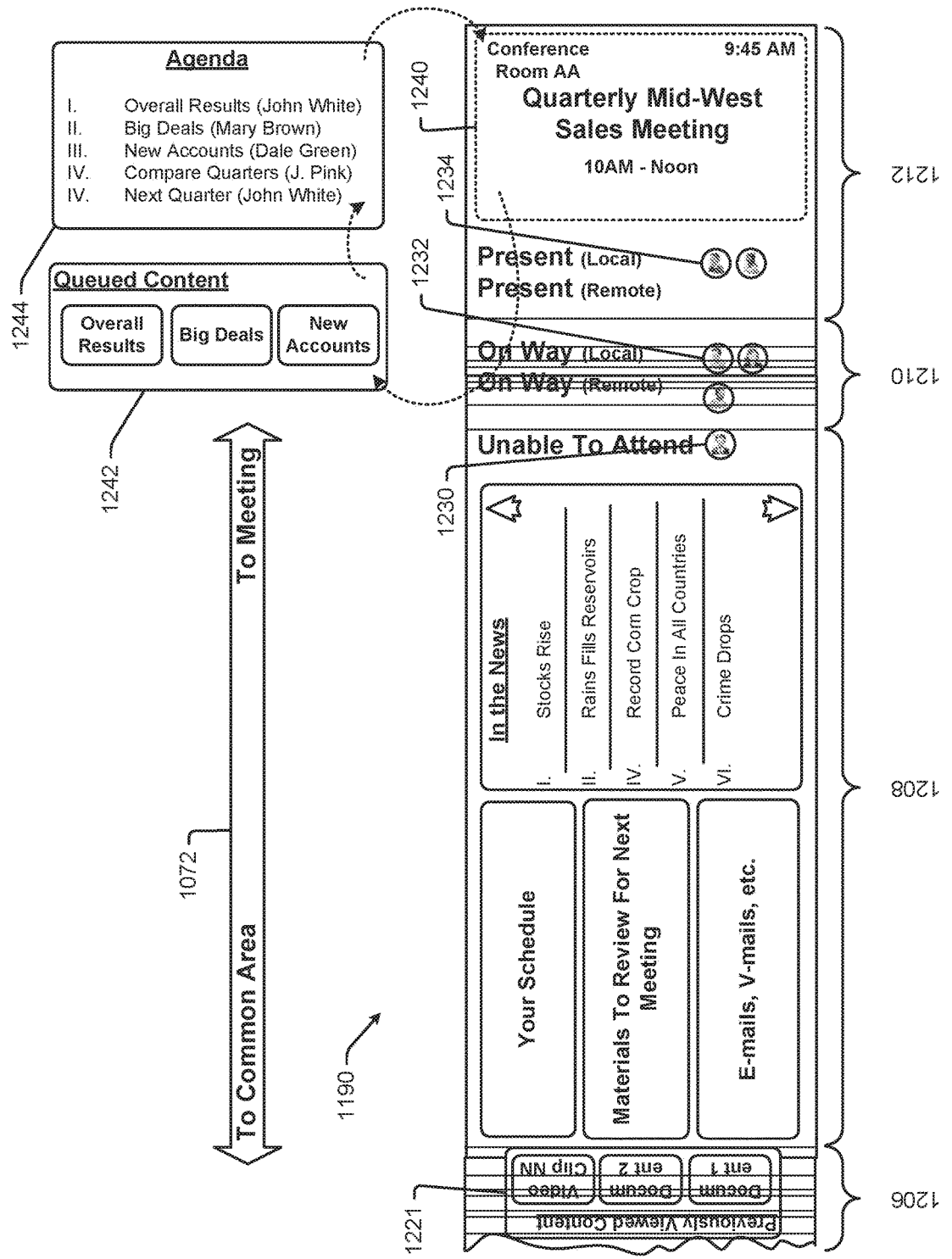
FIG. 54 is similar to FIG. 53, albeit showing the balance of the affordance shown in FIG. 52 with a specific set of content presented.
Figure 55:
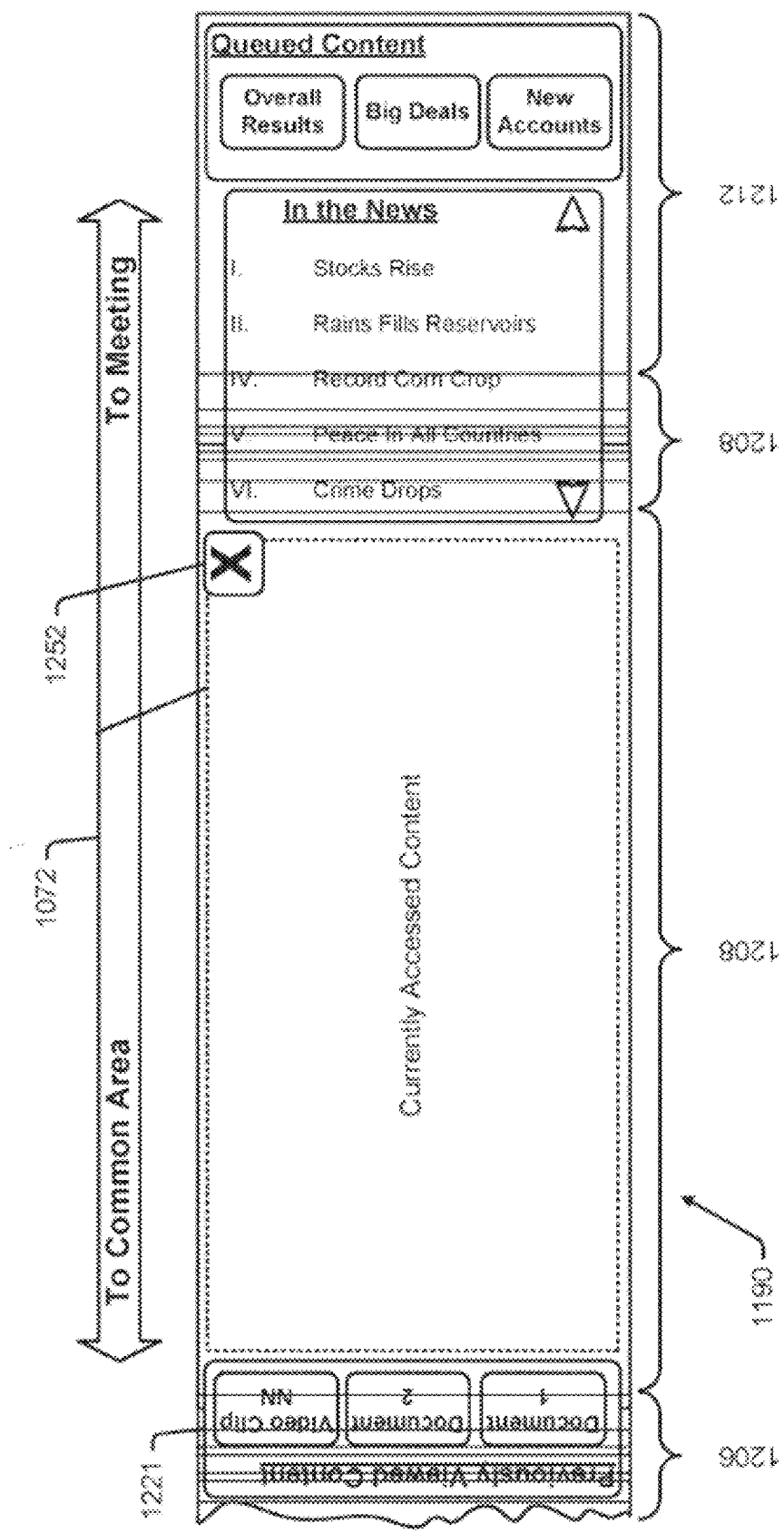
FIG. 55 is similar to FIG. 54, albeit showing the affordance presenting a different content set.

Referring now to FIGS. 53 and 54, another exemplary content presentation arrangement in the context of the affordance 1190 shown in FIG. 51 is illustrated. In this example, surfaces 1198, 1200 and 1202 are controlled together to support a first employee adjacent surface 1200 and surfaces 1206, 1208 and 1210 are controlled together to support a second employee adjacent surface 1208. The other surfaces provided by affordance 1190 are controlled to provide ambient and general meeting information for other employees in the general vicinity of affordance 1190.

Referring to FIG. 53, currently considered information in the form of a live news feed is shown presented on surface 1200. Next video content to be presented is shown at 1217 on upper curved surface 1202. Here, in some cases an employee may have no choice which video is played on surface 1200 next and may simply be fed the next story after the current video is completed. In other cases, while not ideally situated in some embodiments, an employee interface may be presented on surface 1202 for selecting a next video to play (i.e., either the next queued video, a previously played video or some other video in the queue). A previously played video is represented at 1215 on the lower curved surface 1198 to indicate a video played just prior to the currently presented video. Area 1215 may indicate several prior played videos. Thus, new or suggested next content to consider is presented via relatively high emissive surface section 1202, current content is presented via horizontal surface 1200 and previously considered content is presented via lower curved emissive surface 1198.

Referring to FIG. 54, in a similar fashion, currently considered content is presented on surface 1208 and content previously considered by an employee currently considering the content on surface 1208 is presented at 1221 on lower curved surface 1206 to simulate the idea of content falling out of the employee's consciousness off the rolling lower edge. While not shown, suggested next content may be presented to the user adjacent surface 1208 on the curved upper surface 1210 in a fashion similar to that described above with respect to surface 1202.

It has also been recognized that where an affordance presents emissive surfaces in different planes, those planes can be used to represent information about an activity that mirrors a spatial aspect of the activity and that therefore imparts information about the activity in a particularly intuitive way. For instance, see again FIG. 54 where sections of each of surfaces 1208, 1210 and 1212 are used to present meeting attendee status information in a way that spacially reflects current employee status. Here, the left section of surface 1212 as illustrated is reserved for indicating employees 1234 that are current present ether locally or remotely (e.g. via telepresence or audio conference) for a meeting, the curved surface 1210 is reserved for indicating employees 1232 that the system server has determined are on their way to the meeting and the right section of surface 1208 as illustrated is reserved for indicating employees 1230 that were scheduled to attend the meeting but not are not going to attend for some reason. Thus, the left part of surface 1212, surface 1210 and the right part of surface 1208 represent the meeting space, including local or real as well as virtual, employees on their way but not currently in the meeting space an employees that are not on their way and that are not in the meeting space, respectively. The transition from one surface section to another can be clearly visually sensed by an employee proximate affordance 1190.

In at least some cases it is contemplated that one or more of the affordance surfaces will be optimally positioned to present certain types of information but may be too small to present all types of useful information at the same time. Here, in some cases it is contemplated that the system server may continually cycle different content or information onto an optimal surface in a sequential fashion. To this end, see FIG. 54 that shows different subsets of useful meeting information in windows 1240, 1242 and 1244 that may be cycled through on the right hand portion of slanted surface 1212. Thus, for instance, each of windows 1240, 1242 and 1244 may be presented for 5-10 seconds and then swapped out for a next of the windows in the sequence.

Figure 57:
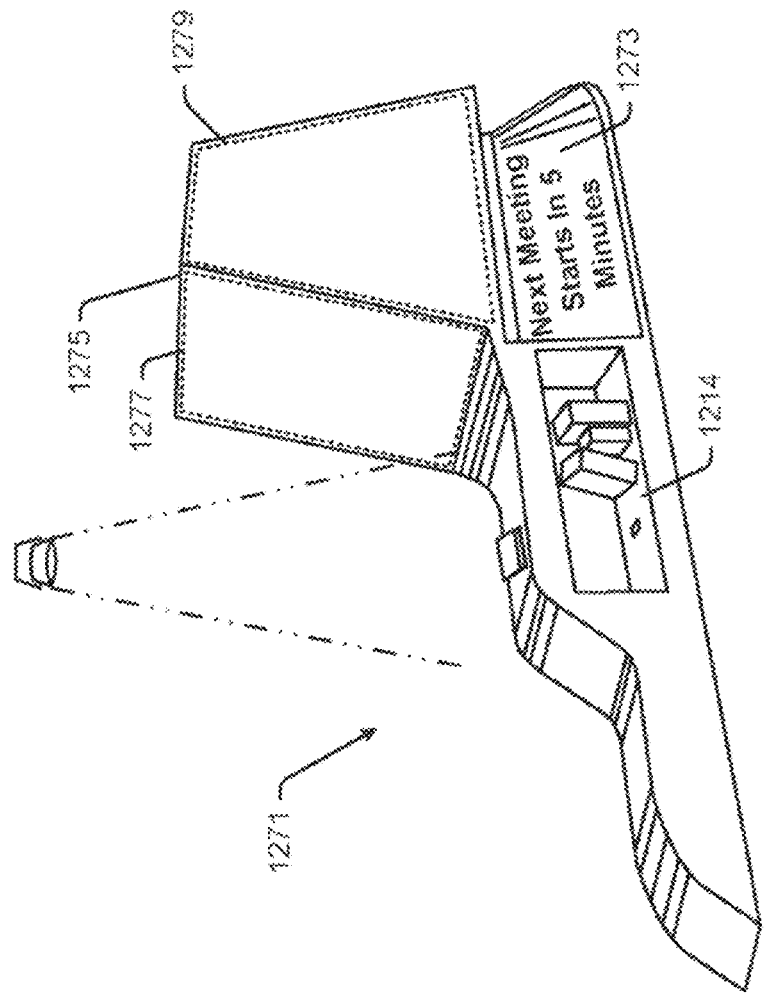
FIG. 57 is a perspective view similar to the view in FIG. 39, albeit of an affordance that includes a sub-foveal portion as well as a totem or kiosk section that extends upward to a height within a typical foveal field of view.

Referring now to FIG. 57, yet one more affordance embodiment 1271 is illustrated that have many characteristics that are similar to different affordance embodiments described above. In general, much of affordance 1271 is similar to affordance 1190 shown in FIG. 51 in that affordance 1271 includes an undulating emissive top surface with flat surface sections separated by curved sections as well as a bookshelf area 1214 for storing mechanical props that may be used with the affordance and system in general. However, in addition to undulating top surface and bookshelf structure, affordance 1271 also includes an integrated vertical kiosk section 1275 that extends upward on a side of the upper horizontal surface opposite the lower horizontal surface. In the illustrated embodiment, kiosk section 1275 includes four substantially flat and vertical side emissive surfaces, one 1277 surface facing the elongated lower portion of the affordance 1271, a second surface (not illustrated or labelled) facing in the direction opposite the direction in which surface 1277 faces and first and second lateral side surfaces (only one illustrated and labelled 1279) that face to opposite lateral sides of affordance 1271. In addition to the emissive surfaces presented on the four sides of section 1275, a recessed and slanted lower emissive surface 1273 that wraps around three sides of the lower portion of the kiosk section 1275 is provided. As in the case of several other slanted lower emissive surfaces, surface 1273 is recessed so that its lower edge is at least substantially within the space directly below the upper portion of the kiosk section 1275 so that the lower surface does not get in the way of an employee's feet while using one of the upper kiosk surfaces to access information.

While content presented on emissive surfaces and content projected onto ambient or affordance surfaces can be used in various ways to support employees in a space, in at least some embodiments it is also contemplated that a sub-foveal emissive surface affordance may include at least some components that move to support employees differently at different times. For instance, in some cases a single affordance may be configured in one way to present information to employees that are casually walking by and may be automatically configured in a second way to support an employee that stops at the affordance to interact therewith in some fashion.

Figure 58:
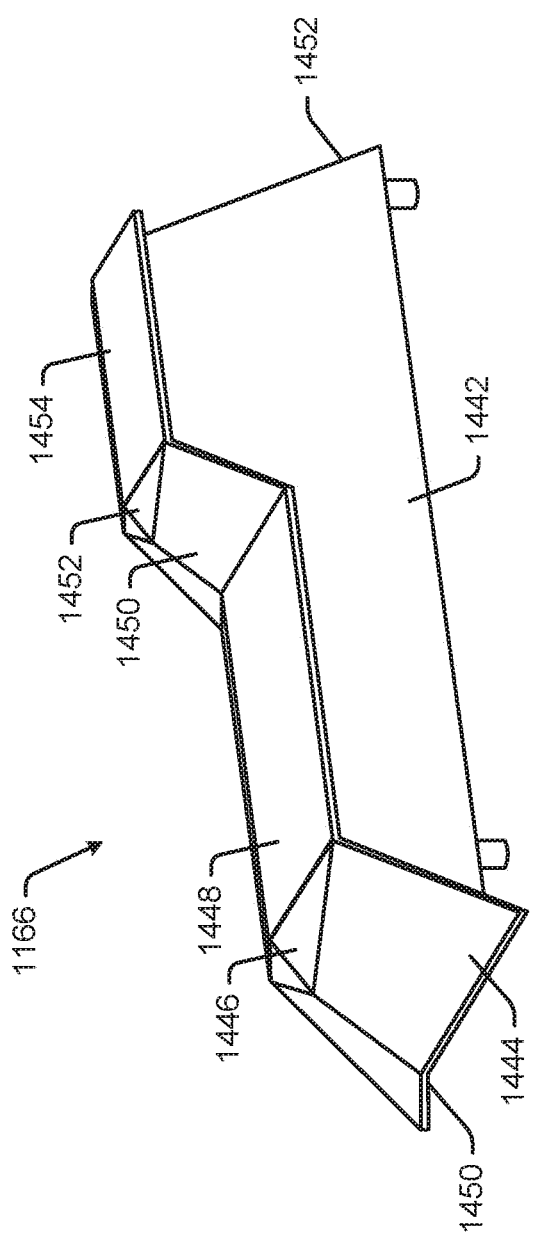
FIG. 58 is a view similar to the view of FIG. 39, albeit showing yet another sub-foveal emissive surface configuration.

Referring now to FIG. 58, yet another affordance configuration 1440 is illustrated that includes a supporting understructure 1442 and twelve sub-foveal emissive surfaces that form an upper shell on the understructure. The twelve emissive surfaces include two groups of six surfaces each where the first six surfaces are supported on one side of the understructure and the second six surfaces are supported on the other side of the understructure. Affordance 1440 is symmetrical along its center line so that the six surfaces on one side are substantially identical to the six surfaces on the other and therefore only one of the six surface groups will be described here in detail. The first six surface group includes first, second, third, fourth, fifth and sixth surfaces 1444, 1446, 1448, 1450, 1452 and 1454, respectively, each of which is at least somewhat slanted rearward from a distal outer edge toward the center of understructure 1442. Thus, each of the first through sixth surfaces is slanted so that it is easier to view from one lateral side than the other. The degree of slant from the outer edges toward the center of affordance 1440 is, in at least some embodiments, between 10 and 45 degrees with respect to a horizontal plane and, in some cases, may be within a range between 15 and 20 degrees. The surfaces that comprise the second group and that are located on the side of affordance 1440 opposite the first group are also slanted from lower outer edges toward the center of understructure 1442 so that those surfaces are more easily viewed from the side of affordance 1440 opposite the first surface group. In addition, each of surfaces 1444 and 1448 angle rearward from a front end of affordance 1440 at 1450 toward a rear end at 1452. The degree of slant from forward to rearward of surfaces 1444 and 1448 may be within any of the angle A ranges described above. Moreover, each of surfaces 1446 and 1450 also angle rearward from the front end 1450 toward the rear end 1452 where the degree of rearward slant is greater than that of surfaces 1444 and 1448.

In the case of affordance 1440, it should be appreciated that the minimal side to center slant of the first and second surface groups has several advantages. First, because each surface slants to a specific side, the surface orientations and information thereon will naturally encourage employees to split to opposite sides of affordance 1440 to view content. In addition, while angled surfaces 1448 and 1454 enhance viewing capabilities of employees on one side of affordance, the angles make it more difficult for employees on the other side to see and comprehend content on the other side. Thus, content privacy is increased substantially by simply angling surfaces to different affordance sides.

Figure 59:
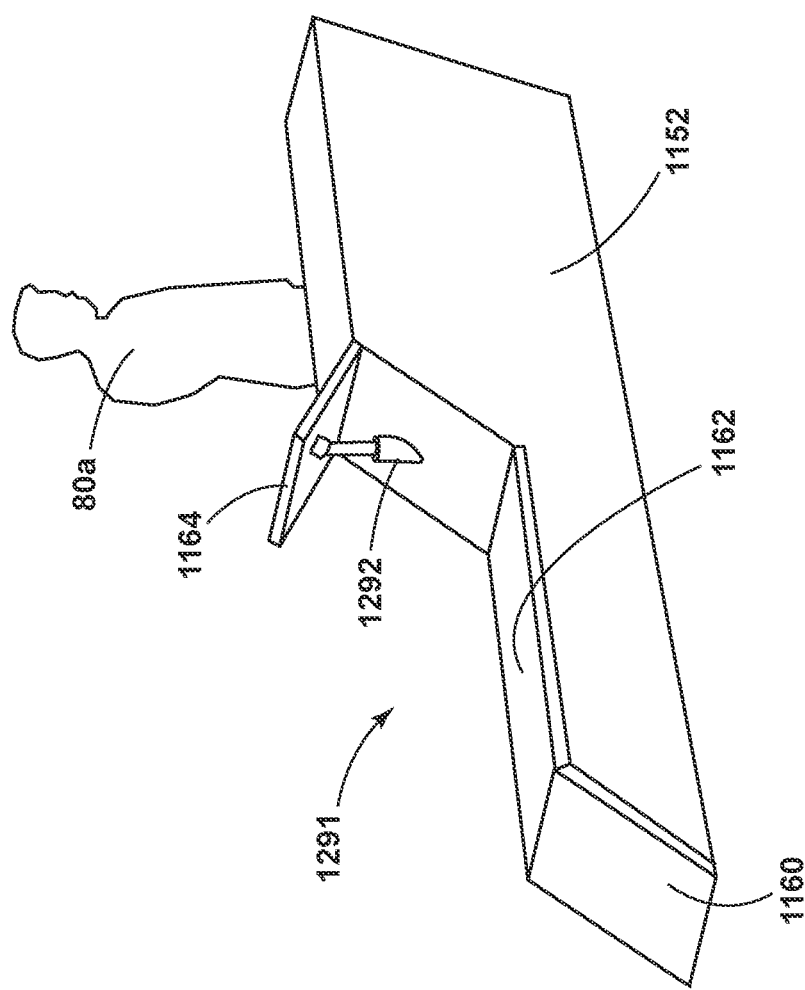
FIG. 59 is a view similar to the view in FIG. 39, albeit of an affordance where one of the emissive surfaces is raised into a secondary use position to support an employee adjacent the affordance.

FIG. 59 shows one dynamic affordance 1291 that is consistent with at least some aspects of the present disclosure. Referring also and again to FIG. 39, affordance 1291 is similar in appearance to affordance 1150 described above at least in one state. In this regard, affordance 1291 includes an understructure 1152 that supports four flat panel emissive surfaces 1160, 1162, 1164 and 1166 in slanted lower, horizontal lower, slanted upper and horizontal upper orientations, respectively. However, affordance 1291 differs from affordance 1150 in that affordance 1150 includes first, second and motive configurations or subassemblies 1292, 1294 and 1295, respectively, below surfaces 1164, 1160 and 1162 that are controllable to change the angles of surfaces 1160 and 1164 as well as their heights and to change the height of surface 1162.

Referring again to FIGS. 39 and 59, in at least some cases while employees are randomly walking by affordance 1271, the affordance may have the appearance of affordance 1150 shown in FIG. 39. If an employee walks up to surface 1166 and halts to view content thereon, in at least some cases the employee's halting at surface 1166 may operate as a trigger event causing the system server to drive motive configuration 1292 to push upward on the underside of surface 1164. In some cases the edge of surface 1166 may be hinged to an adjacent edge of stationary horizontal surface 1166 and the upper end of subassembly 1292 may be pivotally and slidingly attached to the underside of surface 1164 so that as an upper shaft of configuration 1292 is forces upward, surface 1164 rotates about the hinge axis and surface 1164 moves into an angled position as shown in FIG. 60 to support the employee 80*b* adjacent surface 1166.

Figure 60:
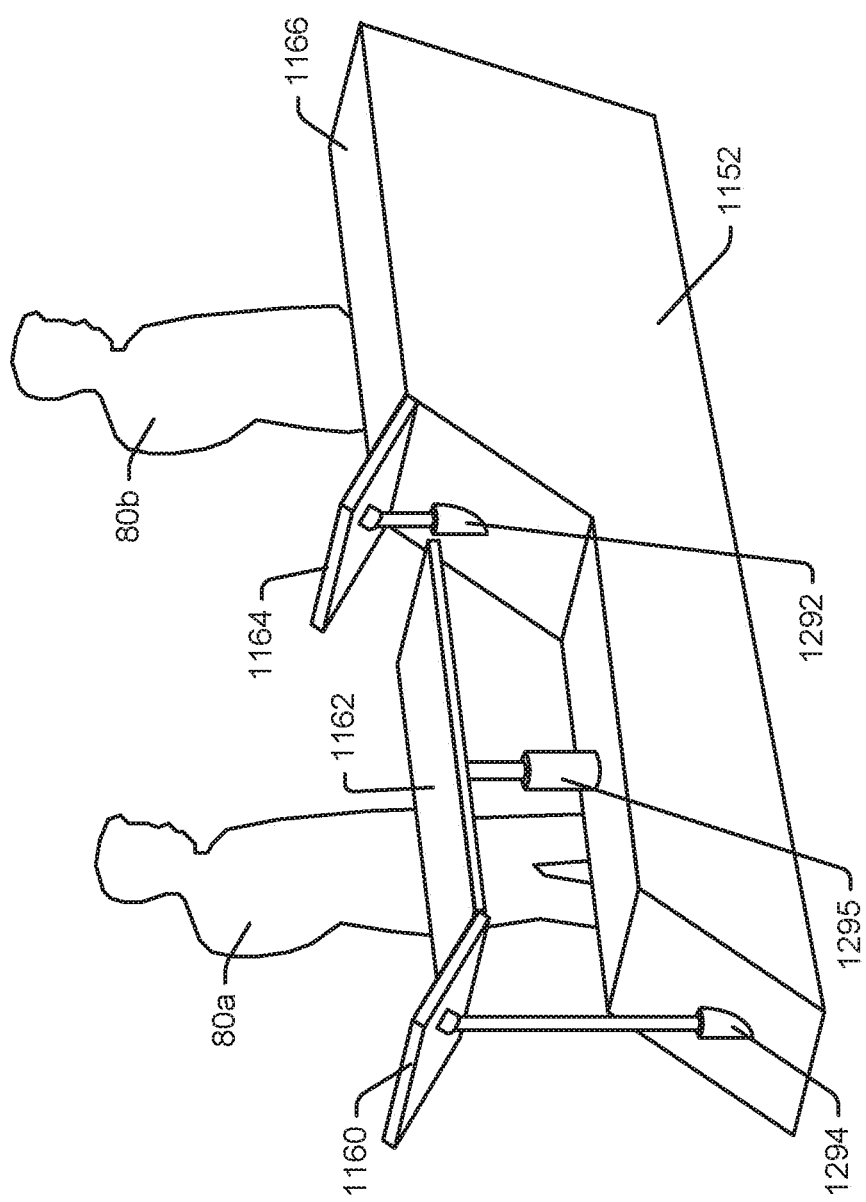
FIG. 60 is similar to FIG. 59, albeit showing several emissive surfaces raised into secondary positions to support first and second employees adjacent the affordance.

Similarly, if an employee walks up to and halts adjacent surface 1162, the system server may control motive configurations 1294 and 1295 to raise surface 1162 to a standing working height (e.g., the height of surface 1166) and to raise and angle surface 1160 to a height and angle similar to the height and angle of surface 1164 as shown in FIG. 60. Again, surface 1160 may be hinged to an adjacent edge of surface 1162 and an upper end of configuration 1294 may be pivotally attached to an underside of surface 1160.

Figure 61:
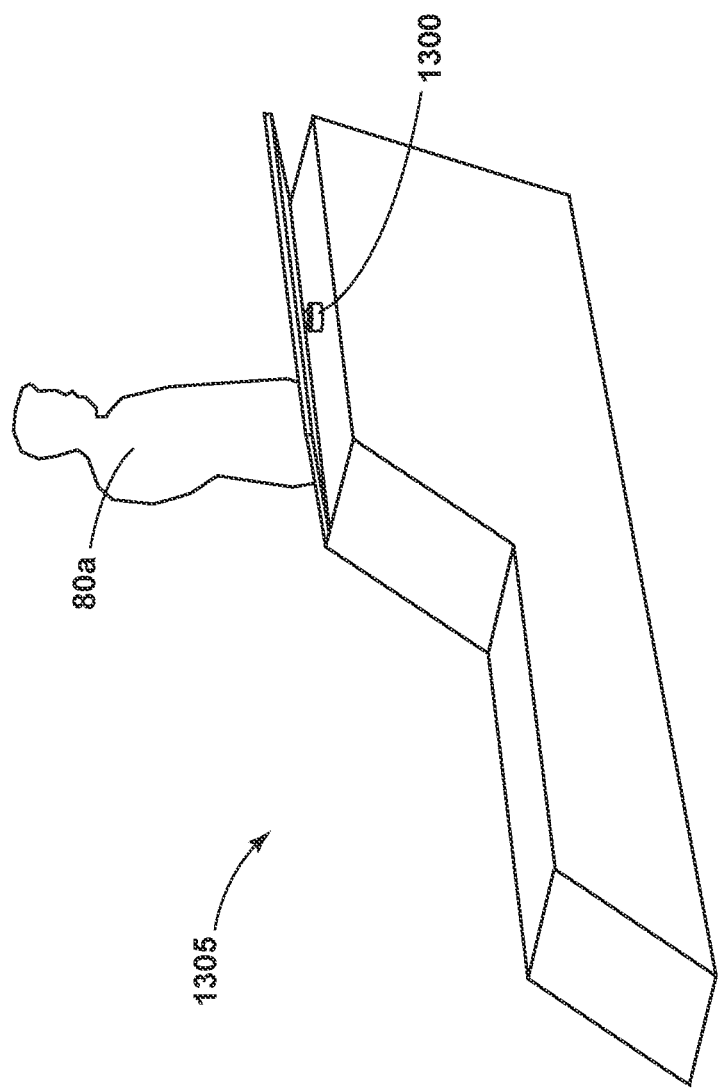
FIG. 61 is a view similar to the view in FIG. 39, albeit of an affordance where one of the emissive surfaces is raised into a secondary use position to support an employee adjacent the affordance.

FIG. 61 shows yet another sub-foveal emissive surface affordance 1305 that includes an understructure 1152 akin to the structure described above with respect to FIG. 39 and that also includes surfaces 1160, 1162, 1164 and 1166 that are arranged, at least at times, as described above with respect to FIG. 39. In FIG. 61, however, emissive surface 1166 is hinged along at least one long side edge and a motive configuration 1300 is provided for driving surface 1166 into different use positions. An upper end of configuration 1300 may be pivotally and slidingly connected to the underside of surface 1166. Here, when an employee halts at surface 1166 to use that surface to access information, the system server may sense the employee's actions as a trigger activity and may automatically tilt surface 1166 upward as shown to provide a better viewing angle and more work product privacy to the employee. In some cases surface 1166 may be dual hinged so that it can be rotated about either lateral side edge to support an employee on either lateral side of affordance 1305.

Referring now to FIG. 62, yet another emissive surface structure, this time an upright totem, is shown at 1320 that includes a generally upright housing or support structure 1322 that supports an upper emissive surface 1326, an intermediate emissive surface 1328 and a lower emissive surface 1330. Support structure 1322 is supported on casters so that the structure 1320 can be moved about manually within an ambient space. In some cases totem structure 1320 may include a motor for moving the totem about in an ambient space automatically.

Figure 63:
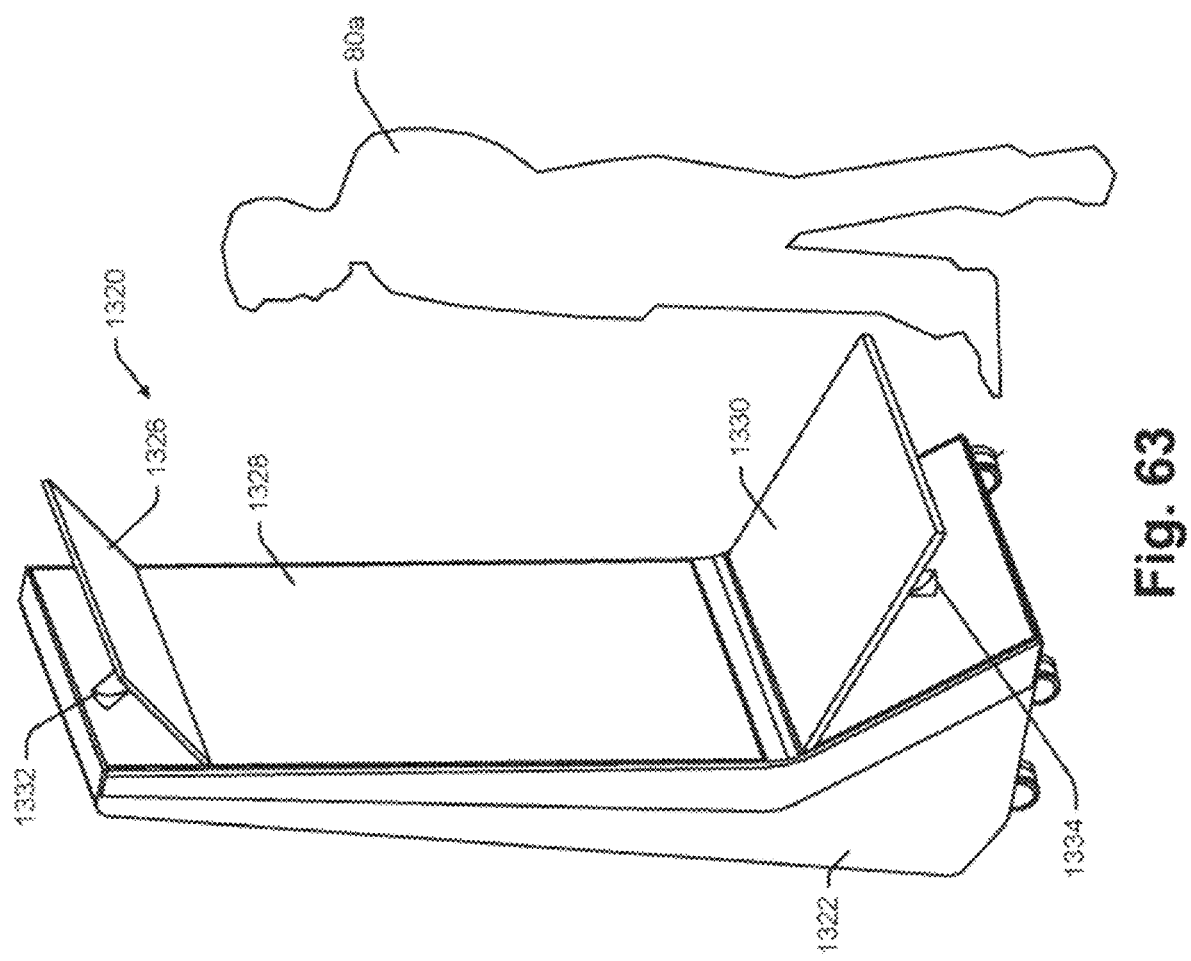
FIG. 63 is a view of the totem of FIG. 62, albeit in a different operating state.

Referring also to FIG. 63, totem 1320 also includes first and second motive configurations 1332 and 1334 behind surfaces 1326 and 1330 that can be controlled to change tilt angles of the two surfaces. While not shown, totem 1320 may also include a wireless transceiver for receiving control signals from a system server via access points in the general vicinity. In operation, when no employee is in close proximity to totem 1320 as shown in FIG. 62, surfaces 1326 and 1330 are in parked or stored positions where surface 1326 is substantially vertically oriented and an edge thereof is substantially flush with an adjacent edge of surface 1338. When stored, surface 1330 is angled upward to provide better viewing angles for an employee to one side of the totem 1320. In at least some cases, once an employee moves to a location relatively close to and within some threshold distance of totem 1320 (e.g., within 3 feet of the emissive surfaces), the server may cause motive configurations 1332 and 1334 to extend and thereby change the angles of surfaces 1326 and 1330 to be more easily viewed by the employee 80a as shown in FIG. 63.

Here, it should be appreciated that relatively minor adjustments in emissive surface slant can have a large impact on how useful those surfaces are to an employee as the employee's location with respect thereto changes. Thus, when an employee is distant from totem 1320, the employee's lines of sight are best if surfaces 1326 and 1330 are in their parked or stored positions as shown in FIG. 62. When the employee is proximate totem 1320 as in FIG. 63, movement of surfaces 1326 and 1330 to more directly face the employee renders those surfaces and more specifically the information presented on those surfaces easier to see and therefore more useful.

Figure 64:
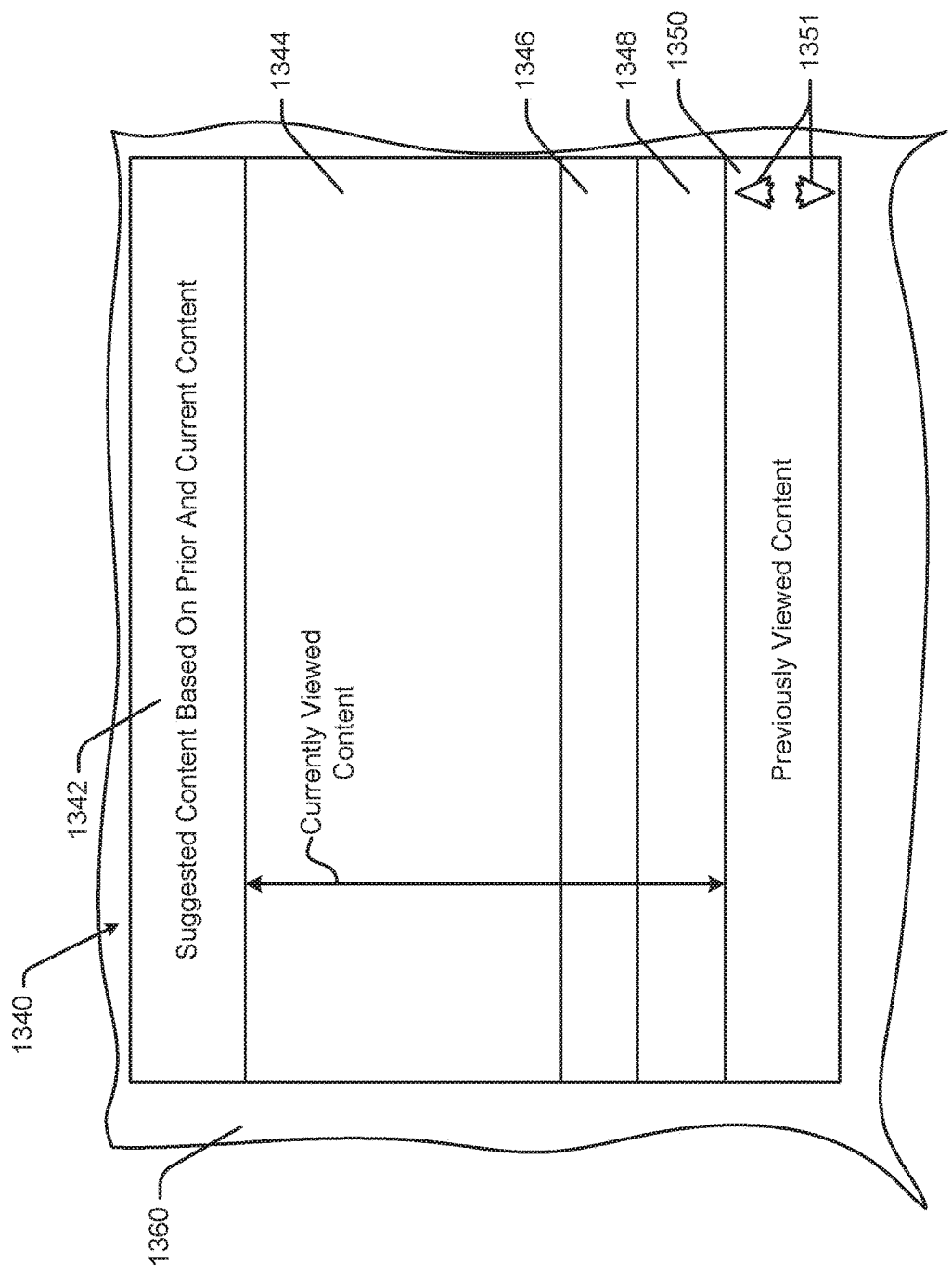
FIG. 64 is a front perspective view of a wall mounted emissive surface assembly that includes several stationary and several moveable surfaces that may be arranged differently to support an employee at different locations within an environment relative to the location of the assembly.
Figure 65:
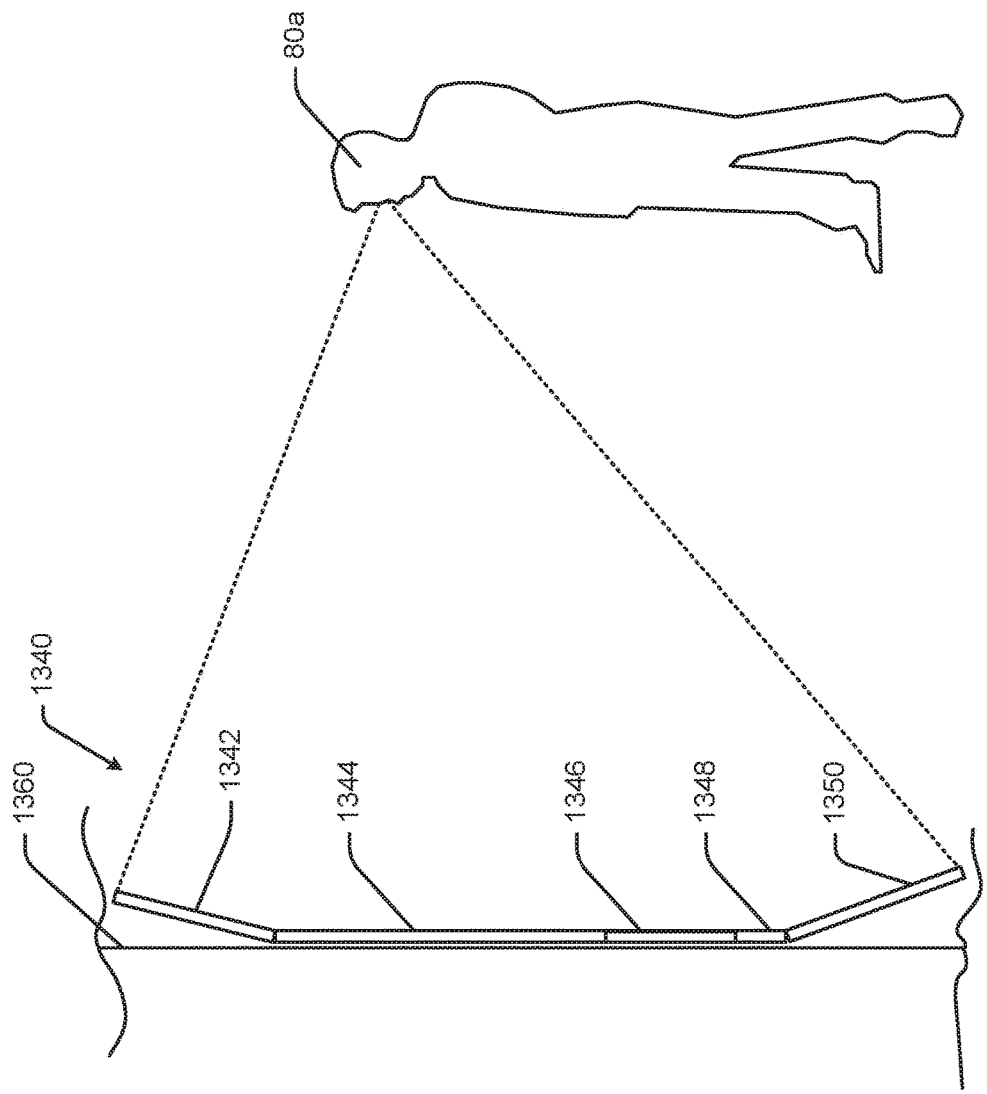
FIG. 65 is a side view of the assembly of FIG. 64.

Referring now to FIGS. 64 and 65, yes another emissive surface configuration 1340 is illustrated that includes a plurality of emissive surfaces mounted to a supporting wall structure 1360. The exemplary emissive surface structure includes first, second, third fourth and fifth substantially rectilinear emissive surfaces 1342, 1344, 1346, 1348 and 1350, respectively. Second surface 1344 is a foveal view surface which is located at a height and has a height dimension such that it substantially fills an area that should include the typical foveal field of view of an employee located in front of the surface 1344. To this end surface 1344 will have a height dimension between 24 and 48 inches and in a particularly advantageous case will have a height dimension between 30 and 42 inches and a width dimension of at least 24 to 36 inches.

Referring still to FIG. 65, first surface 1342 is located above second surface 1344 and has a lower edge that abuts the upper edge of surface 1344. Surface 1342 is located above a typical foveal field of view of an employee but can be viewed if an employee in front thereof turns her line of sight slightly upward. In at least some embodiments surface 1342 may be angled at least slightly downward when in a stored or parked position so that employees there below have a better line of sight to the surface. In other cases surface 1342 may be substantially vertically oriented when in the parked position.

Third surface 1346 is located below second surface 1344 and has an upper edge that abuts the lower edge of surface 1344. Surface 1346 is located below a typical foveal field of view of an employee but can be viewed if an employee in front thereof turns her line of sight slightly lower. Surface 1346 is substantially vertically oriented when in a stored position.

Fourth surface 1348 is located below third surface 1346 and has an upper edge that abuts the lower edge of surface 1346. Surface 1348 is substantially vertically oriented at all times (e.g., does not move).

Fifth surface 1350 is located below fourth surface 1348 and has an upper edge that abuts the lower edge of surface 1348. In at least some embodiments surface 1350 may be angled at least slightly upward when in a stored or parked position so that employees there above have a better line of sight to the surface. In other cases surface 1350 may be substantially vertically oriented when in the parked position.

In addition to including the surfaces described above, assembly 1340 also includes telescoping subassemblies or some other type of assembly capable of moving surfaces 1342, 1346 and 1350 between different angled positions. While not illustrated, the telescoping subassemblies or other assemblies would operate in a fashion similar to that described above with respect to other embodiments. The telescoping subassemblies include a first subassembly associated with surface 1342, a second subassembly associated with surface 1346 and a third subassembly associated with surface 1350.

Figure 66:
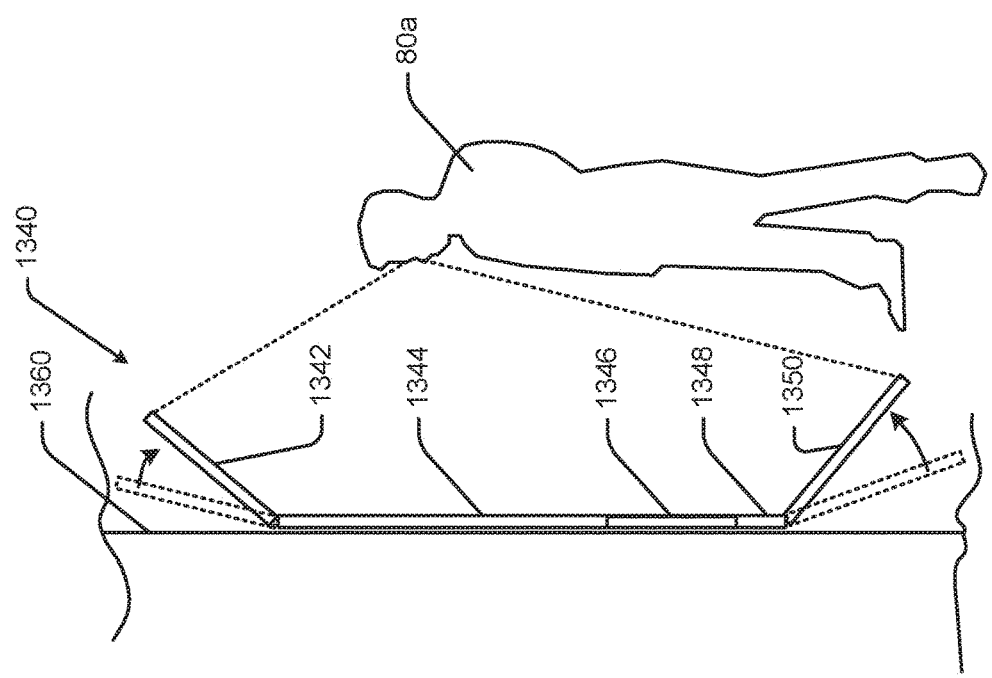
FIG. 66 is a view similar to the FIG. 65 view, albeit where a subset of the moveable surfaces has been driven into a different position to support an employee that has moved toward the assembly.

In operation, when employees are spaced a relatively large distance from assembly 1340 as shown in FIG. 65, all of the surfaces are in their parked positions where they are either vertically oriented or, in the case of the first and fifth surfaces 1342 and 1350, are angled slightly downward and upward, respectively, so that viewing angles thereto by distant employees are improved. As an employee moves closer to subassembly 1340, the employee's position may be sensed via cameras, proximity sensors or other sensor types and may operate as a trigger for the system server to change the angles of assembly 1340 surfaces. More specifically, referring to FIG. 66, as employee 80a moves toward assembly 1340 and gets within some threshold distance thereof, the system server may control the first and third telescoping subassemblies to increase the angles with respect to a vertical plane of surfaces 1342 and 1350, respectively, to a degree generally calculated to maintain an employee's line of sight substantially perpendicular to each of the surfaces 1242 and 1350.

Figure 67:
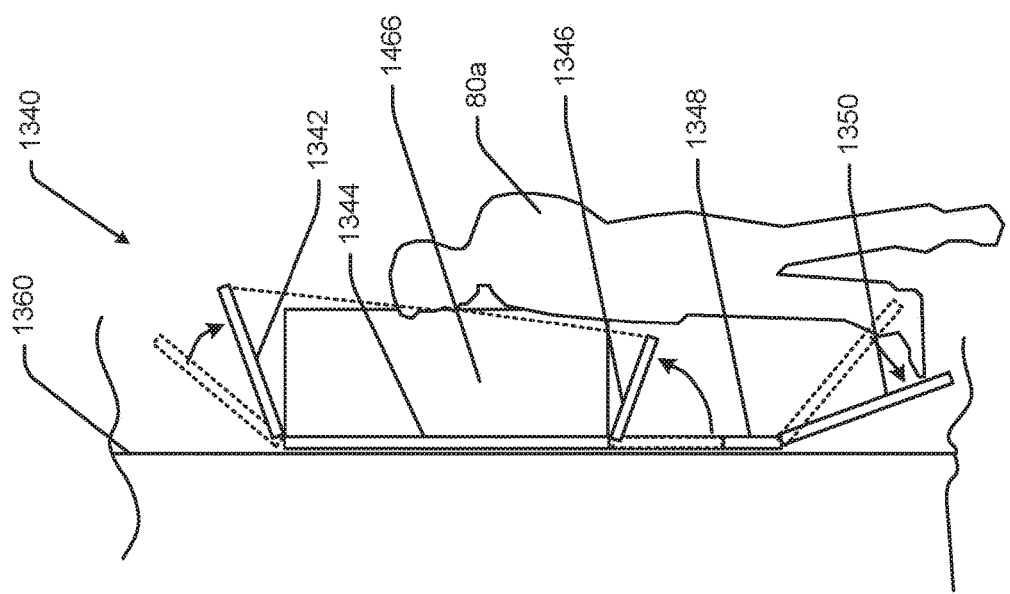
FIG. 67 is a view similar to the FIG. 65 view, albeit where a subset of the moveable surfaces has been driven into a different position to support an employee that has moved even closer to the assembly.

Referring to FIG. 67, eventually, as the employee gets even closer to assembly 1340 a second trigger may occur that causes the server to further increase the angle of surface 1342 with respect to the vertical plane and to control the second telescoping subassembly to drive third surface 1346 up into a shelf supporting and substantially horizontal position for use by the employee. In addition, surface 1362 may be moved back toward its parked and stored position for several reasons. First, once third surface 1346 is moved into its substantially horizontal position, the proximate employee no longer has the ability to easily see surface 1350 and therefore surface 1350 serves little purpose for the proximate employee. Second, when moved back to or toward the parked position, fifth surface 1350 can again operate to present content to be viewed by other employees that are located at a greater distance from assembly 1340 which is better served by surface 1350 in the parked position. Third, by moving surface 1350 toward its parked position, foot space is cleared for the proximate employee adjacent assembly 1340.

Consistent with the idea of information being arranged with new or suggested information in an upper position, currently considered information in an intermediate position and old or previously examined or considered information in a lower position, FIG. 64 shows an exemplary information or content presentation scheme where the upper first surface 1342 presents suggested content to be considered next, the three middle surfaces 1344, 1346 and 1348 present currently contemplated content and the lower or fifth surface 1350 presents previously viewed content. Here, one way to think about the content presentation is that new ideas are in the cloud up above to be aspired to, current content is front and center and old or prior content exists in the ground, fermenting until re-harvested at a later time when it is brought up into the current view on surfaces 1344, 1346 and 1348. In the case of the old content presented at the bottom of assembly 1340, scrolling arrows are provided at 1351 to enable an employee to scroll back or forward through previous content. In this regard it is contemplated that in many cases involving large projects and many meetings or sessions, content considered and developed by a project team will have many iterations and manifestations over time. In FIG. 64 the scrolling arrows 1352 enable a user to scroll backward and forward in time to view differently aged content.

Referring again to FIG. 64, the new or suggested content on surface 1342 may be automatically generated by the system server based on one or both of the currently considered content and the previously considered content. For instance, the server may be programmed to identify key words in current or prior content and to generate search engine queries to access related information to be presented on surface 1342.

Figure 68:
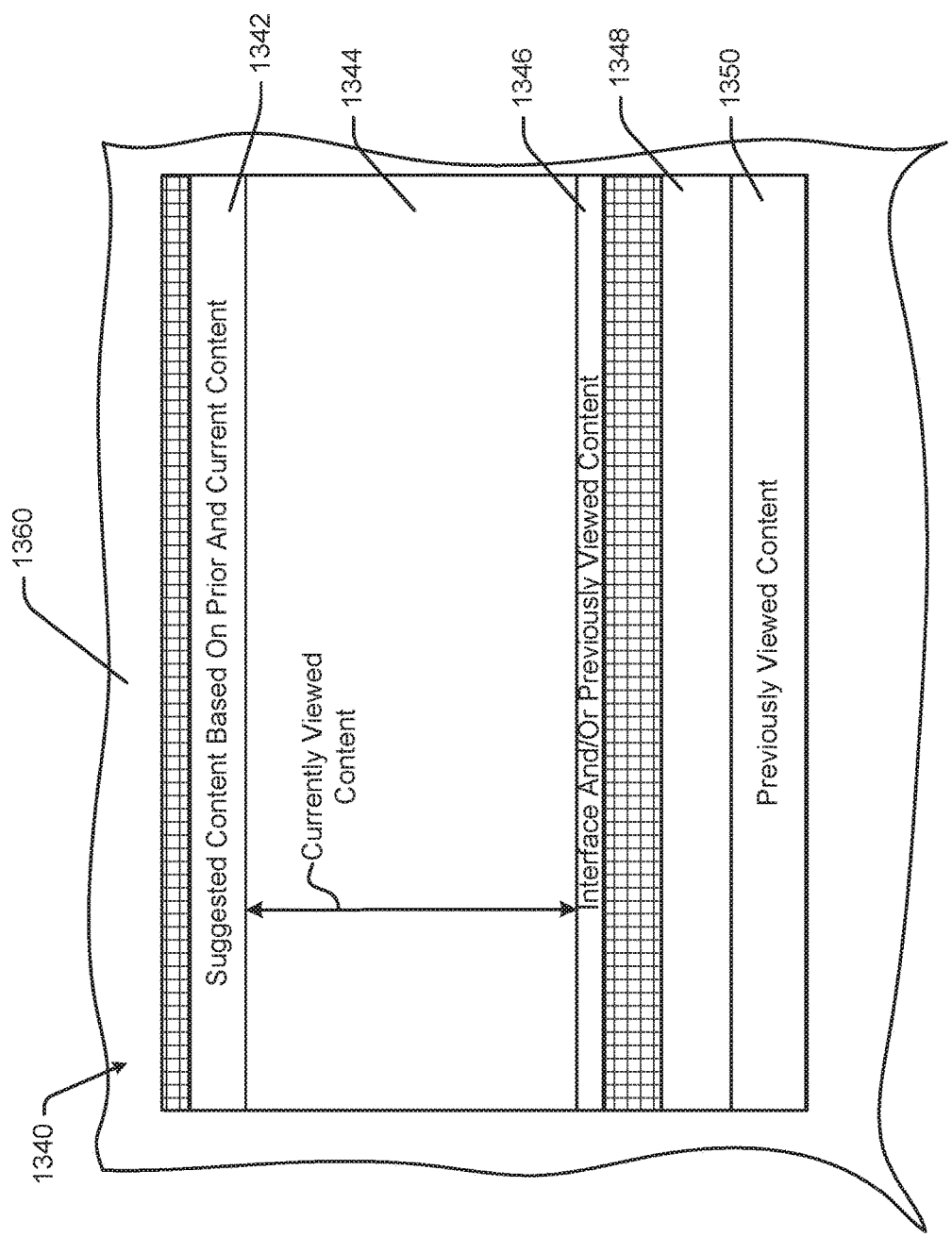
FIG. 68 is a view similar to FIG. 64, albeit showing the surfaces in the operating state of FIG. 67.

Referring to FIG. 68, assembly 1340 is shown with the surfaces 1342, 1346 and 1350 in the positions illustrated in FIG. 67 and with different content sets automatically presented thereon. As shown, the new or suggested content is still presented on surface 1342 for use by a proximate employee. Here, however, the shelf forming surface 1346 now presents the previously viewed or considered content and may present some type of specialized user interface for presenting relatively private information to the employee. Thus, because the employee is proximate the assembly 1340 in FIG. 68, it makes sense to present content differently and to arrange emissive surfaces differently to best support the employee.

Figure 69:
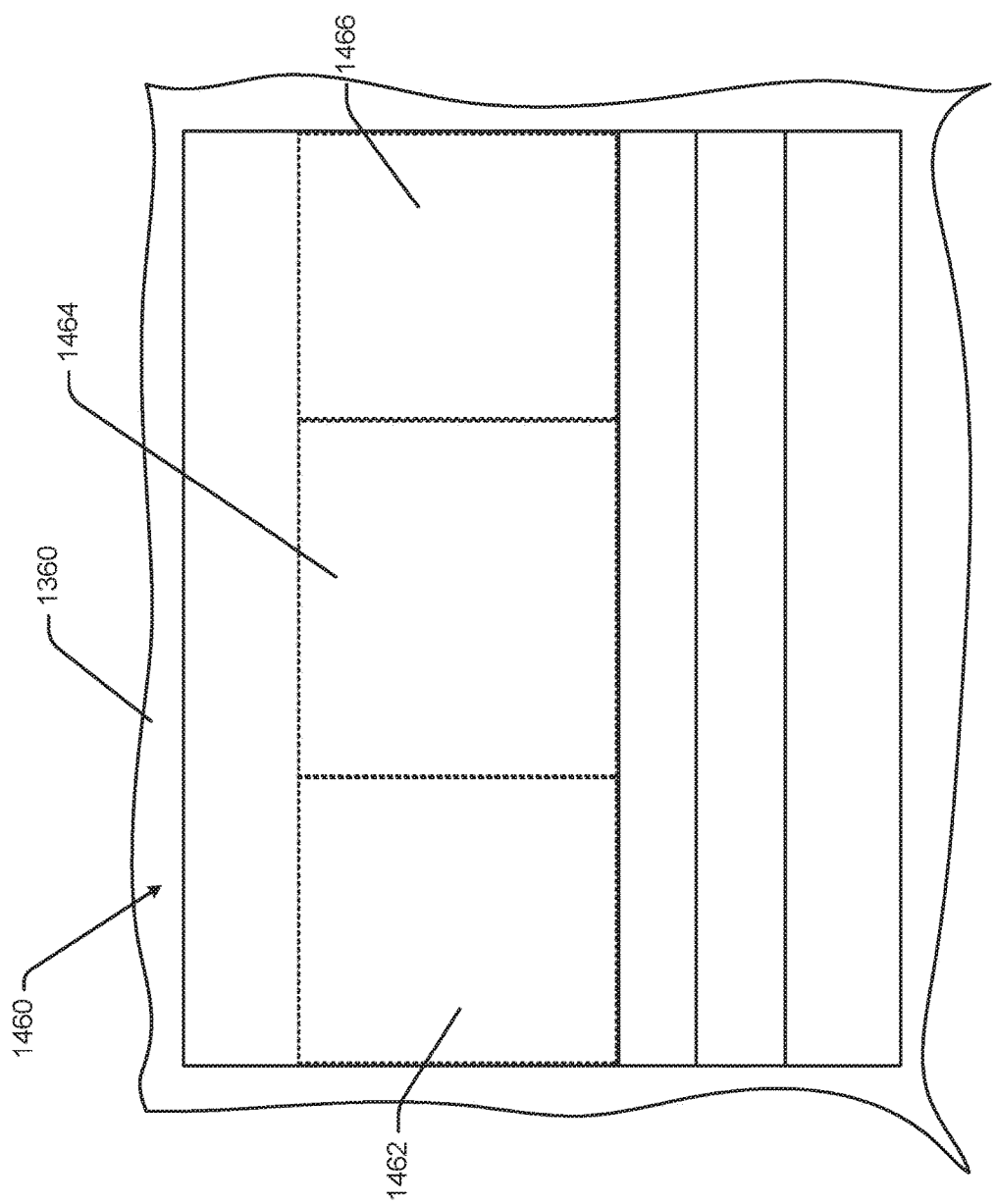
FIG. 69 is a view similar to the view of FIG. 64, albeit showing a different surface assembly.

Referring now to FIG. 69, another emissive surface assembly 1460 is illustrated that is similar to the assembly 1340 in FIG. 64. The difference between assemblies 1340 and 1460 is that assembly 1460 includes three separate emissive surfaces for surface 1344 where including a central stationary surface 1464 flanked on either side by moveable surfaces 1462 and 1466. Here, when an employee moves into close proximity with the assembly 1460 (e.g., see FIG. 67), in addition to the other surfaces being controlled as described above, side surface 1462 and 1466 move are controlled to angle inward (see side surface 1466 in FIG. 67) to, in effect, surround the employee with emissive surfaces that are substantially perpendicular to the employee's lines of sight to the surfaces.

In at least some cases, two or more of the sub-foveal affordance configurations described above may be combined to provide additional useful features. For instance, see FIGS. 70 and 71 where first and second 1190a and 1190b of the affordances shown in and described above with respect to FIGS. 51 through 56 are arranged side by side to form a single affordance configuration 1500. As shown, each of the affordances 1190a and 1190b has a similar shape and design including flat surfaces and curved surfaces that form an undulating structure. In FIGS. 71 and 72, surfaces included in affordance 1190a that are similar to the surfaces described above with respect to FIG. 51 are labelled with the same number as in FIG. 51 followed by a small "a" and affordance 1190b surfaces that are similar to the surfaces described above with respect to FIG. 51 are labelled with the same number as in FIG. 51 followed by a small "b". while affordance 1190b is adjacent affordance 1190a, affordance 1190b has been rotated 180 degrees so that the high and low ends of affordance 1190b are near the low and high ends of affordance 1190a. Thus, slanted lower surface 1194a is proximate slanted high surface 1213b and so on. Advantageously, while lower horizontal surface 1200a can be used by a first employee on one side of configuration 1500, another employee may be directly across from the first employee using the higher emissive surface 1208b. Here, lower surface 1200a spaces a user on that side of configuration 1500 from surface 1208b so that the second user would have a stronger sense of being isolated from the first user. Similarly, two other employees may be directly across from each other using surfaces 1208a and 1204b.

Figure 70:
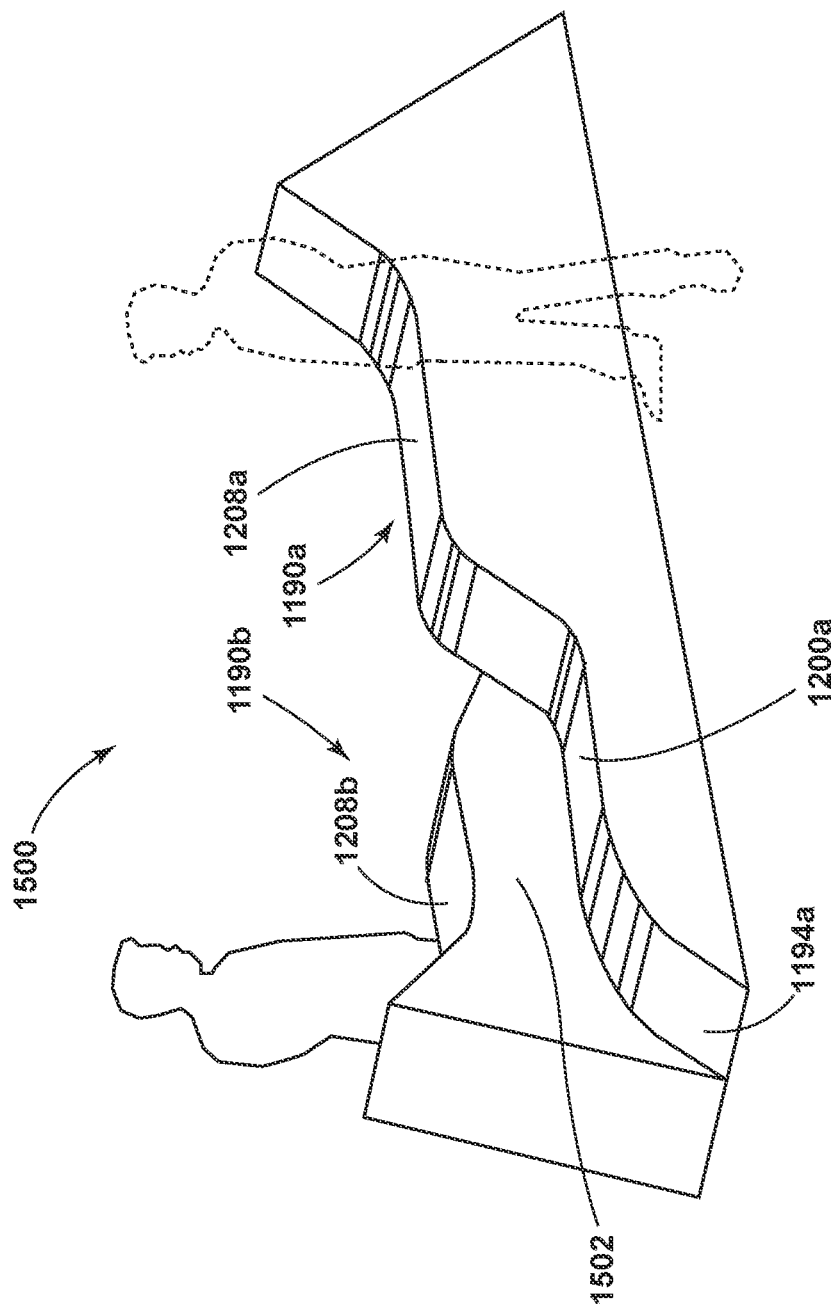
FIG. 70 is a view similar to the view in FIG. 51, albeit showing two affordances in a side by side configuration.
Figure 71:
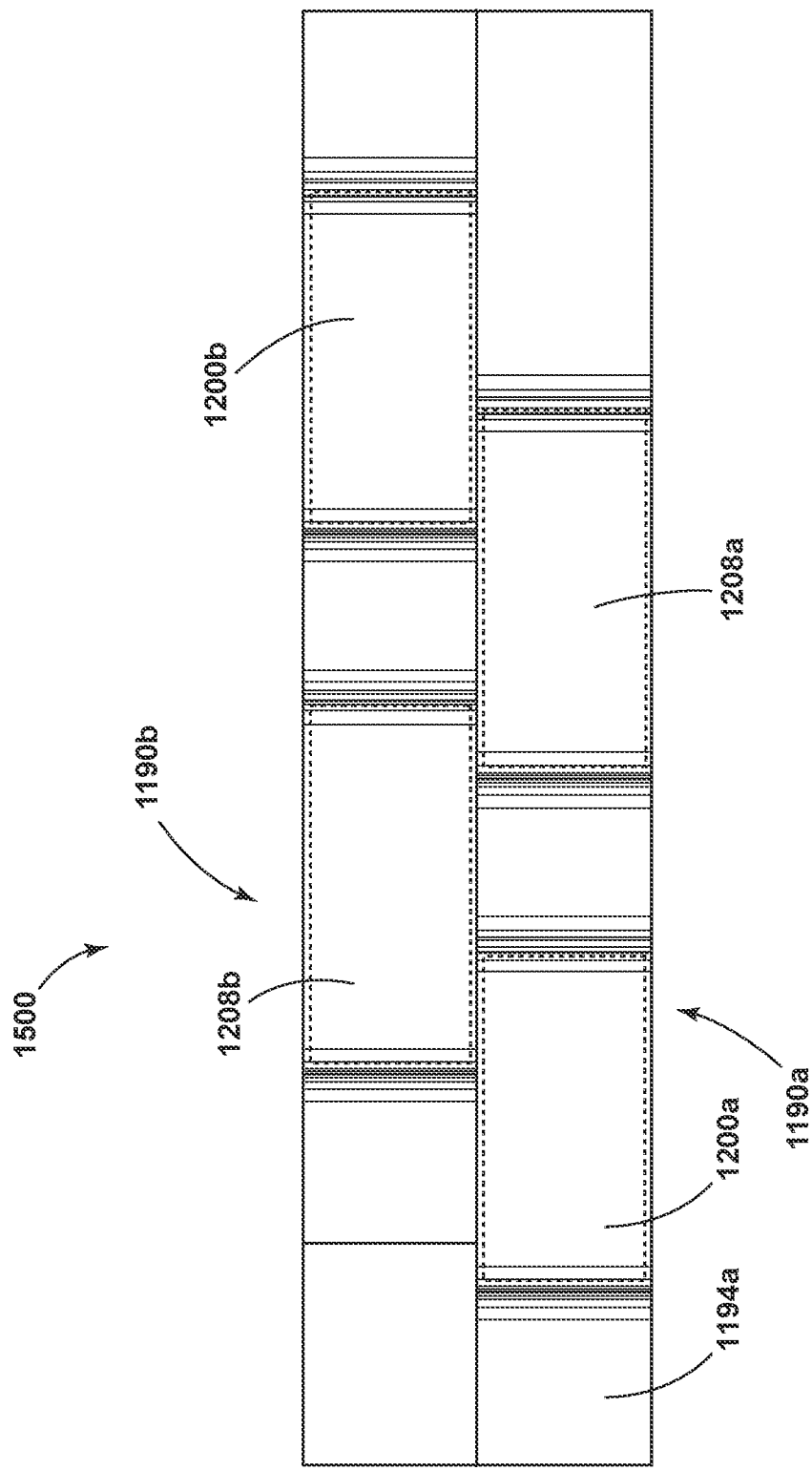
FIG. 71 is a top plan view of the configuration shown in FIG. 70.

Referring still to FIG. 70, side surfaces of affordances 1190a and 1190b may also be emissive. For instance, side surface 1502 of affordance 1190b may be emissive and be used to present content to an employee adjacent surface 1200a and a similar surface on affordance 1190a may present additional content to an employee using surface 1200b (see again FIG. 71).

In addition to the insights above, it has also been recognized that where content or information is projected onto a floor surface, in addition to paying attention to that content, if an employee is not somehow restricted to a path through the projection area, the employee will typically take a path that does not pass through the projected content. Thus, floor projected content has the added benefit of operating as a non-physical tool for affecting employee movement and positions within space. One useful way to use projected information has already been illustrated in FIG. 50 where content is projected onto floor areas 1400a and 1404a on either side of an employee 80b adjacent the central portion of surface 1382. Here, by projecting information into areas on either side of employee 80a, a subtle message is delivered to other employees not to crowd employee 80b at affordance 1380. Another useful way to use projected information is shown at 1402a in FIG. 50 where information is projected onto a floor area adjacent lower slanted surface 1384. Here, the subtle message is that employees should stay away from the area immediately adjacent slanted surface 1384 which reduced obstruction of lines of sight to surface 1384. Projected content in areas 1400a and 1404a in FIG. 50 has a similar effect with respect to slanted adjacent surfaces 1388 and 1392.

Thus, it should be appreciated that at least some embodiments of the present disclosure include sub-foveal emissive surfaces where surface height and angle as well as projected content in space operate to restrict employee views of content presented in various ways.

There are several other pending applications owned by the assignee of this application that describe various types of emissive surface arrangements that include foveal surfaces and concepts including U.S. patent application Ser. No. 14/995,367 which is titled "Emissive Shapes And Control Systems" which was filed on Jan. 14, 2016 and U.S. provisional patent application No. 62/205,392 which is titled "Affordance Template System And Method" which was filed on Aug. 14, 2015, each of which is incorporated herein its entirety by reference.

Thus, the invention is to cover all modifications, equivalents, and alternatives falling within the spirit and scope of the invention as defined by the following appended claims. To apprise the public of the scope of this invention, the following claims are made:

What is claimed is:

1. A method for use with a threshold display surface, the method for facilitating employee transitions into and out of meeting spaces proximate the threshold display surface, the method comprising the steps of:
    storing a space schedule in a database where the space schedule indicates meetings scheduled for meeting spaces in an enterprise space;
    storing employee schedules in a database where the employee schedules indicate meetings that employees are scheduled to attend within the meeting spaces;
    identifying locations of employees within the enterprise space in which the threshold display surface resides;
    determining identities of employees at locations proximate the threshold display surface;
    when a first employee is proximate the threshold display surface, identifying a meeting that the first employee is scheduled to attend in one of the meeting spaces;
    presenting meeting status information related to status of the meeting that the first employee is to attend via the threshold display surface;
    determining statuses of other employees scheduled to attend the meeting that the first employee is to attend;
    presenting employee status information for at least a subset of the other employees scheduled to attend the meeting via the threshold display surface; and
    after the meeting that the first employee is to attend is completed, detecting that the first employee is approaching the threshold display surface and presenting other information associated with the completed meeting to the first employee for consideration.

2. The system of claim 1 wherein the meeting status information changes automatically as the distance between the employee and the threshold display surface changes.

3. The system of claim 1 wherein at least some of the employee status information includes information related to locations of the other employees.

4. The system of claim 3 wherein at least some of the employee status information relates to estimated times of arrival of employees scheduled to attend the meeting.

5. A method for use with a threshold display surface, the method for facilitating employee transitions into and out of meeting spaces proximate the threshold display surface, the method comprising the steps of:
    storing a space schedule in a database where the space schedule indicates meetings scheduled for meeting spaces in an enterprise space;
    storing employee schedules in a database where the employee schedules indicate meetings that employees are scheduled to attend within the meeting spaces;
    identifying locations of employees within the enterprise space in which the threshold display surface resides;
    presenting meeting status information related to status of a meeting via the threshold display surface;
    determining statuses of other employees scheduled to attend the meeting;
    presenting employee status information for at least a subset of the employees scheduled to attend the meeting via the threshold display surface; and
    after the meeting is completed, detecting that a first employee is approaching the threshold display surface and presenting other information associated with the completed meeting to the first employee for consideration.

6. A method for use with a threshold display surface, the method for facilitating employee transitions into and out of meeting spaces proximate the threshold display surface, the method comprising the steps of:
    storing a space schedule in a database where the space schedule indicates meetings scheduled for meeting spaces in an enterprise space;
    identifying locations of employees within the enterprise space in which the threshold display surface resides including the location of a first employee;
    determining that the first employee attends a meeting in the enterprise space;
    presenting meeting status information related to status of the meeting via the threshold display surface while the meeting is ongoing; and
    after the meeting is completed, detecting that the first employee is approaching the threshold display surface and presenting other information via the threshold display surface associated with the completed meeting to the first employee for consideration.

7. A system for transitioning employees from one enterprise space to another enterprise space, the system comprising:
    a database storing schedule information associated with different meeting spaces within the enterprise space;
    at least a first threshold display surface for presenting digital content to at least one employee when the emissive surface is in the field of view of the at least one employee, the first threshold display surface located proximate at least a first meeting space;
    an employee tracking system for tracking the locations and identities of employees within the enterprise space;
    a processor programmed to present content on the emissive surface, the processor programmed to perform the steps of:
    (i) receiving employee tracking information including locations and identities of employees from the tracking system;
    (ii) determining the relative juxtapositions of employees in the enterprise space with respect to the first threshold display surface;
    (iii) identifying content to be presented on the first threshold display surface based on identity of a first employee located near the first threshold display surface, a distance between the first employee and the threshold display surface and the schedule information in the database for the first meeting space; and
    (iv) presenting the identified content via the first threshold display surface;
    after the meeting that the first employee is to attend is completed, detecting that the first employee is approaching the threshold display surface and presenting other information associated with the completed meeting to the first employee for consideration.

8. The system of claim 7 wherein at least some of the content include information related to identities of employees in the first meeting space.

9. The system of claim 7 wherein the other information associated with the completed meeting includes a content queue that renders content considered during the meeting accessible.

10. A system for transitioning employees from one enterprise space to another enterprise space, the system comprising:
   a database storing schedule information associated with different meeting spaces within the enterprise space;
   at least a first threshold display surface for presenting digital content to at least one employee when the emissive surface is in the field of view of the at least one employee, the first threshold display surface located proximate at least a first meeting space;
   an employee tracking system for tracking the locations and identities of employees within the enterprise space;
   a processor programmed to present content on the emissive surface, the processor programmed to perform the steps of:
   (i) receiving employee tracking information including locations and identities of employees from the tracking system;
   (ii) determining the relative juxtapositions of employees in the enterprise space with respect to the first threshold display surface;
   (iii) identifying content to be presented on the first threshold display surface based on identity of a first employee located near the first threshold display surface, a distance between the first employee and the threshold display surface and the schedule information in the database for the first meeting space; and
   (iv) determining whether the first employee is scheduled to attend a meeting;
   (v) determining whether the first employee is within an intermediate distance range of the display surface, further away than the intermediate distance range or closer than the intermediate distance range; and
   (vi) presenting first, second and third content sets when the first employee is closer than the intermediate distance range, within the intermediate distance range and farther away than the intermediate distance range, respectively, wherein the first and second content sets are more detailed than the third content set when the employee is scheduled to attend the meeting, and the more detailed first and second content sets are not displayed to a second employee who is not scheduled to attend the meeting.

11. The system of claim 10 wherein the processor offers an employee that is closer than the intermediate distance range an option to view the third content set and only presents the third content set when the employee accepts the option.

12. The system of claim 11 wherein the third content set includes more detailed personal information than the first and second content sets.

13. The system of claim 11 wherein the display surface includes at least one section arranged so that the surface thereof is relatively precluded by an employee that is proximate the display surface and wherein the third content set is presented on the at least one section while content in the first and second content sets is presented on other sections of the display surface.

14. A method for use with a threshold display surface, the method for facilitating employee transitions into and out of meeting spaces proximate the threshold display surface, the method comprising the steps of:
   storing a space schedule in a database where the space schedule indicates meetings scheduled for meeting spaces in an enterprise space;
   storing employee schedules in a database where the employee schedules indicate meetings that employees are scheduled to attend within the meeting spaces;
   identifying locations of employees within the enterprise space in which the threshold display surface resides;
   determining identities of employees at locations proximate the threshold display surface;
   when a first employee is proximate the threshold display surface, identifying a meeting that the first employee is scheduled to attend in one of the meeting spaces;
   presenting meeting status information related to status of the meeting that the first employee is to attend via the threshold display surface;
   determining statuses of other employees scheduled to attend the meeting that the first employee is to attend;
   presenting employee status information for at least a subset of the other employees scheduled to attend the meeting via the threshold display surface;
   wherein, when a second employee is proximate the threshold display surface at the same time as the first employee, identifying a second meeting that the second employee is scheduled to attend in one of the meeting spaces;
   presenting meeting status information related to status of the second meeting that the second employee is to attend via the threshold display surface at the same time that the status information related to status of the first meeting is displayed;
   determining statuses of other employees scheduled to attend the second meeting that the second employee is to attend; and
   presenting employee status information for at least a subset of the other employees scheduled to attend the second meeting via the threshold display surface.

* * * * *